United States Patent
Kawamura et al.

(10) Patent No.: US 12,287,457 B2
(45) Date of Patent: Apr. 29, 2025

(54) IMAGING LENS AND IMAGING APPARATUS

(71) Applicant: FUJIFILM Corporation, Tokyo (JP)

(72) Inventors: Daiki Kawamura, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 450 days.

(21) Appl. No.: 17/377,480

(22) Filed: Jul. 16, 2021

(65) Prior Publication Data

US 2021/0341709 A1 Nov. 4, 2021

Related U.S. Application Data

(63) Continuation of application No. PCT/JP2020/003556, filed on Jan. 30, 2020.

(30) Foreign Application Priority Data

Jan. 31, 2019 (JP) ................................. 2019-016233
Jan. 29, 2020 (JP) ................................. 2020-012798

(51) Int. Cl.
   *G02B 13/00* (2006.01)
   *G02B 9/08* (2006.01)

(52) U.S. Cl.
   CPC ............. *G02B 13/003* (2013.01); *G02B 9/08* (2013.01)

(58) Field of Classification Search
   CPC .................................. G02B 9/08; G02B 13/003
   See application file for complete search history.

(56) References Cited

U.S. PATENT DOCUMENTS

| | | |
|---|---|---|
| 4,842,385 A | 6/1989 | Tanaka |
| 2010/0309339 A1 | 12/2010 | Yoshitsugu et al. |
| 2012/0307373 A1 | 12/2012 | Hamano et al. |
| 2013/0176385 A1 | 7/2013 | Saruwatari |
| 2014/0184856 A1 | 7/2014 | Iwasawa et al. |
| 2014/0347749 A1 | 11/2014 | Ono |
| 2014/0368926 A1 | 12/2014 | Suzuki |
| 2015/0002946 A1 | 1/2015 | Mori |
| 2015/0116848 A1 | 4/2015 | Yamada et al. |
| 2015/0212302 A1 | 7/2015 | Suzuki |
| 2015/0309328 A1 | 10/2015 | Takakubo |
| 2017/0108673 A1 | 4/2017 | Ichikawa |

(Continued)

FOREIGN PATENT DOCUMENTS

| | | |
|---|---|---|
| CN | 105045014 A | 11/2015 |
| CN | 104238086 B | 1/2018 |
| EP | 3136147 A1 | 3/2017 |

(Continued)

OTHER PUBLICATIONS

International Search Report issued in PCT/JP2020/003556; mailed Mar. 31, 2020.

(Continued)

*Primary Examiner* — Jack Dinh
(74) *Attorney, Agent, or Firm* — Studebaker Brackett PLLC

(57) ABSTRACT

An imaging lens includes, successively in order from a position closest to an object side, a positive first lens group that does not move during focusing, a stop, and a positive second lens group that moves during focusing. The second lens group consists of all lenses that integrally move during focusing. The imaging lens satisfies predetermined conditional expressions.

40 Claims, 62 Drawing Sheets

EXAMPLE 1

(56) References Cited

U.S. PATENT DOCUMENTS

| | | |
|---|---|---|
| 2018/0095256 A1 | 4/2018 | Iwamoto et al. |
| 2018/0341092 A1 | 11/2018 | Machida |

FOREIGN PATENT DOCUMENTS

| | | | |
|---|---|---|---|
| JP | S60-006914 A | 1/1985 | |
| JP | 2012-230432 A | 11/2012 | |
| JP | 2012-247758 A | 12/2012 | |
| JP | 2013-140308 A | 7/2013 | |
| JP | 2013-186458 A | 9/2013 | |
| JP | 2014-126850 A | 7/2014 | |
| JP | 2015-001641 A | 1/2015 | |
| JP | 2015-141384 A | 8/2015 | |
| JP | 2016-038418 A | 3/2016 | |
| JP | 2017-044887 A | 3/2017 | |
| JP | 2017-058478 A | 3/2017 | |
| JP | 2017-223778 A | 12/2017 | |
| JP | 2018-005099 A | 1/2018 | |
| JP | 2018-054987 A | 4/2018 | |
| WO | 2013/118468 A1 | 8/2013 | |
| WO | 2013/140718 A1 | 9/2013 | |
| WO | 2014/006844 A1 | 1/2014 | |
| WO | 2017/094662 A1 | 6/2017 | |

OTHER PUBLICATIONS

International Preliminary Report on Patentability and Written Opinion issued in PCT/JP2020/003556; issued Jul. 27, 2021.

An Office Action; "Notice of Reasons for Refusal," mailed by the Japanese Patent Office on Sep. 26, 2023, which corresponds to Japanese Patent Application No. 2020-568618 and is related to U.S. Appl. No. 17/377,480; with English language translation.

An Office Action; "Notice of Reasons for Refusal," mailed by the Japanese Patent Office on Jul. 11, 2023, which corresponds to Japanese Patent Application No. 2020-568618 and is related to U.S. Appl. No. 17/377,480; with English language translation.

An Office Action mailed by China National Intellectual Property Administration on Oct. 20, 2022, which corresponds to Chinese Patent Application No. 202080011667.5 and is related to U.S. Appl. No. 17/377,480; with English language translation.

EXAMPLE 1

EXAMPLE 2

EXAMPLE 3

EXAMPLE 4

EXAMPLE 6

EXAMPLE 7

EXAMPLE 8

EXAMPLE 9

EXAMPLE 11

EXAMPLE 1

EXAMPLE 2

EXAMPLE 3

EXAMPLE 3

EXAMPLE 4

EXAMPLE 4

EXAMPLE 5

EXAMPLE 7

EXAMPLE 7

EXAMPLE 8

EXAMPLE 8

EXAMPLE 9

EXAMPLE 10

EXAMPLE 11

EXAMPLE 12

EXAMPLE 13

EXAMPLE 14

EXAMPLE 15

EXAMPLE 16

EXAMPLE 17

EXAMPLE 18

EXAMPLE 19

EXAMPLE 20

EXAMPLE 12

FIG. 44
EXAMPLE 12
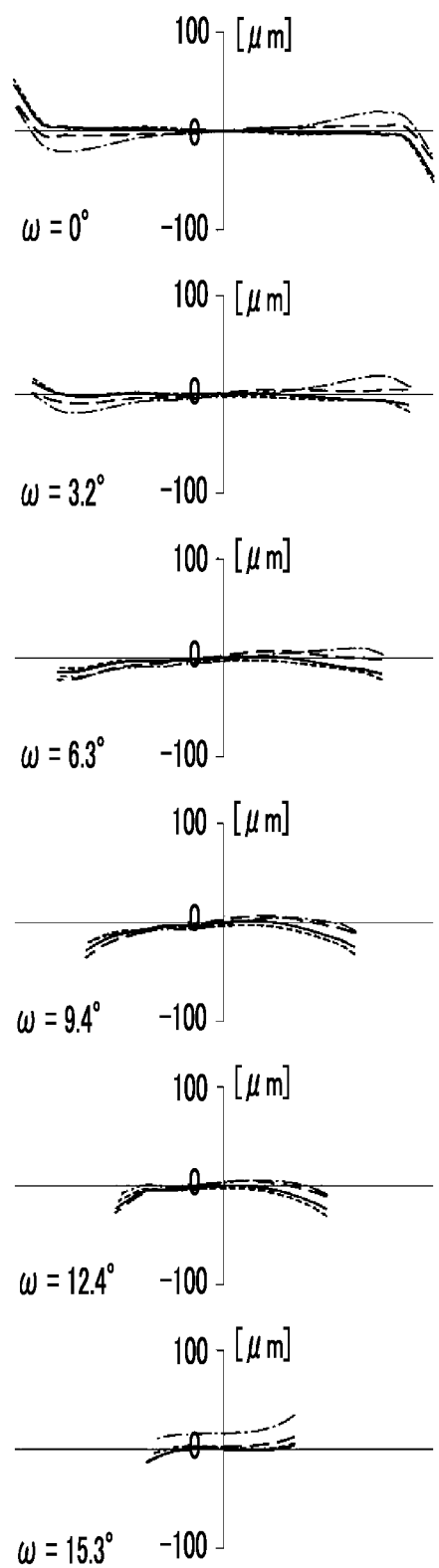
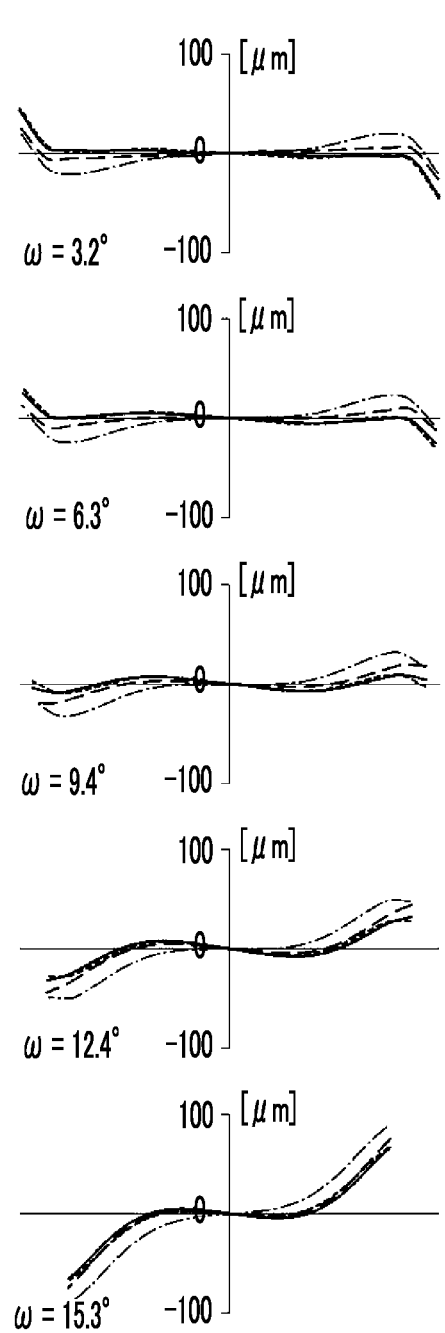

EXAMPLE 13

FIG. 46
EXAMPLE 13
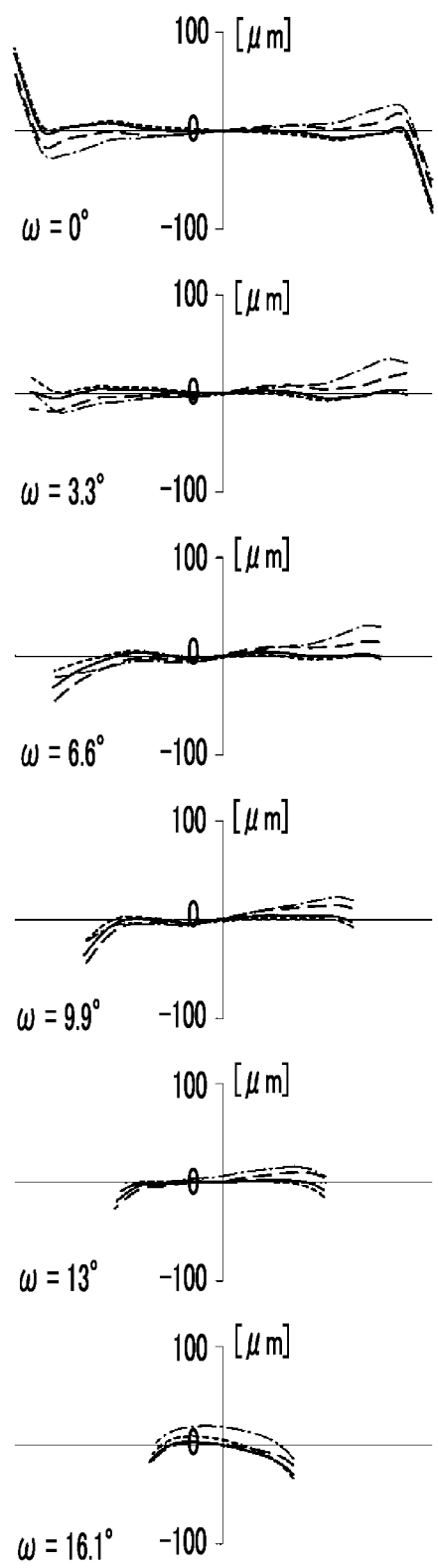
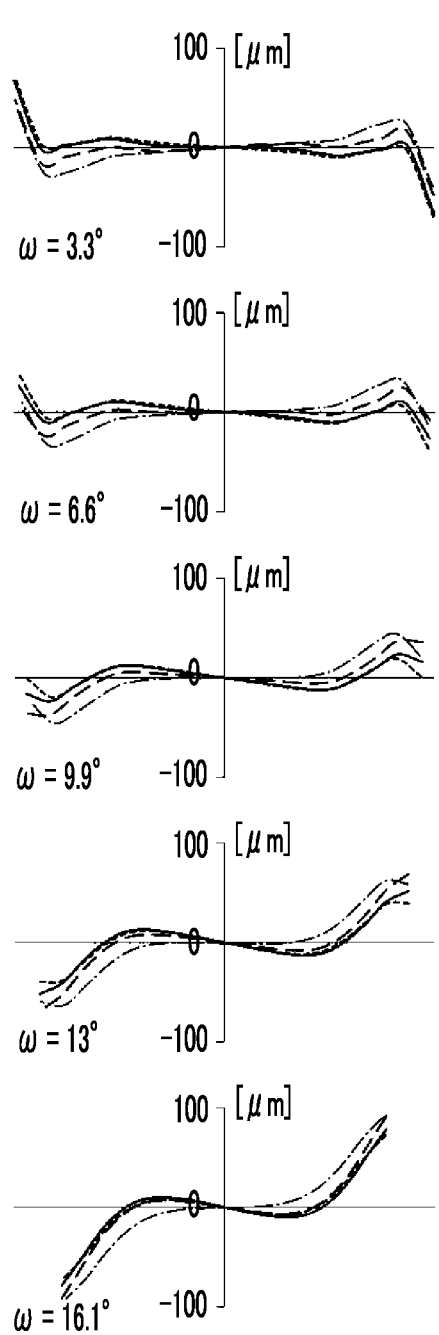

EXAMPLE 14

FIG. 48
EXAMPLE 14
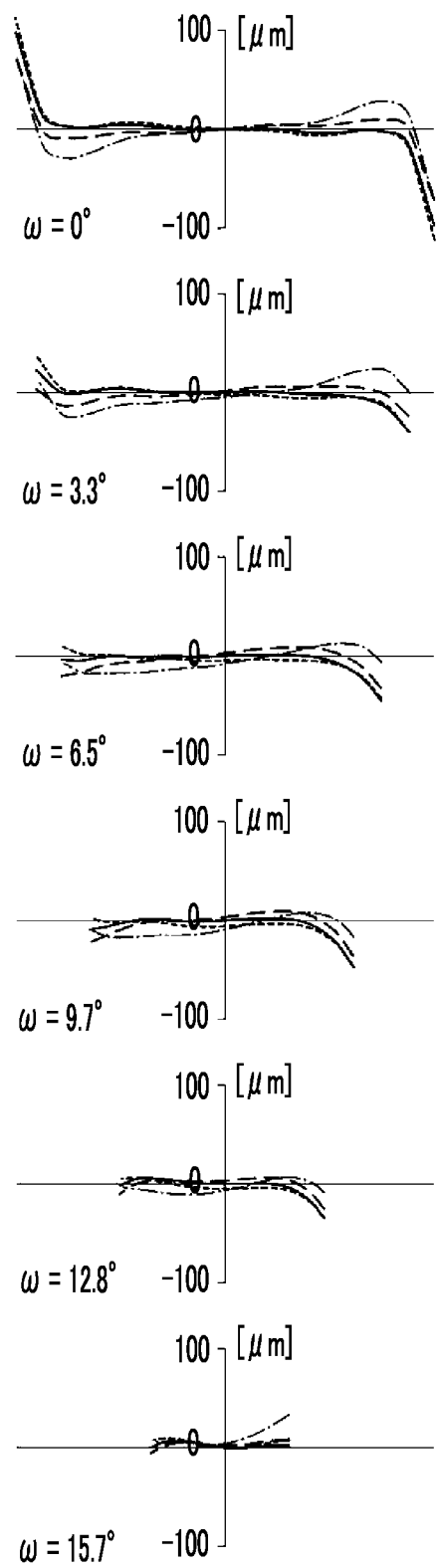
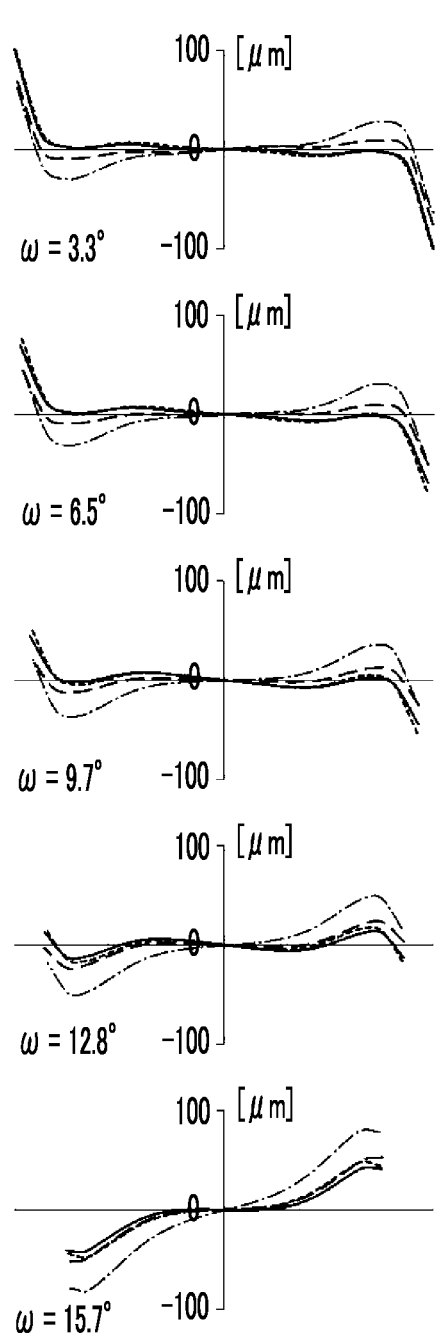

EXAMPLE 15

EXAMPLE 16

EXAMPLE 18

EXAMPLE 19

EXAMPLE 19

EXAMPLE 20

FIG. 60
EXAMPLE 20
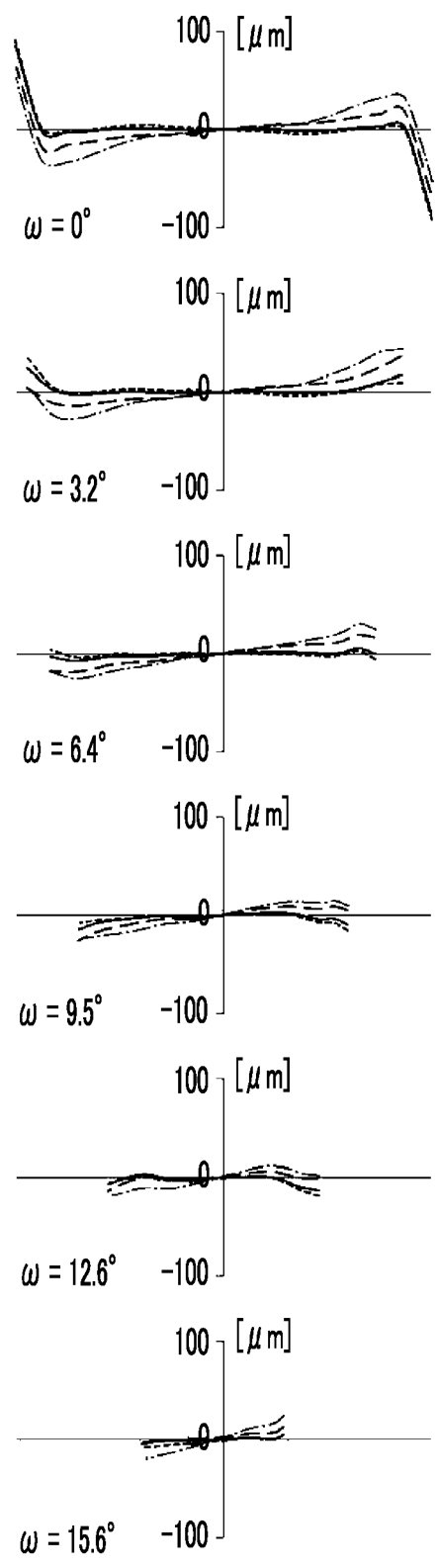
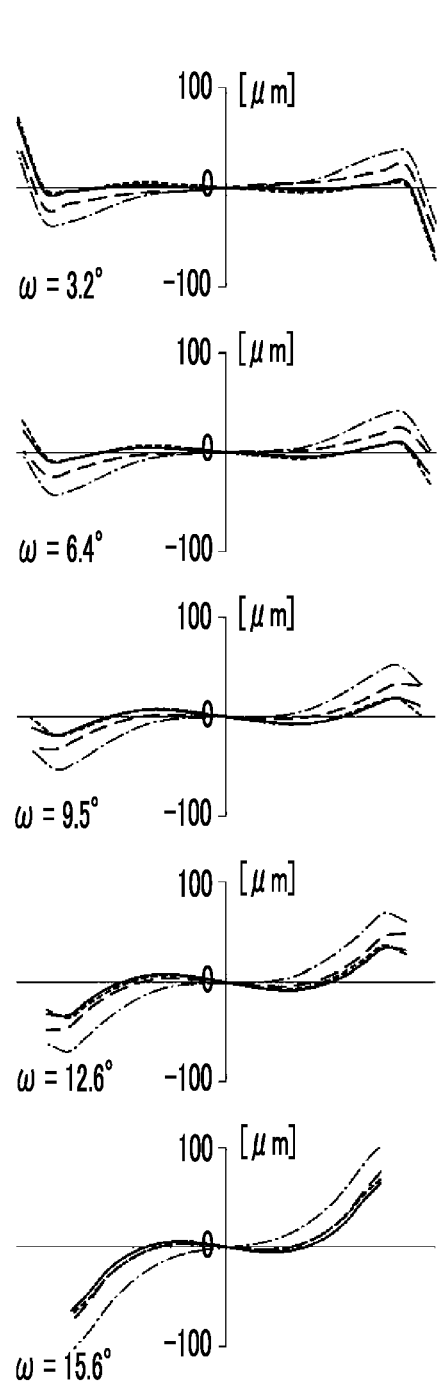

IMAGING LENS AND IMAGING APPARATUS

CROSS-REFERENCE TO RELATED APPLICATIONS

This application is a continuation application of International Application No. PCT/JP2020/003556, filed on Jan. 30, 2020, which is incorporated herein by reference in its entirety. Further, this application claims priority from Japanese Patent Application No. 2019-016233, filed on Jan. 31, 2019, and Japanese Patent Application No. 2020-012798, filed on Jan. 29, 2020. Each application above is hereby expressly incorporated by reference, in its entirety, into the present application.

BACKGROUND

Technical Field

The present disclosure relates to an imaging lens and an imaging apparatus.

Related Art

In the related art, as a lens system that can be used in an imaging apparatus such as a digital camera, a Gauss type lens system and a modified Gauss type lens system have been proposed. As the lens system similar to these Gauss types, for example, lens systems described in JP2018-005099A, JP2018-54987A, and JP2015-141384A are known.

The Gauss type lens system is often used for a lens system having a small F number. In some of JP2018-005099A, JP2018-54987A, and JP2015-141384A, it is desired to achieve a small F number as one of objects. However, in recent years, there has been a demand for a lens system having an F number smaller than the F number of the lens systems described in JP2018-005099A, JP2018-54987A, and JP2015-141384A.

The Gauss type has a problem in that sagittal coma aberration increases in a case where the angle of view increases. However, there has been a demand for a lens system which has a small F number and in which aberrations are satisfactorily corrected to obtain a high-quality image.

A lens system having a small F number has a problem in that there is a disadvantage in increasing the speed of autofocus since the weight of a group (hereinafter referred to as a focus group) that moves during focusing increases. Thus, it is preferable for the focus group to be reduced in weight.

SUMMARY

The present disclosure has been made in consideration of the above-mentioned situation, and its object is to provide an imaging lens, which has high optical performance by achieving a small F number and reduction in weight of a focus group and satisfactorily correcting aberrations, and an imaging apparatus comprising the imaging lens.

According to an aspect of the present disclosure, there is provided an imaging lens comprising, successively in order from a position closest to an object side to an image side: a first lens group that remains stationary with respect to an image plane during focusing and has a positive refractive power; a stop; and a second lens group that moves during focusing and has a positive refractive power. The second lens group consists of all lenses, which integrally move during focusing, among lenses which are disposed closer to the image side than the stop. In addition, assuming that a maximum value of heights of a paraxial ray from an optical axis in the first lens group is H1max, in a case in which paraxial ray tracing is performed by causing the paraxial ray, of which a height from the optical axis on a lens surface closest to the object side in the first lens group is H1f, and which is parallel to the optical axis, to be incident from the object side, Conditional Expression (1) is satisfied.

$$1.05 < H1max/H1f < 2 \quad (1)$$

It is preferable that the imaging lens of the above aspect of the present disclosure satisfies Conditional Expression (1-1).

$$1.1 < H1max/H1f < 2 \quad (1\text{-}1)$$

In the imaging lens according to the aspect of the present disclosure, assuming that a height of the paraxial ray from the optical axis on a lens surface closest to the object side in the second lens group is H2f, it is preferable to satisfy Conditional Expression (2), and it is more preferable to satisfy Conditional Expression (2-1).

$$1.5 < H1max/H2f < 3.5 \quad (2)$$

$$1.7 < H1max/H2f < 2.5 \quad (2\text{-}1)$$

In the imaging lens according to the aspect of the present disclosure, it is preferable that the first lens group includes at least two cemented lenses in which at least one positive lens and at least one negative lens are cemented.

In the imaging lens according to the aspect of the present disclosure, it is preferable that the first lens group includes at least five positive lenses and at least four negative lenses.

In the imaging lens according to the aspect of the present disclosure, it is preferable that the first lens group includes, successively in order from the image side to the object side, one or two negative lenses and three positive lenses convex toward the object side.

In the imaging lens according to the aspect of the present disclosure, it is preferable that the first lens group includes at least three biconvex lenses and at least one biconcave lens.

In the imaging lens according to the aspect of the present disclosure, it is preferable that the second lens group includes at least two positive lenses and at least two negative lenses.

In the imaging lens according to the aspect of the present disclosure, it is preferable that the first lens group includes at least one negative lens. In addition, it is preferable that an image side surface of the negative lens closest to the image side in the first lens group is a concave surface.

In the imaging lens according to the aspect of the present disclosure, it is preferable that the second lens group includes at least one negative lens. In addition, it is preferable that an object side surface of the negative lens closest to the object side in the second lens group is a concave surface.

In the imaging lens according to the aspect of the present disclosure, it is preferable that the first lens group and the second lens group each include at least one negative lens. It is preferable that an image side surface of the negative lens closest to the image side in the first lens group is a concave surface. It is preferable that an object side surface of the negative lens closest to the object side in the second lens group is a concave surface. Assuming that a radius of curvature of the image side surface of the negative lens closest to the image side in the first lens group is Rso, and a radius of curvature of the object side surface of the negative lens closest to the object side in the second lens group is Rsi, it is preferable to satisfy Conditional Expression (3).

$$-0.4<(Rso+Rsi)/(Rso-Rsi)<0.5 \qquad (3)$$

In the imaging lens according to the aspect of the present disclosure, assuming that a lateral magnification of the second lens group in a state where an object at infinity is in focus is β2, it is preferable to satisfy Conditional Expression (4).

$$0.2<\beta 2<0.8 \qquad (4)$$

In the imaging lens according to the aspect of the present disclosure, assuming that a lateral magnification of the second lens group in a state where an object at infinity is in focus is β2, and a combined lateral magnification of all lenses closer to the image side than the second lens group in a state in which the object at infinity is in focus is βr in a case where a lens is disposed closer to the image side than the second lens group, and βr is set to 1 in a case where no lens is disposed closer to the image side than the second lens group, it is preferable to satisfy Conditional Expression (5).

$$0.4<(1-\beta 2^2)\times \beta r^2<1.2 \qquad (5)$$

In the imaging lens according to the aspect of the present disclosure, it is preferable that the first lens group includes at least one positive lens and at least one negative lens. Assuming that an average of Abbe numbers of all positive lenses in the first lens group based on a d line is v1p, an average of Abbe numbers all negative lenses in the first lens group based on the d line is v1n, an average of partial dispersion ratios of all the positive lenses in the first lens group between a g line and an F line is θ1p, and an average of partial dispersion ratios of all the negative lenses in the first lens group between the g line and the F line is θ1n, it is preferable to satisfy Conditional Expressions (6) and (7).

$$5<v1p-v1n<45 \qquad (6)$$

$$0<\theta 1n-\theta 1p<0.07 \qquad (7)$$

In the imaging lens according to the aspect of the present disclosure, it is preferable that the second lens group includes at least one positive lens and at least one negative lens. Assuming that an average of Abbe numbers of all positive lenses in the second lens group based on a d line is v2p, an average of Abbe numbers of all negative lenses in the second lens group based on the d line is v2n, an average of partial dispersion ratios of all the positive lenses in the second lens group between a g line and an F line is θ2p, and an average of partial dispersion ratios of all the negative lenses in the second lens group between the g line and the F line is θ2n, it is preferable to satisfy Conditional Expressions (8) and (9).

$$-10<v2p-v2n<35 \qquad (8)$$

$$-0.03<\beta 2n-\theta 2p<0.07 \qquad (9)$$

In the imaging lens according to the aspect of the present disclosure, assuming that a focal length of the first lens group is f1, and a focal length of the second lens group is f2, it is preferable to satisfy Conditional Expression (10).

$$1<f1/f2<4.5 \qquad (10)$$

The imaging lens according to the aspect of the present disclosure may be configured to further comprise a subsequent group that is disposed to be subsequent to the second lens group on the image side of the second lens group and remains stationary with respect to the image plane during focusing. The imaging lens according to the aspect of the present disclosure may be configured to consist of the first lens group, the stop, and the second lens group.

In the imaging lens according to the aspect of the present disclosure, assuming that a focal length of the imaging lens in a state where an object at infinity is in focus is f and a focal length of the first lens group is f1, it is preferable to satisfy Conditional Expression (11).

$$0.2<f/f1<1 \qquad (11)$$

the imaging lens according to the aspect of the present disclosure, assuming that a focal length of the imaging lens in a state where an object at infinity is in focus is f and a focal length of the second lens group is f2, it is preferable to satisfy Conditional Expression (12).

$$0.5<f/f2<2 \qquad (12)$$

In the imaging lens according to the aspect of the present disclosure, assuming that a distance on the optical axis from a lens surface closest to the image side in the first lens group to an image side principal point position of the first lens group is P1, a sign of P1 is negative in a case where the image side principal point position of the first lens group is closer to the object side than the lens surface closest to the image side in the first lens group, and a sign of P1 is positive in a case where the image side principal point position is on the image side, and a distance on the optical axis between the first lens group and the second lens group in a state where an object at infinity is in focus is D12, it is preferable to satisfy Conditional Expression (13).

$$-5<P1/D12<20 \qquad (13)$$

In the imaging lens according to the aspect of the present disclosure, assuming that a maximum value of partial dispersion ratios of positive lenses in the first lens group between a g line and an F line is θ1max, it is preferable to satisfy Conditional Expression (14).

$$0.56<\theta 1max<0.7 \qquad (14)$$

In the imaging lens according to the aspect of the present disclosure, assuming that a maximum value of partial dispersion ratios of positive lenses in the second lens group between a g line and an F line is θ2max, it is preferable to satisfy Conditional Expression (15).

$$0.54<\beta 2max<0.7 \qquad (15)$$

In the imaging lens according to the aspect of the present disclosure, it is preferable that the first lens group includes at least one positive lens and at least one negative lens. Assuming that an average of partial dispersion ratios of all positive lenses in the first lens group between a g line and an F line is θ1p, and an average of partial dispersion ratios of all negative lenses in the first lens group between the g line and the F line is θ1n, an average of Abbe numbers of all the positive lenses in the first lens group based on a d line is v1p, and an average of Abbe numbers of all the negative lenses in the first lens group based on the d line is v1n, it is preferable to satisfy Conditional Expression (16).

$$-0.04<\theta 1p-\theta 1n+0.00163\times (v1p-v1n)<0.03 \qquad (16)$$

In the imaging lens according to the aspect of the present disclosure, it is preferable that the second lens group includes at least one positive lens and at least one negative lens. Assuming that an average of partial dispersion ratios of all positive lenses in the second lens group between a g line and an F line is θ2p, an average of partial dispersion ratios of all negative lenses in the second lens group between the g line and the F line is θ2n, an average of Abbe numbers of all the positive lenses in the second lens group based on a d line is ν2p, and an average of Abbe numbers of all the negative lenses in the second lens group based on the d line is ν2n, it is preferable to satisfy Conditional Expression (17).

$$-0.02 < \beta 2p - \theta 2n + 0.00163 \times (\nu 2p - \nu 2n) < 0.02 \quad (17)$$

In the imaging lens according to the aspect of the present disclosure, it is preferable that the first lens group includes at least three cemented lenses. Assuming that an average of refractive indices of all positive lenses in the cemented lens closest to the object side in the first lens group at a d line is Nce1Ap, and an average of refractive indices of all negative lenses in the cemented lens closest to the object side in the first lens group at the d line is Nce1An, it is preferable to satisfy Conditional Expression (18).

$$-0.2 < Nce1Ap - Nce1An < 0.35 \quad (18)$$

In the imaging lens according to the aspect of the present disclosure, it is preferable that the first lens group includes at least three cemented lenses. Assuming that an average of Abbe numbers of all positive lenses in the cemented lens closest to the object side in the first lens group based on a d line is vce1Ap, and an average of Abbe numbers of all negative lenses in the cemented lens closest to the object side in the first lens group based on the d line is vce1An, it is preferable to satisfy Conditional Expression (19).

$$-25 < vce1Ap - vce1An < 30 \quad (19)$$

In the imaging lens according to the aspect of the present disclosure, it is preferable that the first lens group includes at least four cemented lenses. Assuming that an average of refractive indices of all positive lenses in the cemented lens which is second from the object side in the first lens group at a d line is Nce1Bp, and an average of refractive indices of all negative lenses in the cemented lens which is second from the object side in the first lens group at the d line is Nce1Bn, it is preferable to satisfy Conditional Expression (20).

$$0 < Nce1Bp - Nce1Bn < 0.35 \quad (20)$$

In the imaging lens according to the aspect of the present disclosure, it is preferable that the first lens group includes at least four cemented lenses. Assuming that an average of Abbe numbers of all positive lenses in the cemented lens which is second from the object side in the first lens group based on a d line is vce1Bp, and an average of Abbe numbers of all negative lenses in the cemented lens which is second from the object side in the first lens group based on the d line is vce1Bn, it is preferable to satisfy Conditional Expression (21).

$$-20 < vce1Bp - vce1Bn < 20 \quad (21)$$

In the imaging lens according to the aspect of the present disclosure, it is preferable that the first lens group includes at least two cemented lenses. Assuming that an average of refractive indices of all positive lenses in the cemented lens which is second from the image side in the first lens group at a d line is Nce1Cp, and an average of refractive indices of all negative lenses in the cemented lens which is second from the image side in the first lens group at the d line is Nce1Cn, it is preferable to satisfy Conditional Expression (22).

$$-0.4 < Nce1Cp - Nce1Cn < 0.1 \quad (22)$$

In the imaging lens according to the aspect of the present disclosure, it is preferable that the first lens group includes at least two cemented lenses. Assuming that an average of Abbe numbers of all positive lenses in the cemented lens which is second from the image side in the first lens group based on a d line is vce1Cp, and an average of Abbe numbers of all negative lenses in the cemented lens which is second from the image side in the first lens group based on the d line is vce1Cn, it is preferable to satisfy Conditional Expression (23).

$$15 < vce1Cp - vce1Cn < 45 \quad (23)$$

In the imaging lens according to the aspect of the present disclosure, it is preferable that the first lens group includes at least one cemented lens. Assuming that an average of refractive indices of all positive lenses in the cemented lens closest to the image side in the first lens group at a d line is Nce1Dp, and an average of refractive indices of all negative lenses in the cemented lens closest to the image side in the first lens group at the d line is Nce1Dn, it is preferable to satisfy Conditional Expression (24).

$$-0.4 < Nce1Dp - Nce1Dn < 0.25 \quad (24)$$

In the imaging lens according to the aspect of the present disclosure, it is preferable that the first lens group includes at least one cemented lens. Assuming that an average of Abbe numbers of all positive lenses in the cemented lens closest to the image side in the first lens group based on a d line is vce1Dp, and an average of Abbe numbers of all negative lenses in the cemented lens closest to the image side in the first lens group based on the d line is vce1Dn, it is preferable to satisfy Conditional Expression (25).

$$0 < vce1Dp - vce1Dn < 45 \quad (25)$$

In the imaging lens according to the aspect of the present disclosure, it is preferable that the second lens group includes a three-piece cemented lens which is formed by cementing a positive lens, a negative lens, and a positive lens in order from the object side. Assuming that an average of refractive indices of all the positive lenses in the three-piece cemented lens in the second lens group at a d line is Nce2p, and a refractive index of the negative lens in the three-piece cemented lens in the second lens group at the d line is Nce2n, it is preferable that the imaging lens includes at least one three-piece cemented lens that satisfies Conditional Expression (26).

$$0 < Nce2p - Nce2n < 0.25 \quad (26)$$

In the imaging lens according to the aspect of the present disclosure, it is preferable that the second lens group includes a three-piece cemented lens which is formed by cementing a positive lens, a negative lens, and a positive lens in order from the object side. Assuming that an average of Abbe numbers of all the positive lenses in the three-piece cemented lens in the second lens group based on a d line is vce2p, and an Abbe number of the negative lens in the three-piece cemented lens in the second lens group based on the d line is vce2n, it is preferable that the imaging lens includes at least one three-piece cemented lens that satisfies Conditional Expression (27).

$$0 < vce2p - vce2n < 25 \quad (27)$$

In the configuration in which the imaging lens according to the aspect of the present disclosure further comprises the subsequent group on the image side of the second lens group, assuming that a focal length of the imaging lens in a state where an object at infinity is in focus is f, and a focal length of the subsequent group is fr, it is preferable to satisfy Conditional Expression (28).

$$-0.3 < f/fr < 0.4 \quad (28)$$

In the imaging lens according to the aspect of the present disclosure, assuming that a sum of a distance on the optical axis from a lens surface closest to the object side to a lens surface closest to the image side and a back focal length at an air conversion distance in a state where an object at infinity is in focus is TL, an F number of the imaging lens in the state where the object at infinity is in focus is FNo, and a focal length of the imaging lens in the state where the object at infinity is in focus is f, it is preferable to satisfy Conditional Expression (29).

$$1.5 < TL \times FNo/f < 5 \quad (29)$$

In the imaging lens according to the aspect of the present disclosure, it is preferable that the second lens group includes at least two positive lenses and at least three negative lenses.

It is preferable that the imaging lens according to the aspect of the present disclosure further comprises, successively in order from the position closest to the object side: a single lens that has a negative refractive power, a single lens that has a positive refractive power, and a single lens that has a positive refractive power.

In the imaging lens according to the aspect of the present disclosure, the number of lenses disposed closer to the object side than the stop is preferably 8 or less, and is more preferably 7 or less. The number of lenses included in the imaging lens according to the aspect of the present disclosure is preferably 13 or less, and more preferably 12 or less.

In the imaging lens according to the aspect of the present disclosure, assuming that a maximum half angle of view of the imaging lens in a state where an object at infinity is in focus is ωmax, and an F number of the imaging lens in the state where the object at infinity is in focus is FNo, it is preferable to satisfy Conditional Expression (30).

$$1.8 < 1/\{\tan(\omega max) \times FNo\} < 4.5 \quad (30)$$

In the imaging lens according to the aspect of the present disclosure, assuming that a distance on the optical axis from a lens surface closest to the object side to the stop in a state where an object at infinity is in focus is Tf, and a sum of a distance on the optical axis from the lens surface closest to the object side to a lens surface closest to the image side and a back focal length at an air conversion distance in the state where the object at infinity is in focus is TL, it is preferable to satisfy Conditional Expression (31).

$$0.2 < Tf/TL < 0.65 \quad (31)$$

In the imaging lens according to the aspect of the present disclosure, it is preferable that the first lens group includes, successively in order from the position closest to the object side, a first unit which has a negative refractive power and a second unit which is separated from the first unit by a maximum air distance on the optical axis in the first lens group and has a positive refractive power, the second unit consists of one single lens or one cemented lens. Assuming that a focal length of the imaging lens in a state where an object at infinity is in focus is f, and a combined focal length of all lenses of the imaging lens closer to the image side than the second unit in the state where the object at infinity is in focus is fm, it is preferable to satisfy Conditional Expression (32).

$$0.7 < f/fm < 0.98 \quad (32)$$

In a case where the first lens group of the imaging lens according to the aspect of the present disclosure includes the first unit and the second unit, it is preferable that the first unit consists of one negative lens, and the second unit consists of one positive lens.

An imaging apparatus according to another aspect of the present disclosure comprises the imaging lens according to the aspect of the present disclosure.

In the present specification, it should be noted that the terms "consisting of ~" and "consists of ~" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Similarly, the term "~ group having a negative refractive power" means that the group has a negative refractive power as a whole. "A lens having a positive refractive power", "a lens having a positive power" and "a positive lens" are synonymous. "A lens having a negative refractive power", "a lens having a negative power", and "a negative lens" are synonymous. Regarding the arrangement order, the phrase "in order from the object side to the image side" and the phrase "in order from the object side" are synonymous. Regarding aberrations, the term "high order" means 5th or more order. The term "single lens" means one uncemented lens.

The "lens group" is not limited to a configuration in which the lens group consists of a plurality of lenses, but the lens group may consist of only one lens. A compound aspheric lens (a lens in which a spherical lens and an aspheric film formed on the spherical lens are integrally formed and function as one aspheric lens as a whole) is not regarded as cemented lenses, but the compound aspheric lens is regarded as one lens. Unless otherwise specified, the sign of the refractive power, the surface shape of the lens surface, and the radius of curvature of a lens including an aspheric surface are considered in the paraxial region. The sign of the radius of curvature of the surface convex toward the object side is positive and the sign of the radius of curvature of the surface convex toward the image side is negative.

In the present specification, the term "whole system" means "imaging lens". In the present specification, the phrase "closest to the object side in the whole system" is also simply referred to as the "closest to the object side". The "focal length" used in a conditional expression is a paraxial focal length. The value of "FNo" used in Conditional Expression is the value of the open F number. The term "back focal length" is the distance on the optical axis from the lens surface closest to the image side to the image side focal position of the imaging lens. The values used in Conditional Expressions are values in a case where the d line is used as a reference in a state where the object at infinity is in focus. The partial dispersion ratio θgF between the g line and the F line of a certain lens is defined by θgF=(Ng−NF)/(NF−NC), where Ng, NF, and NC are the refractive indices of the lens at the g line, the F line, and the C line. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide an imaging lens, which has high optical performance by achieving a small F number and reduction in weight of a focus group and satisfactorily correcting aberrations, and an imaging apparatus comprising the imaging lens.

BRIEF DESCRIPTION OF THE DRAWINGS

FIG. 44 is a lateral aberration diagram of the imaging lens according to Example 12 of the present disclosure.

FIG. 46 is a lateral aberration diagram of the imaging lens according to Example 13 of the present disclosure.

FIG. 48 is a lateral aberration diagram of the imaging lens according to Example 14 of the present disclosure.

FIG. 60 is a lateral aberration diagram of the imaging lens according to Example 20 of the present disclosure.

DESCRIPTION OF EMBODIMENTS

Figure 1:
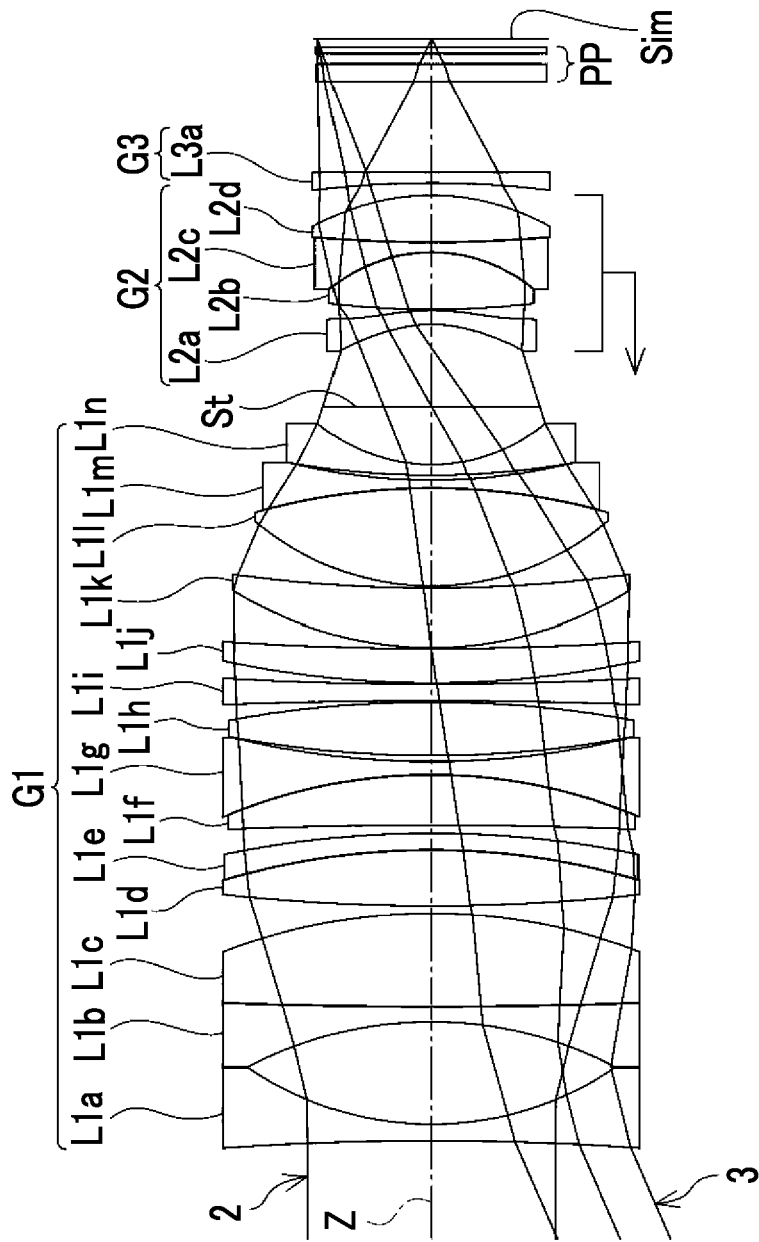
FIG. 1 is a cross-sectional view showing a configuration and rays of a first configuration example of an imaging lens according to an embodiment of the present disclosure corresponding to the imaging lens of Example 1 of the present disclosure.

Hereinafter, embodiments of the present disclosure will be described in detail with reference to the accompanying drawings. FIG. 1 is a diagram showing a cross-sectional configuration of a first configuration example of an imaging lens according to an embodiment of the present disclosure. The example shown in FIG. 1 corresponds to the imaging lens of Example 1 to be described later. FIG. 1 shows a state where the object at infinity is in focus, and shows on-axis rays 2 and rays with the maximum angle of view 3, where the left side is the object side and the right side is the image side. Similarly, FIGS. 2 to 11 show cross-sectional configurations of second to eleventh configuration examples of the imaging lens according to an embodiment of the present disclosure, respectively. The examples shown in FIGS. 2 to 11 correspond to imaging lenses of Examples 2 to 11 described later, respectively. Since the basic configurations of the examples shown in FIGS. 1 to 11 are the same, the following description will be given mostly with reference to FIG. 1.

It should be noted that FIG. 1 shows an example in which an optical member PP having a parallel plate shape is disposed between an imaging lens and an image plane Sim under assumption that the imaging lens is applied to the imaging apparatus. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens according to the present disclosure is a single-focus lens, and comprises, successively in order from the object side to the image side along the optical axis Z, a first lens group G1 having a positive refractive power, an aperture stop St, and a second lens group G2 having a positive refractive power. It should be noted that the aperture stop St shown in FIG. 1 does not indicate a shape thereof, but indicates a position thereof on the optical axis. Since positive refractive powers are respectively disposed on the object side and the image side of the aperture stop St, there is an advantage in correcting distortion and coma aberration. It should be noted that the imaging lens of the present disclosure may further comprise a lens group as a subsequent group on the image side of the second lens group G2. The imaging lens of the example shown in FIG. 1 comprises a third lens group G3 as a subsequent group. It should be noted that the term "lens group" in the present specification refers to a part including the at least one lens, which is a constituent part of the imaging lens and is divided by an air distance that changes during focusing. During focusing, the lens groups move or remain stationary, and the mutual distance between the lenses in one lens group does not change.

The imaging lens shown in FIG. 1 consists of a first lens group G1, an aperture stop St, a second lens group G2, and a third lens group G3 in order from the object side. The first lens group G1 consists of fourteen lenses L1a to L1n in order from the object side. The second lens group G2 consists of four lenses L2a to L2d in order from the object side. The third lens group G3 consists of one lens L3a. However, in the imaging lens of the present disclosure, the number of lenses composing each lens group may be different from that in the example shown in FIG. 1.

During focusing from the object at infinity to the closest object, the lens-to-lens distance in each lens group is unchangeable, the first lens group G1 remains stationary with respect to the image plane Sim, and the second lens group G2 moves as a focus group along the optical axis Z. The second lens group G2 consists of all the lenses that are arranged closer to the image side than the aperture stop St and that move integrally during focusing. That is, the second lens group G2 includes a lens disposed adjacent to the aperture stop St on the image side of the aperture stop St, and includes all lenses that move integrally with the lens during focusing. During focusing, the distance between the second lens group G2 and the subsequent group changes. It should be noted that the term "move integrally" means moving in the same amount and in the same direction at the same time. The horizontal left arrow under the second lens group G2 shown in FIG. 1 means that the second lens group G2 moves to the object side during focusing from the object at infinity to the closest object.

Since the first lens group G1 has a positive refractive power, the rays emitted from the first lens group G1 are converged and are incident into the second lens group G2. Therefore, it is easy to reduce the diameter of the lens of the focus group. As a result, the focus group can be reduced in size and weight. As a result, it is easy to deal with an increase in speed of autofocus.

By making the first lens group G1 remain stationary and moving the second lens group G2 during focusing, as compared with a configuration in which the entire lens system is moved during focusing, it is possible to reduce the weight of the focus group. In addition, it is possible to reduce fluctuation in field curvature during focusing. Since the second lens group G2 has a positive refractive power, there is an advantage in suppressing fluctuation in spherical aberration during focusing.

In the configuration of the imaging lens of the present disclosure, assuming that a maximum value of heights of a paraxial ray from the optical axis Z in the first lens group G1 is H1max, in a case in which paraxial ray tracing is performed by causing the paraxial ray, of which a height from the optical axis Z on a lens surface closest to the object side in the first lens group G1 is H1f, and which is parallel to the optical axis Z, to be incident from the object side, Conditional Expression (1) is satisfied. H1max/H1f in Conditional Expression (1) can be obtained from the value of H1max, for example, in a case where paraxial ray tracing is performed by causing a paraxial ray parallel to the optical axis Z to be incident from the object side, where H1f=1. By not allowing the result of Conditional Expression (1) to be equal to or less than the lower limit, it is possible to suppress occurrence of sagittal coma aberration. By not allowing the result of Conditional Expression (1) to be equal to or greater than the upper limit, it is possible to prevent spherical aberration from being insufficiently corrected. Therefore, there is an advantage in realizing an optical system having a small F number. It should be noted that more favorable characteristics can be obtained in a case where the configuration satisfies Conditional Expression (1-1) and even more favorable characteristics can be obtained in a case where the configuration satisfies Conditional Expression (1-2).

$$1.05 < H1\text{max}/H1f < 2 \tag{1}$$

$$1.1 < H1\text{max}/H1f < 2 \tag{1-1}$$

$$1.2 < H1\text{max}/H1f < 1.8 \tag{1-2}$$

Figure 61:
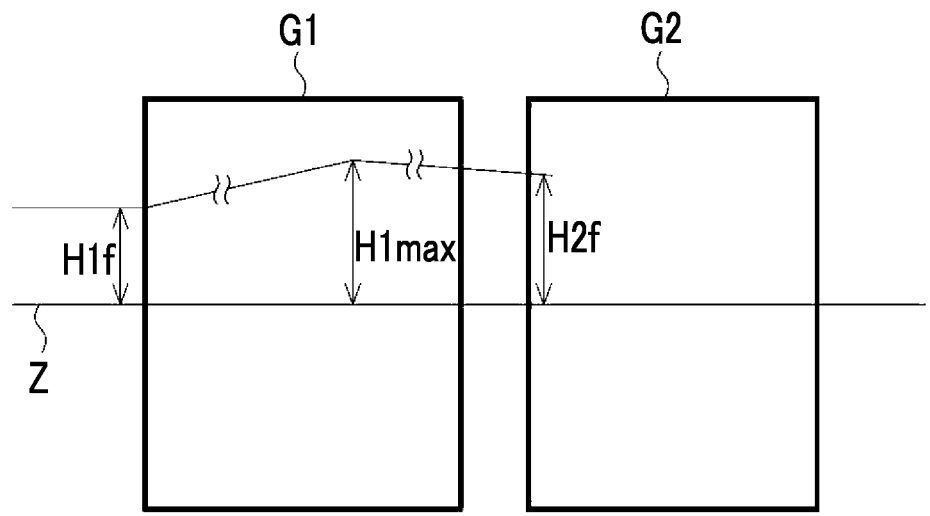
FIG. 61 is a conceptual diagram of H1f, H1max, and H2f.

As an example, FIG. 61 shows a conceptual diagram of H1f and H1max. The inclinations and heights of the rays shown in FIG. 61 are not necessarily accurate. The plane where the height of the paraxial ray from the optical axis Z is H1max (hereinafter referred to as an Hm plane) is a plane in which the sign of the angle formed by the paraxial ray and the optical axis Z changes, that is, rays change from a divergence state to a convergence state. In a system where a positive refractive power is provided to be closer to the image side than the Hm plane as in the imaging lens of the present disclosure, an exit angle of the paraxial ray from the Hm plane can be made relatively small. Therefore, in a case where the exit angle is set to be close to 0, the optical system from the surface closest to the object side in the whole system to the Hm plane is substantially an afocal system, and the whole system from the surface closest to the object side to the Hm plane can be regarded as a wide converter. It should be noted that even in a case where the lens is not strictly an afocal system, the angular magnification can be considered as in the afocal system.

Here, for explanation, the optical system is divided by the Hm plane, a portion in a range from the surface closest to the object side in the whole system to the Hm plane is referred to as an A lens group GA, and a portion in a range from the Hm plane to the surface closest to the image side in the whole system is referred to as a B lens group GB. With the above wide converter configuration, the focal length of the B lens group GB can be made longer than the focal length of the whole system. That is, the angle of view of the B lens group GB can be made smaller than the angle of view of the whole system.

Figure 62:
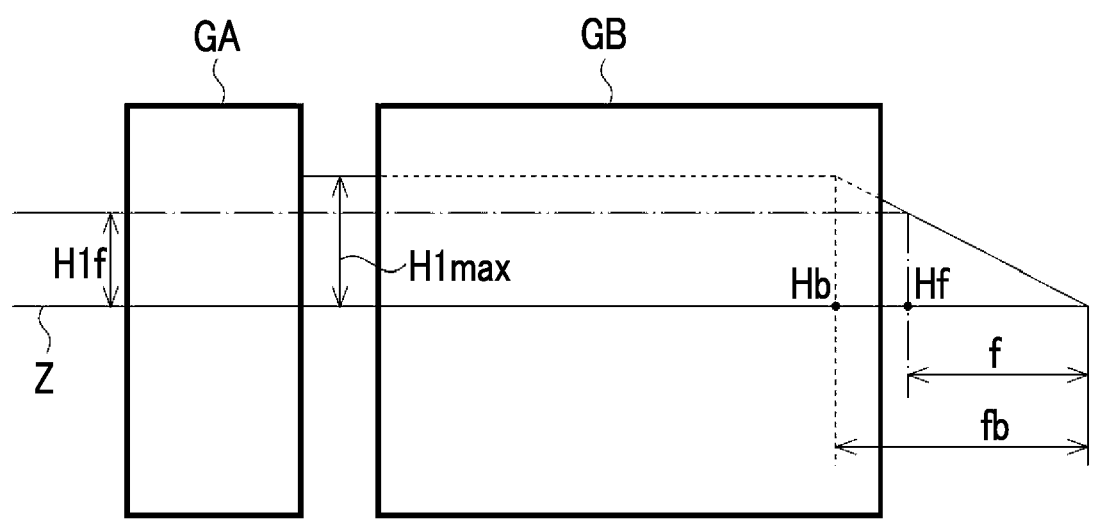
FIG. 62 is a conceptual diagram for describing a configuration relating to Conditional Expression (1).

FIG. 62 shows a conceptual diagram in a case where the A lens group GA is an afocal system. As shown in FIG. 62, by making H1max larger than H1f, the image side principal point position Hf of the whole system can be set to be closer to the image side than the image side principal point position Hb of the B lens group GB. Thus, the focal length fb of the B lens group GB can be made longer than the focal length f of the whole system. That is, the angle of view of the B lens group GB can be made smaller than the angle of view of the whole system. As the angle of view is smaller, correction of sagittal coma aberration is easier. Therefore, the configuration of the present disclosure is advantageous in correcting sagittal coma aberration.

Next, a preferable configuration and a possible configuration of the imaging lens of the present disclosure will be described. Assuming that the maximum value of heights of a paraxial ray from the optical axis Z in the first lens group G1 is H1max, in a case in which paraxial ray tracing is performed by causing the paraxial ray, of which the height from the optical axis Z on a lens surface closest to the object side in the first lens group G1 is H1f, and which is parallel to the optical axis Z, to be incident from the object side, and a height of the paraxial ray from the optical axis Z on the lens surface closest to the object side in the second lens group G2 is H2f, it is preferable to satisfy Conditional Expression (2). By not allowing the result of Conditional Expression (2) to be equal to or less than the lower limit, it is possible to suppress occurrence of sagittal coma aberration. Further, since the effective diameter of the lens of the focus group can be reduced, there is an advantage in reducing the weight of the focus group. Furthermore, spherical aberration occurring in the second lens group G2 can be suppressed. By not allowing the result of Conditional Expression (2) to be equal to or greater than the upper limit, it is easy to reduce the amount of movement of the focus group during focusing while maintaining an appropriate back focal length. In addition, it is easy to suppress spherical aberration occurring in the first lens group G1. In addition, in a case of a configuration in which Conditional Expression (2-1) is satisfied, it is possible to obtain more favorable characteristics.

$$1.5 < H1\max/H2f < 3.5 \quad (2)$$

$$1.7 < H1\max/H2f < 2.5 \quad (2\text{-}1)$$

It is preferable that the first lens group G1 includes at least five positive lenses and at least four negative lenses. With such a configuration, by not allowing the result of Conditional Expression (1) to be equal to or less than the lower limit, it is possible to suppress occurrence of higher-order spherical aberration and occurrence of difference in spherical aberration depending on wavelength. Further, since the first lens group G1 includes five or more positive lenses and four or more negative lenses, it is possible to provide a plurality of combinations of positive lenses and negative lenses. Thus, materials having various partial dispersion ratios are selectable, and both correction of first-order chromatic aberration and second-order chromatic aberration can be achieved. In order to obtain more favorable characteristics, it is more preferable that the first lens group G1 includes at least six positive lenses. Similarly, in order to obtain more favorable characteristics, it is more preferable that the first lens group G1 includes at least five negative lenses. However, in order to reduce the size, it is preferable that the number of positive lenses included in the first lens group G1 is equal to or less than 8. Similarly, in order to reduce the size, it is preferable that the number of negative lenses included in the first lens group G1 is equal to or less than 6.

It is preferable that the first lens group G1 includes one or two negative lenses and three positive lenses convex toward the object side successively in order from the image side to the object side. In such a case, the positive refractive power of the first lens group G1 can be prevented from becoming excessively strong by one or two negative lenses. Further, the height of the on-axis marginal ray can be gradually lowered toward the second lens group G2 by the three positive lenses convex toward the object side. In order to reduce the size, it is preferable that the number of positive lenses that are successively arranged on the object side of one negative lens or two negative lenses of the first lens group G1 and that are convex toward the object side is equal to or more than 3 and equal to or less than 6. In addition, "a lens convex toward the object side" means a lens of which a lens surface on the object side is a convex surface. This point is the same in the following description.

It is preferable that the first lens group G1 includes at least three biconvex lenses. In such a case, it is possible to suppress occurrence of high-order spherical aberration. Further, in order to reduce the size, it is preferable that the number of biconvex lenses included in the first lens group G1 is equal to or less than 8. It is preferable that the first lens group G1 includes at least one biconcave lens. In such a case, it is possible to suppress occurrence of high-order spherical aberration. In order to obtain more favorable characteristics, it is preferable that the first lens group G1 includes at least two biconcave lenses. In addition, in order to reduce the size, the number of biconcave lenses included in the first lens group G1 is preferably equal to or less than 6, and more preferably equal to or less than 5.

The imaging lens may be configured to include a single lens having a negative refractive power, a single lens having a positive refractive power, and a single lens having a positive refractive power, successively in order from the closest to the object side. By making the lens closest to the object side as a negative lens, it is possible to reduce the angle of the principal ray with the maximum angle of view, which is emitted from the negative lens to the image side, with respect to the optical axis Z. As a result, it is possible to suppress sagittal coma aberration. Moreover, since the positive lens that is disposed successively to the negative lens closest to the object side is able to gently lower the on-axis marginal ray, it is possible to suppress occurrence of spherical aberration. Further, by using only one negative lens among the three lenses of the first lens to the third lens counted from the lens closest to the object side, it is possible to suppress an increase in size of the lens system.

It is preferable that the second lens group G2 includes at least two positive lenses. In such a case, it is possible to reduce occurrence of spherical aberration. In order to reduce the weight of the focus group, it is preferable that the number of positive lenses included in the second lens group G2 is equal to or less than 6. It is preferable that the second lens group G2 includes at least two negative lenses. In such a case, there is an advantage in correcting spherical aberration and longitudinal chromatic aberration. In order to reduce the weight of the focus group, it is preferable that the number of negative lenses included in the second lens group G2 is equal to or less than 4. In the situation, it is preferable that the second lens group G2 includes at least two positive lenses and at least two negative lenses. More preferably, the second lens group G2 includes at least two positive lenses and at least three negative lenses. In a case where the second lens group G2 includes at least two positive lenses and at least three negative lenses, it is easy to satisfactorily correct various aberrations, and it is easy to suppress fluctuation in aberrations during focusing.

In a case where the first lens group G1 includes at least one negative lens, it is preferable that the image side surface of the negative lens closest to the image side in the first lens group G1 is a concave surface. In such a case, there is an advantage in correcting spherical aberration. In a case where the second lens group G2 includes at least one negative lens, it is preferable that the object side surface of the negative lens closest to the object side in the second lens group G2 is a concave surface. In such a case, there is an advantage in correcting spherical aberration.

In a case where the first lens group G1 and the second lens group G2 each include at least one negative lens, it is preferable that both the image side surface of the negative lens closest to the image side in the first lens group G1 and the object side surface of the negative lens closest to the object side in the second lens group G2 are concave surfaces. That is, it is preferable that the lens surface on the aperture stop St side of the negative lens closest to the aperture stop St on the object side and the image side of the aperture stop St is a concave surface. In such a case, spherical aberration and longitudinal chromatic aberration can be corrected by the concave surface, and occurrence of coma aberration can be suppressed by the concave surface disposed to be symmetric with respect to the aperture stop St. Further, the Petzval sum can be corrected by the negative refractive powers of the two concave surfaces.

In the configuration in which both the image side surface of the negative lens closest to the image side in the first lens group G1 and the object side surface of the negative lens closest to the object side in the second lens group G2 are concave surfaces, assuming that a radius of curvature of the image side surface of the negative lens closest to the image side in the first lens group G1 is Rso, and a radius of curvature of the object side surface of the negative lens closest to the object side in the second lens group G2 is Rsi, it is preferable to satisfy Conditional Expression (3). By satisfying Conditional Expression (3), it is possible to suppress overcorrection of higher-order spherical aberration. In addition, in a case of a configuration in which Conditional Expression (3-1) is satisfied, it is possible to obtain more favorable characteristics.

$$-0.4<(Rso+Rsi)/(Rso-Rsi)<0.5 \tag{3}$$

$$-0.2<(Rso+Rsi)/(Rso-Rsi)<0.4 \tag{3-1}$$

Assuming that the lateral magnification of the second lens group G2 in the state where the object at infinity is in focus is β2, it is preferable to satisfy Conditional Expression (4). In a case where the sensitivity of focusing is excessively high, there is a concern that the focus group does not stop stably in the autofocusing operation. By not allowing the result of Conditional Expression (4) to be equal to or less than the lower limit, it is possible to suppress the strictness in accuracy of the stopping of the focus group in the focusing operation, thereby preventing such a problem from arising. By not allowing the result of Conditional Expression (4) to be equal to or greater than the upper limit, there is an advantage in reducing the amount of movement of the focus group during focusing. In addition, in a case of a configuration in which Conditional Expression (4-1) is satisfied, it is possible to obtain more favorable characteristics.

$$0.2<\beta2<0.8 \tag{4}$$

$$0.3<\beta2<0.7 \tag{4-1}$$

Assuming that a lateral magnification of the second lens group G2 in the state where an object at infinity is in focus is θ2, and a combined lateral magnification of all lenses closer to the image side than the second lens group G2 in a state in which the object at infinity is in focus is βr in a case where a lens is disposed closer to the image side than the second lens group G2, and βr is set to 1 in a case where no lens is disposed closer to the image side than the second lens group G2, it is preferable to satisfy Conditional Expression (5). By not allowing the result of Conditional Expression (5) to be equal to or less than the lower limit, there is an advantage in reducing the amount of movement of the focus group during focusing. By not allowing the result of Conditional Expression (5) to be equal to or greater than the upper limit, it is possible to suppress the strictness in accuracy of the stopping of the focus group in the focusing operation. In addition, in a case of a configuration in which Conditional Expression (5-1) is satisfied, it is possible to obtain more favorable characteristics.

$$0.4<(1-\beta2^2)\times\beta r^2<1.2 \tag{5}$$

$$0.75<(1-\beta2^2)\times\beta r^2<1 \tag{5-1}$$

In the configuration in which the first lens group G1 includes at least one positive lens and at least one negative lens, assuming that an average of Abbe numbers of all positive lenses in the first lens group G1 based on a d line is v1p and an average of Abbe numbers all negative lenses in the first lens group G1 based on the d line is v1n, it is preferable to satisfy Conditional Expression (6). By not allowing the result of Conditional Expression (6) to be equal to or less than the lower limit, correction of first-order chromatic aberration is easy. By not allowing the result of Conditional Expression (6) to be equal to or greater than the upper limit, correction of second-order chromatic aberration is easy. It should be noted that more favorable characteristics can be obtained in a case where the configuration satisfies Conditional Expression (6-1) and even more favorable characteristics can be obtained in a case where the configuration satisfies Conditional Expression (6-2).

$$5<v1p-v1n<45 \tag{6}$$

$$5<v1p-v1n<35 \tag{6-1}$$

$$7<v1p-v1n<30 \tag{6-2}$$

In the configuration in which the first lens group G1 includes at least one positive lens and at least one negative lens, assuming that an average of partial dispersion ratios of all the positive lenses in the first lens group G1 between a g line and an F line is θ1p and an average of partial dispersion ratios of all the negative lenses in the first lens group G1 between the g line and the F line is θ1n, by not allowing the result of Conditional Expression (7) to be equal to or less than the lower limit, it is easy to correct first-order chromatic aberration. By not allowing the result of Conditional Expression (7) to be equal to or greater than the upper limit, correction of second-order chromatic aberration is easy. It should be noted that more favorable characteristics can be obtained in a case where the configuration satisfies Conditional Expression (7-1) and even more favorable characteristics can be obtained in a case where the configuration satisfies Conditional Expression (7-2).

$$0<\theta1n-\theta1p<0.07 \tag{7}$$

$$0<\theta1n-\theta1p<0.05 \tag{7-1}$$

$$0.005<\theta1n-\theta1p<0.045 \tag{7-2}$$

It is more preferable that Conditional Expressions (6) and (7) are simultaneously satisfied. It is even more preferable that Conditional Expressions (6) and (7) are simultaneously satisfied, and at least one of Conditional Expression (6-1), (6-2), (7-1), or (7-2) is satisfied.

In the configuration in which the second lens group G2 includes at least one positive lens and at least one negative lens, an average of Abbe numbers of all positive lenses in the second lens group G2 based on a d line is v2p and an average of Abbe numbers of all negative lenses in the second lens group G2 based on the d line is v2n, it is preferable to satisfy Conditional Expression (8). By not allowing the result of Conditional Expression (8) to be equal to or less than the lower limit, correction of first-order chromatic aberration is easy. By not allowing the result of Conditional Expression (8) to be equal to or greater than the upper limit, correction of second-order chromatic aberration is easy. In addition, in a case of a configuration in which Conditional Expression (8-1) is satisfied, it is possible to obtain more favorable characteristics.

$$-10<v2p-v2n<35 \tag{8}$$

$$-8<v2p-v2n<30 \tag{8-1}$$

In the configuration in which the second lens group G2 includes at least one positive lens and at least one negative lens, assuming that an average of partial dispersion ratios of all the positive lenses in the second lens group G2 between a g line and an F line is θ2p and an average of partial dispersion ratios of all the negative lenses in the second lens group G2 between the g line and the F line is θ2n, it is preferable to satisfy Conditional Expression (9). By not allowing the result of Conditional Expression (9) to be equal to or less than the lower limit, correction of first-order chromatic aberration is easy. By not allowing the result of Conditional Expression (9) to be equal to or greater than the upper limit, correction of second-order chromatic aberration is easy. In addition, in a case of a configuration in which Conditional Expression (9-1) is satisfied, it is possible to obtain more favorable characteristics.

$$-0.03<\beta 2n-\theta 2p<0.07 \tag{9}$$

$$-0.02<\beta 2n-\theta 2p<0.06 \tag{9-1}$$

It is more preferable that Conditional Expressions (8) and (9) are simultaneously satisfied. It is even more preferable that Conditional Expressions (8) and (9) are simultaneously satisfied, and at least one of Conditional Expression (8-1) or (9-1) is satisfied.

Assuming that a focal length of the first lens group G1 is f1, and a focal length of the second lens group G2 is f2, it is preferable to satisfy Conditional Expression (10). By not allowing the result of Conditional Expression (10) to be equal to or less than the lower limit, there is an advantage in reducing the amount of movement of the focus group during focusing. By not allowing the result of Conditional Expression (10) to be equal to or greater than the upper limit, there is an advantage in correction of spherical aberration. It should be noted that more favorable characteristics can be obtained in a case where the configuration satisfies Conditional Expression (10-1) and even more favorable characteristics can be obtained in a case where the configuration satisfies Conditional Expression (10-2).

$$1<f1/f2<4.5 \tag{10}$$

$$1<f1/f2<3.5 \tag{10-1}$$

$$1.1<f1/f2<3 \tag{10-2}$$

Assuming that a focal length of the imaging lens in a state where the object at infinity is in focus is f, and a focal length of the first lens group G1 is f1, it is preferable to satisfy Conditional Expression (11). By not allowing the result of Conditional Expression (11) to be equal to or less than the lower limit, there is an advantage in correction of spherical aberration. By not allowing the result of Conditional Expression (11) to be equal to or greater than the upper limit, there is an advantage in reducing the amount of movement of the focus group during focusing. In addition, in a case of a configuration in which Conditional Expression (11-1) is satisfied, it is possible to obtain more favorable characteristics.

$$0.2<f/f1<1 \tag{11}$$

$$0.3<f/f1<0.8 \tag{11-1}$$

Assuming that a focal length of the imaging lens in a state where the object at infinity is in focus is f, and a focal length of the second lens group G2 is f2, it is preferable to satisfy Conditional Expression (12). By not allowing the result of Conditional Expression (12) to be equal to or less than the lower limit, there is an advantage in reducing the amount of movement of the focus group during focusing. By not allowing the result of Conditional Expression (12) to be equal to or greater than the upper limit, there is an advantage in correcting spherical aberration and coma aberration. It should be noted that more favorable characteristics can be obtained in a case where the configuration satisfies Conditional Expression (12-1) and even more favorable characteristics can be obtained in a case where the configuration satisfies Conditional Expression (12-2).

$$0.5<f/f2<2 \tag{12}$$

$$0.5<f/f2<1.5 \tag{12-1}$$

$$0.7<f/f2<1.4 \tag{12-2}$$

Assuming that a distance on the optical axis from the lens surface closest to the image side in the first lens group G1 to the image side principal point position of the first lens group G1 is P1, and a distance on the optical axis between the first lens group G1 and the second lens group G2 in a state where the object at infinity is in focus is D12, it is preferable to satisfy Conditional Expression (13). However, the sign of P1 is negative in a case where the image side principal point position of the first lens group G1 is closer to the object side than the lens surface closest to the image side in the first lens group G1, and the sign of P1 is positive in a case where the image side principal point position is on the image side. By not allowing the result of Conditional Expression (13) to be equal to or less than the lower limit, there is an advantage in correction of coma aberration. By not allowing the result of Conditional Expression (13) to be equal to or greater than the upper limit, the image side principal point position of the first lens group G1 is prevented from excessively becoming far in the image side direction from the lens surface closest to the image side in the first lens group G1, and thus H1max can be prevented from increasing. As a result, there is an advantage in reducing the effective diameter of the first lens group G1. Alternatively, by not allowing the result of Conditional Expression (13) to be equal to or greater than the upper limit, the distance between the first lens group G1 and the second lens group G2 is prevented from becoming excessively small, and it is possible to ensure a movable range of the focus group during focusing. As a result, it is possible to shorten the distance from the imaging lens to the closest object which is focusable. In addition, in a case of a configuration in which Conditional Expression (13-1) is satisfied, it is possible to obtain more favorable characteristics.

$$-5<P1/D12<20 \tag{13}$$

$$-2<P1/D12<10 \tag{13-1}$$

Assuming that a maximum value of the partial dispersion ratios of the positive lenses in the first lens group G1 between the g line and the F line is θ1max, it is preferable to satisfy Conditional Expression (14). By satisfying Conditional Expression (14), it is easy to appropriately correct second-order chromatic aberration. In addition, in a case of a configuration in which Conditional Expression (14-1) is satisfied, it is possible to obtain more favorable characteristics.

$$0.56<\theta 1max<0.7 \tag{14}$$

$$0.58<\theta 1max<0.68 \tag{14-1}$$

Assuming that a maximum value of the partial dispersion ratios of the positive lenses in the second lens group G2 between the g line and the F line is θ2max, it is preferable to satisfy Conditional Expression (15). By satisfying Conditional Expression (15), it is easy to appropriately correct second-order chromatic aberration. In addition, in a case of a configuration in which Conditional Expression (15-1) is satisfied, it is possible to obtain more favorable characteristics.

$$0.54<\beta 2max<0.7 \tag{15}$$

$$0.56<\beta 2max<0.65 \tag{15-1}$$

In the configuration in which the first lens group G1 includes at least one positive lens and at least one negative lens, assuming that an average of partial dispersion ratios of all positive lenses in the first lens group G1 between the g line and the F line is θ1p, an average of partial dispersion ratios of all negative lenses in the first lens group G1 between the g line and the F line is θ1n, an average of Abbe numbers of all the positive lenses in the first lens group G1 based on the d line is ν1p, and an average of Abbe numbers of all the negative lenses in the first lens group G1 based on the d line is ν1n, it is preferable to satisfy Conditional Expression (16). By satisfying Conditional Expression (16), it is easy to correct first-order chromatic aberration and second-order chromatic aberration in a balanced manner. In addition, in a case of a configuration in which Conditional Expression (16-1) is satisfied, it is possible to obtain more favorable characteristics.

$$-0.04<\theta 1p-\theta 1n+0.00163\times(\nu 1p-\nu 1n)<0.03 \tag{16}$$

$$-0.03<\theta 1p-\theta 1n+0.00163\times(\nu 1p-\nu 1n)<0.025 \tag{16-1}$$

In the configuration in which the second lens group G2 includes at least one positive lens and at least one negative lens, an average of partial dispersion ratios of all positive lenses in the second lens group G2 between the g line and the F line is θ2p, an average of partial dispersion ratios of all negative lenses in the second lens group G2 between the g line and the F line is θ2n, an average of Abbe numbers of all the positive lenses in the second lens group G2 based on the d line is ν2p, and an average of Abbe numbers of all the negative lenses in the second lens group G2 based on the d line is ν2n, it is preferable to satisfy Conditional Expression (17). By satisfying Conditional Expression (17), it is easy to correct first-order chromatic aberration and second-order chromatic aberration in a balanced manner. In addition, in a case of a configuration in which Conditional Expression (17-1) is satisfied, it is possible to obtain more favorable characteristics.

$$-0.02<\beta 2p-\theta 2n+0.00163\times(\nu 2p-\nu 2n)<0.02 \tag{17}$$

$$-0.02<\beta 2p-\theta 2n+0.00163\times(\nu 2p-\nu 2n)<0.015 \tag{17-1}$$

It is preferable that the first lens group G1 includes at least one cemented lens which is formed by cementing at least one positive lens and at least one negative lens. In such a case, there is an advantage in correcting longitudinal chromatic aberration. In a case where the first lens group G1 includes at least two cemented lenses, there is an advantage in correcting longitudinal chromatic aberration and lateral chromatic aberration in a balanced manner. In a case where the first lens group G1 includes at least three cemented lenses, it is easy to suppress the difference in spherical aberration depending on wavelength. In a case where the first lens group G1 includes at least four cemented lenses, it is easy to suppress the difference in spherical aberration depending on wavelength. In order to reduce the size of the lens system, the number of cemented lenses included in the first lens group G1 is preferably equal to or less than 4.

In the configuration in which the first lens group G1 includes at least three cemented lenses, assuming that an average of refractive indices of all positive lenses in the cemented lens closest to the object side in the first lens group G1 at the d line is Nce1Ap and an average of refractive indices of all negative lenses in the cemented lens closest to the object side in the first lens group G1 at the d line is Nce1An, it is preferable to satisfy Conditional Expression (18). By not allowing the result of Conditional Expression (18) to be equal to or less than the lower limit, the absolute value of the Petzval sum is reduced, and there is an advantage in reducing the field curvature. By not allowing the result of Conditional Expression (18) to be equal to or greater than the upper limit, it is possible to suppress occurrence of distortion in the entire cemented lens closest to the object side in the first lens group G1. In addition, in a case of a configuration in which Conditional Expression (18-1) is satisfied, it is possible to obtain more favorable characteristics.

$$-0.2<Nce1Ap-Nce1An<0.35 \tag{18}$$

$$-0.15<Nce1Ap-Nce1An<0.1 \tag{18-1}$$

In the configuration in which the first lens group G1 includes at least three cemented lenses, an average of Abbe numbers of all positive lenses in the cemented lens closest to the object side in the first lens group G1 based on the d line is νce1Ap and an average of Abbe numbers of all negative lenses in the cemented lens closest to the object side in the first lens group G1 based on the d line is νce1An, it is preferable to satisfy Conditional Expression (19). By not allowing the result of Conditional Expression (19) to be equal to or less than the lower limit, it is easy to prevent longitudinal chromatic aberration from becoming large. By not allowing the result of Conditional Expression (19) to be equal to or greater than the upper limit, it is possible to suppress occurrence of lateral chromatic aberration and second-order longitudinal chromatic aberration, and to suppress the difference in spherical aberration depending on wavelength and the difference in astigmatism depending on wavelength. In addition, in a case of a configuration in which Conditional Expression (19-1) is satisfied, it is possible to obtain more favorable characteristics.

$$-25<\nu ce1Ap-\nu ce1An<30 \tag{19}$$

$$-15<\nu ce1Ap-\nu ce1An<25 \tag{19-1}$$

It is more preferable that Conditional Expressions (18) and (19) are simultaneously satisfied. It is even more preferable that Conditional Expressions (18) and (19) are simultaneously satisfied, and at least one of Conditional Expression (18-1) or (19-1) is satisfied.

In the configuration in which the first lens group G1 includes at least four cemented lenses, assuming that an average of refractive indices of all positive lenses in the cemented lens which is second from the object side in the first lens group G1 at the d line is Nce1Bp and an average of refractive indices of all negative lenses in the cemented lens which is second from the object side in the first lens group G1 at the d line is Nce1Bn, it is preferable to satisfy Conditional Expression (20). By not allowing the result of Conditional Expression (20) to be equal to or less than the lower limit, the absolute value of the Petzval sum is reduced, and there is an advantage in reducing the field curvature. By not allowing the result of Conditional Expression (20) to be equal to or greater than the upper limit, an absolute value of the radius of curvature of the cemented surface of the positive lens can be reduced at the refractive power of the entire cemented lens. Thus, by increasing the incident angle of the off-axis lower ray on the cemented surface, it is possible to correct coma aberration caused by the lower ray.

$$0 < Nce1Bp - Nce1Bn < 0.35 \quad (20)$$

$$0.05 < Nce1Bp - Nce1Bn < 0.32 \quad (20\text{-}1)$$

In the configuration in which the first lens group G1 includes at least four cemented lenses, assuming that an average of Abbe numbers of all the positive lenses in the cemented lens which is second from the object side in the first lens group G1 based on the d line is vce1Bp and an average of Abbe numbers of all the negative lenses in the cemented lens which is second from the object side of the first lens group G1 based on the d line is vce1Bn, it is preferable to satisfy Conditional Expression (21). By not allowing the result of Conditional Expression (21) to be equal to or less than the lower limit, it is easy to prevent longitudinal chromatic aberration from becoming large. By not allowing the result of Conditional Expression (21) to be equal to or greater than the upper limit, it is possible to suppress occurrence of lateral chromatic aberration and second-order longitudinal chromatic aberration, and to suppress the difference in spherical aberration depending on wavelength and the difference in astigmatism depending on wavelength. In addition, in a case of a configuration in which Conditional Expression (21-1) is satisfied, it is possible to obtain more favorable characteristics.

$$-20 < vce1Bp - vce1Bn < 20 \quad (21)$$

$$0 < vce1Bp - vce1Bn < 15 \quad (21\text{-}1)$$

It is more preferable that Conditional Expressions (20) and (21) are simultaneously satisfied. It is even more preferable that Conditional Expressions (20) and (21) are simultaneously satisfied, and at least one of Conditional Expression (20-1) or (21-1) is satisfied.

In a case where the first lens group G1 includes at least four cemented lenses, it is preferable that the cemented lens which is second from the object side in the first lens group G1 includes a cemented surface convex toward the image side and satisfies at least one of Conditional Expression (20) or (21). Since the cemented lens which is second from the object side in the first lens group G1 includes the cemented surface and satisfies Conditional Expression (20), there is an advantage in correcting sagittal coma aberration. Since the cemented lens which is second from the object side in the first lens group G1 includes the cemented surface and satisfies Conditional Expression (21), difference in sagittal coma aberration correction effect depending on wavelength is less likely to occur.

In the configuration in which the first lens group G1 includes at least two cemented lenses, assuming that an average of refractive indices of all positive lenses in the cemented lens which is second from the image side in the first lens group G1 at the d line is Nce1Cp and an average of refractive indices of all negative lenses in the cemented lens which is second from the image side of the first lens group G1 at the d line is Nce1Cn, it is preferable to satisfy Conditional Expression (22). By not allowing the result of Conditional Expression (22) to be equal to or less than the lower limit, the absolute value of the Petzval sum is reduced, and there is an advantage in reducing the field curvature. The absolute value of the difference in refractive index between the positive lens and the negative lens is reduced such that the result of Conditional Expression (22) is set not to be greater than or equal to the upper limit after the result of Conditional Expression (22) is set not to be less than or equal to the lower limit, and materials are selected such that Conditional Expression (23) to be described later is satisfied. Thereby, it is possible to correct, in a balanced manner, longitudinal chromatic aberration, lateral chromatic aberration, and chromatic coma aberration caused by other lenses composing the imaging lens while suppressing the effect on monochromatic aberration of the cemented surface. In addition, in a case of a configuration in which Conditional Expression (22-1) is satisfied, it is possible to obtain more favorable characteristics.

$$-0.4 < Nce1Cp - Nce1Cn < 0.1 \quad (22)$$

$$-0.1 < Nce1Cp - Nce1Cn < 0.05 \quad (22\text{-}1)$$

In the configuration in which the first lens group G1 includes at least two cemented lenses, assuming that an average of Abbe numbers of all positive lenses in the cemented lens which is second from the image side in the first lens group G1 based on the d line is vce1Cp and an average of Abbe numbers of all negative lenses in the cemented lens which is second from the image side of the first lens group G1 based on the d line is vce1Cn, it is preferable to satisfy Conditional Expression (23). By not allowing the result of Conditional Expression (23) to be equal to or less than the lower limit, correction of longitudinal chromatic aberration is easy. By not allowing the result of Conditional Expression (23) to be equal to or greater than the upper limit, it is easy to suppress occurrence of second-order longitudinal chromatic aberration and to suppress occurrence of the difference in spherical aberration depending on wavelength. Further, it is possible to suppress occurrence of chromatic coma aberration caused by the lower ray on the cemented surface. In addition, in a case of a configuration in which Conditional Expression (23-1) is satisfied, it is possible to obtain more favorable characteristics.

$$15 < vce1Cp - vce1Cn < 45 \quad (23)$$

$$20 < vce1Cp - vce1Cn < 30 \quad (23\text{-}1)$$

It is more preferable that Conditional Expressions (22) and (23) are simultaneously satisfied. It is even more preferable that Conditional Expressions (22) and (23) are simultaneously satisfied, and at least one of Conditional Expression (22-1) or (23-1) is satisfied.

In a case where the first lens group G1 includes at least two cemented lenses, it is preferable that the cemented lens which is second from the image side in the first lens group G1 includes a cemented surface convex toward the image side and satisfies at least one of Conditional Expression (22) or (23). Since the cemented lens which is second from the image side in the first lens group G1 includes the cemented surface and satisfies Conditional Expression (22), there is an advantage in correcting sagittal coma aberration on the cemented surface. Since the cemented lens which is second from the object side in the first lens group G1 includes the cemented surface and satisfies Conditional Expression (23), difference in sagittal coma aberration correction effect depending on wavelength is less likely to occur.

In the configuration in which the first lens group G1 includes at least one cemented lens, assuming that an average of refractive indices of all positive lenses in the cemented lens closest to the image side in the first lens group G1 at the d line is Nce1Dp and an average of refractive indices of all negative lenses in the cemented lens closest to the image side in the first lens group G1 at the d line is Nce1Dn, it is preferable to satisfy Conditional Expression (24). By not allowing the result of Conditional Expression (24) to be equal to or less than the lower limit, the absolute value of the Petzval sum is reduced, and there is an advantage in reducing the field curvature. The result of Conditional Expression (24) is not allowed to be equal to or less than the lower limit, then the absolute value of the difference in refractive index between the positive lens and the negative lens is reduced such that the result of Conditional Expression (24) is not allowed to be equal to or greater than the upper limit, and materials are selected to satisfy Conditional Expression (25). Thereby, it is possible to correct longitudinal chromatic aberration and chromatic coma aberration occurring in other lenses composing the imaging lens in a balanced manner while suppressing the effect on the monochromatic aberration of the cemented surface. It should be noted that more favorable characteristics can be obtained in a case where the configuration satisfies Conditional Expression (24-1) and even more favorable characteristics can be obtained in a case where the configuration satisfies Conditional Expression (24-2).

$$-0.4 < Nce1Dp - Nce1Dn < 0.25 \quad (24)$$

$$-0.1 < Nce1Dp - Nce1Dn < 0.25 \quad (24\text{-}1)$$

$$-0.08 < Nce1Dp - Nce1Dn < 0.2 \quad (24\text{-}2)$$

In the configuration in which the first lens group G1 includes at least one cemented lens, assuming that an average of Abbe numbers of all positive lenses in the cemented lens closest to the image side in the first lens group G1 based on the d line is vce1Dp and an average of Abbe numbers of all negative lenses in the cemented lens closest to the image side in the first lens group G1 based on the d line is vce1Dn, it is preferable to satisfy Conditional Expression (25). By not allowing the result of Conditional Expression (25) to be equal to or less than the lower limit, correction of longitudinal chromatic aberration is easy. By not allowing the result of Conditional Expression (25) to be equal to or greater than the upper limit, it is easy to suppress occurrence of second-order longitudinal chromatic aberration and to suppress occurrence of the difference in spherical aberration depending on wavelength. Further, it is possible to suppress occurrence of chromatic coma aberration caused by the lower ray on the cemented surface. It should be noted that more favorable characteristics can be obtained in a case where the configuration satisfies Conditional Expression (25-1) and even more favorable characteristics can be obtained in a case where the configuration satisfies Conditional Expression (25-2).

$$0 < vce1Dp - vce1Dn < 45 \quad (25)$$

$$0 < vce1Dp - vce1Dn < 30 \quad (25\text{-}1)$$

$$5 < vce1Dp - vce1Dn < 25 \quad (25\text{-}2)$$

It is more preferable that Conditional Expressions (24) and (25) are simultaneously satisfied. It is even more preferable that Conditional Expressions (24) and (25) are simultaneously satisfied, and at least one of Conditional Expression (24-1) or (25-1) is satisfied.

In a case where the first lens group G1 includes at least one cemented lens, it is preferable that the cemented lens closest to the image side in the first lens group G1 is configured to consist of, in order from the object side, a positive lens convex toward the object side and a negative lens concave toward the image side. In such a case, since the entire cemented lens has a meniscus shape, it is a shape close to an aplanatic lens, and it is easy to suppress occurrence of spherical aberration and coma aberration. Further, the concave surface closest to the image side in this cemented lens is also able to have a function of correcting the Petzval sum. In a case where the first lens group G1 includes at least one cemented lens, it is preferable that the cemented lens closest to the image side in the first lens group G1 has the above-mentioned configuration and satisfies at least one of Conditional Expression (24) or (25).

It is preferable that the second lens group G2 includes a cemented lens which is formed by cementing a positive lens and a negative lens in order from the object side and the image side surface of the negative lens of the cemented lens is a concave surface. In such a case, it is easy to suppress fluctuation in spherical aberration during focusing.

It is preferable that the second lens group G2 includes a three-piece cemented lens which is formed by cementing a positive lens, a negative lens, and a positive lens in order from the object side. By cementing these three lenses, a refractive power of each lens can be increased as compared with a case where the lenses are not cemented. Therefore, there is an advantage in correcting chromatic aberration and the Petzval sum, and it is easy to suppress fluctuation in astigmatism during focusing.

In the configuration in which the second lens group G2 includes the three-piece cemented lens, assuming that an average of refractive indices of all positive lenses in the cemented lens at the d line is Nce2p and a refractive index of the negative lens in the cemented lens at the d line is Nce2n, it is preferable to satisfy Conditional Expression (26). By not allowing the result of Conditional Expression (26) to be equal to or less than the lower limit, the absolute value of the Petzval sum is reduced, and there is an advantage in reducing the field curvature. By not allowing the result of Conditional Expression (26) to be equal to or greater than the upper limit, it is possible to reduce the refractive index difference of the lenses composing the three-piece cemented lens. Therefore, it is possible to reduce an absolute value of the radius of curvature of the cemented surface while the cemented surface does not have a strong paraxial refractive power. As a result, it is possible to correct higher-order spherical aberration and sagittal coma aberration. In addition, in a case of a configuration in which Conditional Expression (26-1) is satisfied, it is possible to obtain more favorable characteristics.

$$0 < Nce2p - Nce2n < 0.25 \quad (26)$$

$$0.04 < Nce2p - Nce2n < 0.2 \quad (26\text{-}1)$$

In the configuration in which the second lens group G2 has the three-piece cemented lens, assuming that an average of Abbe numbers of all the positive lenses in the cemented lens based on the d line is vce2p and an Abbe number of the negative lens in the cemented lens based on the d line is vce2n, it is preferable to satisfy Conditional Expression (27). By not allowing the result of Conditional Expression (27) to be equal to or less than the lower limit, correction of longitudinal chromatic aberration is easy. By not allowing the result of Conditional Expression (27) to be equal to or greater than the upper limit, it is easy to suppress occurrence of second-order longitudinal chromatic aberration and to suppress occurrence of the difference in spherical aberration depending on wavelength. In addition, in a case of a configuration in which Conditional Expression (27-1) is satisfied, it is possible to obtain more favorable characteristics.

$$0 < vce2p - vce2n < 25 \tag{27}$$

$$5 < vce2p - vce2n < 20 \tag{27-1}$$

It is more preferable that Conditional Expressions (26) and (27) are simultaneously satisfied. It is even more preferable that Conditional Expressions (26) and (27) are simultaneously satisfied, and at least one of Conditional Expression (26-1) or (27-1) is satisfied.

Figure 5:
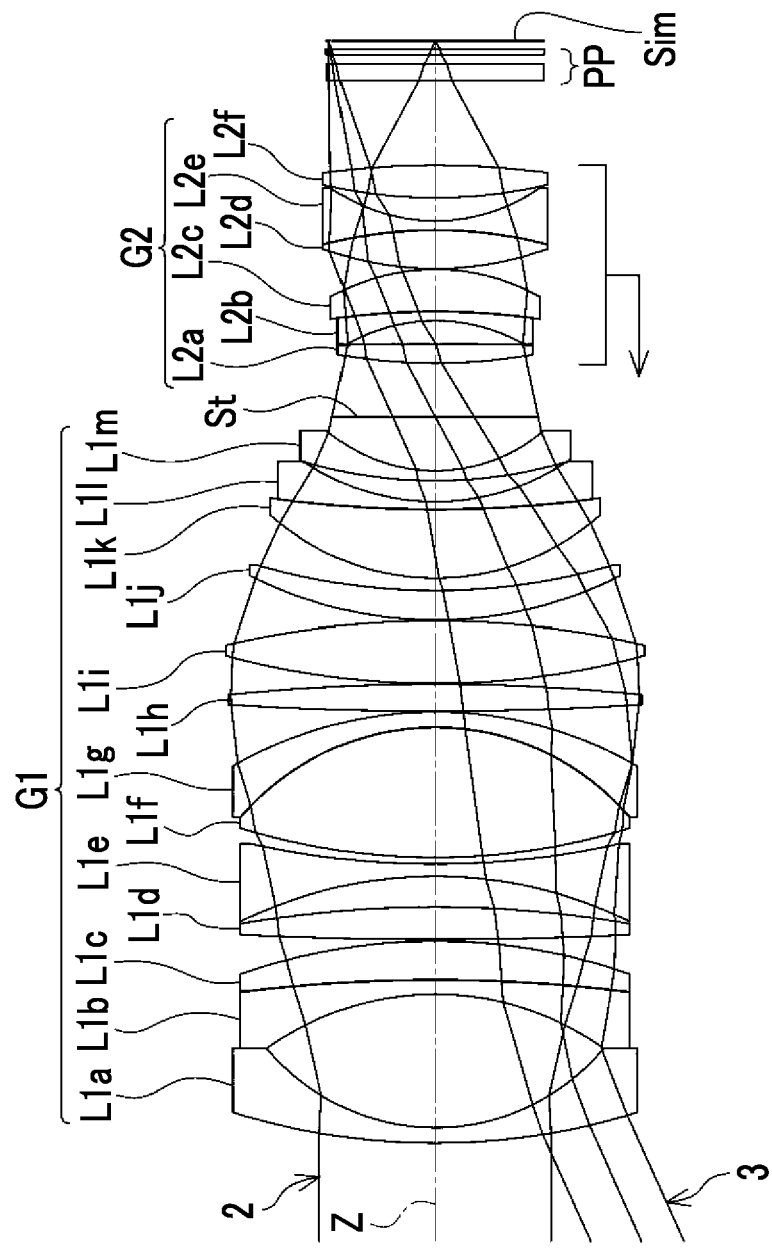
FIG. 5 is a cross-sectional view showing a configuration and rays of a fifth configuration example of an imaging lens according to an embodiment of the present disclosure, corresponding to the imaging lens of Example 5 of the present disclosure.

As a group configuration, as shown in FIG. 5, the imaging lens may be configured to consist of a first lens group G1, an aperture stop St, and a second lens group G2. There is an advantage in achieving reduction in size and simplification of the structure. Alternatively, as shown in FIG. 1, the imaging lens is disposed successively to the second lens group G2 on the image side of the second lens group G2, and may be configured to further comprise a subsequent group of which the distance from the second lens group G2 changes during focusing. In a case where the subsequent group is further provided, aberration correction can be performed using the fact that the ray height of the principal ray on each lens surface of the subsequent group changes during focusing. Therefore, it is easy to correct fluctuation in astigmatism, fluctuation in distortion, and fluctuation in lateral chromatic aberration during focusing. The subsequent group may be configured to move along the optical axis Z with a movement locus different from that of the second lens group G2 during focusing. In such a case, it is easier to correct fluctuation in aberrations during focusing. Alternatively, the subsequent group may be configured to remain stationary with respect to the image plane Sim during focusing. In such a case, as compared with the case where the subsequent group moves during focusing, it is possible to simplify the lens barrel structure. In a case where the subsequent group is a lens group having a positive refractive power, there is an advantage in reducing the incident angle of the principal ray, which has the maximum angle of view, incident on the image plane Sim. In a case where the subsequent group is a lens group having a negative refractive power, the refractive power of the focus group can be increased. Therefore, it is possible to reduce the amount of movement of the focus group during focusing.

Assuming that a focal length of the imaging lens in a state in which the object at infinity is in focus is f and a focal length of the subsequent group is fr, it is preferable to satisfy Conditional Expression (28). By not allowing the result of Conditional Expression (28) to be equal to or less than the lower limit, there is an advantage in reducing the incident angle of the principal ray, which has the maximum angle of view, incident on the image plane Sim. By not allowing the result of Conditional Expression (28) to be equal to or greater than the upper limit, it is easy to increase the refractive power of the focus group. As a result, there is an advantage in reducing the amount of movement of the focus group during focusing. It should be noted that more favorable characteristics can be obtained in a case where the configuration satisfies Conditional Expression (28-1) and even more favorable characteristics can be obtained in a case where the configuration satisfies Conditional Expression (28-2).

$$-0.3 < f/fr < 0.4 \tag{28}$$

$$-0.3 < f/fr < 0.1 \tag{28-1}$$

$$-0.25 < f/fr < 0.05 \tag{28-2}$$

Assuming that a sum of a distance on an optical axis from a lens surface closest to the object side to a lens surface closest to the image side and a back focal length at an air conversion distance in a state where an object at infinity is in focus is TL, an F number of the imaging lens in the state where the object at infinity is in focus is FNo, and a focal length of the imaging lens in the state where the object at infinity is in focus is f, it is preferable to satisfy Conditional Expression (29). By not allowing the result of Conditional Expression (29) to be equal to or less than the lower limit, there is an advantage in satisfactorily correcting various aberrations. More specifically, it is easy to arrange the optimum number of lenses to correct various aberrations. Thus, there is an advantage in obtaining higher imaging performance. By not allowing the result of Conditional Expression (29) to be equal to or greater than the upper limit, there is an advantage in suppressing an increase in size of the lens system. It should be noted that more favorable characteristics can be obtained in a case where the configuration satisfies Conditional Expression (29-1) and even more favorable characteristics can be obtained in a case where the configuration satisfies Conditional Expression (29-2).

$$1.5 < TL \times FNo/f < 5 \tag{29}$$

$$1.8 < TL \times FNo/f < 3.5 \tag{29-1}$$

$$2 < TL \times FNo/f < 3.2 \tag{29-2}$$

Assuming that a maximum half angle of view of the imaging lens in a state where an object at infinity is in focus is ωmax, and an F number of the imaging lens in the state where the object at infinity is in focus is FNo, it is preferable to satisfy Conditional Expression (30). Considering Conditional Expression (30) on the assumption that a small F number is maintained, the smaller the value of $1/\{\tan(\omega max) \times FNo\}$ of Conditional Expression (30) is, the lens system is a wider-angle type optical system. As the value is lager, the lens system is closer to the telephoto type optical system. In a case where the result of Conditional Expression (30) is equal to or less than the lower limit while a small F number is maintained, it is difficult to correct sagittal coma aberration. In order to correct sagittal coma aberration, the number of lenses of the first lens group G1 having a large outer diameter increases. As a result, there is a problem in that the size of the lens system may increase. On the other hand, in a case where the result of Conditional Expression (30) is equal to or greater than the upper limit while a small F number is maintained, an entrance pupil diameter is large and the diameter of the whole lens system is large. As a result, there is a problem in that the size of the lens system may increase. Alternatively, there is a problem in that it may be necessary to increase the total lens length in order to correct longitudinal chromatic aberration that occurs as the lens system is closer to a telephoto type optical system. As described above, by satisfying Conditional Expression (30), there is an advantage in achieving both a small F number and reduction in size of the lens system. It should be noted that more favorable characteristics can be obtained in a case where the configuration satisfies Conditional Expression (30-1) and even more favorable characteristics can be obtained in a case where the configuration satisfies Conditional Expression (30-2).

$$1.8 < 1/\{\tan(\omega max) \times FNo\} < 4.5 \tag{30}$$

$$2.4 < 1/\{\tan(\omega max) \times FNo\} < 4.2 \tag{30-1}$$

$$2.8 < 1/\{\tan(\omega max) \times FNo\} < 3.8 \tag{30-2}$$

Assuming that a distance on an optical axis from a lens surface closest to the object side to the aperture stop St in a state where an object at infinity is in focus is Tf, and a sum of a distance on an optical axis from a lens surface closest to the object side to a lens surface closest to the image side and a back focal length at an air conversion distance in the state where the object at infinity is in focus is TL, it is preferable to satisfy Conditional Expression (31). The first lens group G1 disposed closer to the object side than the aperture stop St has a positive refractive power. Thus, by not allowing the result of Conditional Expression (31) to be equal to or less than the lower limit, It is possible to further reduce the ray height in the lens disposed closer to the image side than the aperture stop St. Thereby, there is an advantage in suppressing occurrence of various aberrations in the lens disposed closer to the image side than the aperture stop St. Further, by not allowing the result of Conditional Expression (31) to be less than or equal to the lower limit, it is easy to dispose as many lenses as necessary for correcting spherical aberration, longitudinal chromatic aberration, and the like at the position closer to the object side than the aperture stop St. By not allowing the result of Conditional Expression (31) to be equal to or greater than the upper limit, it is possible to suppress an increase in diameter of the lens disposed closer to the object side than the aperture stop St. Thus, it is easy to achieve reduction in size and weight of the whole lens system. It should be noted that more favorable characteristics can be obtained in a case where the configuration satisfies Conditional Expression (31-1) and even more favorable characteristics can be obtained in a case where the configuration satisfies Conditional Expression (31-2).

$$0.2 < Tf/TL < 0.65 \tag{31}$$

$$0.4 < Tf/TL < 0.64 \tag{31-1}$$

$$0.48 < Tf/TL < 0.61 \tag{31-2}$$

The first lens group G1 may be configured to include, successively in order from the position closest to the object side, a first unit that has a negative refractive power and a second unit that is separated from the first unit by the maximum air distance on the optical axis in the first lens group and has a positive refractive power. The first unit is a unit including at least one lens, and the second unit is a unit consisting of one single lens or one cemented lens. In such a case, the first unit and the second unit can be made to have the same configuration as a wide conversion lens. As a result, it is easy to suppress sagittal coma aberration while widening the angle of view. For example, in the example of FIG. 1, the first unit consists of a lens L1$a$, and the second unit consists of a lens L1$b$ and a lens L1$c$.

In the configuration in which the first lens group G1 has the first unit and the second unit, assuming that the focal length of the imaging lens in the state where the object at infinity is in focus is f, and the combined focal length of all the lenses closer to the image side than the second unit of the imaging lenses in the state where the object at infinity is in focus is fm, it is preferable to satisfy Conditional Expression (32). By not allowing the result of Conditional Expression (32) to be equal to or less than the lower limit, there is an advantage in reducing the coma aberration occurring in the first unit and the second unit. By not allowing the result of Conditional Expression (32) to be equal to or greater than the upper limit, there is an advantage in reducing aberration, particularly coma aberration, occurring in the lens closer to the image side than the second unit. In addition, in a case of a configuration in which Conditional Expression (32-1) is satisfied, it is possible to obtain more favorable characteristics.

$$0.7 < f/fm < 0.98 \tag{32}$$

$$0.75 < f/fm < 0.95 \tag{32-1}$$

Further, in a case where the first lens group G1 has the above-mentioned first unit and second unit, it is preferable that the first unit consists of one negative lens and the second unit consists of one positive lens. In such a case, the number of lenses in the first unit and the second unit having large lens diameters is small. Thus, there is an advantage in reducing the size and the weight of the imaging lens.

In order to reduce the size and weight of the lens system, it is preferable to use as few lenses as possible. For that purpose, for example, the number of lenses included in the imaging lens is preferably 13 or less, and more preferably 12 or less.

Further, since a lens outer diameter and a lens weight of the lens disposed closer to the object side than the aperture stop St tend to be large, it is desirable to keep the number of lenses small. In a case where it is considered that this aspect is important, the number of lenses disposed closer to the object side than the aperture stop St is preferably 8 or less, and more preferably 7 or less.

Next, the detailed configuration of the lenses in each lens group and the function and effect thereof will be described with reference to the configuration examples shown in FIGS. 1 to 11. It should be noted that the reference numerals used for the lenses in FIGS. 1 to 11 are used independently for each Fig. in order to avoid complication of explanation due to an increase in the number of digits of the reference numerals. For this reason, even in a case where the reference numerals commonly used in the other drawings are provided, the configurations thereof are not necessarily a common configuration. In the following description, for convenience of explanation, in the configuration example in which the number of cemented lenses included in the first lens group G1 is 4, regarding the cemented lenses in the first lens group G1, the cemented lenses which are first, second, third, fourth from the object side are referred to as an A cemented lens, a B cemented lens, a C cemented lens, and a D cemented lens, respectively. In the configuration example in which the number of cemented lenses included in the first lens group G1 is 3, regarding the cemented lenses in the first lens group G1, the cemented lenses which are first, second, and third from the object side are referred to as an A cemented lens, a C cemented lens, and a D cemented lens, respectively. In the following description, the paraxial ray parallel to the optical axis Z is referred to as a paraxial on-axis ray.

First, the first lens group G1 will be described. The first lens group G1 of the first configuration example shown in FIG. 1 consists of, in order from the object side, a lens L1$a$ that is a biconcave lens, an A cemented lens, a B cemented lens, a C cemented lens, a lens L1$h$ that is a biconvex lens, a lens L1$i$ that is a biconcave lens, a lens L1$j$ that is a positive meniscus convex toward the object side, a lens L1$k$ that is a positive meniscus convex toward the object side, a D cemented lens, and a lens L1$n$ which is a negative meniscus concave toward the image side. The A cemented lens is configured by cementing a lens L1$b$ that is a biconcave lens and a lens L1$c$ that is a biconvex lens in order from the object side. The B cemented lens is configured by cementing a lens L1$d$ that is a biconvex lens and a lens L1$e$ that is a negative meniscus lens concave toward the object side in order from the object side. The C cemented lens is configured by cementing a lens L1$f$ that is a positive lens convex toward the image side and a lens L1$g$ that is a biconcave lens in order from the object side. The D cemented lens is configured by cementing a lens L1*l* that is a biconvex lens and a lens L1*m* that is a biconcave lens in order from the object side.

The functions and effects of the above-mentioned lenses of the first configuration example are as follows. The incident angle of the principal ray at the maximum angle of view to the image side lens can be reduced by increasing the paraxial on-axis ray at a position close to the object by the divergence effect of the lens L1*a*. Thereby, there is an advantage in suppressing occurrence of sagittal coma aberration. For this reason, it is preferable that the negative lens is disposed to be closest to the object side. In addition, since the lens L1*a* has a biconcave shape, the lens L1*a* is able to have a strong refractive power. Therefore, the above-mentioned effect can be enhanced. By successively arranging two negative lenses L1*a* and L1*b*, a sufficient negative refractive power is provided, and by making these two lenses biconcave, it is possible to suppress spherical aberration occurring on each surface. By cementing the lens L1*b* and the positive lens L1*c* on the image side, it is possible to correct longitudinal chromatic aberration and lateral chromatic aberration. By forming the lens L1*c* as a biconvex lens, it is possible to suppress spherical aberration occurring on each surface. The lenses L1*a* to L1*c* have a higher height of the principal ray than the B cemented lens, and therefore contribute more to lateral chromatic aberration than longitudinal chromatic aberration. In other words, the B cemented lens has a lower height of the principal ray than the lens closer to the object side than the B cemented lens, and contributes less to lateral chromatic aberration. In such a manner, by using lenses having different degrees of contribution to lateral chromatic aberration, it is possible to appropriately balance lateral chromatic aberration and longitudinal chromatic aberration in the entire first lens group G1. The incident angle of the off-axis principal ray and the lower ray to the cemented surface can be increased through the C cemented lens, and coma aberration caused by the lower ray, particularly sagittal coma aberration, can be corrected. Further, spherical aberration can be corrected by the concave surface closest to the image side in the C cemented lens. The divergence angle of the paraxial on-axis ray can be gradually reduced by the lens L1*h*. Spherical aberration and longitudinal chromatic aberration can be finely adjusted through the lens L1*i*. Since the lenses L1*j* and L1*k* have the above-mentioned shapes, there is an advantage in forming an optical system having a small F number while suppressing occurrence of spherical aberration and coma aberration. The on-axis rays incident on the D cemented lens are convergent light. The D cemented lens has a meniscus shape convex toward the object side as a whole cemented lens, and thus has a shape close to an aplanatic lens. Thereby, it is easy to suppress occurrence of spherical aberration and coma aberration. Further, since a refractive power of each of a positive lens and a negative lens can be increased by cementing a biconvex lens and a biconcave lens, there is an advantage in correcting longitudinal chromatic aberration. Furthermore, the concave surface of the lens L1*m* is able to also have a function of correcting the Petzval sum. The lens L1*n* and the concave surface closest to the image side in the D cemented lens shares the refraction function. Thus, it is possible to suppress occurrence of higher-order spherical aberration and sagittal coma aberration. By forming the lens L1*n* in a meniscus shape, it is possible to further suppress occurrence of higher-order spherical aberration.

Figure 2:
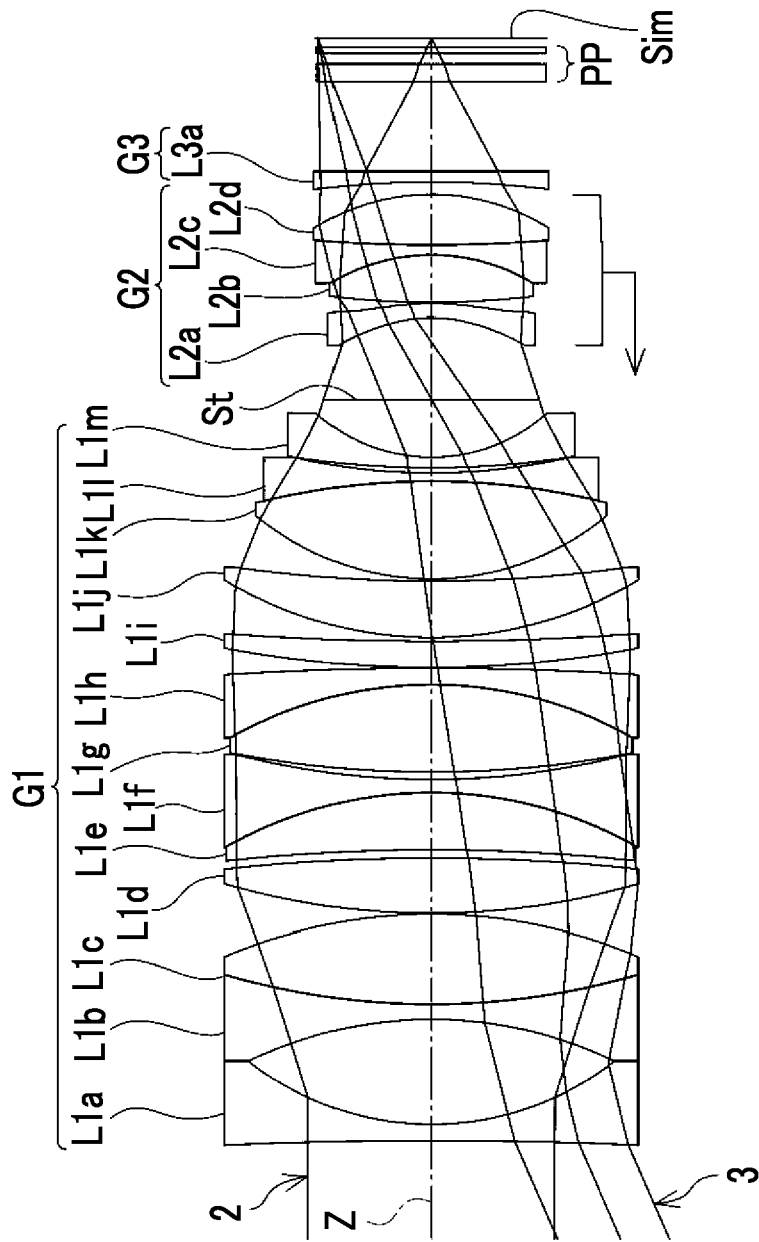
FIG. 2 is a cross-sectional view showing a configuration and rays of a second configuration example of an imaging lens according to an embodiment of the present disclosure, corresponding to the imaging lens of Example 2 of the present disclosure.

The first lens group G1 of the second configuration example shown in FIG. 2 consists of, in order from the object side, a lens L1*a* that is a biconcave lens, an A cemented lens, a lens L1*d* that is a biconvex lens, a B cemented lens, and a C cemented lens, a lens L1*i* that is a positive meniscus lens convex toward the object side, a lens L1*j* that is a positive meniscus lens convex toward the object side, a D cemented lens, and a Lens L1*m* that is a negative meniscus lens concave toward the image side. The A cemented lens is configured by cementing a lens L1*b* that is a biconcave lens and a lens L1*c* that is a biconvex lens in order from the object side. The B cemented lens is configured by cementing a lens L1*e* that is a positive meniscus lens convex toward the image side and a lens L1*f* that is a biconcave lens in order from the object side. The C cemented lens is configured by cementing a lens L1*g* that is a biconvex lens and a lens L1*h* that is a negative meniscus lens concave toward the object side in order from the object side. The D cemented lens is configured by cementing a lens L1*k* that is a biconvex lens and a lens L1*l* that is a biconcave lens in order from the object side.

The functions and effects of the above-mentioned lenses of the second configuration example are as follows. The functions and effects of the lenses L1*a* to L1*c* and L1*i* to L1*m* of the second configuration example are the same as the functions and effects of the lenses L1*a* to L1*c* and L1*j* to L1*n* of the first configuration example. The lens L1*d* of the second configuration example is located at a position, at which the paraxial on-axis ray is high, or in the vicinity thereof. By forming the lens L1*d* as a biconvex lens, it is possible to suppress occurrence of spherical aberration while reducing the height of the paraxial on-axis ray in the lens closer to the image side than the lens L1*d*. In the B cemented lens of the second configuration example, the Petzval sum can be corrected by making the refractive index of the positive lens higher than that of the negative lens. Further, by forming the cemented surface of the B cemented lens convex toward the image side, the incident angle of the off-axis principal ray and off-axis lower ray to the cemented surface is increased, and the coma aberration of the lower ray and sagittal coma aberration can be corrected. Further, spherical aberration can be corrected by the concave surface closest to the image side in the B cemented lens. In the C cemented lens, by reducing the absolute value of the difference in refractive index between the positive lens and the negative lens, it is possible to correct longitudinal chromatic aberration while suppressing the effect on the monochromatic aberration of the cemented surface. By forming the surface closest to the object side in the C cemented lens as a convex surface and forming the surface closest to the image side in the C cemented lens as a convex surface, the C cemented lens is able to share the refractive power with the positive lens closer to the image side than the C cemented lens. As a result, it is possible to suppress occurrence of spherical aberration.

Figure 3:
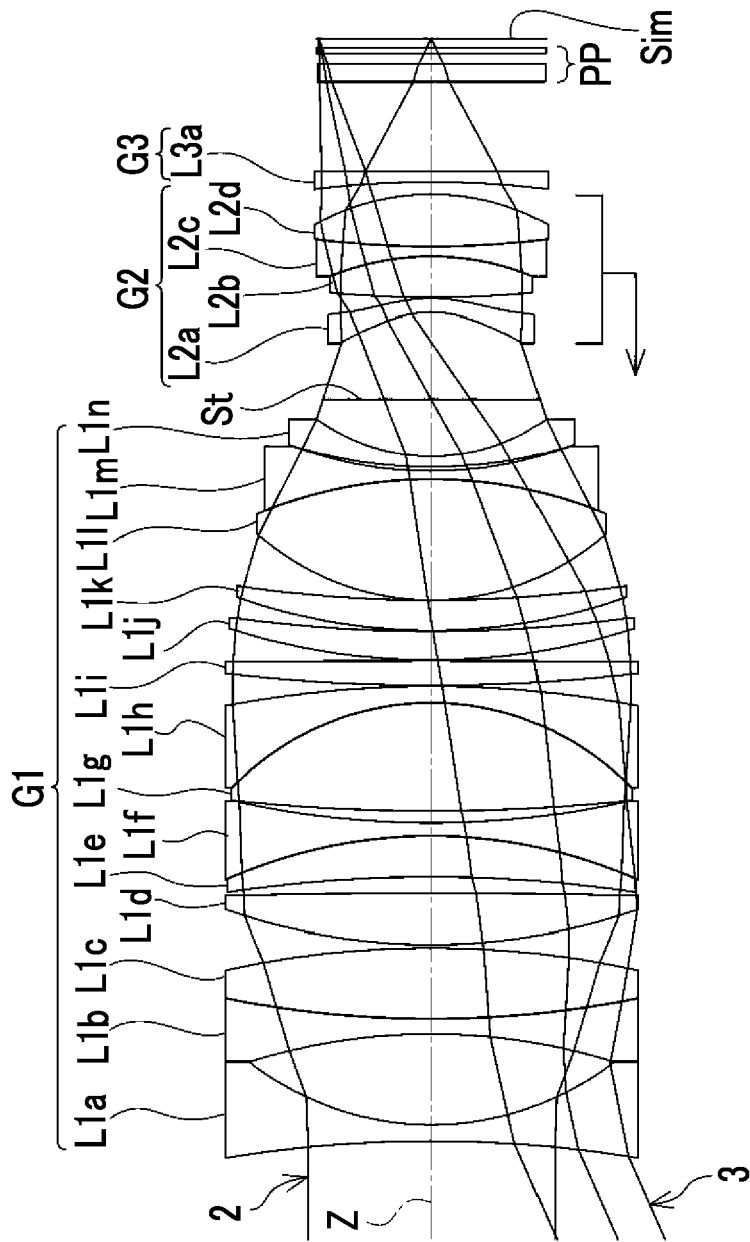
FIG. 3 is a cross-sectional view showing a configuration and rays of a third configuration example of an imaging lens according to an embodiment of the present disclosure, corresponding to the imaging lens of Example 3 of the present disclosure.

The first lens group G1 of the third configuration example shown in FIG. 3 consists of, in order from the object side, a lens L1*a* that is a biconcave lens, an A cemented lens, a lens L1*d* that is a biconvex lens, a B cemented lens, and C A cemented lens, a lens L1*i* that is a biconvex lens, a lens L1*j* that is a positive meniscus lens convex toward the object side, a lens L1*k* that is a positive meniscus lens convex toward the object side, a D cemented lens, and a lens L1*n* that is a negative meniscus lens concave toward the image side. The A cemented lens is configured by cementing a lens L1*b* that is a biconcave lens and a lens L1*c* that is a biconvex lens in order from the object side. The B cemented lens is configured by cementing a lens L1*e* that is a positive meniscus lens convex toward the image side and a lens L1*f* that is a biconcave lens in order from the object side. The C cemented lens is configured by cementing a lens L1g that is a biconvex lens and a lens L1h that is a negative meniscus lens concave toward the object side in order from the object side. The D cemented lens is configured by cementing a lens L1l that is a biconvex lens and a lens L1m that is a biconcave lens in order from the object side.

The functions and effects of the above-mentioned lenses of the third configuration example are as follows. The functions and effects of the lenses L1a to L1d, L1g, L1h, and L1l to L1n of the third configuration example are the same as the functions and effects of the lenses L1a to L1d, L1g, L1h, and L1k to L1m of the second configuration example. In the B cemented lens of the third configuration example, by making the refractive index of the positive lens higher than that of the negative lens and by forming the cemented surface in a shape convex toward the image side while correcting the Petzval sum on the cemented surface, it is possible to correct sagittal coma aberration. Further, by reducing difference in Abbe number between the positive lens and the negative lens of the B cemented lens, difference in sagittal coma aberration correction effect depending on wavelength is less likely to occur. Spherical aberration can be corrected by the concave surface closest to the object side in the B cemented lens and the concave surface closest to the image side in the B cemented lens. The lens L1i is positioned at a position at which the paraxial on-axis ray is high or in the vicinity thereof. By forming the lens L1i as a biconvex lens, it is possible to suppress occurrence of spherical aberration while reducing the height of the paraxial on-axis ray in the lens closer to the image side than the lens L1i. The on-axis rays incident on the lenses L1j and L1k are convergent light. Since the lenses L1j and L1k have a meniscus shape convex toward the object side, the lenses L1j and L1k have a shape close to that of an aplanatic lens. Therefore, it is possible to apply a positive refractive power while suppressing occurrence of spherical aberration and coma aberration. Thereby, it is easy to form an optical system with a small F number.

Figure 4:
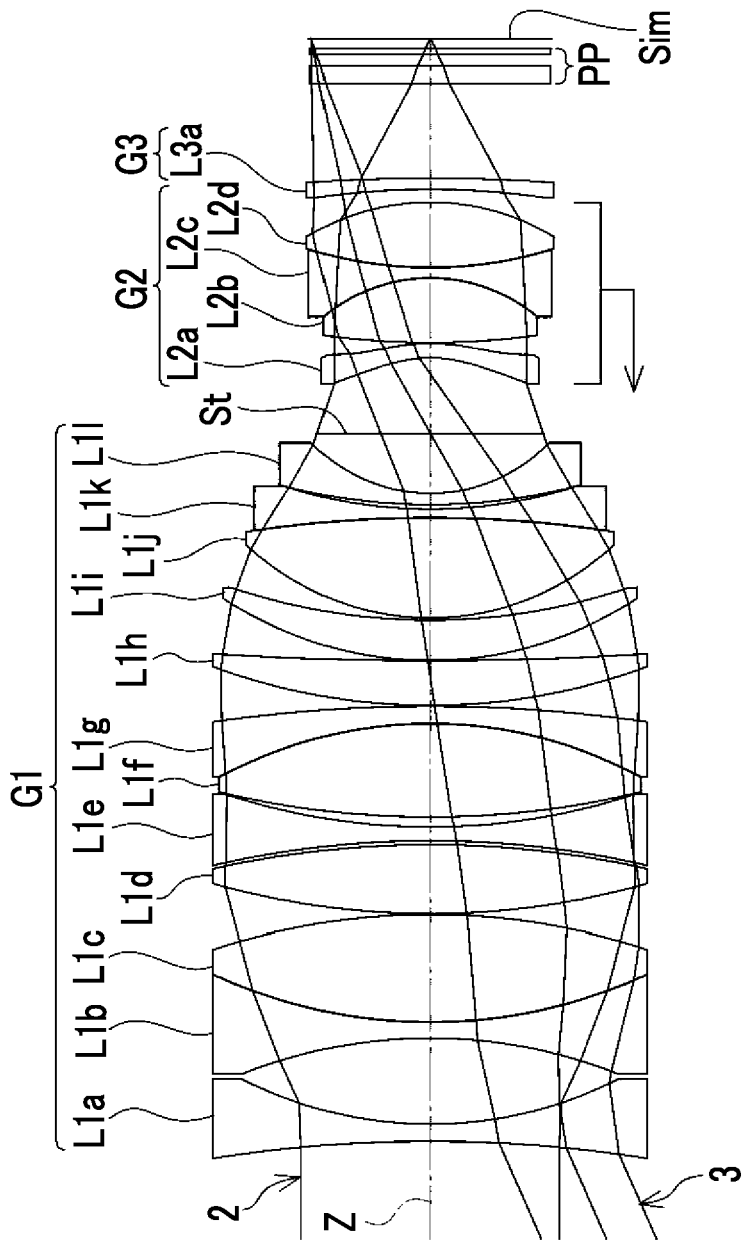
FIG. 4 is a cross-sectional view showing a configuration and rays of a fourth configuration example of an imaging lens according to an embodiment of the present disclosure, corresponding to the imaging lens of Example 4 of the present disclosure.

The first lens group G1 of the fourth configuration example shown in FIG. 4 consists of, in order from the object side, a lens L1a that is a biconcave lens, an A cemented lens, a lens L1d that is a biconvex lens, a lens L1e that is a biconcave lens, a C cemented lens, a lens L1h that is a positive meniscus lens convex toward the object side, a lens L1i that is a positive meniscus lens convex toward the object side, a D cemented lens, and a lens L1l that is a negative meniscus lens concave toward the image side. The A cemented lens is configured by cementing a lens Lib that is a biconcave lens and a lens L1c that is a biconvex lens in order from the object side. The C cemented lens is configured by cementing a lens L1f that is a biconvex lens and a lens L1g that is a negative meniscus lens concave toward the object side in order from the object side. The D cemented lens is configured by cementing a lens L1j that is a biconvex lens and a lens L1k that is a biconcave lens in order from the object side.

The functions and effects of the lenses L1a to L1d, and L1f to Lil of the fourth configuration example are the same as the functions and effects of the lenses L1a to L1d, L1g, L1h, and L1j to L1n of the third configuration example. The lens L1e of the fourth configuration example is able to correct spherical aberration.

The first lens group G1 of the fifth configuration example shown in FIG. 5 consists of, in order from the object side, a lens L1a that is a negative meniscus lens concave toward the image side, an A cemented lens, a lens L1d that is a biconvex lens, a lens L1e that is a biconcave lens, a C cemented lens, a lens L1h that is a biconvex lens, a lens L1i that is a biconvex lens, a lens L1j that is a positive meniscus lens convex toward the object side, a D cemented lens, and a lens L1m that is a negative meniscus lens concave toward the image side. The A cemented lens is configured by cementing a lens L1b that is a negative meniscus lens concave toward the object side and a lens L1c that is a positive meniscus lens convex toward the image side in order from the object side. The C cemented lens is configured by cementing a lens L1f that is a biconvex lens and a lens L1g that is a negative meniscus lens concave toward the object side in order from the object side. The D cemented lens is configured by cementing a lens L1k that is a positive meniscus lens convex toward the object side and a lens L1l that is a negative meniscus lens concave toward the image side in order from the object side.

The functions and effects of the above-mentioned lenses of the fifth configuration example are as follows. The incident angle of the principal ray at the maximum angle of view to the image side lens can be reduced by increasing the paraxial on-axis ray at a position close to the object by the divergence effect of the lens L1a. Thereby, there is an advantage in suppressing occurrence of sagittal coma aberration. For this reason, it is preferable that the negative lens is disposed to be closest to the object side. Further, there is an advantage in suppressing occurrence of astigmatism and distortion by forming the lens L1a in a meniscus shape concave toward the image side. There is an advantage in obtaining a sufficient negative refractive power by successively arranging the two negative lenses L1a and Lib. The incident angle of the on-axis marginal ray on each surface can be reduced by forming all of the surface closest to the object side, the cemented surface, and the surface closest to the image side in the A cemented lens in shapes concave toward the object side. In addition, it is possible to correct longitudinal chromatic aberration while suppressing the difference between spherical aberration occurring on each surface and spherical aberration depending on wavelength. The lens L1d is able to suppress occurrence of spherical aberration by sharing a positive refractive power with the positive lens L1c immediately before the object side. The lens L1e is able to correct spherical aberration. The C cemented lens has a positive refractive power as a whole, and a cemented surface is formed in a shape concave toward the object side. Thereby, there is an advantage in correcting lateral chromatic aberration and astigmatism. In particular, in a case where the absolute value of the radius of curvature of the cemented surface of the C cemented lens is reduced, the above-mentioned effect is enhanced. The lenses L1h and L1i each are positioned at a position at which the paraxial on-axis ray is high or in the vicinity thereof. By forming the lenses L1h and L1i as biconvex lenses, it is possible to suppress occurrence of spherical aberration while reducing the height of the paraxial on-axis ray in the lens closer to the image side than the lens L1i. The above-mentioned effect can be further enhanced by two lenses sharing the above-mentioned function. The on-axis rays incident on the lens L1j are convergent light. Since the lens L1j has a meniscus shape convex toward the object side, the lens L1j has a shape close to that of an aplanatic lens. Therefore, it is possible to apply a positive refractive power while suppressing occurrence of spherical aberration and coma aberration. Thereby, it is easy to form an optical system with a small F number. The D cemented lens has a meniscus shape convex toward the object side as a whole cemented lens, and thus has a shape close to an aplanatic lens. Thereby, it is easy to suppress occurrence of spherical aberration and coma aberration. The concave surface closest to the image side in the D cemented lens is also able to have a function of correcting the Petzval sum. The lens L1m and the concave surface closest to the image side in the D cemented lens shares the refraction function. Thus, it is possible to suppress occurrence of higher-order spherical aberration and sagittal coma aberration. By forming the lens L1m in a meniscus shape, it is possible to further suppress occurrence of higher-order spherical aberration.

Figure 6:
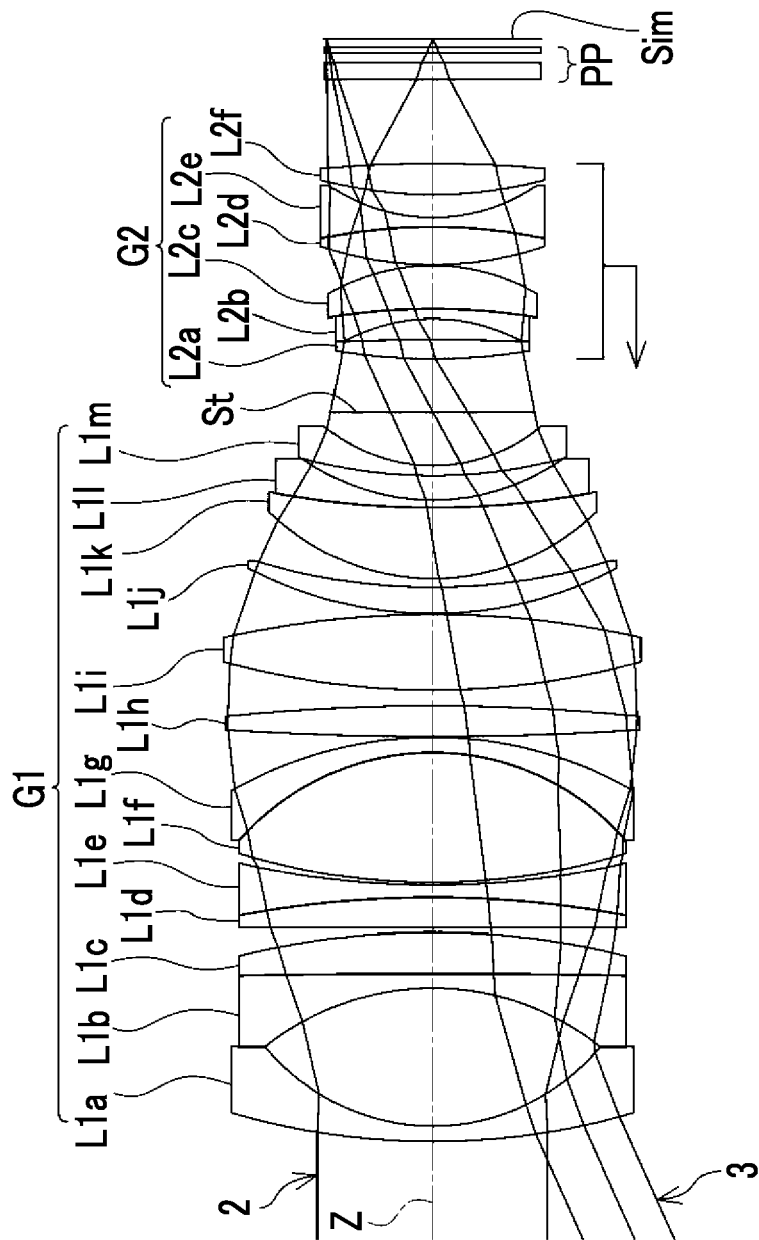
FIG. 6 is a cross-sectional view showing a configuration and rays of a sixth configuration example of an imaging lens according to an embodiment of the present disclosure, corresponding to the imaging lens of Example 6 of the present disclosure.

The first lens group G1 of the sixth configuration example shown in FIG. 6 consists of, in order from the object side, a lens L1a that is a negative meniscus lens concave toward the image side, an A cemented lens, a B cemented lens, a C cemented lens, a lens L1h that is a biconvex lens, a lens L1i that is a biconvex lens, a lens L1j that is a positive meniscus lens convex toward the object side, a D cemented lens, and a lens L1m that is a negative meniscus lens concave toward the image side. The A cemented lens is configured by cementing a lens Lib that is a negative meniscus lens concave toward the object side and a lens L1c that is a positive meniscus lens convex toward the image side in order from the object side. The B cemented lens is configured by cementing a lens L1d that is a positive lens convex toward the image side, and a lens L1e that is a biconcave lens in order from the object side. The C cemented lens is configured by cementing a lens L1f that is a biconvex lens and a lens L1g that is a negative meniscus lens concave toward the object side in order from the object side. The D cemented lens is configured by cementing a lens L1k that is a positive meniscus lens convex toward the object side and a lens L1l that is a negative meniscus lens concave toward the image side in order from the object side.

The functions and effects of the above-mentioned lenses of the sixth configuration example are as follows. The functions and effects of the lenses L1a and L1f to L1m of the sixth configuration example are the same as the functions and effects of the lenses L1a and L1f to L1m of the fifth configuration example. There is an advantage in obtaining a sufficient negative refractive power by successively arranging the two negative lenses L1a and Lib. The A cemented lens formed by cementing a negative lens and a positive lens is able to correct longitudinal chromatic aberration and lateral chromatic aberration. By forming the cemented surface of the A cemented lens in a shape convex toward the image side, it is possible to suppress occurrence of astigmatism. By forming the surface closest to the object side in the A cemented lens as a concave surface and forming the surface closest to the image side in the A cemented lens as a convex surface, it is possible to suppress occurrence of higher-order spherical aberration. In the B cemented lens, by forming the cemented surface in a shape concave toward the object side, the incident angle of the on-axis marginal ray on the cemented surface is made smaller. As a result, it is possible to correct longitudinal chromatic aberration while preventing the difference between higher-order spherical aberration and spherical aberration depending on wavelength from occurring. Spherical aberration can be corrected by forming the surface closest to the image side in the B cemented lens as a concave surface.

Figure 7:
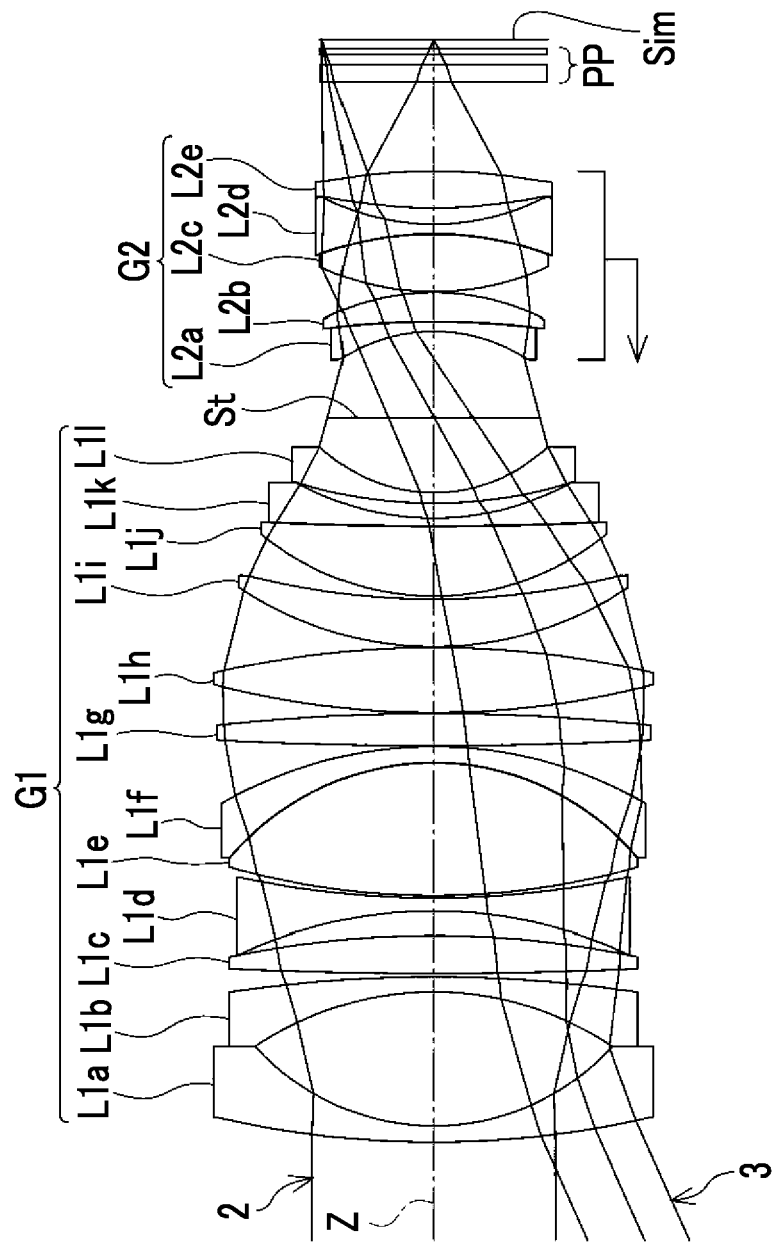
FIG. 7 is a cross-sectional view showing a configuration and rays of a seventh configuration example of an imaging lens according to an embodiment of the present disclosure, corresponding to the imaging lens of Example 7 of the present disclosure.

The first lens group G1 of the seventh configuration example shown in FIG. 7 has only two cemented lenses. The first lens group G1 of the seventh configuration example consists of, in order from the object side, a lens L1a that is a negative meniscus lens concave toward the image side, a lens L1b that is a negative meniscus lens concave toward the object side, a lens L1c that is a biconvex lens, a lens L1d that is a biconcave lens, a cemented lens that is formed by cementing a lens L1e which is a biconvex lens and a lens L1f which is a negative meniscus lens concave toward the object side in order from the object side, a lens L1g that is a convex lens, a lens L1h that is a biconvex lens, a lens L1i that is a positive meniscus lens convex toward the object side, a cemented lens that is formed by cementing a lens L1j which is a positive meniscus lens convex toward the object side and a lens L1k which is a negative meniscus lens concave toward the image side in order from the object side, and a lens L1l that is a negative meniscus lens concave toward the image side.

The functions and effects of the above-mentioned lenses of the seventh configuration example are as follows. The functions and effects of the lenses L1a and Lie to L1l of the seventh configuration example are the same as the functions and effects of the lenses L1a and L1f to L1m of the fifth configuration example. In the seventh configuration example, there is an advantage in obtaining a sufficient negative refractive power by successively arranging the two negative lenses L1a and Lib. By forming the lens L1b in a shape concave toward the object side, the incident angle of the on-axis marginal ray on each surface can be reduced. As a result, it is possible to suppress spherical aberration occurring on each surface. The lens L1c is able to correct longitudinal chromatic aberration and lateral chromatic aberration. The lens L1d is able to correct spherical aberration.

Figure 8:
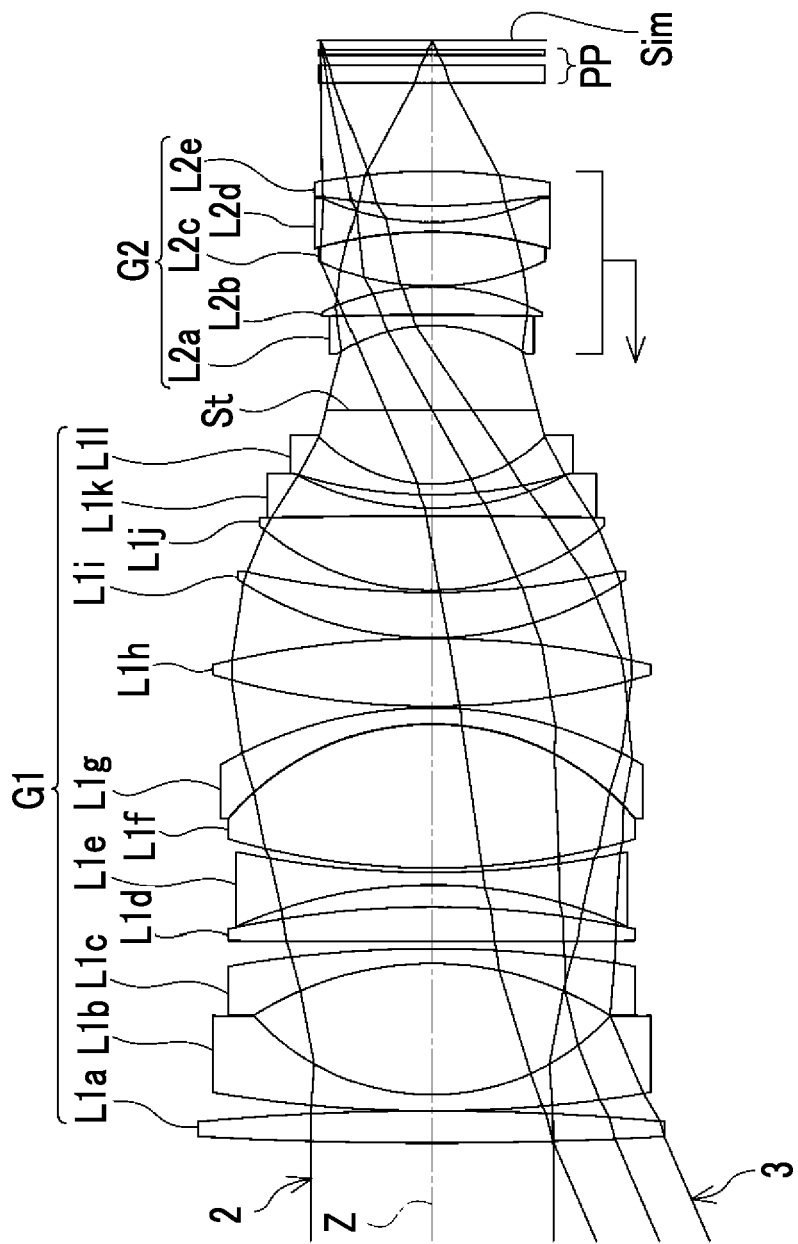
FIG. 8 is a cross-sectional view showing a configuration and rays of an eighth configuration example of an imaging lens according to an embodiment of the present disclosure, corresponding to the imaging lens of Example 8 of the present disclosure.

The first lens group G1 of the eighth configuration example shown in FIG. 8 has only two cemented lenses. The first lens group G1 of the eighth configuration example consists of, in order from the object side, a lens L1a that is a biconvex lens, a lens L1b that is a negative meniscus lens concave toward the image side, a lens L1c that is a negative meniscus lens concave toward the object side, a lens L1d that is a positive lens convex toward the image side, a lens L1e that is a biconcave lens, a cemented lens that is formed by cementing a lens L1f which is a biconvex lens and a lens L1g which is a negative meniscus lens concave toward the object side in order from the object side, a lens L1h that is a biconvex lens, a lens L1i that is a positive meniscus convex toward the object side, a cemented lens that is formed by cementing a lens L1j which is a biconvex lens and a lens L1k which is a biconcave lens in order from the object side, and a lens L1l that is a negative meniscus lens concave toward the image side.

The functions and effects of the above-mentioned lenses of the eighth configuration example are as follows. The lens L1a is advantageous in correcting distortion and lateral chromatic aberration occurring in the lens L1b. The functions and effects of the lenses Lib, L1c, L1e to L1g, and L1i to L1l of the eighth configuration example are the same as the functions and effects of the lenses L1a, Lib, L1d to L1f, and L1i to L1l of the seventh configuration example. In the eighth configuration example, the lens L1d is able to correct longitudinal chromatic aberration and lateral chromatic aberration while reducing the divergence angle of the on-axis ray. The lens L1h is positioned at a position at which the paraxial on-axis ray is high or in the vicinity thereof. By forming the lens L1h as a biconvex lens, it is possible to suppress occurrence of spherical aberration while reducing the height of the paraxial on-axis ray in the lens closer to the image side than the lens L1h.

Figure 9:
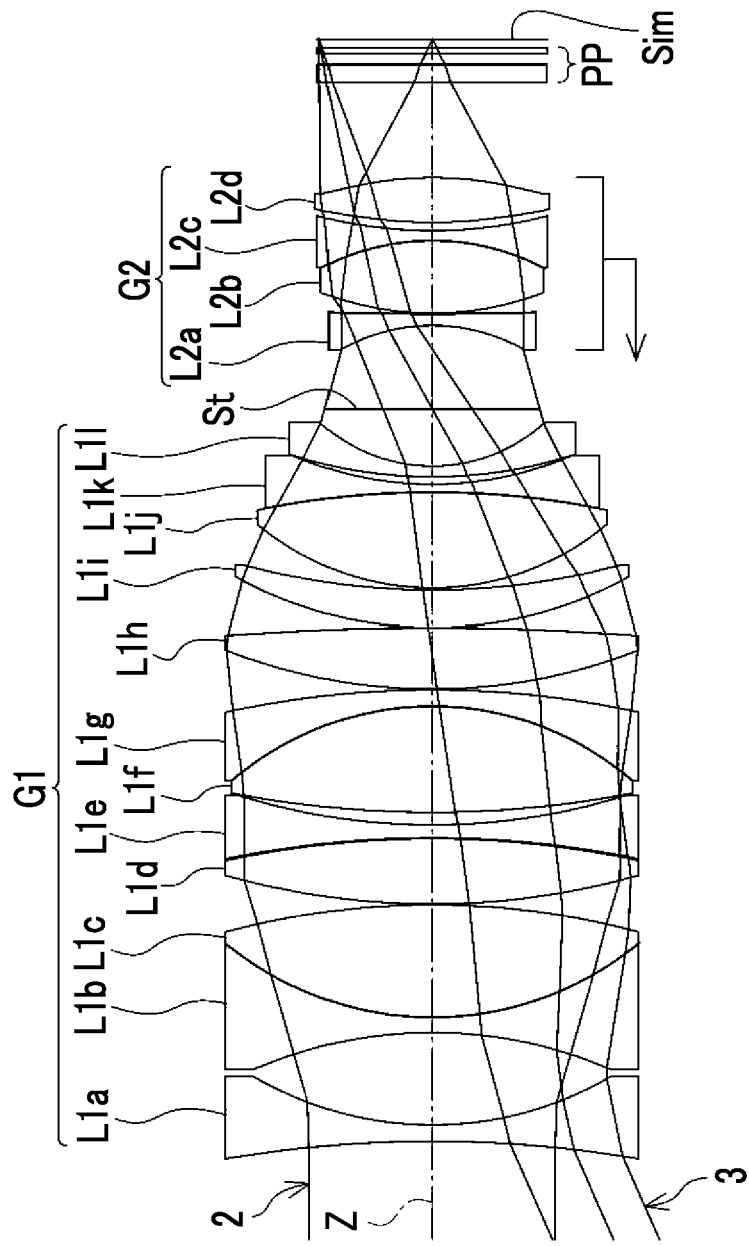
FIG. 9 is a cross-sectional view showing a configuration and rays of a ninth configuration example of an imaging lens according to an embodiment of the present disclosure, corresponding to the imaging lens of Example 9 of the present disclosure.

The first lens group G1 of the ninth configuration example shown in FIG. 9 consists of, in order from the object side, a lens L1a that is a biconcave lens, an A cemented lens, a lens L1d that is a biconvex lens, a lens L1e that is a biconcave lens, a C cemented lens, a lens L1h that is a biconvex lens, a lens L1i that is a positive meniscus lens convex toward the object side, a D cemented lens, and a lens L1l that is a negative meniscus lens concave toward the image side. The A cemented lens is configured by cementing a lens L1b that is a biconcave lens and a lens L1c that is a biconvex lens in order from the object side. The C cemented lens is configured by cementing a lens L1f that is a biconvex lens and a lens L1g that is a negative meniscus lens concave toward the object side in order from the object side. The D cemented lens is configured by cementing a lens L1j that is a positive lens convex toward the object side and a lens L1k that is a negative lens concave toward the image side in order from the object side. It should be noted that the first lens group G1 of the tenth configuration example shown in FIG. 10 has the same configuration as the first lens group G1 of the ninth configuration example.

The functions and effects of the above-mentioned lenses of the ninth configuration example are as follows. The incident angle of the principal ray at the maximum angle of view to the image side lens can be reduced by increasing the paraxial on-axis ray at a position close to the object by the divergence effect of the lens L1a. Thereby, there is an advantage in suppressing occurrence of sagittal coma aberration. For this reason, it is preferable that the negative lens is disposed to be closest to the object side. In addition, since the lens L1a has a biconcave shape, the lens L1a is able to have a strong refractive power. Therefore, the above-mentioned effect can be enhanced. By successively arranging two negative lenses L1a and L1b, a sufficient negative refractive power is provided, and by making these two lenses biconcave, it is possible to suppress spherical aberration occurring on each surface. By cementing the lens L1b and the positive lens L1c on the image side, it is possible to correct longitudinal chromatic aberration and lateral chromatic aberration. By forming the lens L1c as a biconvex lens, it is possible to suppress spherical aberration occurring on each surface. The lens L1d is able to correct longitudinal chromatic aberration and lateral chromatic aberration while reducing the divergence angle of the on-axis ray. The lens L1e is able to correct spherical aberration. The C cemented lens has a positive refractive power as a whole, and the cemented surface is formed in a shape concave toward the object side. Thereby, it is possible to correct longitudinal chromatic aberration while suppressing occurrence of a difference in spherical aberration depending on wavelength. By forming the surface closest to the object side in the C cemented lens as a convex surface and forming the surface closest to the image side in the C cemented lens as a convex surface, the C cemented lens is able to share the refractive power with the positive lens closer to the image side than the C cemented lens. As a result, it is possible to suppress occurrence of spherical aberration. The functions and effects of the lenses L1h, L1i, and L1l of the ninth configuration example are the same as the functions and effects of the lenses L1h, L1i, and L1l of the eighth configuration example. The D cemented lens has a meniscus shape convex toward the object side as a whole cemented lens, and thus has a shape close to an aplanatic lens. Thereby, it is easy to suppress occurrence of spherical aberration and coma aberration. The concave surface closest to the image side in the D cemented lens is also able to have a function of correcting the Petzval sum. In a case where the cemented surface of the D cemented lens has a shape convex toward the image side, the refractive power of each of the positive lens and the negative lens can be increased. Therefore, there is an advantage in correcting longitudinal chromatic aberration. In a case where the cemented surface has a shape convex toward the object side, it is possible to suppress occurrence of a difference in spherical aberration depending on wavelength.

Figure 11:
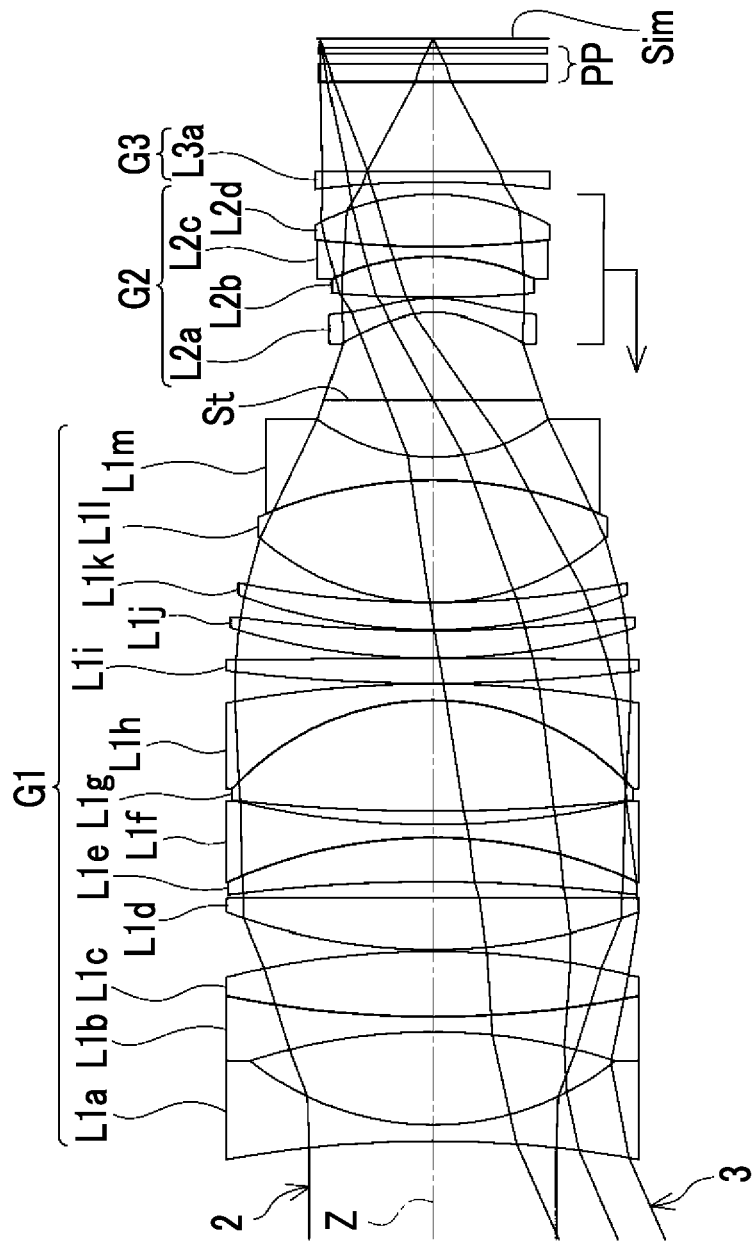
FIG. 11 is a cross-sectional view showing a configuration and rays of an eleventh configuration example of an imaging lens according to an embodiment of the present disclosure corresponding to the imaging lens of Example 11 of the present disclosure.

The first lens group G1 of the eleventh configuration example shown in FIG. 11 consists of, in order from the object side, a lens L1a that is a biconcave lens, an A cemented lens, and a lens L1d that is a positive lens convex toward the object side, a B cemented lens, a C cemented lens, a lens L1i that is a biconvex lens, a lens L1j that is a positive meniscus lens convex toward the object side, a lens L1k that is a positive meniscus lens convex toward the object side, and a D cemented lens. The A cemented lens is configured by cementing a lens L1b that is a biconcave lens and a lens L1c that is a biconvex lens in order from the object side. The B cemented lens is configured by cementing a lens L1e that is a positive meniscus lens convex toward the image side and a lens L1f that is a biconcave lens in order from the object side. The C cemented lens is configured by cementing a lens L1g that is a biconvex lens and a lens L1h that is a negative meniscus lens concave toward the object side in order from the object side. The D cemented lens is configured by cementing a lens L1l that is a biconvex lens and a lens L1m that is a biconcave lens in order from the object side.

The functions and effects of the above-mentioned lenses of the eleventh configuration example are as follows. The functions and effects of the lenses L1a and Lib of the eleventh configuration example are the same as the functions and effects of the lenses L1a and Lib of the ninth configuration example. In the eleventh configuration example, the lens L1d is advantageous in correcting distortion and lateral chromatic aberration occurring in the lens L1b. In the B cemented lens, by forming the cemented surface in a shape in which the surface closest to the object side and the cemented surface are concave toward the object side, the incident angle of the on-axis marginal ray on the cemented surface is made smaller. As a result, it is possible to correct longitudinal chromatic aberration while preventing the difference between higher-order spherical aberration and spherical aberration depending on wavelength from occurring. Spherical aberration can be corrected by forming the surface closest to the image side in the B cemented lens as a concave surface. The functions and effects of the lenses L1g to L1i, L1l, and L1m of the eleventh configuration example are the same as the functions and effects of the lenses L1f to L1h, L1j, and L1k of the eighth configuration example. The on-axis rays incident on the lenses L1j and L1k are convergent light. Since the lenses L1j and L1k have a meniscus shape convex toward the object side, the lenses L1j and L1k have a shape close to that of an aplanatic lens. Therefore, it is possible to apply a positive refractive power while suppressing occurrence of spherical aberration and coma aberration. Thereby, it is easy to form an optical system with a small F number.

Next, the second lens group G2 will be described. The second lens group G2 of the first to fourth, tenth, and eleventh configuration examples shown in FIGS. 1 to 4, 10, and 11 consists of a three-piece cemented lens which is formed by cementing a lens L2a that is a negative meniscus lens concave toward the object side, a lens L2b that is a biconvex lens, a lens L2c that is a biconcave lens, and a lens L2d that is a biconvex lens, in order from the object side. The functions and effects of the above-mentioned lenses of these configuration examples are as follows. The lens L2a is able to suppress fluctuation in spherical aberration during focusing. In the three-piece cemented lens, by cementing the three lenses, the refractive power of each lens can be increased as compared with the case where the three lenses are not cemented. As a result, there is an advantage in correcting chromatic aberration and the Petzval sum. In addition, it is possible to suppress fluctuation in astigmatism. By forming each lens in the three-piece cemented lens in a biconvex shape, a biconcave shape, and a biconvex shape, the above-mentioned effect can be further enhanced.

The second lens group G2 of the fifth and sixth configuration examples shown in FIGS. 5 and 6 consists of, in order from the object side, a cemented lens that is formed by cementing a lens L2a which is a biconvex lens, a lens L2b which is a negative meniscus lens concave toward the object side, and a lens L2c which is a positive meniscus lens convex toward the image side, in order from the object side, a cemented lens that is formed by cementing a lens L2d that is a biconvex lens and a lens L2e that is a biconcave lens in order from the object side, and a lens L2f that is a biconvex lens. The functions and effects of the above-mentioned lenses of these configuration examples are as follows. The lens L2a shares the positive refractive power with other positive lenses, and is able to correct second-order chromatic aberration while suppressing occurrence of spherical aberration. The lens L2b turns the on-axis ray into a divergent ray at the concave surface on the object side, and contributes to ensuring the back focal length. The cemented lens consisting of the lenses L2b and L2c has a meniscus shape as a whole cemented lens, and has a shape close to an aplanatic lens with respect to the divergent ray. Therefore, it is possible to suppress occurrence of spherical aberration and coma aberration. Further, by making the cemented surface concave toward the object side, all the surfaces intersecting with the optical axis Z of the cemented lens are able to reduce the incident angle of the off-axis principal ray on each surface. Thus, it is possible to correct longitudinal chromatic aberration while suppressing occurrence of astigmatism and lateral chromatic aberration. The cemented lens consisting of the lenses L2d and L2e has a shape in which the surface closest to the object side and the surface closest to the image side are convex toward the object side. Thereby, it is possible to suppress occurrence of higher order spherical aberration while suppressing the incident angle of the on-axis marginal ray on each surface. This cemented lens has a shape in which the cemented surface is convex toward the image side. Thereby, it is possible to adjust high-order aberration caused by the on-axis marginal ray while suppressing the incidence angle of the off-axis principal ray on the cemented surface and suppressing occurrence of astigmatism. In a case where the difference in Abbe number between the positive lens and the negative lens in the cemented lens is reduced, the difference in spherical aberration depending on wavelength on the cemented surface is less likely to occur. The lens L2f is able to reduce the incident angle of the principal ray with the maximum angle of view on the image plane Sim.

The second lens group G2 of the seventh and eighth configuration examples shown in FIGS. 7 and 8 consists of, in order from the object side, a cemented lens that is formed by cementing a lens L2a which is a negative meniscus lens concave toward the object side and a lens L2b which is a positive meniscus lens convex toward the image side in order from the object side, a cemented lens which is formed by cementing a lens L2c that is a biconvex lens and a lens L2d that is a biconcave lens in order from the object side, and a lens L2e that is a biconvex lens. The functions and effects of the lenses L2a to L2e of these configuration examples are the same as the functions and effects of the lenses L2b to L2f of the fifth configuration example.

The second lens group G2 of the ninth configuration example shown in FIG. 9 consists of, in order from the object side, a lens L2a that is a negative lens concave toward the object side, a cemented lens that is formed by cementing a lens L2b which is a biconvex lens and a lens L2c which is a biconcave lens in order from the object side, and a lens L2d that is a biconvex lens. The functions and effects of the above-mentioned lenses of the ninth configuration example are as follows. The lens L2a is able to suppress fluctuation in spherical aberration during focusing. The lenses L2b to L2d are able to have a main image forming function as a whole. By cementing a biconvex lens and a biconcave lens, the refractive power of each lens can be increased as compared with the case where the lenses are not cemented. As a result, there is an advantage in correcting chromatic aberration and the Petzval sum. In addition, it is possible to suppress fluctuation in astigmatism during focusing. The lenses L2b to L2d are able to further enhance the above-mentioned effects by forming the lenses in biconvex, biconcave, and biconvex shapes, respectively. By providing an air distance between the lenses L2c and L2d, there is an advantage in correcting higher-order spherical aberration and sagittal coma aberration.

Next, the subsequent group will be described. The subsequent group of the first configuration example shown in FIG. 1 consists of one plano-concave lens concave toward the object side. The subsequent group of the fourth configuration example shown in FIG. 4 consists of one negative meniscus lens concave toward the object side. The subsequent group of the tenth configuration example shown in FIG. 10 consists of one positive meniscus lens convex toward the object side. By adopting a configuration in which the subsequent group consists of one lens, there is an advantage in balancing aberrations while reducing the size.

The above-mentioned preferred configurations and available configurations may be optional combinations, and it is preferable to selectively adopt the configurations in accordance with required specification. According to the technique of the present disclosure, it is possible to realize an imaging lens having high optical performance by reducing the weight of the focus group and satisfactorily correcting aberrations while having a small F number.

Next, numerical examples of the imaging lens of the present disclosure will be described.

Example 1

FIG. 1 shows a cross-sectional configuration of an imaging lens of Example 1, and an illustration method and a configuration thereof is as described above. Therefore, repeated description is partially omitted herein. The imaging lens of Example 1 consists of, in order from the object side, a first lens group G1 having a positive refractive power, an aperture stop St, a second lens group G2 having a positive refractive power, and a third lens group G3 having a negative refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of fourteen lenses L1a to L1n in order from the object side. The second lens group G2 consists of four lenses L2a to L2d in order from the object side. The third lens group G3 consists of one lens L3a.

Regarding the imaging lens of Example 1, Table 1 shows basic lens data, Table 2 shows specification, Table 3 shows variable surface distances, and Table 4 shows aspheric surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line, the column of vd shows an Abbe number of each constituent element based on the d line, and the column of θgF shows a partial dispersion ratio of each constituent element between the g line and the F line.

In Table 1, the sign of the radius of curvature of the surface convex toward the object side is positive and the sign of the radius of curvature of the surface convex toward the image side is negative. Table 1 also shows the aperture stop St and the optical member PP, and in the column of the surface number of the surface corresponding to the aperture stop St, the surface number and (St) are noted. In Table 1, the surface number and the term (Hm) are noted in the surface number column of the surface where the height of the paraxial ray from the optical axis Z used in Conditional Expression (1) is H1max. A value at the bottom place of D in Table 1 indicates a distance between the image plane Sim and the surface closest to the image side in the table. In Table 1, the symbol DD[ ] is used for each variable surface distance that varies during focusing, and the object side surface number of the distance is given in [ ] and is noted in the column D.

Table 2 shows values of the focal length f, the F number FNo, and the maximum total angle of view 2ωmax of the imaging lens. FNo. is the same as FNo used in the above conditional expression. The unit of 2ωmax is degree. The values shown in Table 2 are values in the case of using the d line as a reference in a state where the object at infinity is in focus.

In Table 3, the column labelled "Infinity" shows values of the variable surface distance in the state where the object at infinity is in focus and the column labelled "0.3 m" shows values of the variable surface distance in the state where an object at a distance of 0.3 m (meters) from the object to an image plane Sim is in focus.

In Table 1, the reference sign * is attached to surface numbers of aspheric surfaces, and numerical values of the paraxial radius of curvature are written into the column of the radius of curvature of the aspheric surface. In Table 4, the row of Sn shows surface numbers of the aspheric surfaces, and the rows of KA and Am (m is an integer of 3 or more, and is different for each surface) shows numerical values of the aspheric surface coefficients for each aspheric surface. The "E±n" (n: an integer) in numerical values of the aspheric surface coefficients of Table 4 indicates "×10$^{\pm n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here,

Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of the paraxial radius of curvature, KA and Am are aspheric surface coefficients, and Σ in the aspheric surface expression means the sum with respect to m.

In data of each table, a degree is used as a section of an angle, and mm (millimeter) is used as a section of a length, but appropriate different sections may be used since the optical system can be used even in a case where the system is enlarged or reduced in proportion. Further, each of the following tables shows numerical values rounded off to predetermined decimal places.

TABLE 1

| Sn | R | D | Nd | vd | θgF |
|---|---|---|---|---|---|
| 1 | −375.48753 | 2.000 | 1.51633 | 64.14 | 0.53531 |
| 2 | 41.61374 | 12.442 | | | |
| 3 | −50.77397 | 1.850 | 1.80610 | 40.93 | 0.57141 |
| 4 | 751.41459 | 11.330 | 1.75500 | 52.32 | 0.54737 |
| 5 | −74.65707 | 0.939 | | | |
| 6 | 247.91657 | 6.789 | 1.85150 | 40.78 | 0.56958 |
| 7 | −93.10744 | 2.010 | 1.69895 | 30.13 | 0.60298 |
| 8 | −132.38227 | 1.000 | | | |
| 9 | −622.93948 | 6.109 | 1.71848 | 55.58 | 0.54383 |
| 10 | −68.47115 | 1.600 | 1.73622 | 28.43 | 0.60794 |
| 11 | 106.96983 | 0.723 | | | |
| 12 | 139.78186 | 6.510 | 1.67471 | 57.76 | 0.54285 |
| 13 | −144.98029 | 0.162 | | | |
| 14 | −677.05462 | 2.000 | 1.78174 | 25.91 | 0.61513 |
| 15 | 469.19581 | 0.150 | | | |
| 16 (Hm) | 126.78629 | 4.153 | 1.62741 | 60.10 | 0.54309 |
| 17 | 394.68490 | 0.101 | | | |
| 18 | 47.91818 | 7.151 | 1.98613 | 16.48 | 0.66558 |
| 19 | 184.56988 | 0.250 | | | |
| 20 | 34.67041 | 11.884 | 1.79337 | 48.66 | 0.55346 |
| 21 | −83.57508 | 1.010 | 1.71207 | 29.40 | 0.60535 |
| 22 | 74.94803 | 0.600 | | | |
| 23 | 104.76893 | 1.300 | 1.95906 | 17.47 | 0.65993 |
| 24 | 22.74495 | 7.000 | | | |
| 25 (St) | ∞ | DD[25] | | | |
| *26 | −16.73226 | 1.700 | 1.68948 | 31.02 | 0.59874 |
| *27 | −27.38218 | 0.100 | | | |
| 28 | 110.45346 | 6.951 | 1.88300 | 39.22 | 0.57295 |
| 29 | −20.37452 | 1.220 | 1.69895 | 30.13 | 0.60298 |
| 30 | 175.14157 | 5.684 | 1.81600 | 46.62 | 0.55682 |
| 31 | −30.64835 | DD[31] | | | |
| 32 | −125.00429 | 1.300 | 1.48749 | 70.24 | 0.53007 |
| 33 | ∞ | 11.001 | | | |
| 34 | ∞ | 2.150 | 1.54763 | 54.98 | 0.55247 |
| 35 | ∞ | 1.310 | | | |
| 36 | ∞ | 0.700 | 1.49784 | 54.98 | 0.55000 |
| 37 | ∞ | 1.125 | | | |

TABLE 2

| | |
|---|---|
| f | 32.028 |
| FNo. | 1.04 |
| 2ωmax | 49.2 |

TABLE 3

| | Infinity | 0.3 m |
|---|---|---|
| DD[25] | 10.006 | 6.279 |
| DD[31] | 1.500 | 5.227 |

TABLE 4

| Sn | 26 | 27 |
|---|---|---|
| KA | 1.0000000E+00 | 1.0000000E+00 |
| A4 | 1.0918413E−04 | 1.1221929E−04 |

TABLE 4-continued

| Sn | 26 | 27 |
|---|---|---|
| A6 | −3.9247588E−07 | −4.5041583E−08 |
| A8 | 5.6253829E−09 | −1.3422782E−08 |
| A10 | −1.5368868E−10 | 4.4663683E−10 |
| A12 | 2.6112443E−12 | −8.3275411E−12 |
| A14 | −2.6476673E−14 | 9.2612242E−14 |
| A16 | 1.5967794E−16 | −6.0654418E−16 |
| A18 | −5.2941766E−19 | 2.1589277E−18 |
| A20 | 7.4321084E−22 | −3.2224891E−21 |

Figure 12:
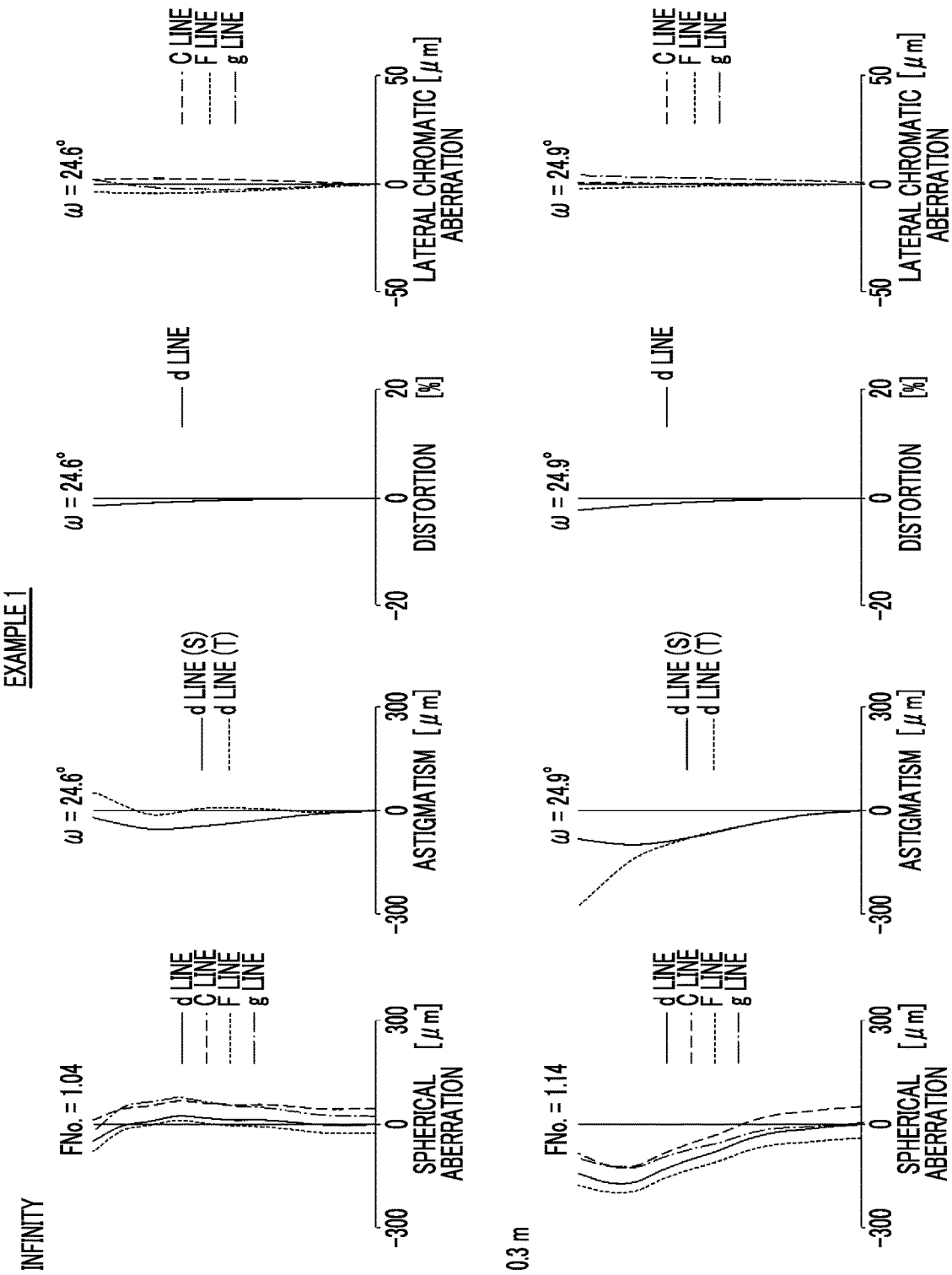
FIG. 12 shows spherical aberration diagrams, astigmatism diagrams, distortion diagrams, lateral chromatic aberration diagrams of the imaging lens of Example 1 of the present disclosure.
Figure 13:
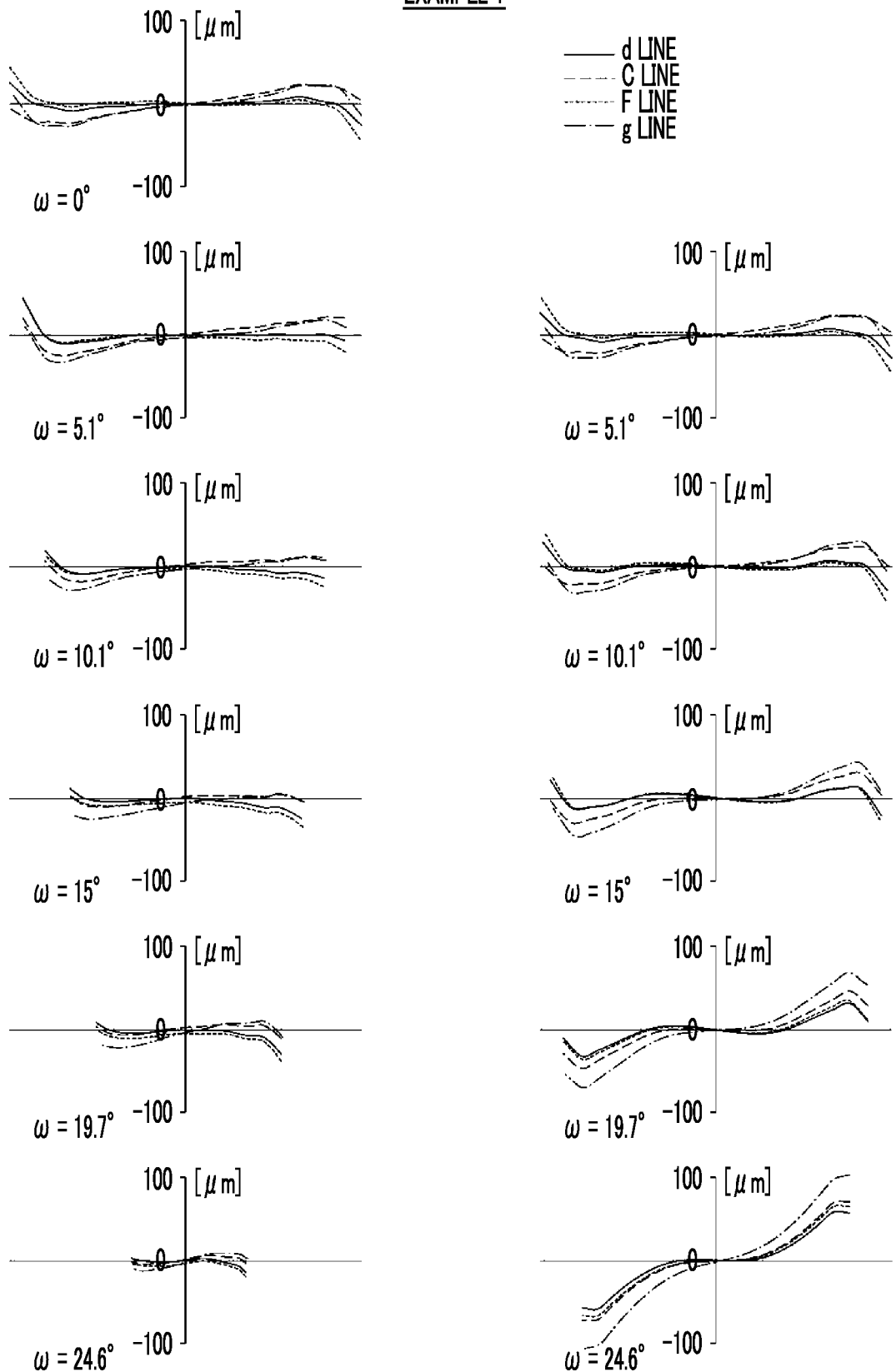
FIG. 13 is a lateral aberration diagram of the imaging lens according to Example 1 of the present disclosure.

FIGS. 12 and 13 each show aberration diagrams of the imaging lens of Example 1. FIG. 12 shows spherical aberration diagrams, astigmatism diagrams, distortion diagrams, and lateral chromatic aberration diagrams in order from the left. In FIG. 12, the upper part labeled "Infinity" shows aberration diagrams in a state where the object at infinity is in focus, and the lower part labeled "0.3 m" shows aberration diagrams in a state where an object at the distance of 0.3 m (meter) from the object to the image plane Sim is in focus. In spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration, aberrations at the C line, the F line, and the g line are respectively indicated by the long dashed line, the short dashed line, and the chain line. In spherical aberration diagram, FNo. indicates an F number. In the other aberration diagrams, ω indicates a half angle of view. In FIG. 12, values of FNo. and ω corresponding to the upper part in the vertical axis of each diagram are shown next to "=".

FIG. 13 shows lateral aberration diagram in a state in which the object at infinity is in focus. The left column shows tangential aberration and the right column shows sagittal aberration for each angle of view. In FIG. 13, ω means a half angle of view. In the lateral aberration diagram, aberrations at the d line, the C line, the F line, and the g line are indicated by the solid line, the long dashed line, the short dashed line, and the chain line, respectively.

Symbols, meanings, description methods, and illustration methods of the respective data pieces according to Example 1 are the same as those in the following examples unless otherwise noted. Therefore, in the following description, repeated description will be partially omitted.

Example 2

FIG. 2 shows a cross-sectional configuration of the imaging lens of Example 2. The imaging lens of Example 2 consists of, in order from the object side, a first lens group G1 having a positive refractive power, an aperture stop St, a second lens group G2 having a positive refractive power, and a third lens group G3 having a negative refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of thirteen lenses L1a to L1m in order from the object side. The second lens group G2 consists of four lenses L2a to L2d in order from the object side. The third lens group G3 consists of one lens L3a.

Figure 14:
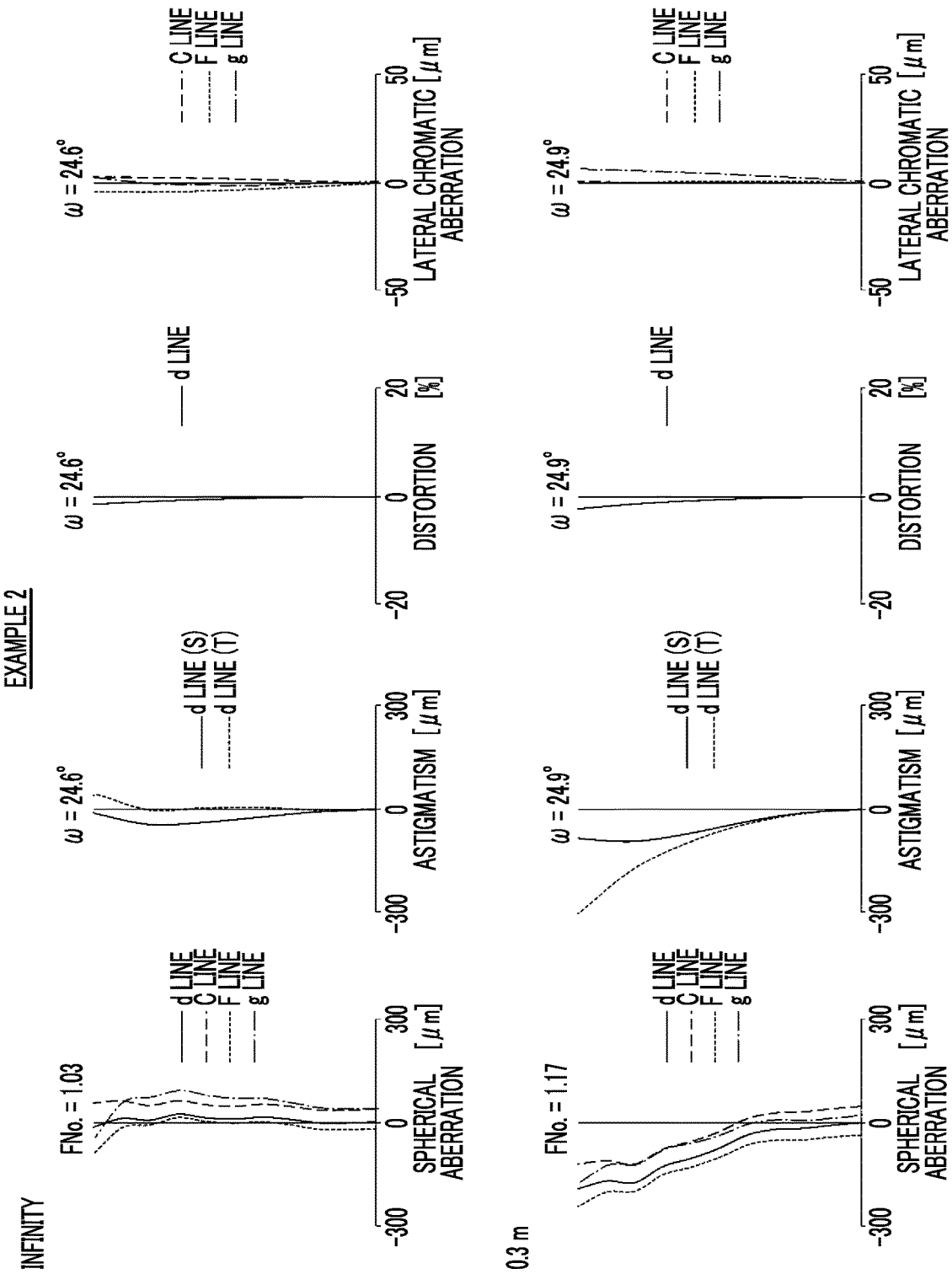
FIG. 14 shows spherical aberration diagrams, astigmatism diagrams, distortion diagrams, lateral chromatic aberration diagrams of the imaging lens of Example 2 of the present disclosure.
Figure 15:
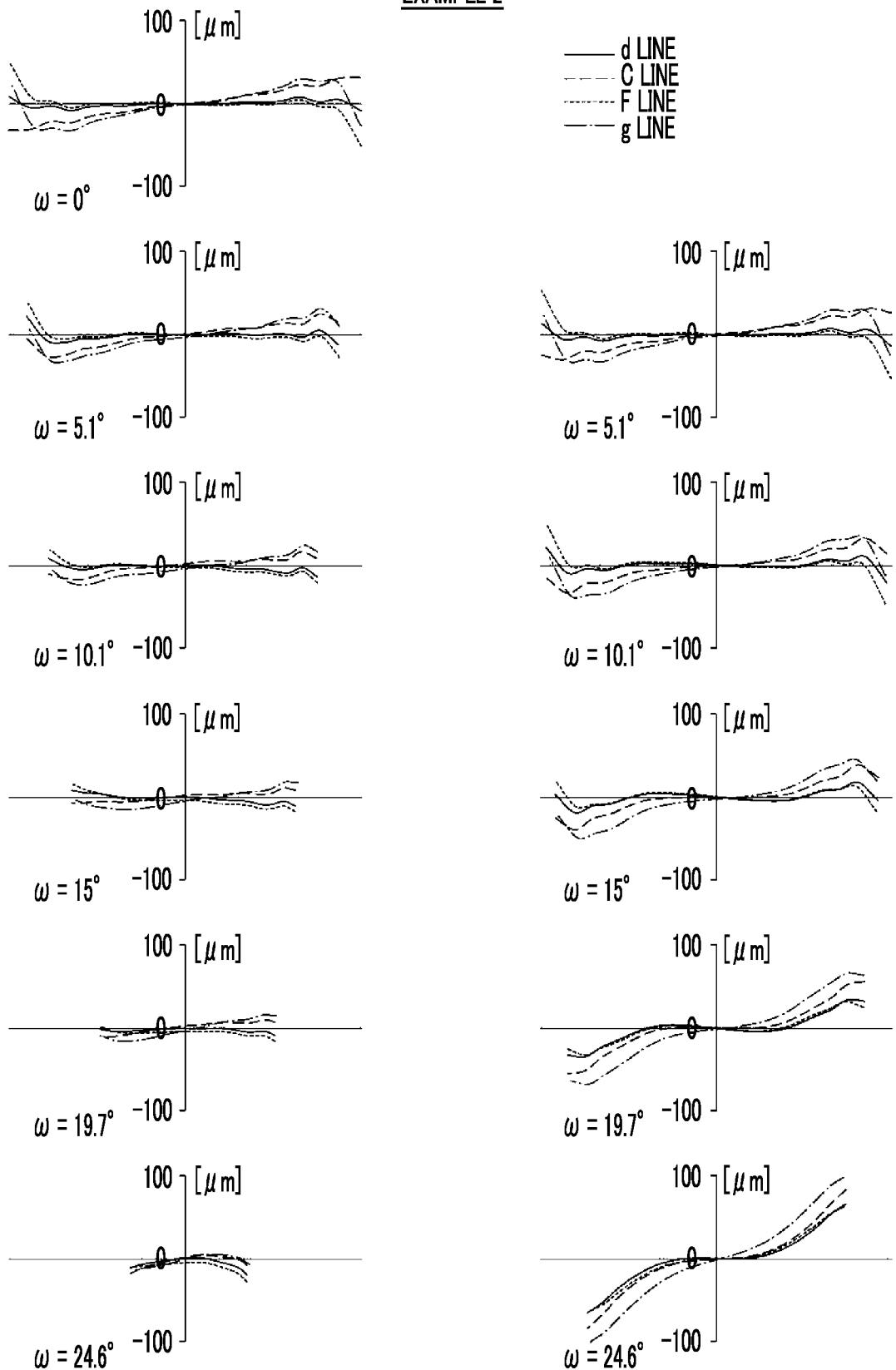
FIG. 15 is a lateral aberration diagram of the imaging lens according to Example 2 of the present disclosure.

Regarding the imaging lens of Example 2, Table 5 shows basic lens data, Table 6 shows specification, Table 7 shows variable surface distances, Table 8 shows aspheric surface coefficients, and FIGS. 14 and 15 show aberration diagrams. In FIG. 14, the upper part shows aberration diagrams in a state where the object at infinity is in focus, and the lower part shows aberration diagrams in a state where the object at the distance of 0.3 m (meter) from the object to the image plane Sim is in focus. FIG. 15 shows lateral aberration diagram in a state where

TABLE 5

| Sn | R | D | Nd | νd | θgF |
|---|---|---|---|---|---|
| 1 | −633.25261 | 2.000 | 1.59551 | 39.24 | 0.58043 |
| 2 | 38.00665 | 12.863 | | | |
| 3 | −54.28519 | 1.850 | 1.80100 | 34.97 | 0.58642 |
| 4 | 95.00850 | 10.922 | 1.71300 | 53.87 | 0.54587 |
| 5 | −67.98194 | 0.100 | | | |
| 6 | 95.72298 | 6.765 | 2.00272 | 19.32 | 0.64514 |
| 7 | −251.63874 | 1.000 | | | |
| 8 | −246.42407 | 6.991 | 1.80100 | 34.97 | 0.58642 |
| 9 | −53.58723 | 1.610 | 1.69895 | 30.13 | 0.60298 |
| 10 | 99.80167 | 0.909 | | | |
| 11 | 137.54054 | 10.681 | 1.62041 | 60.29 | 0.54266 |
| 12 | −52.34651 | 2.010 | 1.60342 | 38.03 | 0.58356 |
| 13 | −414.75790 | 0.100 | | | |
| 14 (Hm) | 143.20008 | 3.225 | 1.69680 | 55.53 | 0.54341 |
| 15 | 366.55185 | 0.462 | | | |
| 16 | 51.74239 | 6.881 | 1.91082 | 35.25 | 0.58224 |
| 17 | 180.97539 | 0.260 | | | |
| 18 | 35.24471 | 11.944 | 1.81600 | 46.62 | 0.55682 |
| 19 | −93.14313 | 1.010 | 1.72825 | 28.46 | 0.60772 |
| 20 | 79.60733 | 0.642 | | | |
| 21 | 118.00563 | 1.300 | 1.85896 | 22.73 | 0.62844 |
| 22 | 22.08603 | 7.000 | | | |
| 23 (St) | ∞ | DD[23] | | | |
| *24 | −18.33819 | 1.700 | 1.68948 | 31.02 | 0.59874 |
| *25 | −31.12948 | 0.100 | | | |
| 26 | 111.28451 | 5.800 | 1.87070 | 40.73 | 0.56825 |
| 27 | −25.06585 | 1.220 | 1.69895 | 30.13 | 0.60298 |
| 28 | 182.89249 | 6.206 | 1.81600 | 46.62 | 0.55682 |
| 29 | −28.43888 | DD[29] | | | |
| 30 | −125.00563 | 1.300 | 1.51742 | 52.43 | 0.55649 |
| 31 | ∞ | 11.000 | | | |
| 32 | ∞ | 2.150 | 1.54763 | 54.98 | 0.55247 |
| 33 | ∞ | 1.310 | | | |
| 34 | ∞ | 0.700 | 1.49784 | 54.98 | 0.55000 |
| 35 | ∞ | 1.125 | | | |

TABLE 6

| f | 32.025 |
|---|---|
| FNo. | 1.03 |
| 2ωmax | 49.2 |

TABLE 7

| | Infinity | 0.3 m |
|---|---|---|
| DD[23] | 10.027 | 6.297 |
| DD[29] | 1.500 | 5.230 |

TABLE 8

| Sn | 24 | 25 |
|---|---|---|
| KA | 1.0000000E+00 | 1.0000000E+00 |
| A4 | 7.6509788E−05 | 8.6420274E−05 |
| A6 | −1.2736248E−06 | −6.0388926E−07 |

TABLE 8-continued

| Sn | 24 | 25 |
|---|---|---|
| A8 | 5.0778640E−08 | 1.1474585E−08 |
| A10 | −1.3097284E−09 | −7.5854198E−11 |
| A12 | 2.0623870E−11 | −1.6331770E−12 |
| A14 | −2.0059301E−13 | 3.9524334E−14 |
| A16 | 1.1722812E−15 | −3.5644909E−16 |
| A18 | −3.7566167E−18 | 1.5341315E−18 |
| A20 | 5.0432936E−21 | −2.6183645E−21 |

Example 3

FIG. 3 shows a cross-sectional configuration of the imaging lens of Example 3. The imaging lens of Example 3 consists of, in order from the object side, a first lens group G1 having a positive refractive power, an aperture stop St, a second lens group G2 having a positive refractive power, and a third lens group G3 having a negative refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of fourteen lenses L1a to L1n in order from the object side. The second lens group G2 consists of four lenses L2a to L2d in order from the object side. The third lens group G3 consists of one lens L3a.

Figure 16:
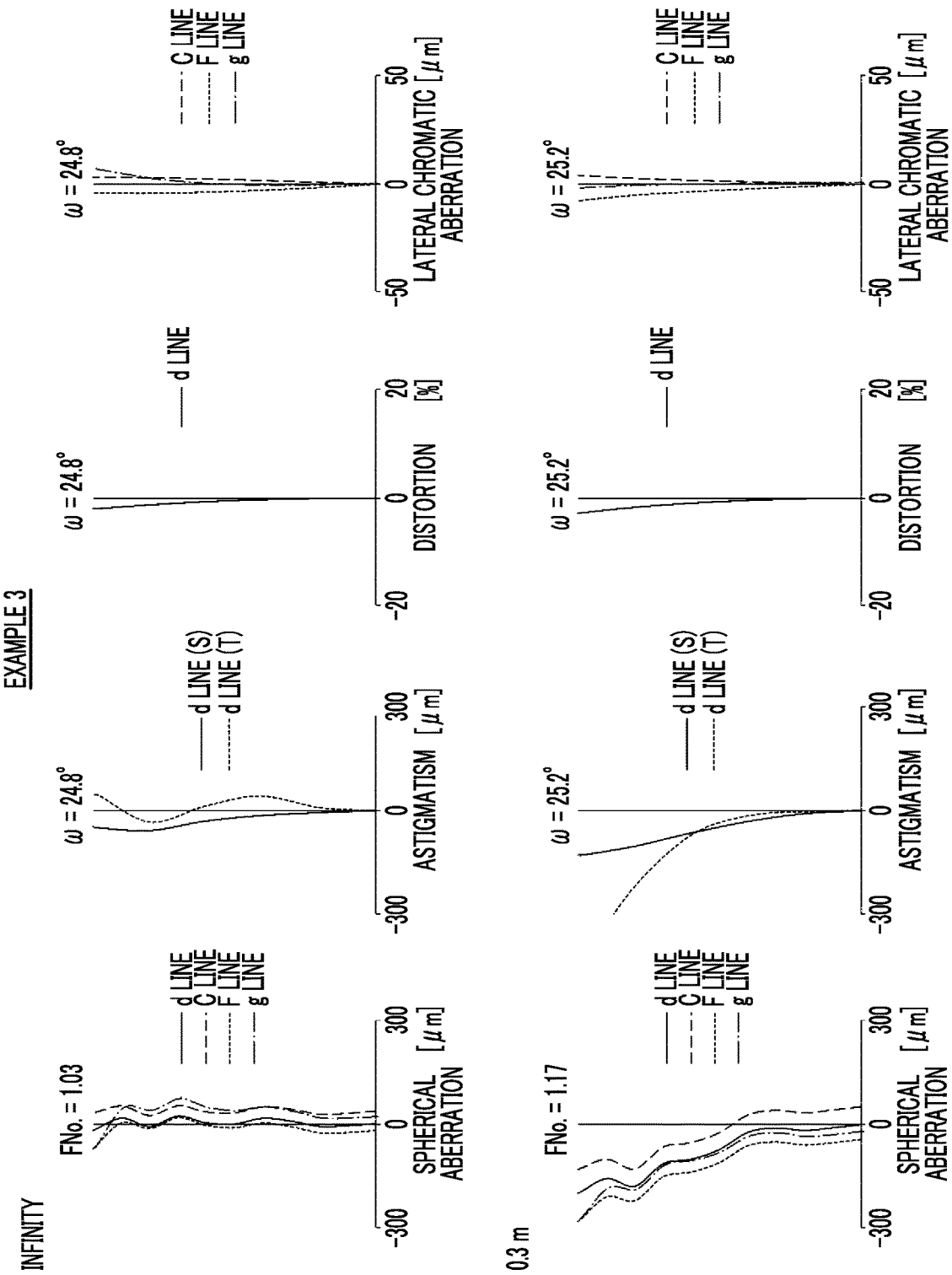
FIG. 16 shows spherical aberration diagrams, astigmatism diagrams, distortion diagrams, lateral chromatic aberration diagrams of the imaging lens of Example 3 of the present disclosure.
Figure 17:
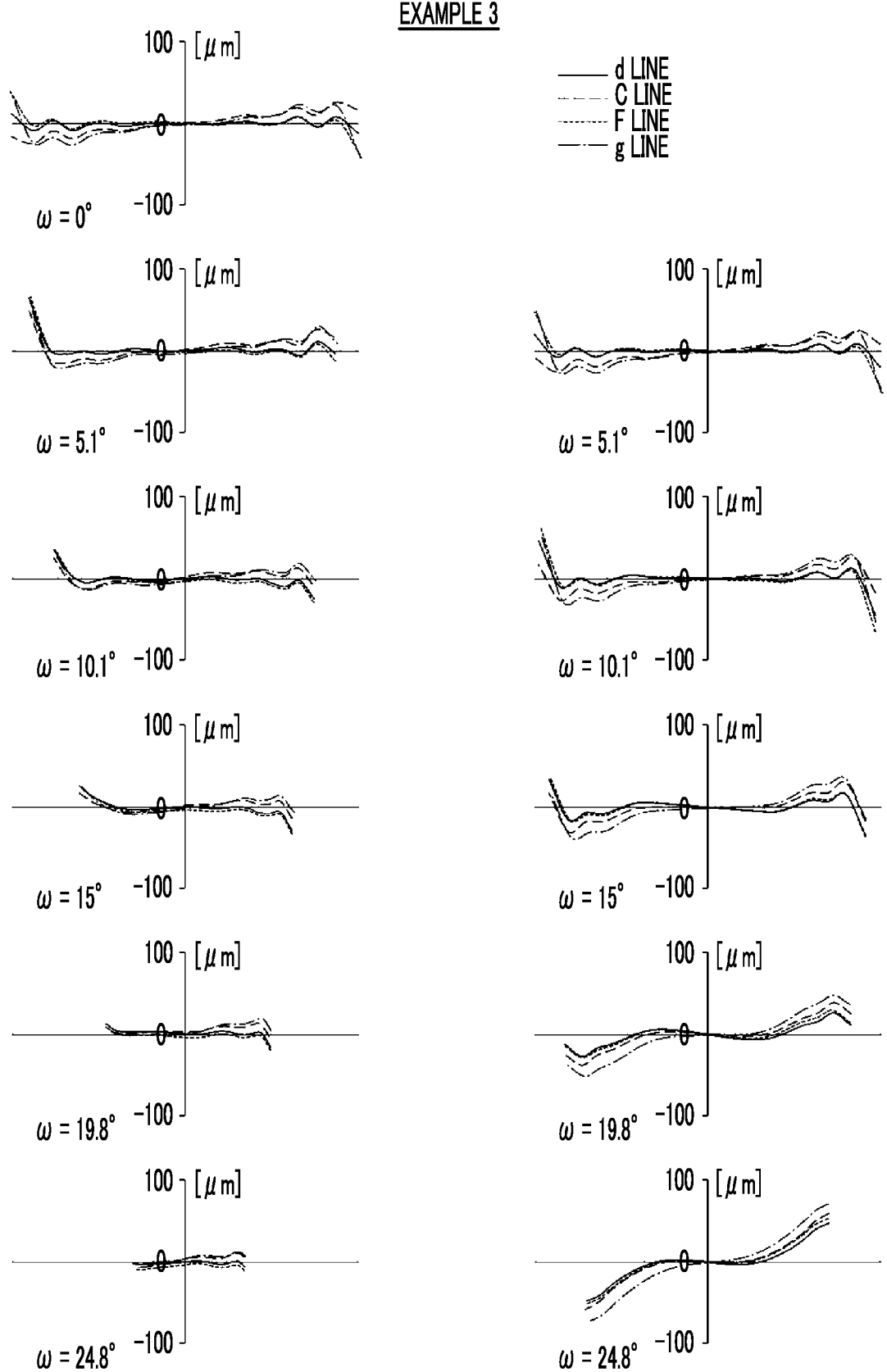
FIG. 17 is a lateral aberration diagram of the imaging lens according to Example 3 of the present disclosure.

Regarding the imaging lens of Example 3, Table 9 shows basic lens data, Table 10 shows specification, Table 11 shows variable surface distances, Table 12 shows aspheric surface coefficients, and FIGS. 16 and 17 show aberration diagrams. In FIG. 16, the upper part shows aberration diagrams in a state where the object at infinity is in focus, and the lower part shows aberration diagrams in a state where the object at the distance of 0.3 m (meter) from the object to the image plane Sim is in focus. FIG. 17 shows lateral aberration diagram in a state in which

TABLE 9

| Sn | R | D | Nd | vd | θgF |
|---|---|---|---|---|---|
| 1 | −165.42350 | 2.000 | 1.58913 | 61.13 | 0.54067 |
| 2 | 38.02493 | 11.171 | | | |
| 3 | −78.90205 | 1.860 | 1.85896 | 22.73 | 0.62844 |
| 4 | 135.03359 | 8.673 | 1.88300 | 39.22 | 0.57295 |
| 5 | −125.34332 | 0.388 | | | |
| 6 | 81.38853 | 6.229 | 1.98613 | 16.48 | 0.66558 |
| 7 | −1164.55245 | 2.000 | | | |
| 8 | −176.23720 | 5.057 | 1.88300 | 39.22 | 0.57295 |
| 9 | −65.39636 | 1.610 | 1.60342 | 38.03 | 0.58356 |
| 10 | 117.84539 | 1.449 | | | |
| 11 | 248.12960 | 13.269 | 1.62041 | 60.29 | 0.54266 |
| 12 | −35.62036 | 2.010 | 1.59270 | 35.31 | 0.59336 |
| 13 | −142.31708 | 0.100 | | | |
| 14 (Hm) | 226.48778 | 3.068 | 1.62041 | 60.29 | 0.54266 |
| 15 | −2645.65433 | 0.100 | | | |
| 16 | 86.52768 | 3.520 | 1.62041 | 60.29 | 0.54266 |
| 17 | 191.08772 | 0.100 | | | |
| 18 | 75.79354 | 3.706 | 1.63854 | 55.38 | 0.54858 |
| 19 | 171.58105 | 0.000 | | | |
| 20 | 33.82444 | 14.858 | 1.75500 | 52.32 | 0.54737 |
| 21 | −58.88844 | 1.010 | 1.74000 | 28.30 | 0.60790 |
| 22 | 51.73381 | 0.500 | | | |
| 23 | 61.33515 | 1.300 | 1.80518 | 25.42 | 0.61616 |
| 24 | 25.36951 | 7.000 | | | |
| 25 (St) | ∞ | DD[25] | | | |
| *26 | −13.61427 | 1.700 | 1.68948 | 31.02 | 0.59874 |
| *27 | −19.19138 | 0.100 | | | |

TABLE 9-continued

| Sn | R | D | Nd | vd | θgF |
|---|---|---|---|---|---|
| 28 | 141.72239 | 5.000 | 1.87070 | 40.73 | 0.56825 |
| 29 | −34.64752 | 1.220 | 1.69895 | 30.13 | 0.60298 |
| 30 | 114.02867 | 6.434 | 1.88300 | 39.22 | 0.57295 |
| 31 | −30.99263 | DD[31] | | | |
| 32 | −125.00563 | 1.300 | 1.48749 | 70.24 | 0.53007 |
| 33 | ∞ | 11.000 | | | |
| 34 | ∞ | 2.150 | 1.54763 | 54.98 | 0.55247 |
| 35 | ∞ | 1.310 | | | |
| 36 | ∞ | 0.700 | 1.49784 | 54.98 | 0.55000 |
| 37 | ∞ | 1.122 | | | |

TABLE 10

| f | 32.026 |
|---|---|
| FNo. | 1.03 |
| 2ωmax | 49.6 |

TABLE 11

| | Infinity | 0.3 m |
|---|---|---|
| DD[25] | 10.596 | 6.741 |
| DD[31] | 1.500 | 5.355 |

TABLE 12

| Sn | 26 | 27 |
|---|---|---|
| KA | 1.0000000E+00 | 1.0000000E+00 |
| A4 | 1.6825325E−04 | 1.4660302E−04 |
| A6 | −2.1553844E−06 | −9.3570707E−07 |
| A8 | 9.2157099E−08 | 1.4440237E−08 |
| A10 | −2.2926119E−09 | 1.1596827E−10 |
| A12 | 3.4857987E−11 | −8.2569738E−12 |
| A14 | −3.2821584E−13 | 1.3298821E−13 |
| A16 | 1.8701820E−15 | −1.0460064E−15 |
| A18 | −5.8954769E−18 | 4.1491271E−18 |
| A20 | 7.8960041E−21 | −6.6428045E−21 |

Example 4

FIG. 4 shows a cross-sectional configuration of the imaging lens of Example 4. The imaging lens of Example 4 consists of, in order from the object side, a first lens group G1 having a positive refractive power, an aperture stop St, a second lens group G2 having a positive refractive power, and a third lens group G3 having a negative refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of twelve lenses L1a to L1l in order from the object side. The second lens group G2 consists of four lenses L2a to L2d in order from the object side. The third lens group G3 consists of one lens L3a.

Figure 18:
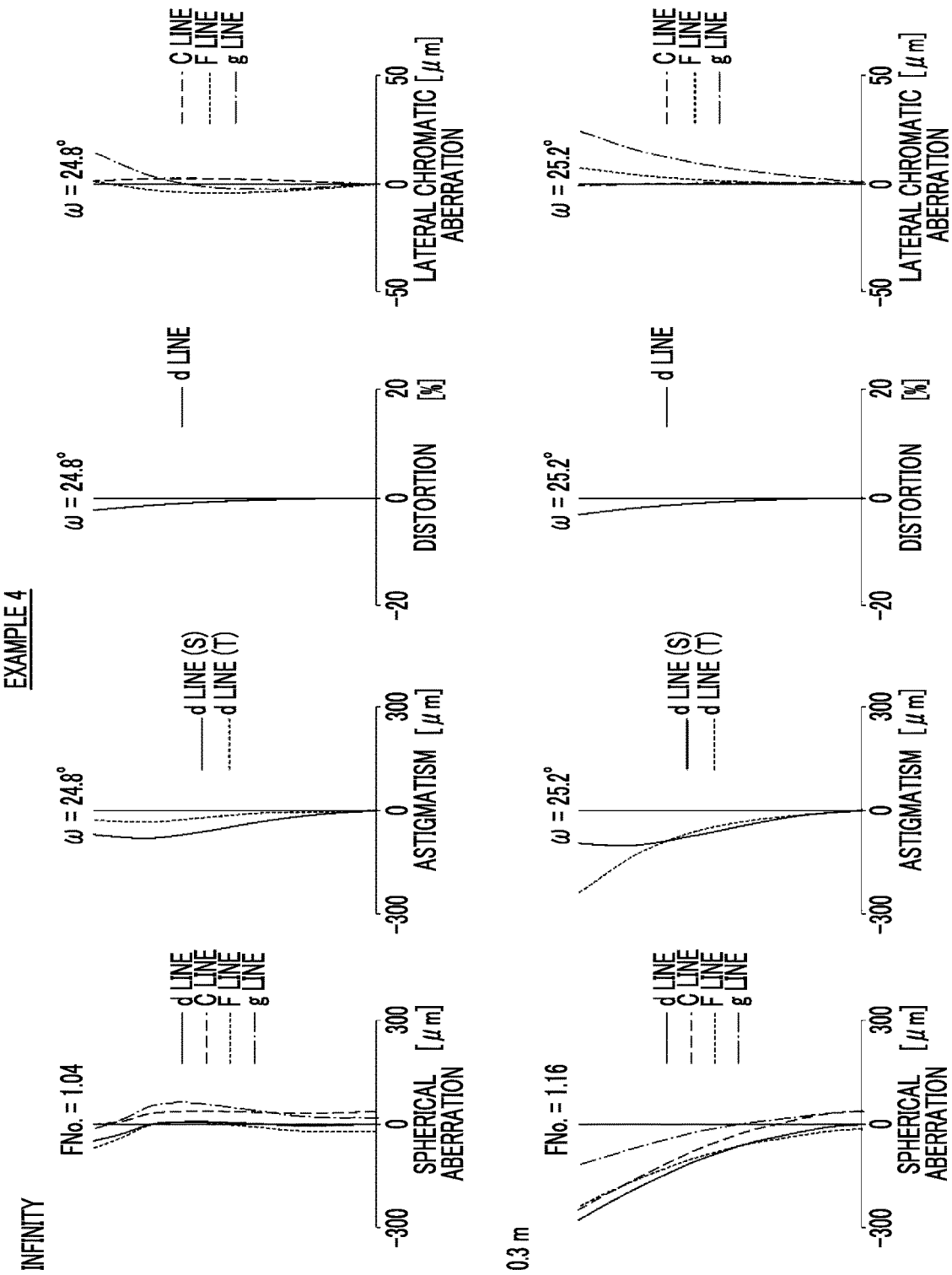
FIG. 18 shows spherical aberration diagrams, astigmatism diagrams, distortion diagrams, lateral chromatic aberration diagrams of the imaging lens of Example 4 of the present disclosure.
Figure 19:
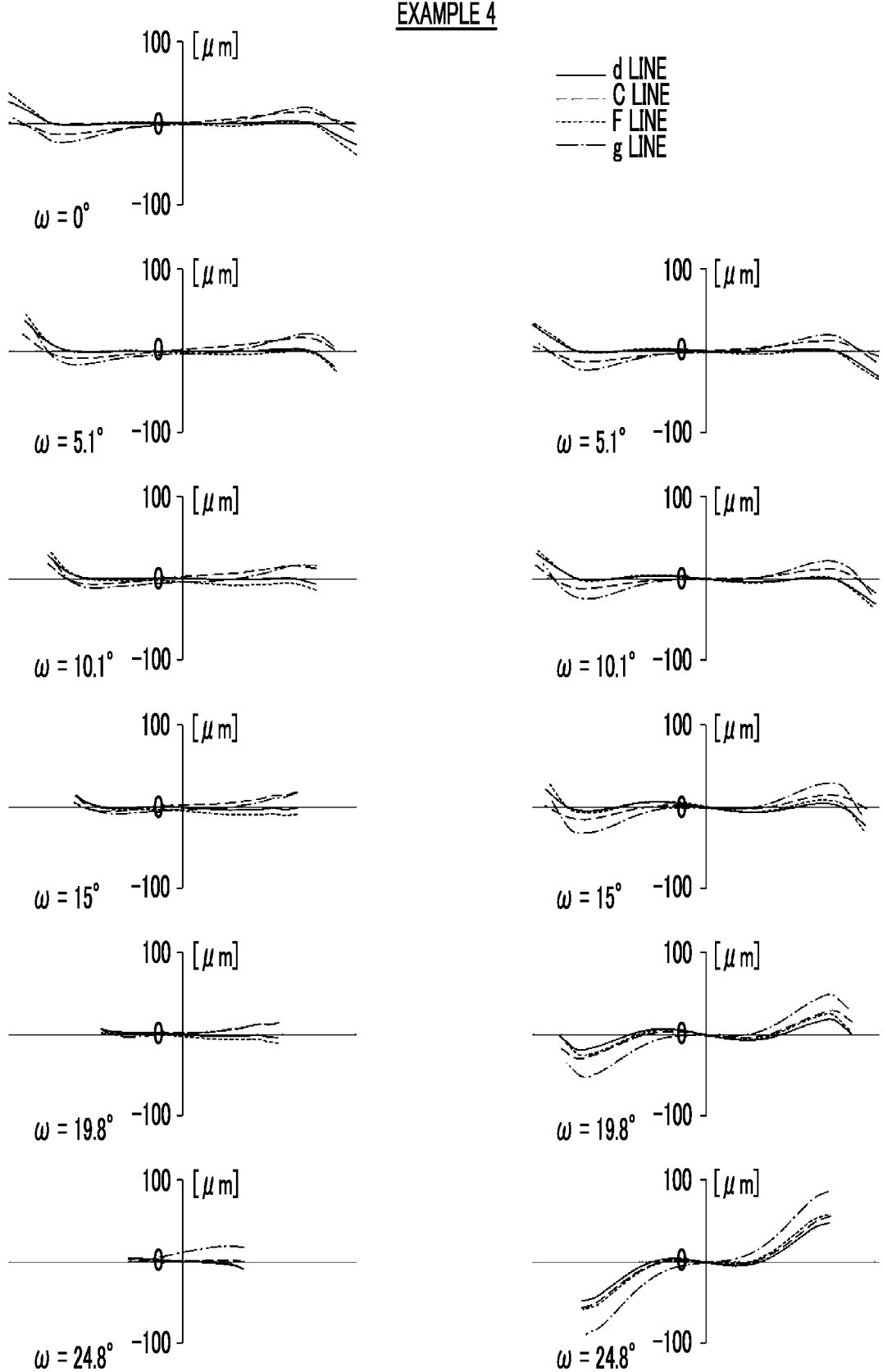
FIG. 19 is a lateral aberration diagram of the imaging lens according to Example 4 of the present disclosure.

Regarding the imaging lens of Example 4, Table 13 shows basic lens data, Table 14 shows specification, Table 15 shows variable surface distances, Table 16 shows aspheric surface coefficients, and FIGS. 18 and 19 show aberration diagrams. In FIG. 18, the upper part shows aberration diagrams in a state where the object at infinity is in focus, and the lower part shows aberration diagrams in a state where the object at the distance of 0.3 m (meter) from the object to the image plane Sim is in focus. FIG. 19 shows lateral aberration diagram in a state in which

TABLE 13

| Sn | R | D | Nd | vd | θgF |
|---|---|---|---|---|---|
| 1 | −170.42205 | 2.000 | 1.95906 | 17.47 | 0.65993 |
| 2 | 50.93126 | 10.000 | | | |
| 3 | −62.89963 | 1.860 | 1.73800 | 32.33 | 0.59005 |
| 4 | 63.23471 | 12.479 | 2.00069 | 25.46 | 0.61364 |
| 5 | −85.62329 | 0.100 | | | |
| 6 | 98.56677 | 8.000 | 1.95906 | 17.47 | 0.65993 |
| 7 | −121.79029 | 0.477 | | | |
| 8 | −118.43196 | 1.600 | 1.80518 | 25.42 | 0.61616 |
| 9 | 80.65370 | 1.155 | | | |
| 10 | 111.39530 | 10.914 | 1.65160 | 58.55 | 0.54267 |
| 11 | −53.88195 | 2.000 | 1.69895 | 30.13 | 0.60298 |
| 12 | −187.46939 | 0.100 | | | |
| 13 (Hm) | 77.09490 | 5.219 | 1.69680 | 55.53 | 0.54341 |
| 14 | 430.48603 | 0.010 | | | |
| 15 | 45.95146 | 4.706 | 1.77250 | 49.60 | 0.55212 |
| 16 | 76.46363 | 0.250 | | | |
| 17 | 32.61413 | 11.699 | 1.81600 | 46.62 | 0.55682 |
| 18 | −148.26374 | 1.010 | 1.69895 | 30.13 | 0.60298 |
| 19 | 58.93531 | 0.528 | | | |
| 20 | 72.93410 | 1.300 | 1.80000 | 29.84 | 0.60178 |
| 21 | 20.09516 | 7.000 | | | |
| 22 (St) | ∞ | DD[22] | | | |
| *23 | −15.15790 | 1.700 | 1.80610 | 40.73 | 0.56940 |
| *24 | −20.92915 | 0.100 | | | |
| 25 | 98.17592 | 7.400 | 1.81600 | 46.62 | 0.55682 |
| 26 | −20.50642 | 1.220 | 1.78472 | 25.68 | 0.61621 |
| 27 | 51.14074 | 7.600 | 1.88300 | 39.22 | 0.57295 |
| 28 | −29.09669 | DD[28] | | | |
| 29 | −96.04384 | 1.300 | 1.89286 | 20.36 | 0.63944 |
| 30 | −204.55708 | 11.000 | | | |
| 31 | ∞ | 2.150 | 1.54763 | 54.98 | 0.55247 |
| 32 | ∞ | 1.310 | | | |
| 33 | ∞ | 0.700 | 1.49784 | 54.98 | 0.55000 |
| 34 | ∞ | 1.120 | | | |

TABLE 14

| f | 32.031 |
|---|---|
| FNo. | 1.04 |
| 2ωmax | 49.6 |

TABLE 15

| | Infinity | 0.3 m |
|---|---|---|
| DD[22] | 8.784 | 5.091 |
| DD[28] | 1.500 | 5.193 |

TABLE 16

| Sn | 23 | 24 |
|---|---|---|
| KA | 1.0000000E+00 | 1.0000000E+00 |
| A3 | 0.0000000E+00 | 0.0000000E+00 |
| A4 | 1.3211887E−04 | 1.2050752E−04 |
| A5 | 1.1634328E−05 | 1.1221955E−05 |
| A6 | −2.9087313E−06 | −2.7613273E−06 |
| A7 | 2.2227009E−07 | 1.4658350E−07 |
| A8 | 2.0727705E−08 | 6.4386926E−08 |
| A9 | −3.2564526E−09 | −1.0901974E−08 |
| A10 | −4.7536117E−11 | −6.8694012E−10 |
| A11 | −2.5124386E−11 | 2.7059934E−10 |
| A12 | 5.5141964E−12 | −3.5423643E−12 |
| A13 | 5.8876373E−13 | −3.5396610E−12 |
| A14 | −1.1569406E−13 | 1.6811758E−13 |

TABLE 16-continued

| Sn | 23 | 24 |
|---|---|---|
| A15 | −1.3487895E−15 | 2.5770290E−14 |
| A16 | 8.4031933E−16 | −1.7421479E−15 |
| A17 | −1.9473700E−17 | −9.8711547E−17 |
| A18 | −2.0411231E−18 | 8.0324338E−18 |
| A19 | 8.7644939E−20 | 1.5542646E−19 |
| A20 | −3.5194950E−22 | −1.4295009E−20 |

Example 5

FIG. 5 shows a cross-sectional configuration of the imaging lens of Example 5. The imaging lens of Example 5 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of thirteen lenses L1a to L1m in order from the object side. The second lens group G2 consists of six lenses L2a to L2f in order from the object side.

Figure 20:
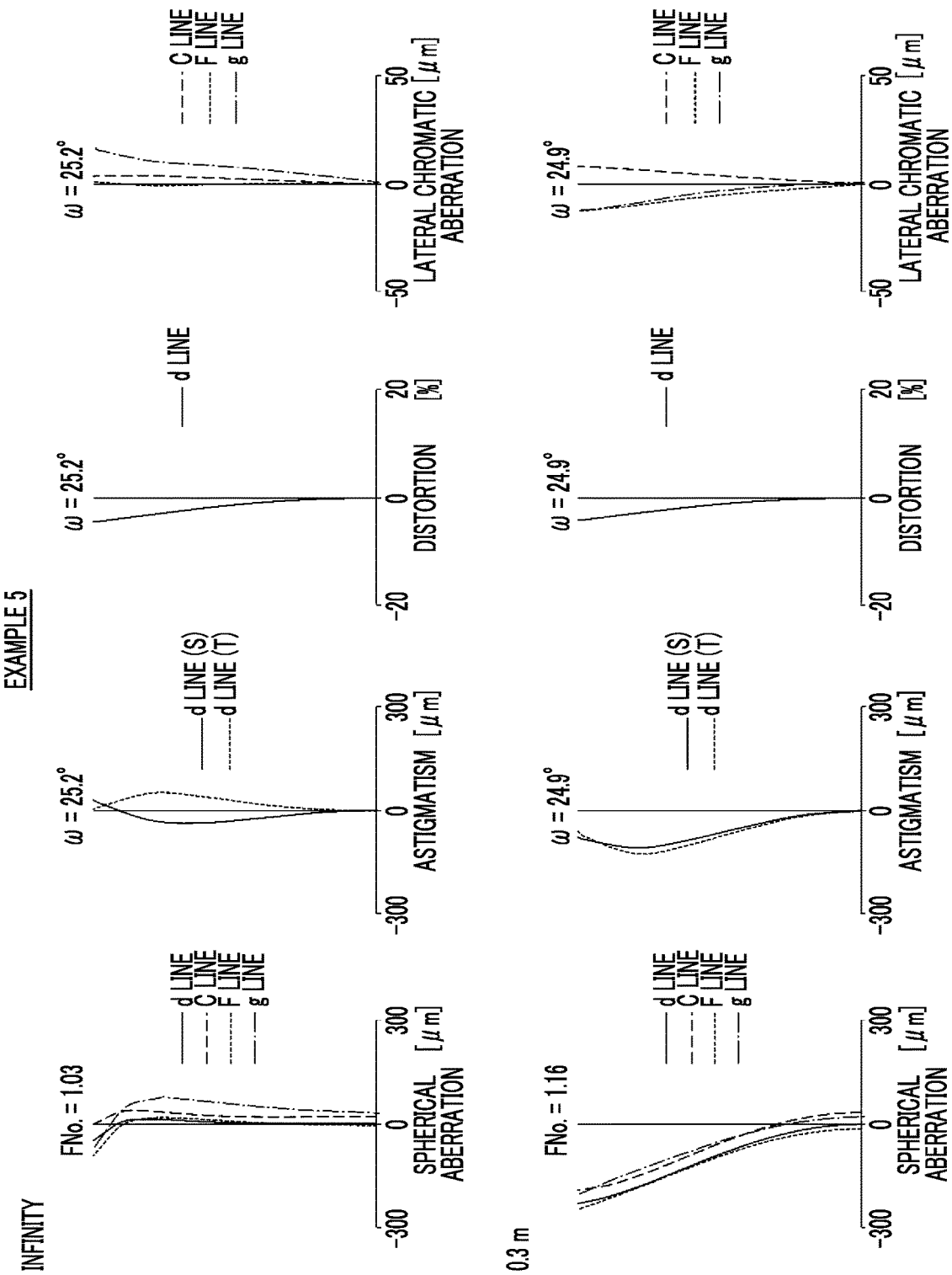
FIG. 20 shows spherical aberration diagrams, astigmatism diagrams, distortion diagrams, lateral chromatic aberration diagrams of the imaging lens of Example 5 of the present disclosure.
Figure 21:
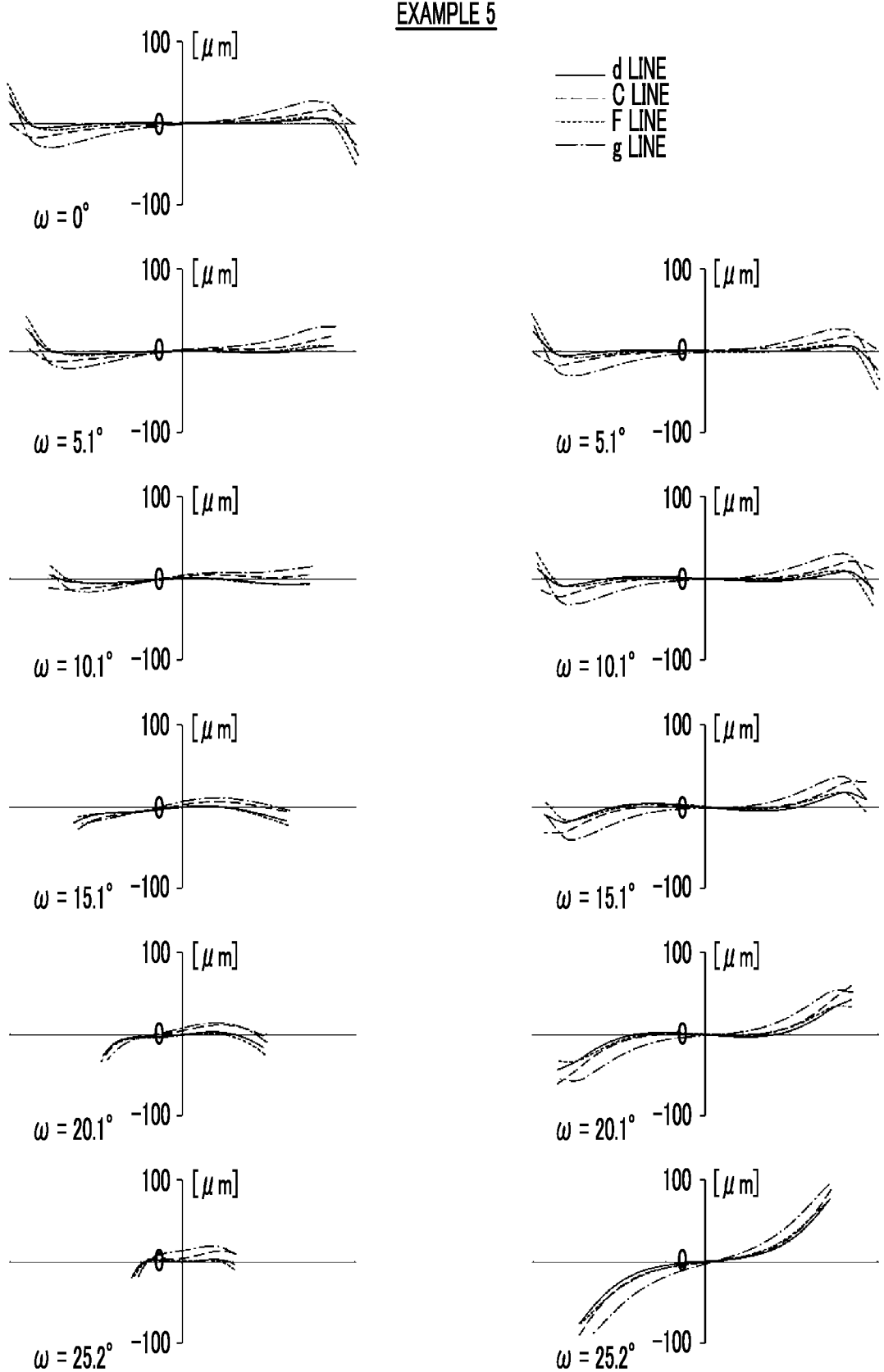
FIG. 21 is a lateral aberration diagram of the imaging lens according to Example 5 of the present disclosure.

Regarding the imaging lens of Example 5, Table 17 shows basic lens data, Table 18 shows specification, Table 19 shows variable surface distances, and FIGS. 20 and 21 show aberration diagrams. In FIG. 20, the upper part shows aberration diagrams in a state where the object at infinity is in focus, and the lower part shows aberration diagrams in a state where the object at the distance of 0.3 m (meter) from the object to the image plane Sim is in focus. FIG. 21 shows lateral aberration diagram in a state where the object at infinity is in focus.

TABLE 17

| Sn | R | D | Nd | vd | θgF |
|---|---|---|---|---|---|
| 1 | 93.49153 | 2.000 | 1.48749 | 70.24 | 0.53007 |
| 2 | 29.70852 | 17.353 | | | |
| 3 | −39.46261 | 1.860 | 1.58407 | 61.77 | 0.54180 |
| 4 | −216.50745 | 5.050 | 1.88300 | 39.22 | 0.57295 |
| 5 | −80.98035 | 0.213 | | | |
| 6 | 553.37274 | 4.264 | 1.95906 | 17.47 | 0.65993 |
| 7 | −153.81123 | 4.004 | | | |
| 8 | −60.21820 | 1.600 | 1.60298 | 37.70 | 0.58116 |
| 9 | 117.82410 | 0.843 | | | |
| 10 | 90.81795 | 16.920 | 1.59522 | 67.73 | 0.54426 |
| 11 | −34.79772 | 2.000 | 1.95375 | 32.32 | 0.59015 |
| 12 | −55.45369 | 0.100 | | | |
| 13 | 457.15507 | 3.500 | 1.99730 | 28.27 | 0.60393 |
| 14 (Hm) | −280.37877 | 0.100 | | | |
| 15 | 110.18055 | 8.064 | 1.59522 | 67.73 | 0.54426 |
| 16 | −127.59714 | 0.100 | | | |
| 17 | 56.22705 | 3.805 | 1.59282 | 68.62 | 0.54414 |
| 18 | 87.06432 | 1.603 | | | |
| 19 | 33.61740 | 8.937 | 1.81072 | 46.93 | 0.55416 |
| 20 | 164.66513 | 1.010 | 1.76014 | 26.99 | 0.60657 |
| 21 | 31.98498 | 2.761 | | | |
| 22 | 63.71560 | 1.300 | 1.80937 | 24.53 | 0.61430 |
| 23 | 22.73810 | 7.000 | | | |
| 24 (St) | ∞ | DD[24] | | | |
| 25 | 76.80522 | 2.500 | 1.93536 | 34.46 | 0.58319 |
| 26 | −566.47857 | 3.012 | | | |
| 27 | −24.43192 | 1.200 | 1.90721 | 19.64 | 0.63285 |
| 28 | −99.86181 | 5.486 | 1.61800 | 63.33 | 0.54414 |
| 29 | −28.95786 | 0.100 | | | |
| 30 | 45.14791 | 5.000 | 1.96145 | 31.85 | 0.59137 |

TABLE 17-continued

| Sn | R | D | Nd | νd | θgF |
|---|---|---|---|---|---|
| 31 | −61.04673 | 1.210 | 1.58377 | 39.62 | 0.57734 |
| 32 | 24.96457 | 3.000 | | | |
| 33 | 66.97436 | 4.220 | 1.98945 | 29.06 | 0.60104 |
| 34 | −114.91948 | DD[34] | | | |
| 35 | ∞ | 2.150 | 1.54763 | 54.98 | 0.55247 |
| 36 | ∞ | 1.310 | | | |
| 37 | ∞ | 0.700 | 1.49784 | 54.98 | 0.55000 |
| 38 | ∞ | 1.048 | | | |

TABLE 18

| f | 32.095 |
|---|---|
| FNo. | 1.03 |
| 2ωmax | 50.4 |

TABLE 19

| | Infinity | 0.3 m |
|---|---|---|
| DD[24] | 7.000 | 3.121 |
| DD[34] | 11.010 | 14.889 |

Example 6

FIG. 6 shows a cross-sectional configuration of the imaging lens of Example 6. The imaging lens of Example 6 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of thirteen lenses L1a to L1m in order from the object side. The second lens group G2 consists of six lenses L2a to L2f in order from the object side.

Figure 22:
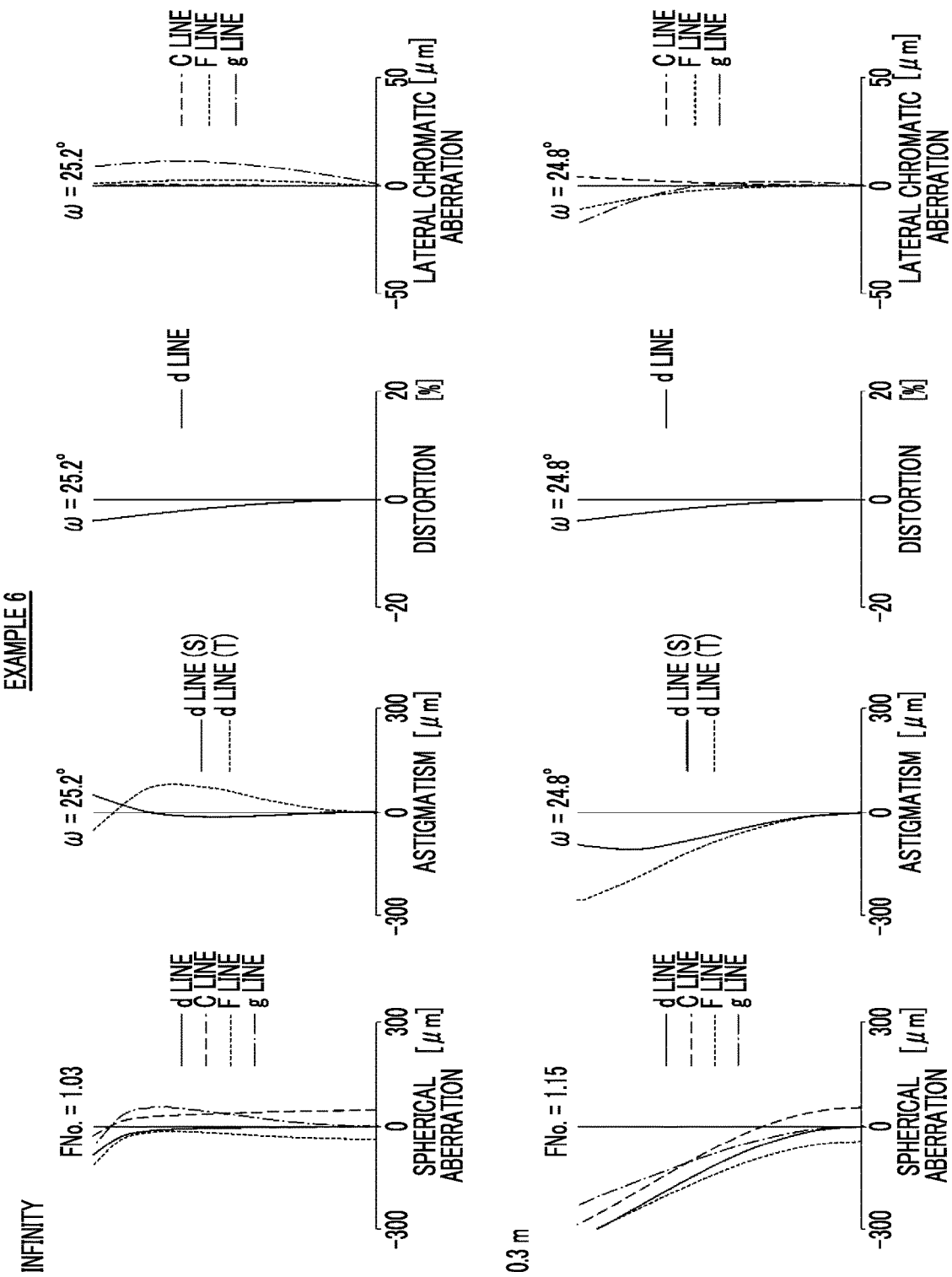
FIG. 22 shows spherical aberration diagrams, astigmatism diagrams, distortion diagrams, lateral chromatic aberration diagrams of the imaging lens of Example 6 of the present disclosure.
Figure 23:
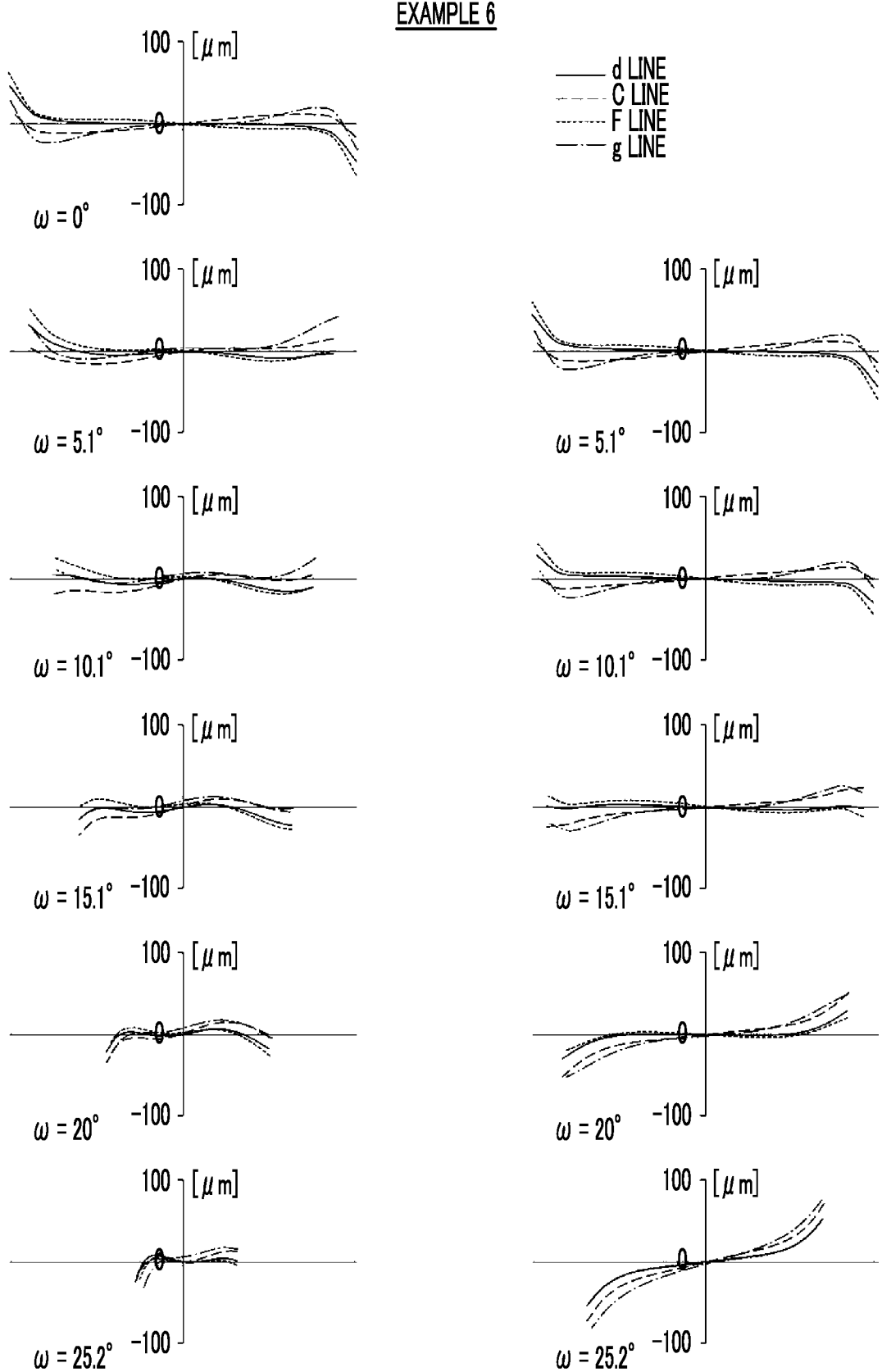
FIG. 23 is a lateral aberration diagram of the imaging lens according to Example 6 of the present disclosure.

Regarding the imaging lens of Example 6, Table 20 shows basic lens data, Table 21 shows specification, Table 22 shows variable surface distances, and FIGS. 22 and 23 show aberration diagrams. In FIG. 22, the upper part shows aberration diagrams in a state where the object at infinity is in focus, and the lower part shows aberration diagrams in a state where the object at the distance of 0.3 m (meter) from the object to the image plane Sim is in focus. FIG. 23 shows lateral aberration diagram in a state in which the object at infinity is in focus.

TABLE 20

| Sn | R | D | Nd | νd | θgF |
|---|---|---|---|---|---|
| 1 | 99.18024 | 2.000 | 1.49479 | 65.20 | 0.53573 |
| 2 | 29.47046 | 18.106 | | | |
| 3 | −36.84151 | 1.860 | 1.67719 | 31.63 | 0.59428 |
| 4 | −1489.58852 | 5.376 | 1.94487 | 17.76 | 0.64130 |
| 5 | −112.59590 | 0.543 | | | |
| 6 | 14168.97705 | 3.976 | 1.92303 | 18.85 | 0.63630 |
| 7 | −143.82995 | 1.610 | 1.62034 | 35.97 | 0.58467 |
| 8 | 119.16826 | 0.334 | | | |
| 9 | 90.16679 | 17.020 | 1.59334 | 61.41 | 0.54198 |
| 10 | −35.19591 | 2.000 | 1.95777 | 19.60 | 0.63545 |
| 11 | −55.64928 | 0.100 | | | |
| 12 | 442.67467 | 4.000 | 2.00000 | 15.00 | 0.65515 |
| 13 (Hm) | −281.77500 | 2.067 | | | |
| 14 | 107.53440 | 9.938 | 1.58991 | 61.54 | 0.54192 |
| 15 | −130.88888 | 0.100 | | | |
| 16 | 54.47414 | 3.454 | 1.61128 | 60.72 | 0.54217 |
| 17 | 84.19147 | 1.140 | | | |
| 18 | 32.10976 | 9.257 | 1.92245 | 35.76 | 0.57943 |
| 19 | 117.96927 | 1.000 | 1.99193 | 22.80 | 0.62482 |
| 20 | 30.99102 | 3.205 | | | |
| 21 | 70.43978 | 1.300 | 1.80198 | 24.90 | 0.61308 |
| 22 | 23.01450 | 7.000 | | | |
| 23 (St) | ∞ | DD[23] | | | |
| 24 | 81.66950 | 2.500 | 1.95028 | 32.97 | 0.58777 |
| 25 | −319.96827 | 2.713 | | | |
| 26 | −25.82889 | 1.200 | 1.97068 | 16.51 | 0.64741 |
| 27 | −90.31078 | 5.672 | 1.61800 | 63.33 | 0.54414 |
| 28 | −28.34558 | 0.100 | | | |
| 29 | 48.38611 | 5.000 | 1.96110 | 31.89 | 0.59126 |
| 30 | −74.68695 | 1.210 | 1.52755 | 49.83 | 0.55937 |
| 31 | 25.37518 | 3.000 | | | |
| 32 | 59.81778 | 4.066 | 1.93892 | 29.21 | 0.60123 |
| 33 | −169.40853 | DD[33] | | | |
| 34 | ∞ | 2.150 | 1.54763 | 54.98 | 0.55247 |
| 35 | ∞ | 1.310 | | | |
| 36 | ∞ | 0.700 | 1.49784 | 54.98 | 0.55000 |
| 37 | ∞ | 1.125 | | | |

TABLE 21

| f | 32.018 |
|---|---|
| FNo. | 1.03 |
| 2ωmax | 50.4 |

TABLE 22

| | Infinity | 0.3 m |
|---|---|---|
| DD[23] | 7.000 | 3.153 |
| DD[33] | 11.010 | 14.857 |

Example 7

FIG. 7 shows a cross-sectional configuration of the imaging lens of Example 7. The imaging lens of Example 7 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of twelve lenses L1a to L1l in order from the object side. The second lens group G2 consists of five lenses L2a to L2e in order from the object side.

Figure 24:
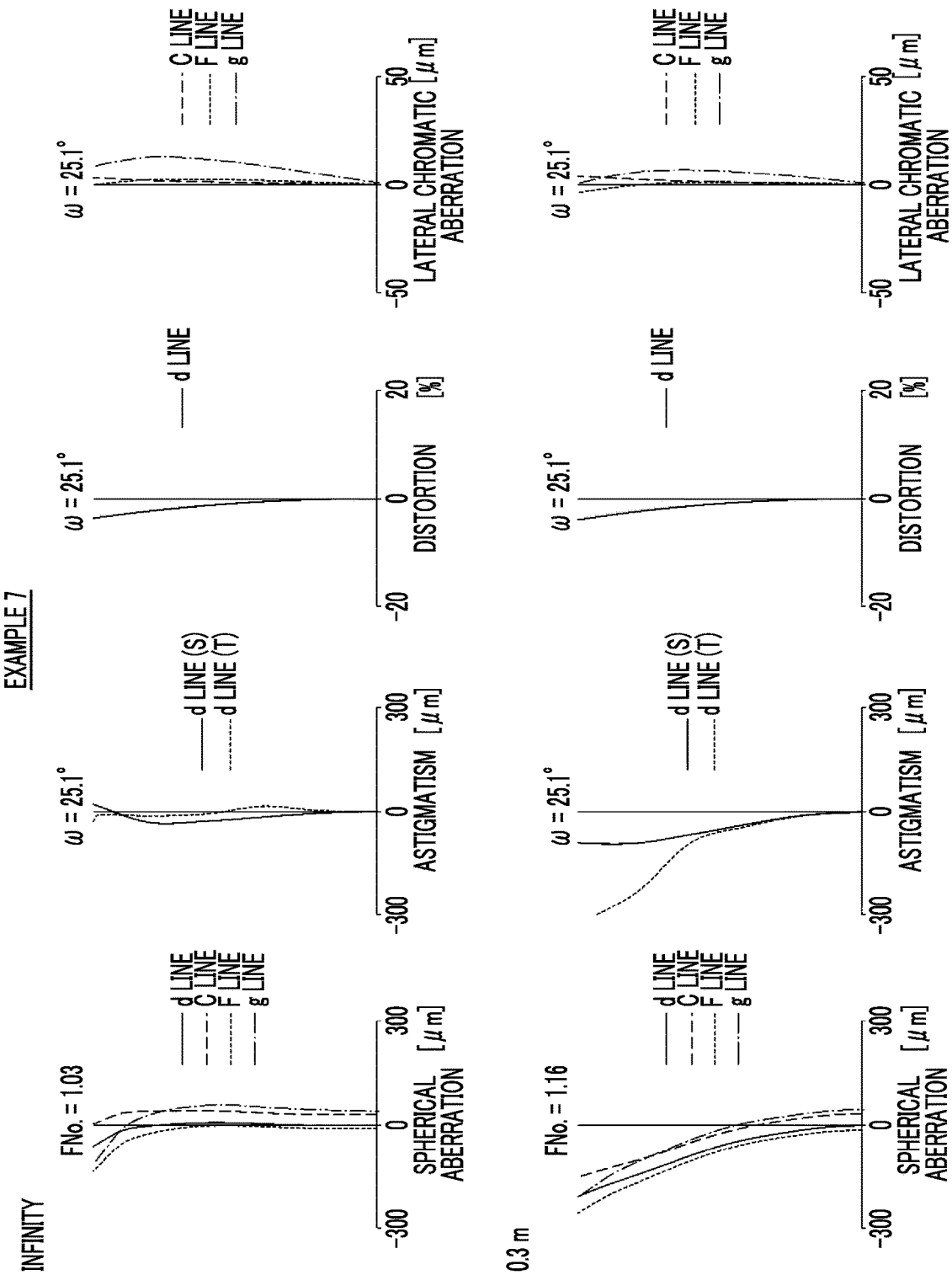
FIG. 24 shows spherical aberration diagrams, astigmatism diagrams, distortion diagrams, lateral chromatic aberration diagrams of the imaging lens of Example 7 of the present disclosure.
Figure 25:
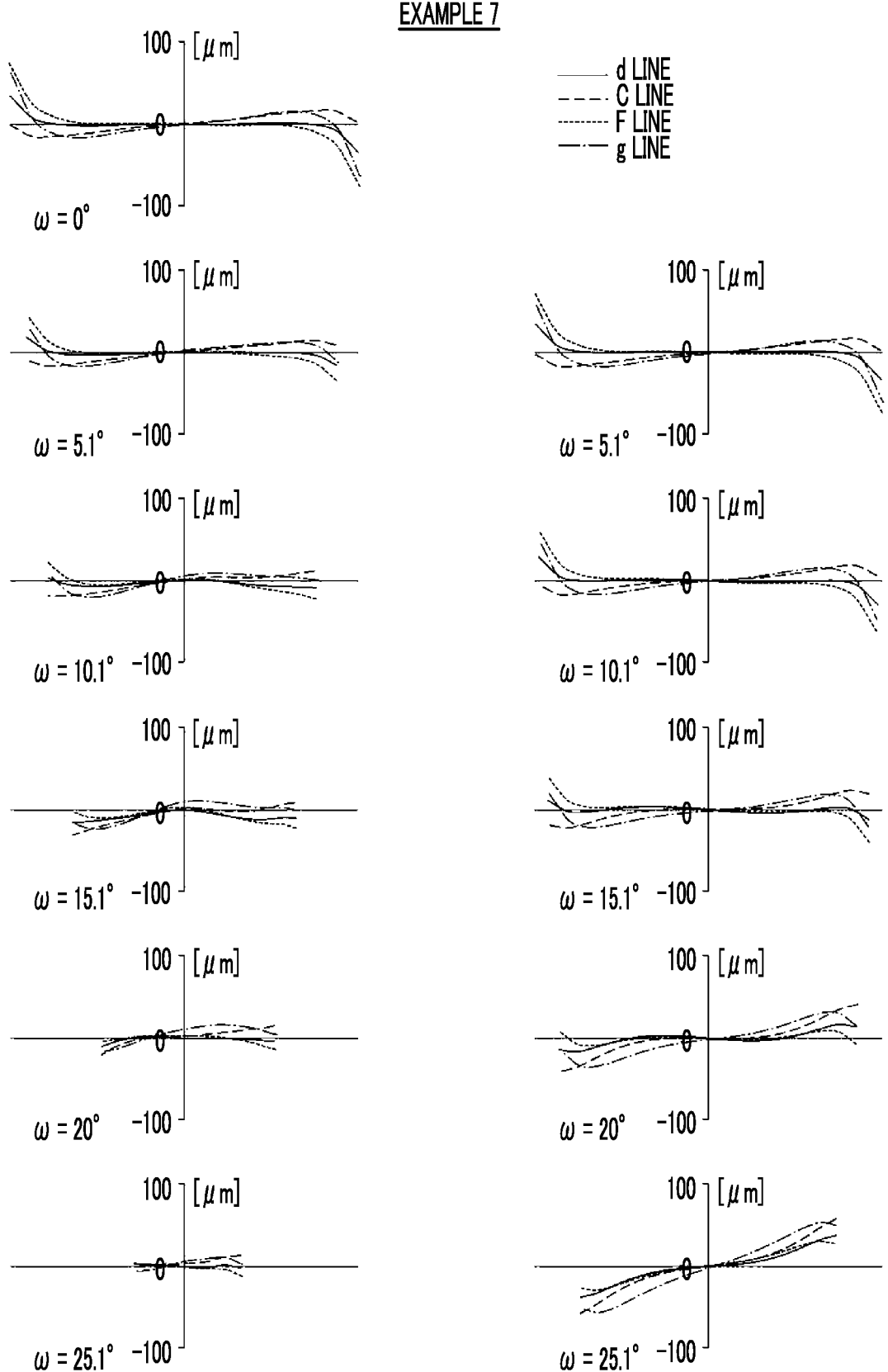
FIG. 25 is a lateral aberration diagram of the imaging lens according to Example 7 of the present disclosure.

Regarding the imaging lens of Example 7, Table 23 shows basic lens data, Table 24 shows specification, Table 25 shows variable surface distances, Table 26 shows aspheric surface coefficients, and FIGS. 24 and 25 show aberration diagrams. In FIG. 24, the upper part shows aberration diagrams in a state where the object at infinity is in focus, and the lower part shows aberration diagrams in a state where the object at the distance of 0.3 m (meter) from the object to the image plane Sim is in focus. FIG. 25 shows lateral aberration diagram in a state in which

TABLE 23

| Sn | R | D | Nd | vd | θgF |
|---|---|---|---|---|---|
| 1 | 125.70620 | 2.000 | 1.48100 | 58.56 | 0.54357 |
| 2 | 31.10811 | 16.659 | | | |
| 3 | −41.62266 | 1.850 | 1.48381 | 58.04 | 0.54458 |
| 4 | −180.22621 | 0.433 | | | |
| 5 | 577.01458 | 4.667 | 1.99827 | 17.50 | 0.64538 |
| 6 | −128.95645 | 2.980 | | | |
| 7 | −60.32679 | 1.600 | 1.59799 | 38.20 | 0.58016 |
| 8 | 120.77856 | 0.293 | | | |
| 9 | 96.79214 | 16.506 | 1.59282 | 68.62 | 0.54414 |
| 10 | −34.51760 | 2.000 | 1.96322 | 27.49 | 0.60711 |
| 11 | −55.32247 | 0.100 | | | |
| 12 | 548.34765 | 4.000 | 2.00069 | 25.46 | 0.61476 |
| 13 | −260.44696 | 0.100 | | | |
| 14 (Hm) | 114.07574 | 8.107 | 1.59310 | 61.42 | 0.54198 |
| 15 | −125.02189 | 0.100 | | | |
| 16 | 45.39753 | 5.907 | 1.61698 | 60.50 | 0.54219 |
| 17 | 97.76183 | 0.360 | | | |
| 18 | 35.30164 | 8.671 | 1.86596 | 41.40 | 0.56509 |
| 19 | 451.43640 | 1.010 | 1.75562 | 27.22 | 0.60590 |
| 20 | 36.94392 | 1.850 | | | |
| 21 | 61.14358 | 1.300 | 1.77421 | 26.29 | 0.60869 |
| 22 | 21.24536 | 9.368 | | | |
| 23 (St) | ∞ | DD[23] | | | |
| 24 | −22.22605 | 1.210 | 1.87078 | 21.46 | 0.62539 |
| 25 | −110.31722 | 3.500 | 1.94390 | 26.98 | 0.60899 |
| 26 | −31.87002 | 0.100 | | | |
| 27 | 35.62614 | 7.192 | 1.91949 | 36.05 | 0.57859 |
| 28 | −42.56130 | 1.210 | 1.69463 | 30.38 | 0.59726 |
| 29 | 31.56263 | 2.000 | | | |
| *30 | 60.21733 | 4.592 | 1.80610 | 40.73 | 0.56940 |
| *31 | −69.19818 | DD[31] | | | |
| 32 | ∞ | 2.150 | 1.54763 | 54.98 | 0.55247 |
| 33 | ∞ | 1.310 | | | |
| 34 | ∞ | 0.700 | 1.49784 | 54.98 | 0.55000 |
| 35 | ∞ | 1.114 | | | |

TABLE 24

| | |
|---|---|
| f | 32.015 |
| FNo. | 1.03 |
| 2ωmax | 50.2 |

TABLE 25

| | Infinity | 0.3 m |
|---|---|---|
| DD[23] | 10.658 | 6.515 |
| DD[31] | 11.010 | 15.153 |

TABLE 26

| Sn | 30 | 31 |
|---|---|---|
| KA | 1.0000000E+00 | 1.0000000E+00 |
| A4 | −3.8832363E−06 | 5.1039857E−06 |
| A6 | −1.3837629E−07 | −1.2077911E−07 |
| A8 | 4.5016314E−09 | 3.7710259E−09 |
| A10 | −8.2103198E−11 | −6.7507922E−11 |
| A12 | 8.5623613E−13 | 6.8923185E−13 |
| A14 | −5.2452031E−15 | −4.0215230E−15 |
| A16 | 1.8371138E−17 | 1.2813265E−17 |
| A18 | −3.2833677E−20 | −1.8796185E−20 |
| A20 | 2.1581715E−23 | 6.7070565E−24 |

Example 8

FIG. 8 shows a cross-sectional configuration of the imaging lens of Example 8. The imaging lens of Example 8 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of twelve lenses L1a to L1l in order from the object side. The second lens group G2 consists of five lenses L2a to L2e in order from the object side.

Figure 26:
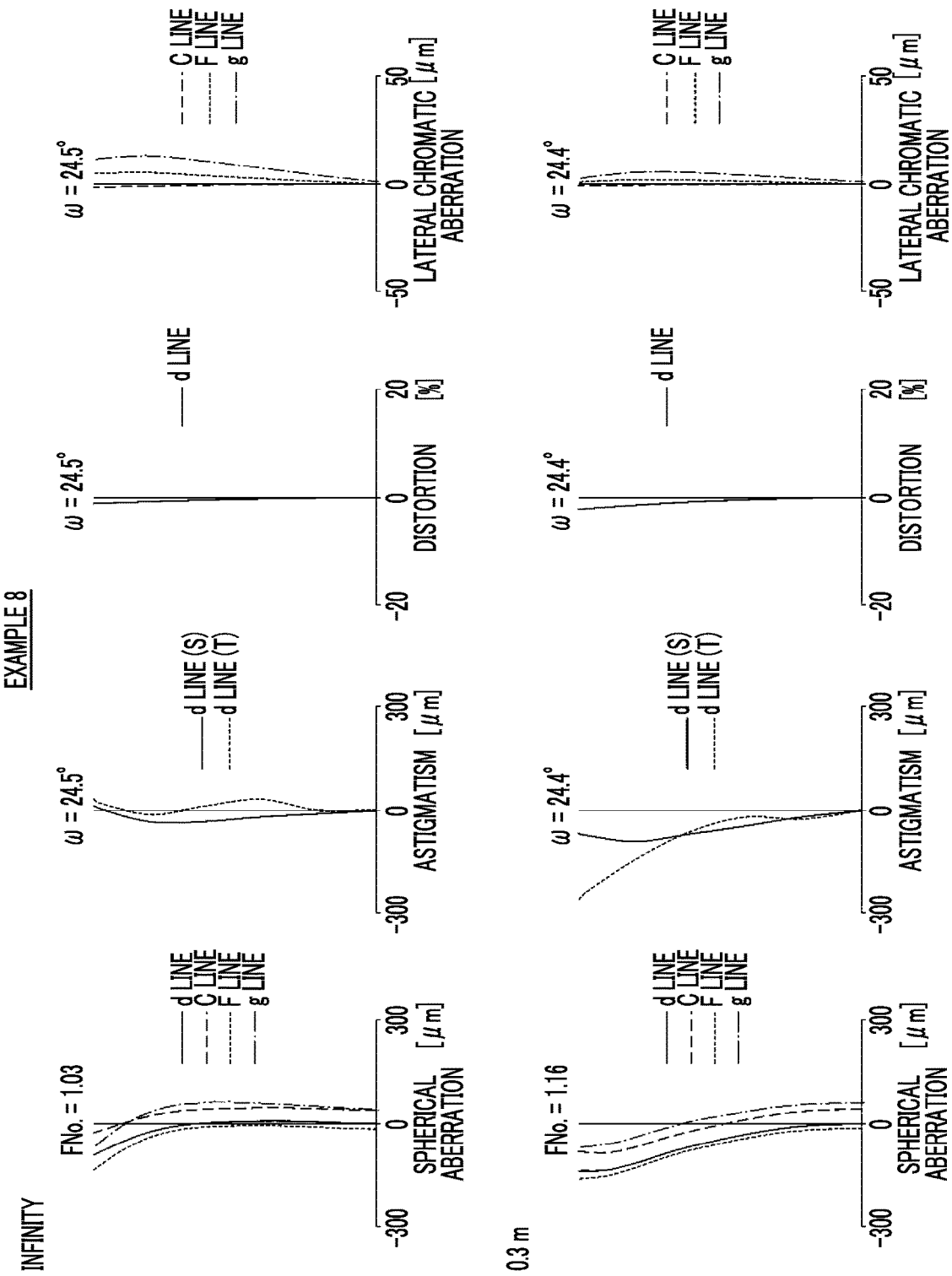
FIG. 26 shows spherical aberration diagrams, astigmatism diagrams, distortion diagrams, lateral chromatic aberration diagrams of the imaging lens of Example 8 of the present disclosure.
Figure 27:
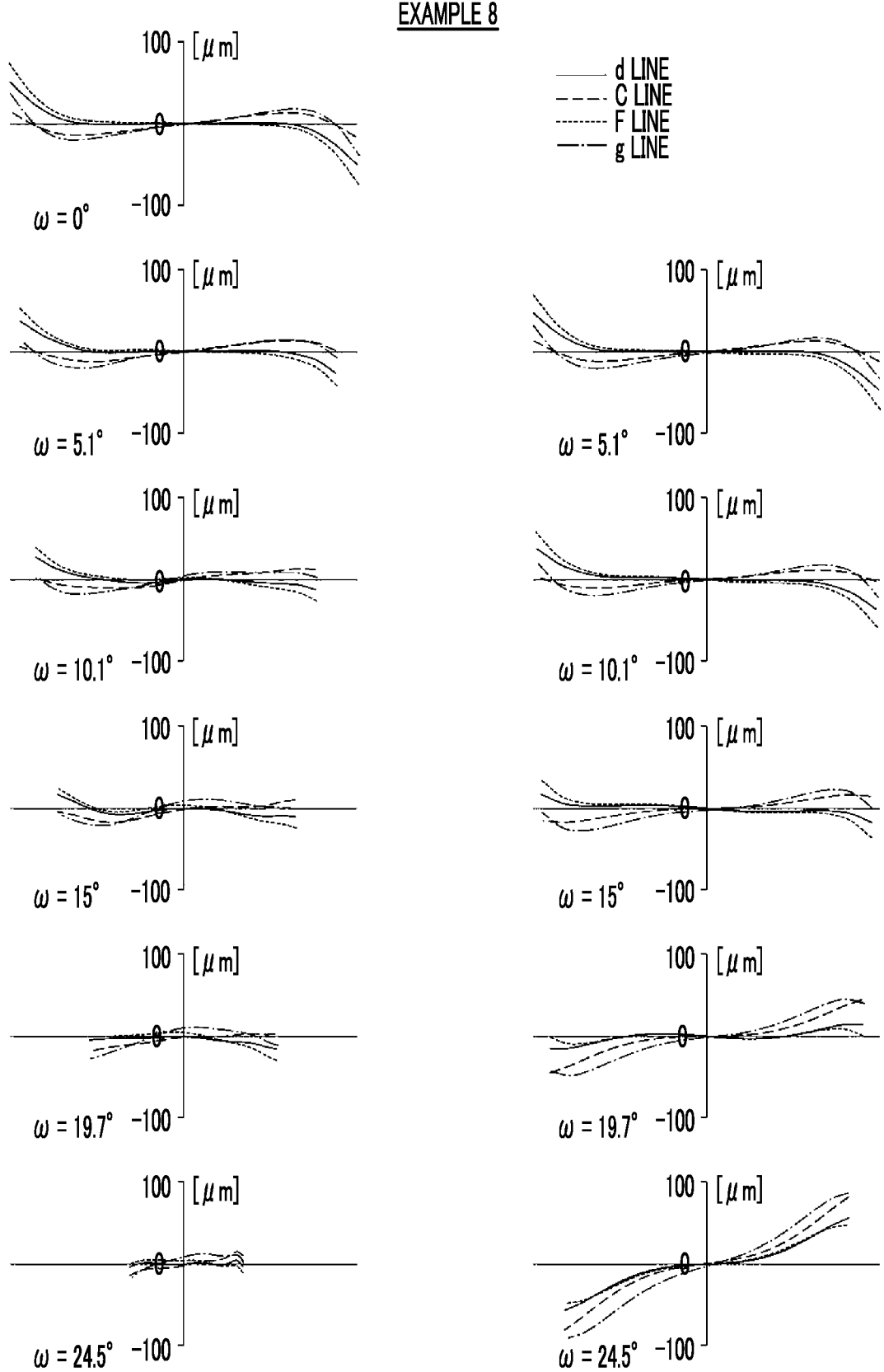
FIG. 27 is a lateral aberration diagram of the imaging lens according to Example 8 of the present disclosure.

Regarding the imaging lens of Example 8, Table 27 shows basic lens data, Table 28 shows specification, Table 29 shows variable surface distances, Table 30 shows aspheric surface coefficients, and FIGS. 26 and 27 show aberration diagrams. In FIG. 26, the upper part shows aberration diagrams in a state where the object at infinity is in focus, and the lower part shows aberration diagrams in a state where the object at the distance of 0.3 m (meter) from the object to the image plane Sim is in focus. FIG. 27 shows lateral aberration diagram in a state where

TABLE 27

| Sn | R | D | Nd | vd | θgF |
|---|---|---|---|---|---|
| 1 | 544.79643 | 4.000 | 1.77848 | 50.15 | 0.54902 |
| 2 | −329.40666 | 0.000 | | | |
| 3 | 171.17685 | 2.000 | 1.52470 | 64.05 | 0.53882 |
| 4 | 31.15456 | 16.344 | | | |
| 5 | −43.20911 | 1.850 | 1.49206 | 56.49 | 0.54748 |
| 6 | −153.78121 | 0.893 | | | |
| 7 | 4223.27884 | 4.163 | 2.00001 | 19.81 | 0.63657 |
| 8 | −124.99860 | 2.748 | | | |
| 9 | −62.76448 | 1.600 | 1.59266 | 38.73 | 0.57910 |
| 10 | 122.79445 | 0.555 | | | |
| 11 | 95.27148 | 17.893 | 1.59270 | 61.44 | 0.54197 |
| 12 | −34.61040 | 2.000 | 1.95606 | 32.39 | 0.58962 |
| 13 | −55.01221 | 0.200 | | | |
| 14 (Hm) | 101.95591 | 8.459 | 1.62174 | 60.32 | 0.54220 |
| 15 | −122.34642 | 0.100 | | | |
| 16 | 45.86119 | 5.630 | 1.71107 | 55.95 | 0.54269 |
| 17 | 110.69731 | 0.274 | | | |
| 18 | 34.28901 | 9.205 | 1.88038 | 39.45 | 0.57004 |
| 19 | −1227.95231 | 1.010 | 1.73753 | 34.32 | 0.58915 |
| 20 | 37.98136 | 1.673 | | | |
| 21 | 60.22716 | 1.300 | 1.75889 | 27.06 | 0.60638 |
| 22 | 20.35734 | 9.209 | | | |
| 23 (St) | ∞ | DD[23] | | | |
| 24 | −22.51494 | 1.210 | 1.86188 | 21.91 | 0.62368 |
| 25 | −559.19731 | 3.500 | 1.97130 | 30.87 | 0.59467 |
| 26 | −32.32704 | 0.100 | | | |
| 27 | 35.25550 | 6.765 | 1.93472 | 34.53 | 0.58300 |
| 28 | −54.20070 | 1.210 | 1.71521 | 29.24 | 0.60023 |
| 29 | 34.29600 | 2.000 | | | |
| *30 | 66.06044 | 4.316 | 1.80610 | 40.73 | 0.56940 |
| *31 | −75.57744 | DD[31] | | | |
| 32 | ∞ | 2.150 | 1.54763 | 54.98 | 0.55247 |
| 33 | ∞ | 1.310 | | | |
| 34 | ∞ | 0.700 | 1.49784 | 54.98 | 0.55000 |
| 35 | ∞ | 1.120 | | | |

TABLE 28

| | |
|---|---|
| f | 32.016 |
| FNo. | 1.03 |
| 2ωmax | 49.0 |

TABLE 29

|  | Infinity | 0.3 m |
|---|---|---|
| DD[23] | 10.535 | 6.464 |
| DD[31] | 11.010 | 15.081 |

TABLE 30

| Sn | 30 | 31 |
|---|---|---|
| KA | 1.0000000E+00 | 1.0000000E+00 |
| A4 | −1.6059090E−05 | −9.2742747E−06 |
| A6 | 3.6764526E−07 | 5.3900196E−07 |
| A8 | −1.0351646E−08 | −1.5930881E−08 |
| A10 | 1.7978702E−10 | 2.8481090E−10 |
| A12 | −1.9824971E−12 | −3.1889224E−12 |
| A14 | 1.3831448E−14 | 2.2459545E−14 |
| A16 | −5.9045734E−17 | −9.6446385E−17 |
| A18 | 1.4088259E−19 | 2.3063523E−19 |
| A20 | −1.4383063E−22 | −2.3514647E−22 |

Example 9

FIG. 9 shows a cross-sectional configuration of the imaging lens of Example 9. The imaging lens of Example 9 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of twelve lenses L1a to L1l in order from the object side. The second lens group G2 consists of four lenses L2a to L2d in order from the object side.

Figure 28:
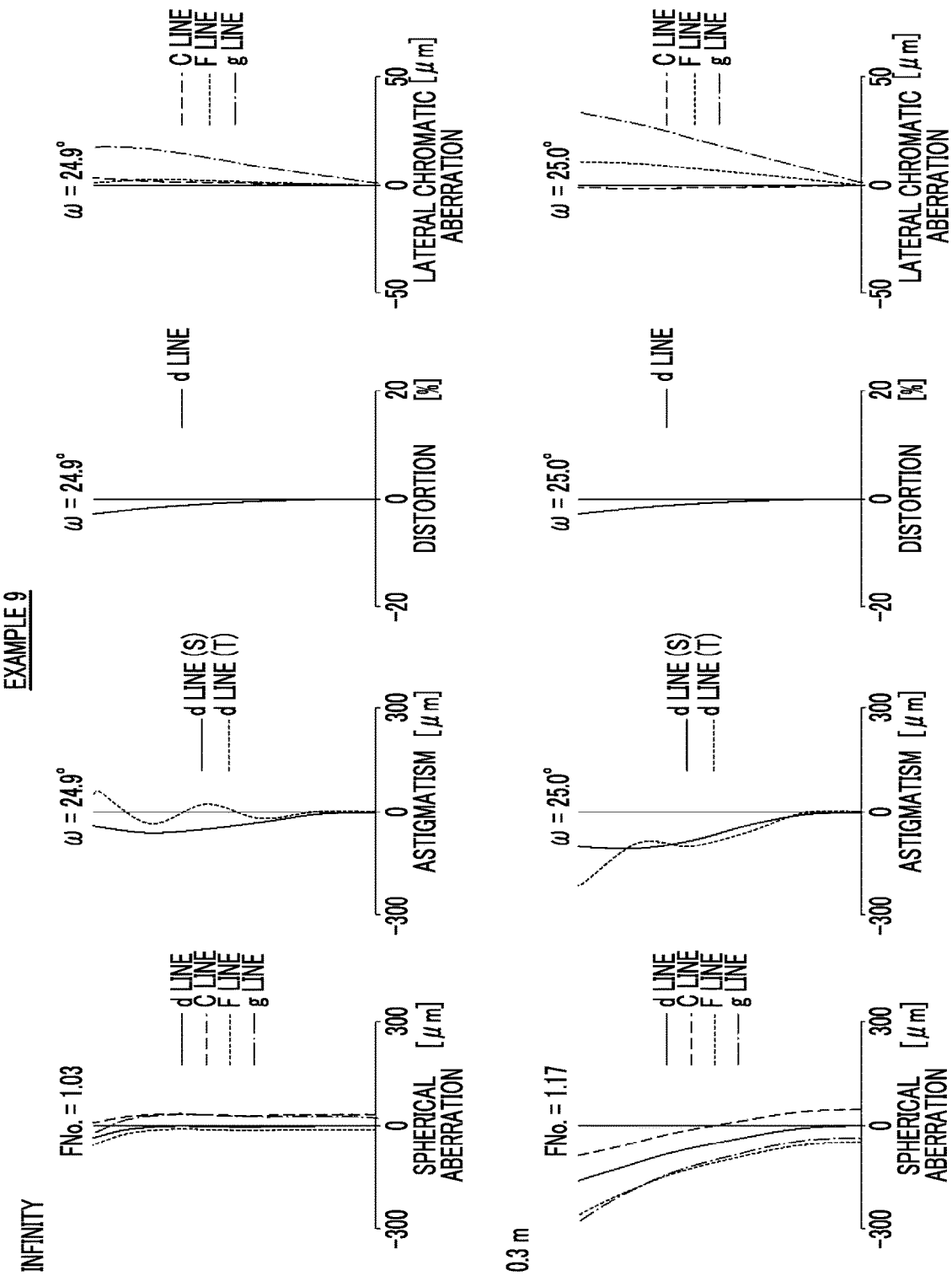
FIG. 28 shows spherical aberration diagrams, astigmatism diagrams, distortion diagrams, lateral chromatic aberration diagrams of the imaging lens of Example 9 of the present disclosure.
Figure 29:
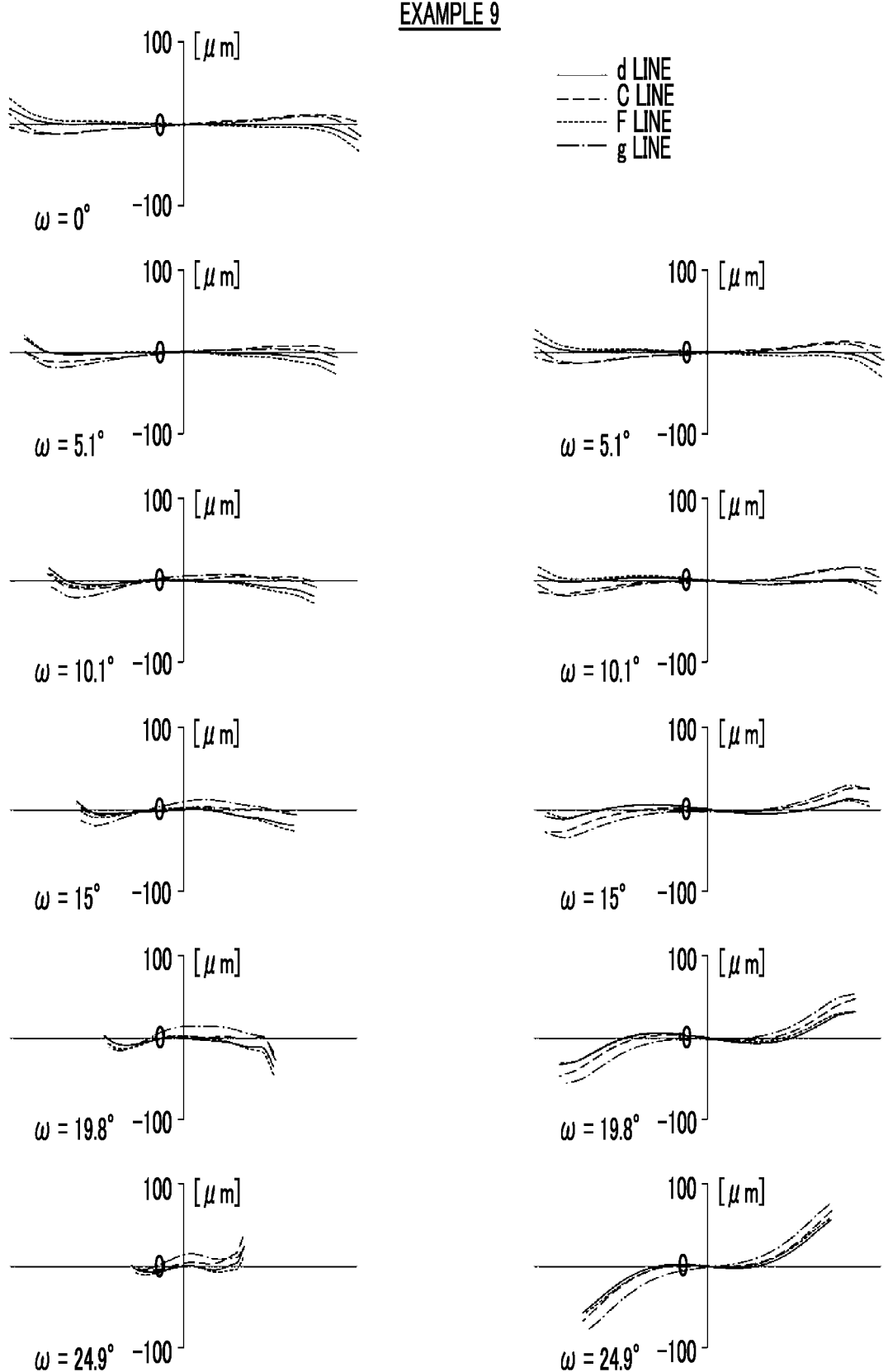
FIG. 29 is a lateral aberration diagram of the imaging lens according to Example 9 of the present disclosure.

Regarding the imaging lens of Example 9, Table 31 shows basic lens data, Table 32 shows specification, Table 33 shows variable surface distances, Table 34 shows aspheric surface coefficients, and FIGS. 28 and 29 show aberration diagrams. In FIG. 28, the upper part shows aberration diagrams in a state where the object at infinity is in focus, and the lower part shows aberration diagrams in a state where the object at the distance of 0.3 m (meter) from the object to the image plane Sim is in focus. FIG. 29 shows lateral aberration diagram in a state in which

TABLE 31

| Sn | R | D | Nd | vd | θgF |
|---|---|---|---|---|---|
| 1 | −158.58566 | 2.000 | 1.56926 | 62.34 | 0.54137 |
| 2 | 45.50663 | 11.311 |  |  |  |
| 3 | −58.28419 | 1.860 | 1.82401 | 23.80 | 0.61679 |
| 4 | 41.90339 | 13.828 | 1.88018 | 21.34 | 0.62618 |
| 5 | −101.81510 | 0.100 |  |  |  |
| 6 | 98.28394 | 8.000 | 1.99999 | 15.00 | 0.65515 |
| 7 | −127.35841 | 0.100 |  |  |  |
| 8 | −132.35649 | 1.600 | 1.85117 | 22.44 | 0.62166 |
| 9 | 84.30253 | 1.535 |  |  |  |
| 10 | 137.70215 | 12.985 | 1.66628 | 58.19 | 0.54256 |
| 11 | −39.49589 | 2.000 | 1.86788 | 21.61 | 0.62483 |
| 12 | −124.45426 | 0.100 |  |  |  |
| 13 (Hm) | 73.44245 | 7.449 | 1.82042 | 45.96 | 0.55588 |
| 14 | −358.81915 | 0.000 |  |  |  |
| 15 | 52.60700 | 4.584 | 1.71060 | 55.97 | 0.54269 |
| 16 | 93.76319 | 0.250 |  |  |  |
| 17 | 35.01559 | 11.718 | 1.81600 | 46.62 | 0.55682 |
| 18 | −112.02490 | 1.000 | 1.83429 | 23.29 | 0.61859 |

TABLE 31-continued

| Sn | R | D | Nd | vd | θgF |
|---|---|---|---|---|---|
| 19 | 45.38534 | 0.919 |  |  |  |
| 20 | 60.40304 | 1.300 | 1.80688 | 24.66 | 0.61389 |
| 21 | 21.37711 | 7.000 |  |  |  |
| 22 (St) | ∞ | DD[22] |  |  |  |
| 23 | −24.07079 | 1.400 | 1.48001 | 58.75 | 0.54321 |
| 24 | 352.80309 | 0.100 |  |  |  |
| 25 | 39.97798 | 8.898 | 1.94001 | 31.43 | 0.59353 |
| 26 | −30.93442 | 1.210 | 1.76519 | 26.74 | 0.60732 |
| 27 | 59.03069 | 1.000 |  |  |  |
| *28 | 53.18296 | 5.500 | 1.80610 | 40.73 | 0.56940 |
| *29 | −44.23856 | DD[29] |  |  |  |
| 30 | ∞ | 2.150 | 1.54763 | 54.98 | 0.55247 |
| 31 | ∞ | 1.310 |  |  |  |
| 32 | ∞ | 0.700 | 1.49784 | 54.98 | 0.55000 |
| 33 | ∞ | 1.122 |  |  |  |

TABLE 32

| f | 32.017 |
|---|---|
| FNo. | 1.03 |
| 2ωmax | 49.8 |

TABLE 33

|  | Infinity | 0.3 m |
|---|---|---|
| DD[22] | 10.229 | 5.964 |
| DD[29] | 11.719 | 15.984 |

TABLE 34

| Sn | 28 | 29 |
|---|---|---|
| KA | 1.0000000E+00 | 1.0000000E+00 |
| A4 | −1.0078045E−05 | 8.8298530E−06 |
| A6 | −3.5300117E−08 | −1.8081425E−07 |
| A8 | −8.3277198E−10 | 5.3397794E−09 |
| A10 | 4.3699816E−11 | −9.6079166E−11 |
| A12 | −7.6172757E−13 | 1.0902419E−12 |
| A14 | 6.9072493E−15 | −7.9169687E−15 |
| A16 | −3.4626193E−17 | 3.6005727E−17 |
| A18 | 9.0691746E−20 | −9.3635343E−20 |
| A20 | −9.6047967E−23 | 1.0660537E−22 |

Example 10

Figure 10:
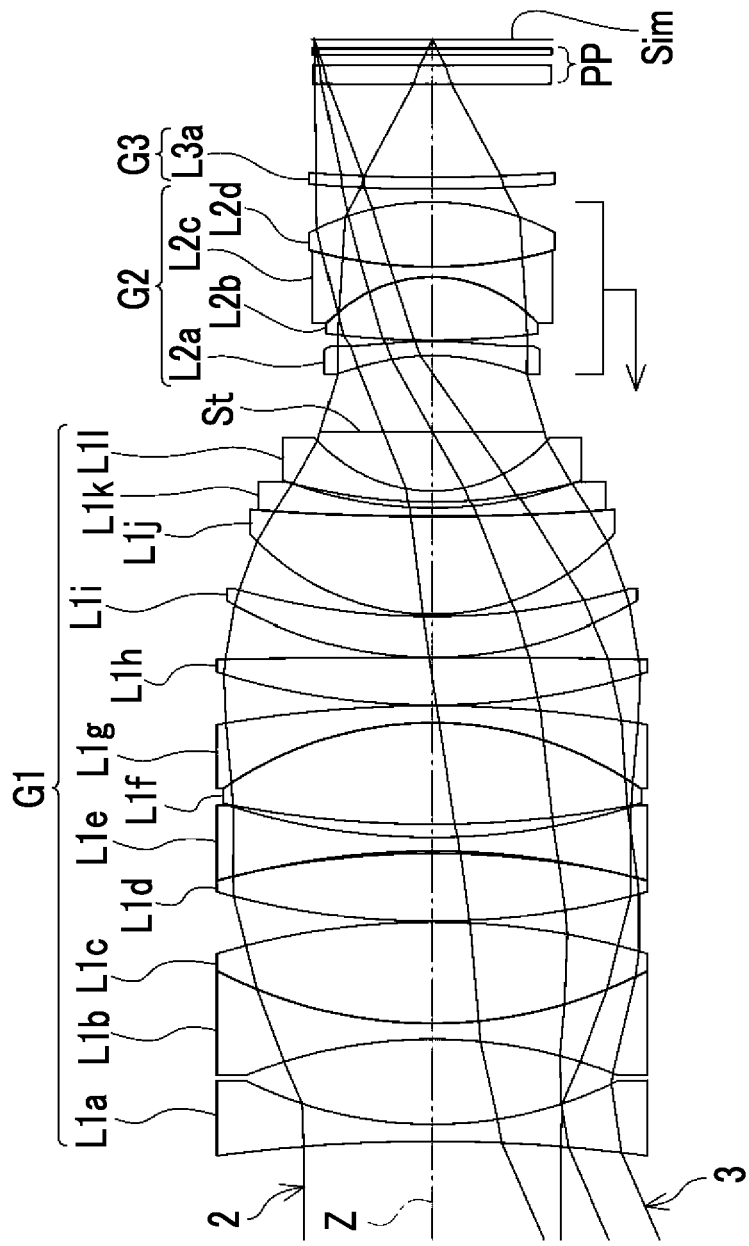
FIG. 10 is a cross-sectional view showing a configuration and rays of a tenth configuration example of an imaging lens according to an embodiment of the present disclosure corresponding to the imaging lens of Example 10 of the present disclosure.

FIG. 10 shows a cross-sectional configuration of the imaging lens of Example 10. The imaging lens of Example 10 consists of, in order from the object side, a first lens group G1 that has a positive refractive power, an aperture stop St, a second lens group G2 that has a positive refractive power, and a third lens group G3 that has a positive refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of twelve lenses L1a to L1l in order from the object side. The second lens group G2 consists of four lenses L2a to L2d in order from the object side. The third lens group G3 consists of one lens L3a.

Figure 30:
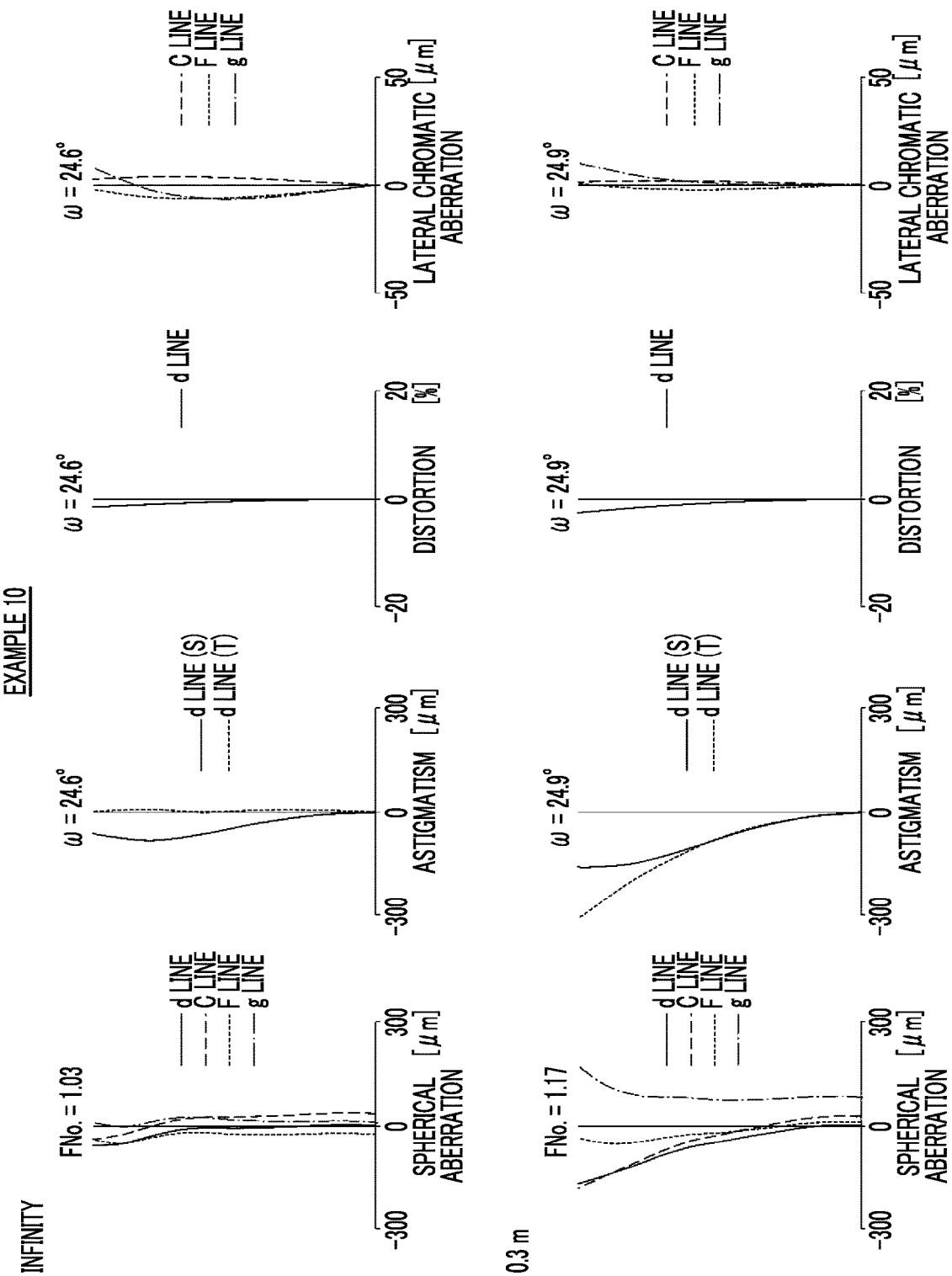
FIG. 30 shows spherical aberration diagrams, astigmatism diagrams, distortion diagrams, lateral chromatic aberration diagrams of the imaging lens of Example 10 of the present disclosure.
Figure 31:
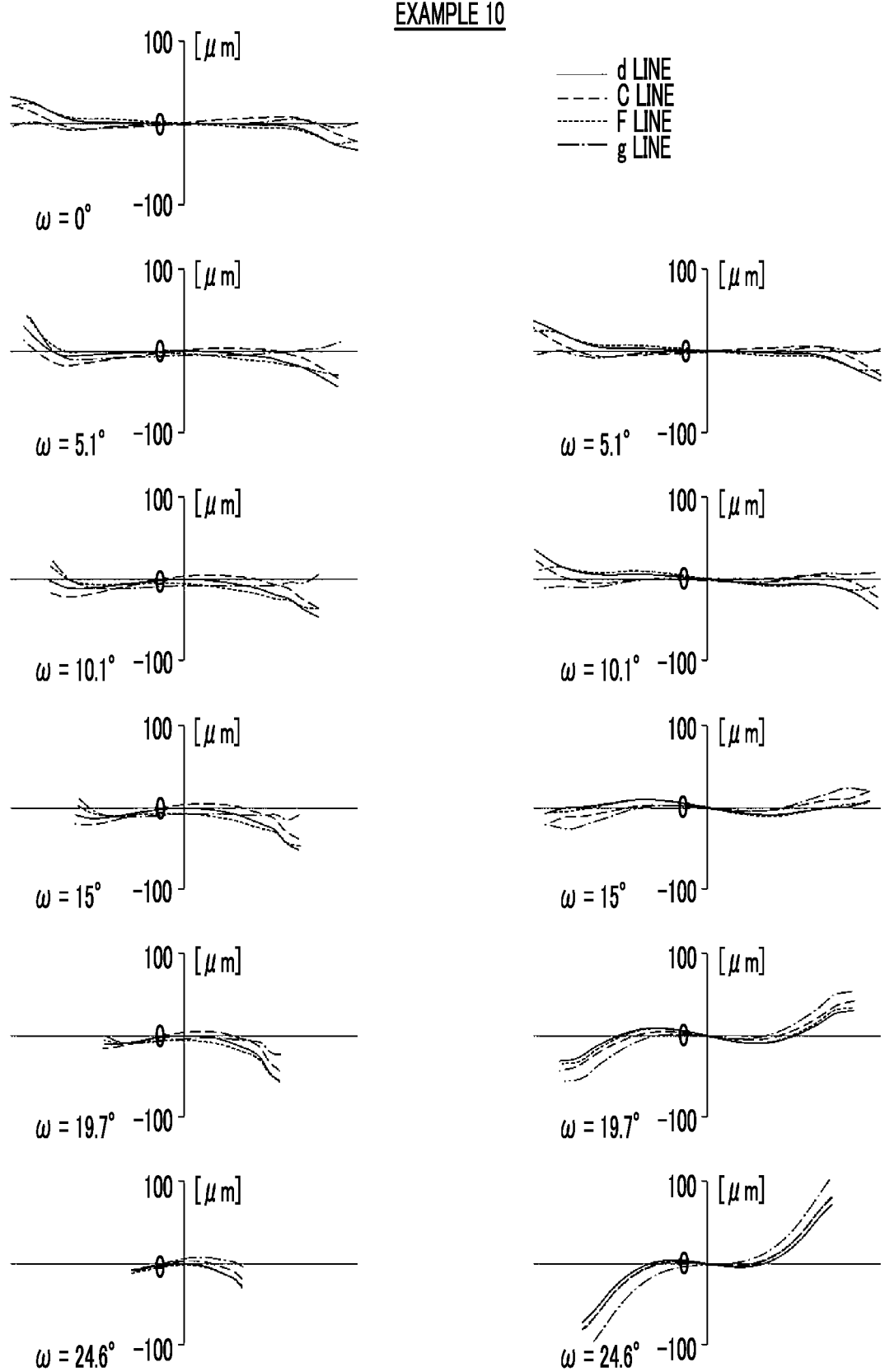
FIG. 31 is a lateral aberration diagram of the imaging lens according to Example 10 of the present disclosure.

Regarding the imaging lens of Example 10, Table 35 shows basic lens data, Table 36 shows specification, Table 37 shows variable surface distances, Table 38 shows aspheric surface coefficients, and FIGS. 30 and 31 show aberration diagrams. In FIG. 30, the upper part shows aberration diagrams in a state where the object at infinity is in focus, and the lower part shows aberration diagrams in a state where the object at the distance of 0.3 m (meter) from the object to the image plane Sim is in focus. FIG. 31 shows lateral aberration diagram in a state in which

TABLE 35

| Sn | R | D | Nd | vd | θgF |
|---|---|---|---|---|---|
| 1 | −198.05570 | 2.000 | 1.95906 | 17.47 | 0.65993 |
| 2 | 51.79154 | 10.000 | | | |
| 3 | −61.60893 | 1.860 | 1.73800 | 32.33 | 0.59005 |
| 4 | 57.81860 | 11.903 | 2.00069 | 25.46 | 0.61364 |
| 5 | −92.70808 | 0.100 | | | |
| 6 | 98.13867 | 8.000 | 1.95906 | 17.47 | 0.65993 |
| 7 | −109.33134 | 0.279 | | | |
| 8 | −97.29052 | 1.600 | 1.80518 | 25.42 | 0.61616 |
| 9 | 82.01343 | 1.553 | | | |
| 10 | 132.36119 | 11.911 | 1.65160 | 58.55 | 0.54267 |
| 11 | −45.07990 | 2.000 | 1.69895 | 30.13 | 0.60298 |
| 12 | −153.21980 | 0.100 | | | |
| 13 (Hm) | 89.53845 | 5.578 | 1.69680 | 55.53 | 0.54341 |
| 14 | −1425.83483 | 0.010 | | | |
| 15 | 50.07892 | 4.697 | 1.77250 | 49.60 | 0.55212 |
| 16 | 89.01209 | 0.250 | | | |
| 17 | 30.30790 | 11.500 | 1.81600 | 46.62 | 0.55682 |
| 18 | 299.78356 | 1.010 | 1.69895 | 30.13 | 0.60298 |
| 19 | 51.07743 | 0.693 | | | |
| 20 | 65.03714 | 1.300 | 1.80000 | 29.84 | 0.60178 |
| 21 | 19.10902 | 7.000 | | | |
| 22 (St) | ∞ | DD[22] | | | |
| *23 | −24.84133 | 1.700 | 1.80610 | 40.73 | 0.56940 |
| *24 | −43.76209 | 0.100 | | | |
| 25 | 107.95598 | 7.400 | 1.81600 | 46.62 | 0.55682 |
| 26 | −17.70538 | 1.220 | 1.78472 | 25.68 | 0.61621 |
| 27 | 56.53761 | 7.600 | 1.88300 | 39.22 | 0.57295 |
| 28 | −32.29418 | DD[28] | | | |
| 29 | 180.00000 | 1.400 | 1.91650 | 31.60 | 0.59117 |
| 30 | 200.00000 | 11.000 | | | |
| 31 | ∞ | 2.150 | 1.54763 | 54.98 | 0.55247 |
| 32 | ∞ | 1.310 | | | |
| 33 | ∞ | 0.700 | 1.49784 | 54.98 | 0.55000 |
| 34 | ∞ | 1.122 | | | |

TABLE 36

| f | 32.032 |
|---|---|
| FNo. | 1.03 |
| 2ωmax | 49.2 |

TABLE 37

| | Infinity | 0.3 m |
|---|---|---|
| DD[22] | 8.946 | 4.292 |
| DD[28] | 1.500 | 6.154 |

TABLE 38

| Sn | 23 | 24 |
|---|---|---|
| KA | 1.0000000E+00 | 1.0000000E+00 |
| A3 | 0.0000000E+00 | 0.0000000E+00 |
| A4 | 4.5607461E−05 | 5.8759869E−05 |
| A5 | 1.1181524E−05 | 9.3708540E−06 |
| A6 | −3.0792745E−06 | −2.7067386E−06 |
| A7 | 2.3124432E−07 | 1.4621555E−07 |
| A8 | 2.1283560E−08 | 6.4583352E−08 |

TABLE 38-continued

| Sn | 23 | 24 |
|---|---|---|
| A9 | −3.2283627E−09 | −1.0878003E−08 |
| A10 | −4.6935616E−11 | −6.8688388E−10 |
| A11 | −2.5204722E−11 | 2.7068788E−10 |
| A12 | 5.4993438E−12 | −3.5368630E−12 |
| A13 | 5.8716329E−13 | −3.5392498E−12 |
| A14 | −1.1569406E−13 | 1.6804859E−13 |
| A15 | −1.3487895E−15 | 2.5765486E−14 |
| A16 | 8.4031933E−16 | −1.7423017E−15 |
| A17 | −1.9473700E−17 | −9.8736729E−17 |
| A18 | −2.0411231E−18 | 8.0263862E−18 |
| A19 | 8.7644939E−20 | 1.5551676E−19 |
| A20 | −3.3578339E−22 | −1.4244400E−20 |

Example 11

FIG. 11 shows a cross-sectional configuration of the imaging lens of Example 11. The imaging lens of Example 11 consists of, in order from the object side, a first lens group G1 having a positive refractive power, an aperture stop St, a second lens group G2 having a positive refractive power, and a third lens group G3 having a negative refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of thirteen lenses L1a to L1m in order from the object side. The second lens group G2 consists of four lenses L2a to L2d in order from the object side. The third lens group G3 consists of one lens L3a.

Figure 32:
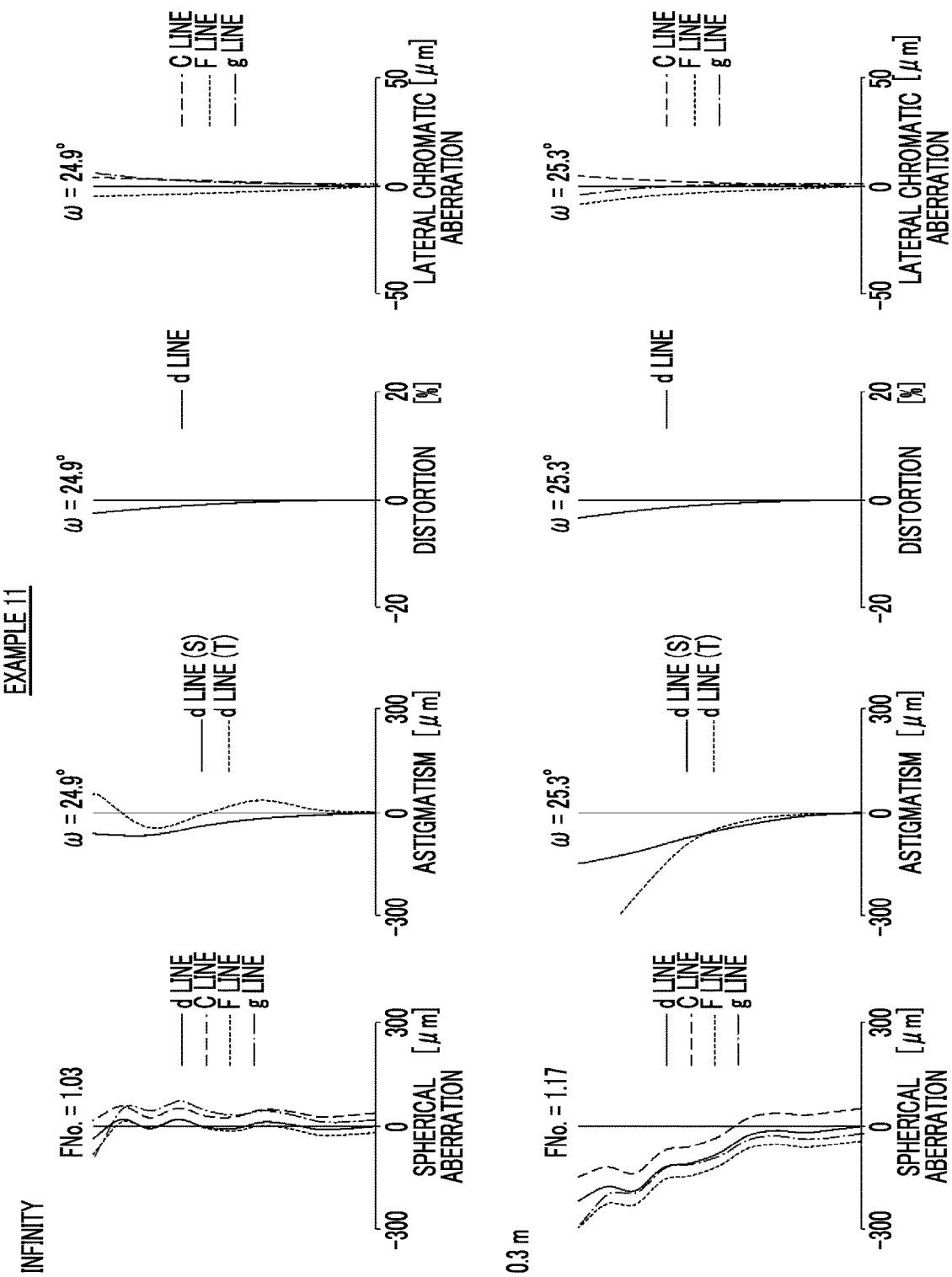
FIG. 32 shows spherical aberration diagrams, astigmatism diagrams, distortion diagrams, lateral chromatic aberration diagrams of the imaging lens of Example 11 of the present disclosure.
Figure 33:
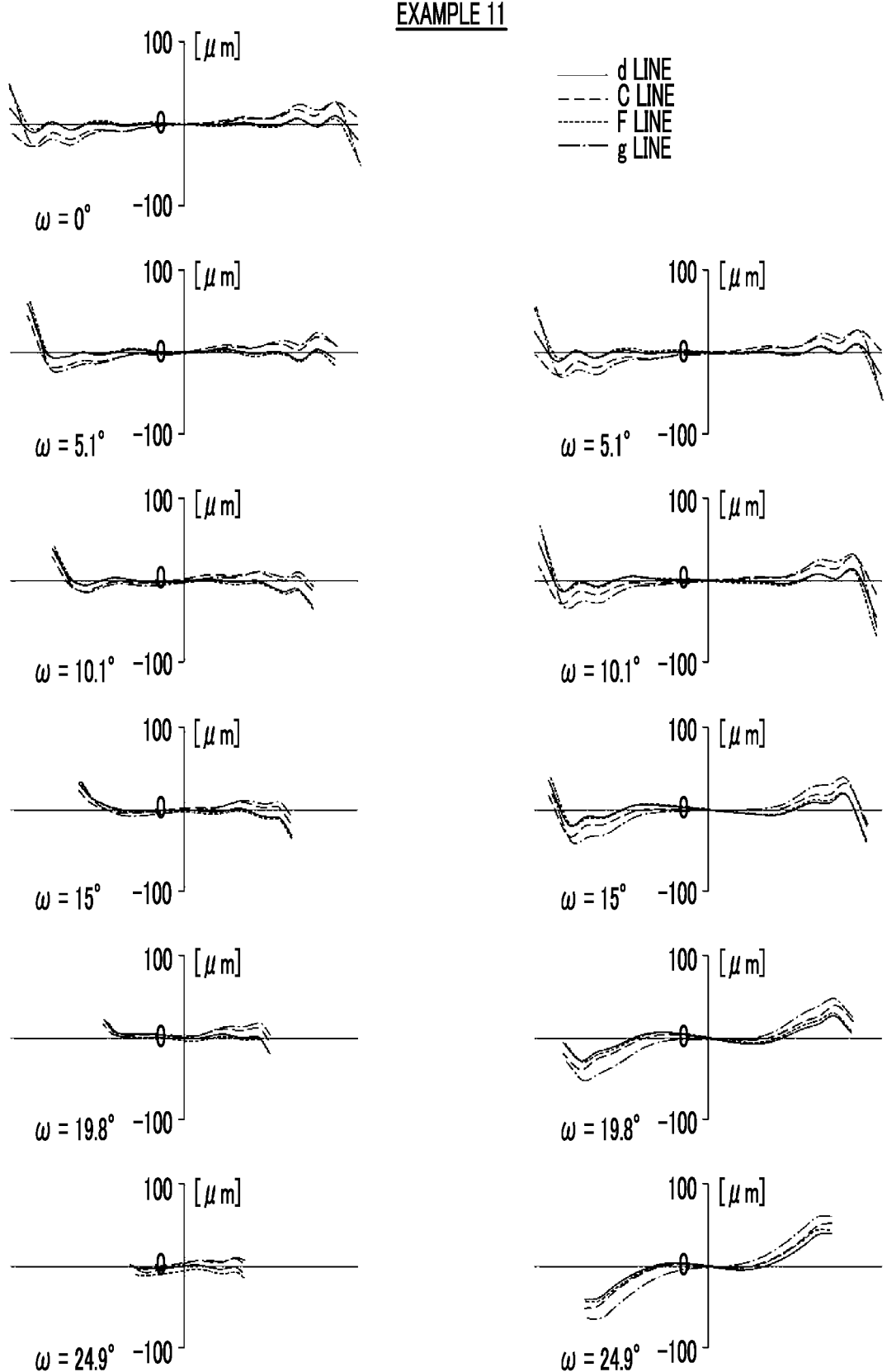
FIG. 33 is a lateral aberration diagram of the imaging lens according to Example 11 of the present disclosure.

Regarding the imaging lens of Example 11, Table 39 shows basic lens data, Table 40 shows specification, Table 41 shows variable surface distances, Table 42 shows aspheric surface coefficients, and FIGS. 32 and 33 show aberration diagrams. In FIG. 32, the upper part shows aberration diagrams in a state where the object at infinity is in focus, and the lower part shows aberration diagrams in a state where the object at the distance of 0.3 m (meter) from the object to the image plane Sim is in focus. FIG. 33 shows lateral aberration diagram in a state where the object at infinity is in focus.

TABLE 39

| Sn | R | D | Nd | vd | θgF |
|---|---|---|---|---|---|
| 1 | −151.19402 | 2.000 | 1.58913 | 61.13 | 0.54067 |
| 2 | 37.53623 | 11.449 | | | |
| 3 | −75.73247 | 1.860 | 1.85896 | 22.73 | 0.62844 |
| 4 | 134.29951 | 8.009 | 1.88300 | 39.22 | 0.57295 |
| 5 | −108.41655 | 0.213 | | | |
| 6 | 77.28350 | 6.218 | 1.98613 | 16.48 | 0.66558 |
| 7 | −6547.91108 | 2.000 | | | |
| 8 | −206.55417 | 5.458 | 1.88300 | 39.22 | 0.57295 |
| 9 | −63.36178 | 1.610 | 1.60342 | 38.03 | 0.58356 |
| 10 | 108.74912 | 1.646 | | | |
| 11 | 241.12138 | 13.580 | 1.62041 | 60.29 | 0.54266 |
| 12 | −34.85264 | 2.010 | 1.59270 | 35.31 | 0.59336 |
| 13 | −146.01224 | 0.100 | | | |
| 14 (Hm) | 223.84497 | 3.027 | 1.62041 | 60.29 | 0.54266 |
| 15 | −4817.49702 | 0.100 | | | |
| 16 | 89.62817 | 3.361 | 1.62041 | 60.29 | 0.54266 |
| 17 | 184.74945 | 0.100 | | | |
| 18 | 72.49645 | 3.355 | 1.63854 | 55.38 | 0.54858 |
| 19 | 126.49572 | 0.000 | | | |
| 20 | 34.03799 | 15.012 | 1.75500 | 52.32 | 0.54737 |
| 21 | −55.54254 | 2.800 | 1.75520 | 27.51 | 0.61033 |

TABLE 39-continued

| Sn | R | D | Nd | vd | θgF |
|---|---|---|---|---|---|
| 22 | 24.62367 | 7.066 | | | |
| 23 (St) | ∞ | DD[23] | | | |
| *24 | −13.60688 | 1.700 | 1.68948 | 31.02 | 0.59874 |
| *25 | −19.41617 | 0.100 | | | |
| 26 | 156.78052 | 5.000 | 1.87070 | 40.73 | 0.56825 |
| 27 | −31.38198 | 1.220 | 1.69895 | 30.13 | 0.60298 |
| 28 | 120.18287 | 6.475 | 1.88300 | 39.22 | 0.57295 |
| 29 | −30.69544 | DD[29] | | | |
| 30 | −125.00563 | 1.300 | 1.48749 | 70.24 | 0.53007 |
| 31 | ∞ | 11.016 | | | |
| 32 | ∞ | 2.150 | 1.54763 | 54.98 | 0.55247 |
| 33 | ∞ | 1.310 | | | |
| 34 | ∞ | 0.700 | 1.49784 | 54.98 | 0.55000 |
| 35 | ∞ | 1.124 | | | |

TABLE 40

| | |
|---|---|
| f | 32.024 |
| FNo. | 1.03 |
| 2ωmax | 49.8 |

TABLE 41

| | Infinity | 0.3 m |
|---|---|---|
| DD[23] | 10.669 | 6.783 |
| DD[29] | 1.500 | 5.386 |

TABLE 42

| Sn | 24 | 25 |
|---|---|---|
| KA | 1.0000000E+00 | 1.0000000E+00 |
| A4 | 1.6825325E−04 | 1.4660302E−04 |
| A6 | −2.1723456E−06 | −9.5411287E−07 |
| A8 | 9.2098668E−08 | 1.4478108E−08 |
| A10 | −2.2915037E−09 | 1.1584303E−10 |
| A12 | 3.4849647E−11 | −8.2608047E−12 |
| A14 | −3.2818181E−13 | 1.3302562E−13 |
| A16 | 1.8701820E−15 | −1.0460595E−15 |
| A18 | −5.8954769E−18 | 4.1491271E−18 |
| A20 | 7.8960041E−21 | −6.6428045E−21 |

Example 12

Figure 34:
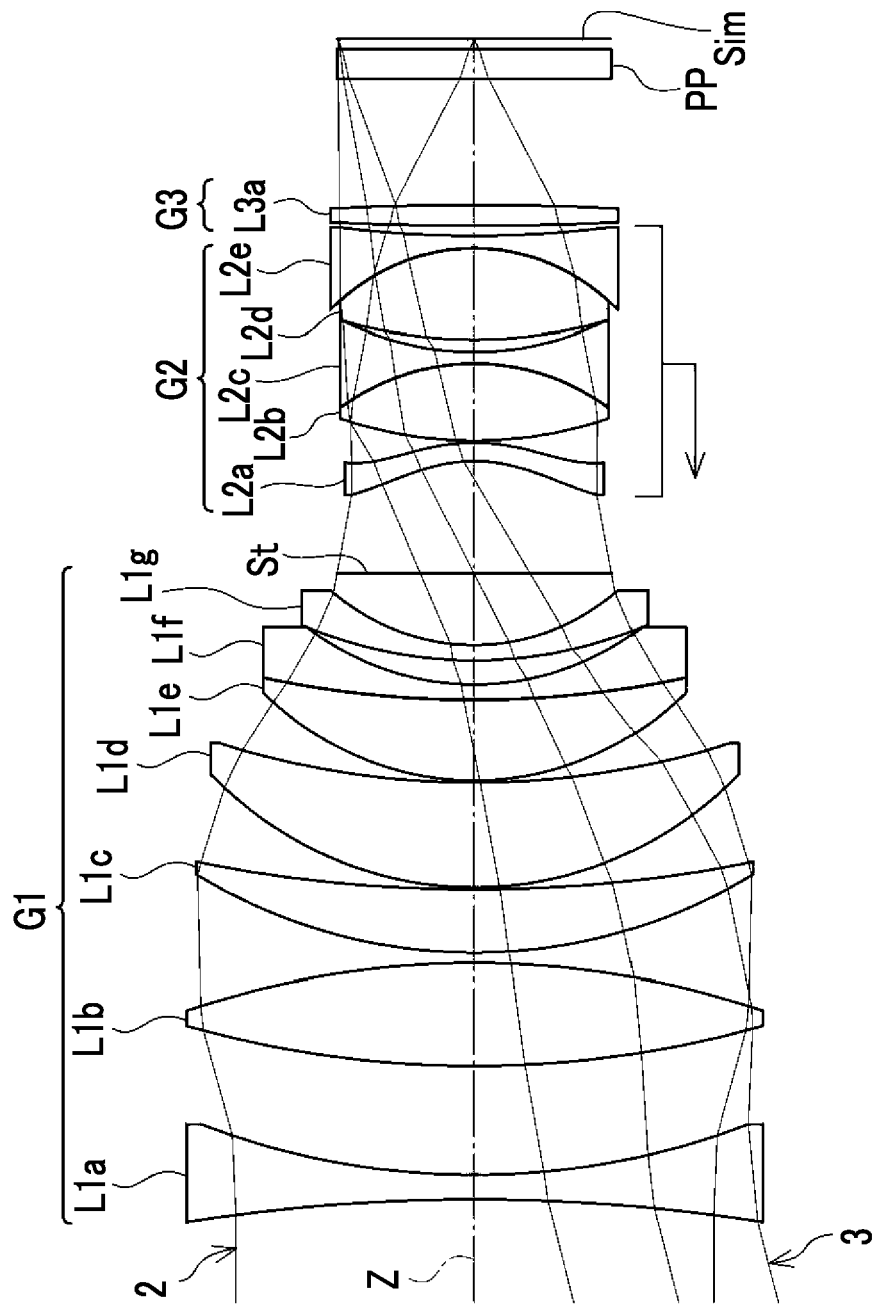
FIG. 34 is a cross-sectional view showing a configuration and rays of an imaging lens according to Example 12 of the present disclosure.

FIG. 34 shows a cross-sectional configuration of the imaging lens of Example 12. The imaging lens of Example 12 consists of, in order from the object side, a first lens group G1 that has a positive refractive power, an aperture stop St, a second lens group G2 that has a positive refractive power, and a third lens group G3 that has a positive refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side. The third lens group G3 consists of one lens L3a.

Figure 43:
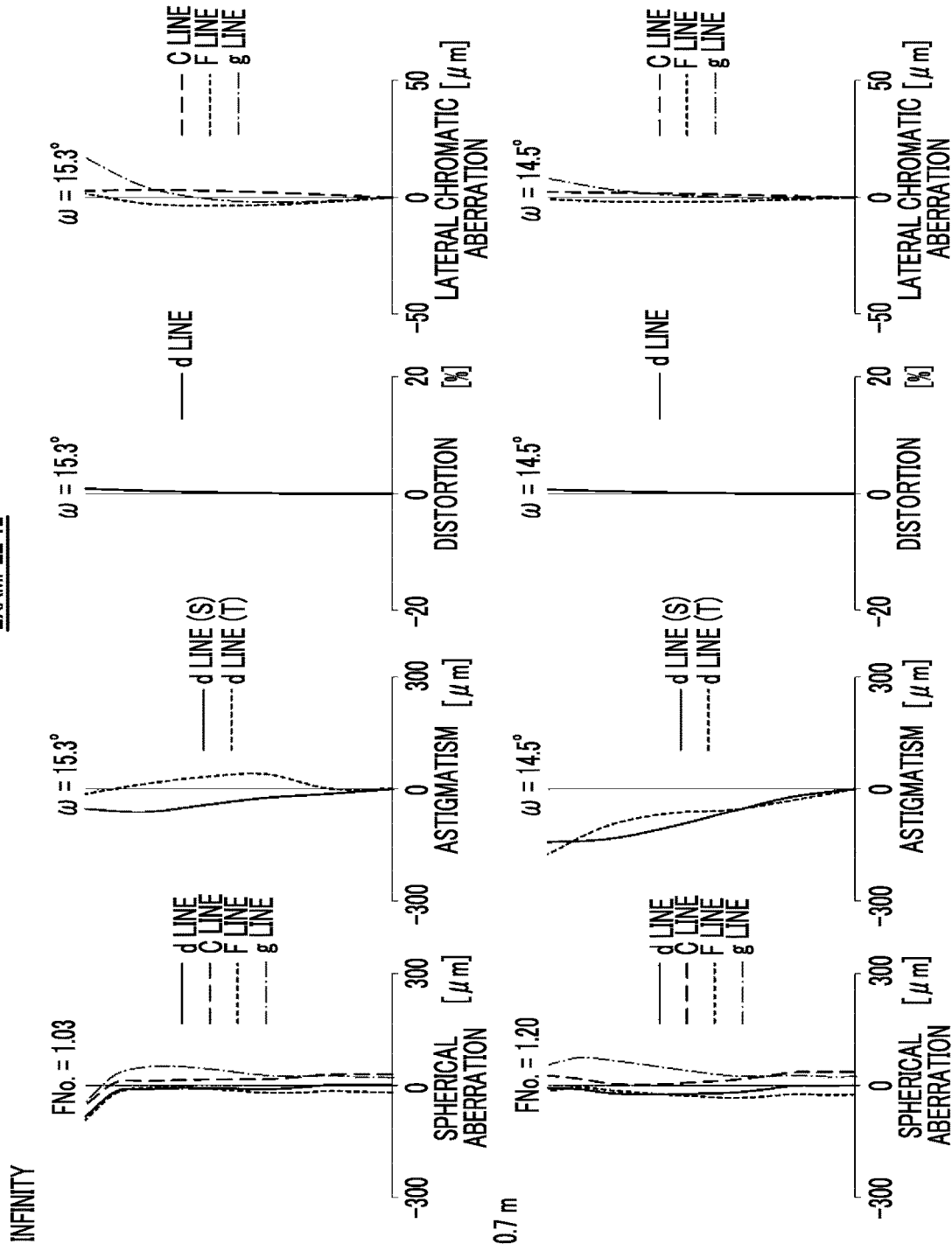
FIG. 43 shows spherical aberration diagrams, astigmatism diagrams, distortion diagrams, lateral chromatic aberration diagrams of the imaging lens of Example 12 of the present disclosure.

Regarding the imaging lens of Example 12, Table 43 shows basic lens data, Table 44 shows specification, Table 45 shows variable surface distances, Table 46 shows aspheric surface coefficients, and FIGS. 43 and 44 show aberration diagrams. In FIG. 43, the upper part shows aberration diagrams in a state where the object at infinity is in focus, and the lower part shows aberration diagrams in a state where the object at the distance of 0.7 m (meter) from the object to the image plane Sim is in focus. FIG. 44 shows lateral aberration diagram in a state where

TABLE 43

| Sn | R | D | Nd | vd | θgF |
|---|---|---|---|---|---|
| 1 | −202.46222 | 2.400 | 1.61750 | 36.25 | 0.58409 |
| 2 | 84.17703 | 10.655 | | | |
| 3 | 116.82988 | 10.000 | 1.45860 | 90.19 | 0.53516 |
| 4 | −99.70316 | 1.010 | | | |
| 5 (Hm) | 58.97589 | 6.168 | 2.00272 | 19.32 | 0.64514 |
| 6 | 157.48112 | 0.200 | | | |
| 7 | 39.80574 | 10.250 | 1.59282 | 68.62 | 0.54414 |
| 8 | 93.85195 | 0.200 | | | |
| 9 | 32.50135 | 7.910 | 1.53945 | 63.48 | 0.53990 |
| 10 | 113.27635 | 1.500 | 1.85896 | 22.73 | 0.62844 |
| 11 | 30.08960 | 2.350 | | | |
| 12 | 48.57213 | 1.500 | 1.98613 | 16.48 | 0.66558 |
| 13 | 23.70172 | 7.000 | | | |
| 14 (St) | ∞ | DD[14] | | | |
| *15 | −16.62654 | 1.800 | 1.68948 | 31.02 | 0.59874 |
| *16 | −20.47694 | 0.200 | | | |
| 17 | 46.52462 | 7.524 | 1.95375 | 32.32 | 0.59015 |
| 18 | −24.94567 | 1.110 | 1.78555 | 25.72 | 0.61045 |
| 19 | 32.92450 | 1.205 | | | |
| 20 | 53.58123 | 8.896 | 1.95375 | 32.32 | 0.59015 |
| 21 | −21.67977 | 1.210 | 1.63849 | 34.39 | 0.58799 |
| 22 | 121.65386 | DD[22] | | | |
| 23 | 350.00000 | 2.000 | 1.90602 | 23.33 | 0.62075 |
| 24 | −350.00000 | 12.401 | | | |
| 25 | ∞ | 2.850 | 1.51680 | 64.20 | 0.53430 |
| 26 | ∞ | 1.000 | | | |

TABLE 44

| | |
|---|---|
| f | 51.529 |
| FNo. | 1.03 |
| 2ωmax | 30.6 |

TABLE 45

| | Infinity | 0.7 m |
|---|---|---|
| DD[14] | 11.000 | 5.227 |
| DD[22] | 1.004 | 6.777 |

TABLE 46

| Sn | 15 | 16 |
|---|---|---|
| KA | 1.0000000E+00 | 1.0000000E+00 |
| A3 | 0.0000000E+00 | 0.0000000E+00 |
| A4 | 1.4134736E−05 | 1.5709981E−05 |
| A5 | 2.6259559E−05 | 2.5965284E−05 |
| A6 | −3.3907589E−06 | −4.2475360E−06 |
| A7 | −2.4053109E−07 | −1.2459177E−08 |
| A8 | 1.0812258E−07 | 1.0406812E−07 |
| A9 | −2.4866912E−09 | −8.5930892E−09 |
| A10 | −1.7843185E−09 | −1.0929846E−09 |
| A11 | 1.2258615E−10 | 1.6907154E−10 |
| A12 | 1.6697433E−11 | 4.3662373E−12 |
| A13 | −1.8317390E−12 | −1.5987613E−12 |
| A14 | −7.6120774E−14 | 1.5986683E−14 |
| A15 | 1.4012767E−14 | 8.3615812E−15 |
| A16 | 2.5265457E−17 | −2.3879418E−16 |
| A17 | −5.5017957E−17 | −2.3215598E−17 |
| A18 | 1.1014057E−18 | 9.2450531E−19 |

TABLE 46-continued

| Sn | 15 | 16 |
|---|---|---|
| A19 | 8.7746514E-20 | 2.6760815E-20 |
| A20 | -2.9531051E-21 | -1.2643529E-21 |

Example 13

Figure 35:
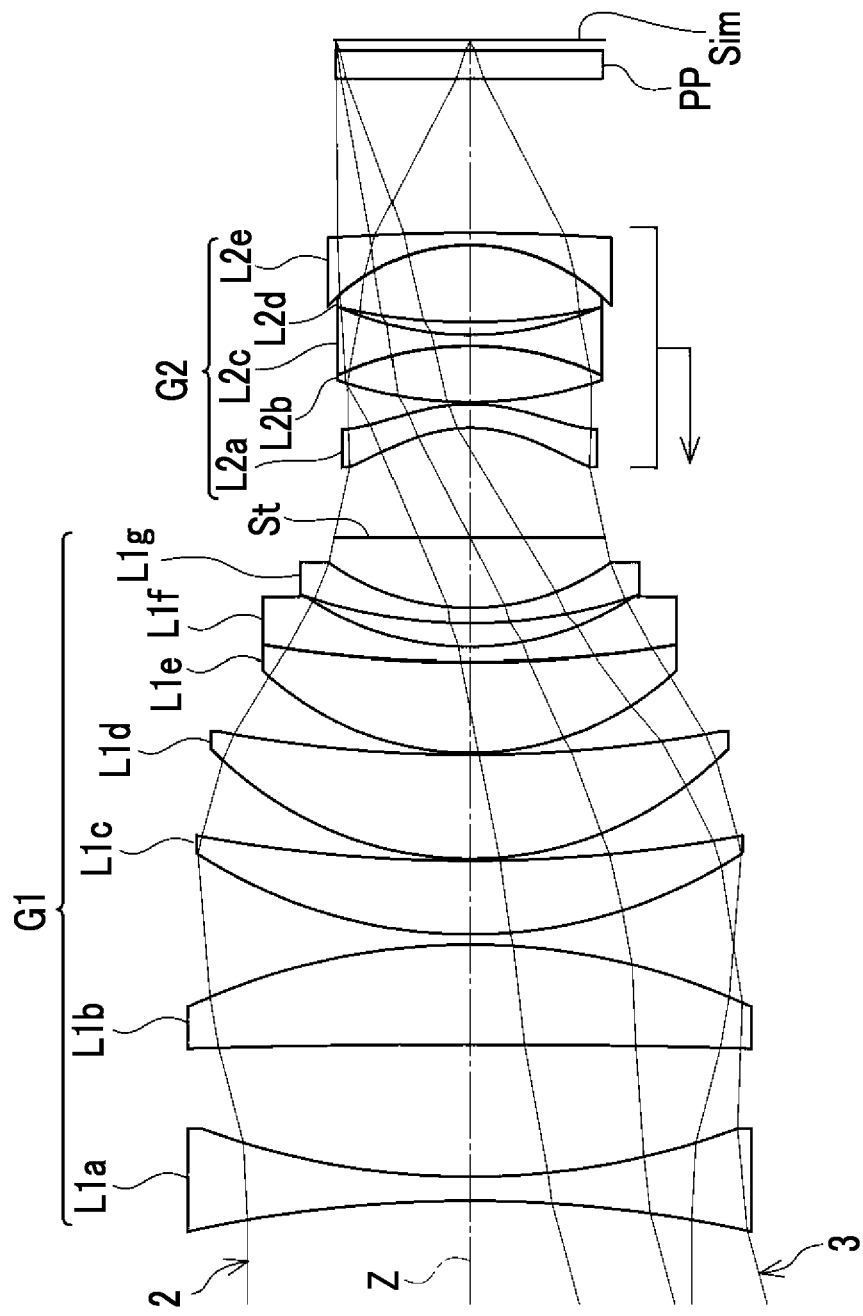
FIG. 35 is a cross-sectional view showing a configuration and rays of an imaging lens according to Example 13 of the present disclosure.

FIG. 35 shows a cross-sectional configuration of the imaging lens of Example 13. The imaging lens of Example 13 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 45:
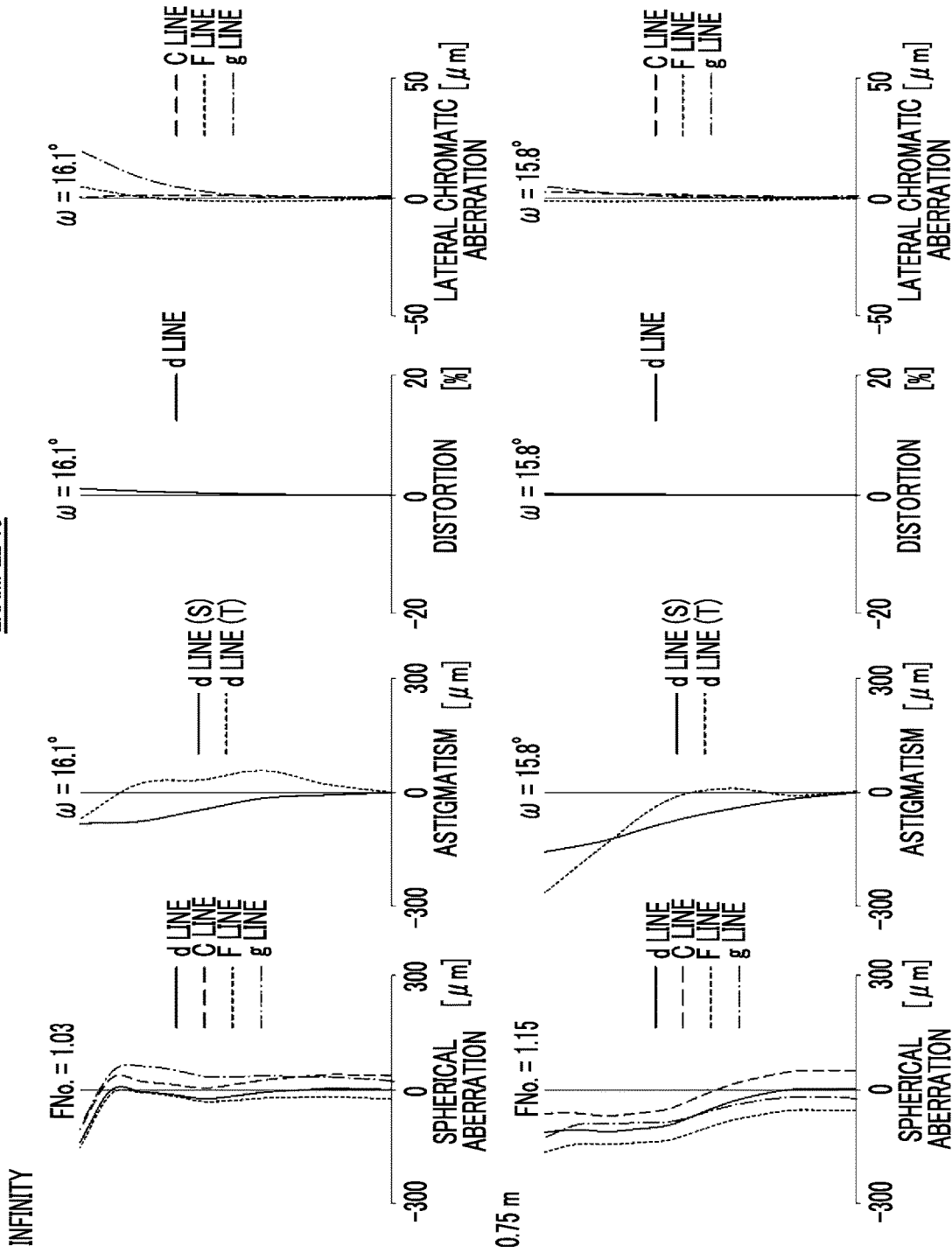
FIG. 45 shows spherical aberration diagrams, astigmatism diagrams, distortion diagrams, lateral chromatic aberration diagrams of the imaging lens of Example 13 of the present disclosure.

Regarding the imaging lens of Example 13, Table 47 shows basic lens data, Table 48 shows specification, Table 49 shows variable surface distances, Table 50 shows aspheric surface coefficients, and FIGS. 45 and 46 show aberration diagrams. In FIG. 45, the upper part shows aberration diagrams in a state where the object at infinity is in focus, and the lower part shows aberration diagrams in a state where the object at the distance of 0.75 m (meter) from the object to the image plane Sim is in focus. FIG. 46 shows lateral aberration diagram in a state where

TABLE 47

| Sn | R | D | Nd | vd | θgF |
|---|---|---|---|---|---|
| 1 | -147.83201 | 2.400 | 1.56607 | 42.61 | 0.57194 |
| 2 | 86.55844 | 13.196 | | | |
| 3 | -1112.59959 | 10.000 | 1.49700 | 81.61 | 0.53887 |
| 4 | -74.96995 | 1.010 | | | |
| 5 (Hm) | 56.10284 | 7.350 | 1.92286 | 20.88 | 0.63900 |
| 6 | 168.76278 | 0.200 | | | |
| 7 | 39.99940 | 10.364 | 1.49700 | 81.61 | 0.53887 |
| 8 | 153.92109 | 0.200 | | | |
| 9 | 33.63361 | 9.003 | 1.58350 | 61.79 | 0.54178 |
| 10 | 143.73093 | 1.500 | 1.89286 | 20.36 | 0.63944 |
| 11 | 32.94000 | 2.350 | | | |
| 12 | 58.54173 | 1.500 | 1.98613 | 16.48 | 0.66558 |
| 13 | 26.84925 | 7.000 | | | |
| 14 (St) | ∞ | DD[14] | | | |
| *15 | -16.34007 | 2.374 | 1.68948 | 31.02 | 0.59874 |
| *16 | -20.92321 | 0.200 | | | |
| 17 | 46.16889 | 5.601 | 2.00100 | 29.13 | 0.59952 |
| 18 | -34.75772 | 1.110 | 1.82933 | 23.53 | 0.61772 |
| 19 | 36.00359 | 1.259 | | | |
| 20 | 65.48463 | 7.692 | 2.00100 | 29.13 | 0.59952 |
| 21 | -21.60337 | 1.210 | 1.72399 | 28.80 | 0.60142 |
| 22 | -221.70851 | DD[22] | | | |
| 23 | ∞ | 2.850 | 1.51680 | 64.20 | 0.53430 |
| 24 | ∞ | 1.000 | | | |

TABLE 48

| f | 48.912 |
|---|---|
| FNo. | 1.03 |
| 2ωmax | 32.2 |

TABLE 49

| | Infinity | 0.75 m |
|---|---|---|
| DD[14] | 11.000 | 6.974 |
| DD[22] | 15.398 | 19.418 |

TABLE 50

| Sn | 15 | 16 |
|---|---|---|
| KA | 1.0000000E+00 | 1.0000000E+00 |
| A3 | 0.0000000E+00 | 0.0000000E+00 |
| A4 | 1.1642920E-05 | 1.4474213E-05 |
| A5 | 2.1306014E-05 | 2.0258437E-05 |
| A6 | -3.3814546E-06 | -4.0400080E-06 |
| A7 | -1.9812243E-07 | 4.7913832E-08 |
| A8 | 1.0663262E-07 | 9.6017868E-08 |
| A9 | -1.5803952E-09 | -8.4598138E-09 |
| A10 | -1.8092896E-09 | -9.9449719E-10 |
| A11 | 9.0694353E-11 | 1.5710711E-10 |
| A12 | 1.8185970E-11 | 4.0001956E-12 |
| A13 | -1.4218748E-12 | -1.4517868E-12 |
| A14 | -9.8519189E-14 | 1.3061204E-14 |
| A15 | 1.1294372E-14 | 7.4850181E-15 |
| A16 | 1.8703189E-16 | -2.0136740E-16 |
| A17 | -4.5775183E-17 | -2.0557864E-17 |
| A18 | 5.1939904E-19 | 7.6973691E-19 |
| A19 | 7.4994186E-20 | 2.3482464E-20 |
| A20 | -2.1146255E-21 | -1.0301864E-21 |

Example 14

Figure 36:
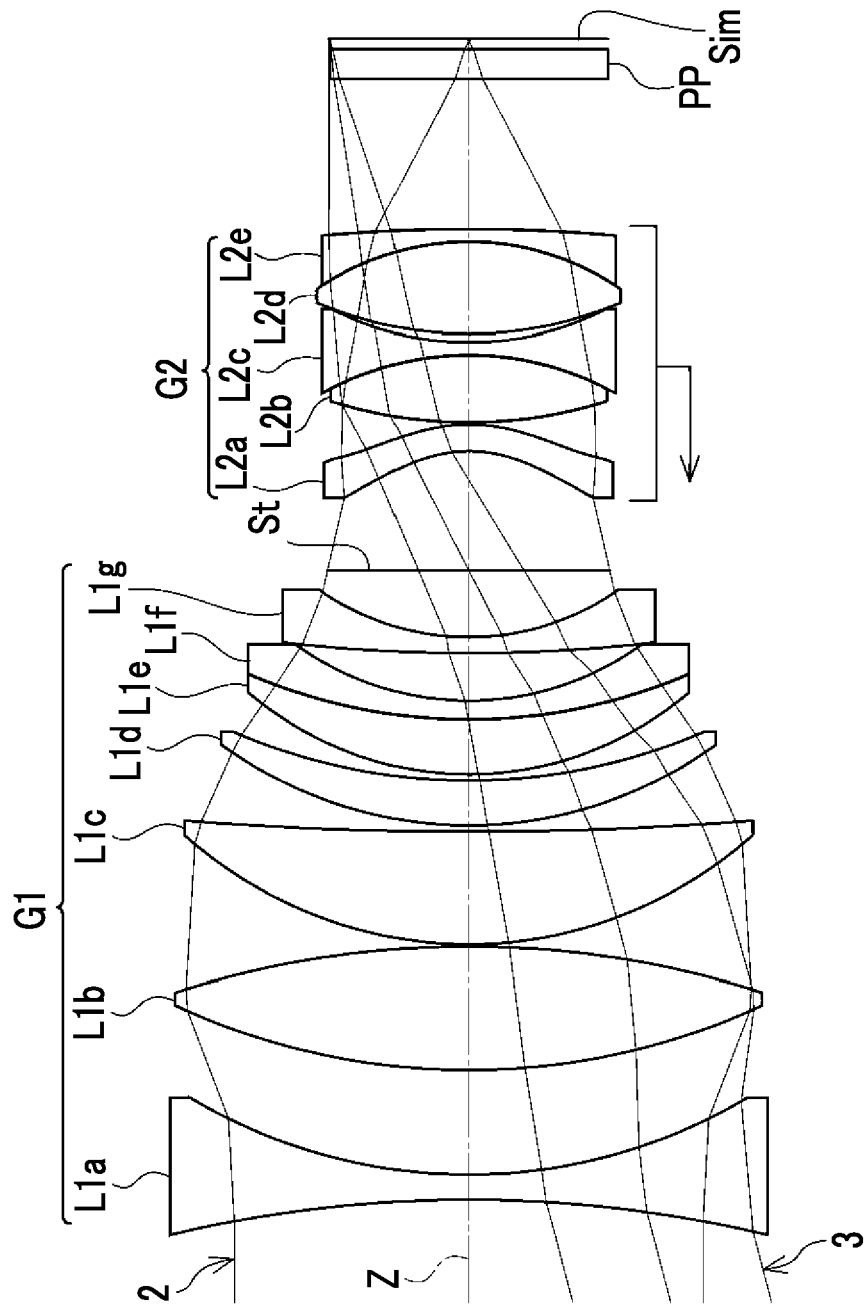
FIG. 36 is a cross-sectional view showing a configuration and rays of an imaging lens according to Example 14 of the present disclosure.

FIG. 36 shows a cross-sectional configuration of the imaging lens of Example 14. The imaging lens of Example 14 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 47:
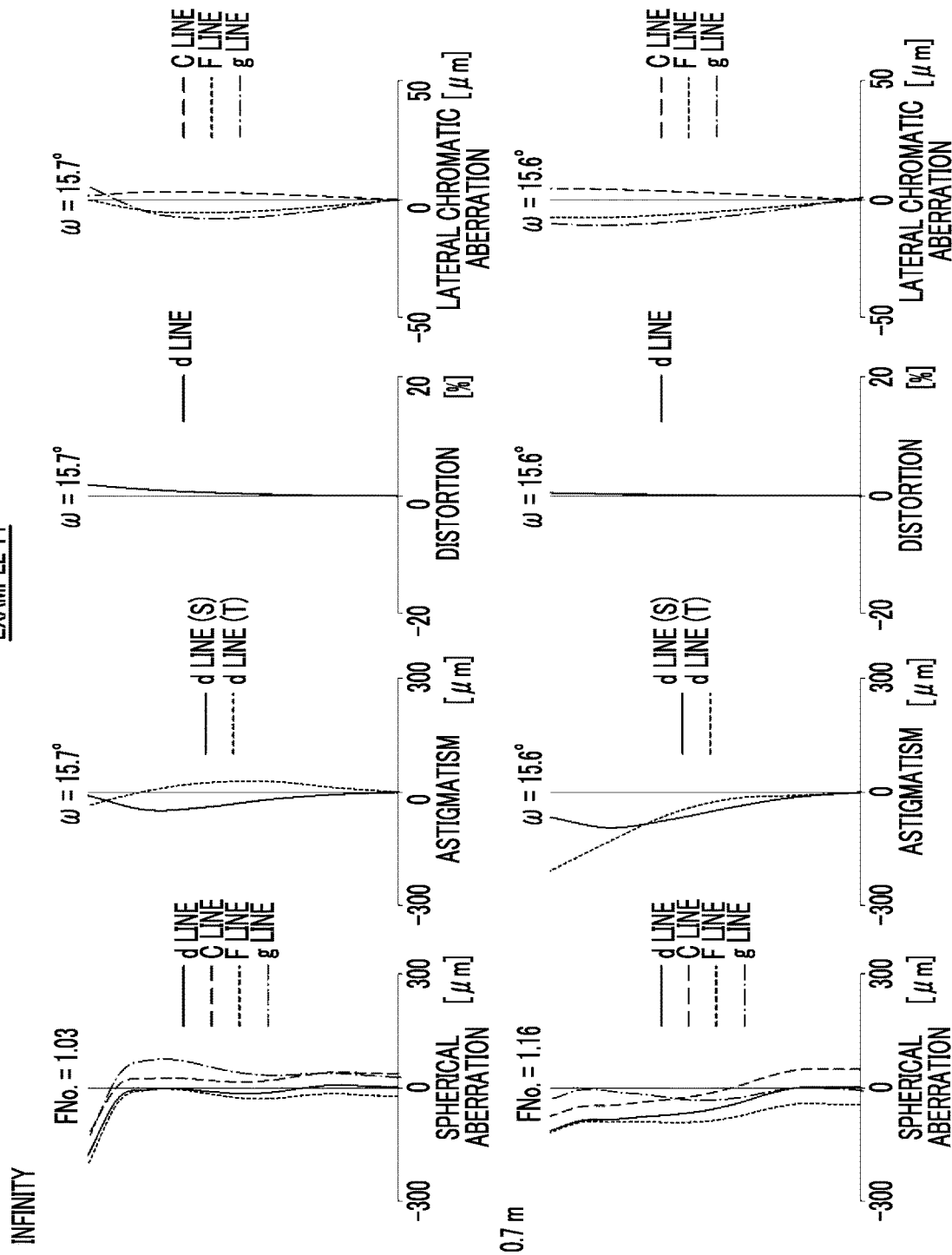
FIG. 47 shows spherical aberration diagrams, astigmatism diagrams, distortion diagrams, lateral chromatic aberration diagrams of the imaging lens of Example 14 of the present disclosure.

Regarding the imaging lens of Example 14, Table 51 shows basic lens data, Table 52 shows specification, Table 53 shows variable surface distances, Table 54 shows aspheric surface coefficients, and FIGS. 47 and 48 show aberration diagrams. In FIG. 47, the upper part shows aberration diagrams in a state where the object at infinity is in focus, and the lower part shows aberration diagrams in a state where the object at the distance of 0.7 m (meter) from the object to the image plane Sim is in focus. FIG. 48 shows lateral aberration diagram in a state where

TABLE 51

| Sn | R | D | Nd | vd | θgF |
|---|---|---|---|---|---|
| 1 | -138.62827 | 2.400 | 1.54072 | 47.23 | 0.56780 |
| 2 | 58.55723 | 10.030 | | | |
| 3 | 75.89616 | 11.800 | 1.59282 | 68.62 | 0.54414 |
| 4 (Hm) | -105.01257 | 0.200 | | | |
| 5 | 45.45982 | 10.800 | 1.59282 | 68.62 | 0.54414 |
| 6 | 399.21443 | 0.600 | | | |
| 7 | 44.95362 | 4.320 | 1.95906 | 17.47 | 0.65993 |
| 8 | 63.84817 | 0.600 | | | |
| 9 | 36.12697 | 5.270 | 1.78800 | 47.52 | 0.55545 |

TABLE 51-continued

| Sn | R | D | Nd | vd | θgF |
|---|---|---|---|---|---|
| 10 | 60.17700 | 1.800 | 1.89286 | 20.36 | 0.63944 |
| 11 | 31.65635 | 4.565 | | | |
| 12 | 177.12407 | 1.520 | 1.80809 | 22.76 | 0.63073 |
| 13 | 27.86122 | 6.406 | | | |
| 14 (St) | ∞ | DD[14] | | | |
| *15 | −14.64464 | 2.550 | 1.68863 | 31.20 | 0.60109 |
| *16 | −18.73058 | 0.200 | | | |
| 17 | 49.66071 | 6.450 | 1.88300 | 39.22 | 0.57295 |
| 18 | −32.52200 | 1.210 | 1.69895 | 30.05 | 0.60174 |
| 19 | 32.52200 | 0.820 | | | |
| 20 | 42.22428 | 8.800 | 1.88300 | 39.22 | 0.57295 |
| 21 | −28.75400 | 1.210 | 1.62005 | 36.35 | 0.58602 |
| 22 | −178.14293 | DD[22] | | | |
| 23 | ∞ | 2.850 | 1.51680 | 64.20 | 0.53430 |
| 24 | ∞ | 1.000 | | | |

TABLE 52

| f | 49.549 |
|---|---|
| FNo. | 1.03 |
| 2ωmax | 31.4 |

TABLE 53

| | Infinity | 0.7 m |
|---|---|---|
| DD[14] | 11.466 | 7.025 |
| DD[22] | 14.401 | 18.842 |

TABLE 54

| Sn | 15 | 16 |
|---|---|---|
| KA | 1.0000000E+00 | 1.0000000E+00 |
| A3 | 0.0000000E+00 | 0.0000000E+00 |
| A4 | 5.0823068E−05 | 3.9661172E−05 |
| A5 | 5.6696216E−06 | 7.3155985E−06 |
| A6 | −1.1665918E−06 | −1.9241870E−06 |
| A7 | 2.3011235E−07 | 2.0632606E−07 |
| A8 | −8.5462646E−09 | 2.7709406E−08 |
| A9 | −3.9871990E−09 | −6.9926396E−09 |
| A10 | 5.8946218E−10 | −2.2702122E−11 |
| A11 | 6.8551648E−12 | 9.8429055E−11 |
| A12 | −7.4371184E−12 | −3.5432557E−12 |
| A13 | 3.9451971E−13 | −7.7218349E−13 |
| A14 | 3.7621265E−14 | 4.3918443E−14 |
| A15 | −4.2785117E−15 | 3.5209637E−15 |
| A16 | −2.5668735E−17 | −2.5005394E−16 |
| A17 | 1.8252095E−17 | −8.7077803E−18 |
| A18 | −4.3536351E−19 | 7.1579377E−19 |
| A19 | −2.9072588E−20 | 9.0040531E−21 |
| A20 | 1.1528202E−21 | −8.3059544E−22 |

Example 15

Figure 37:
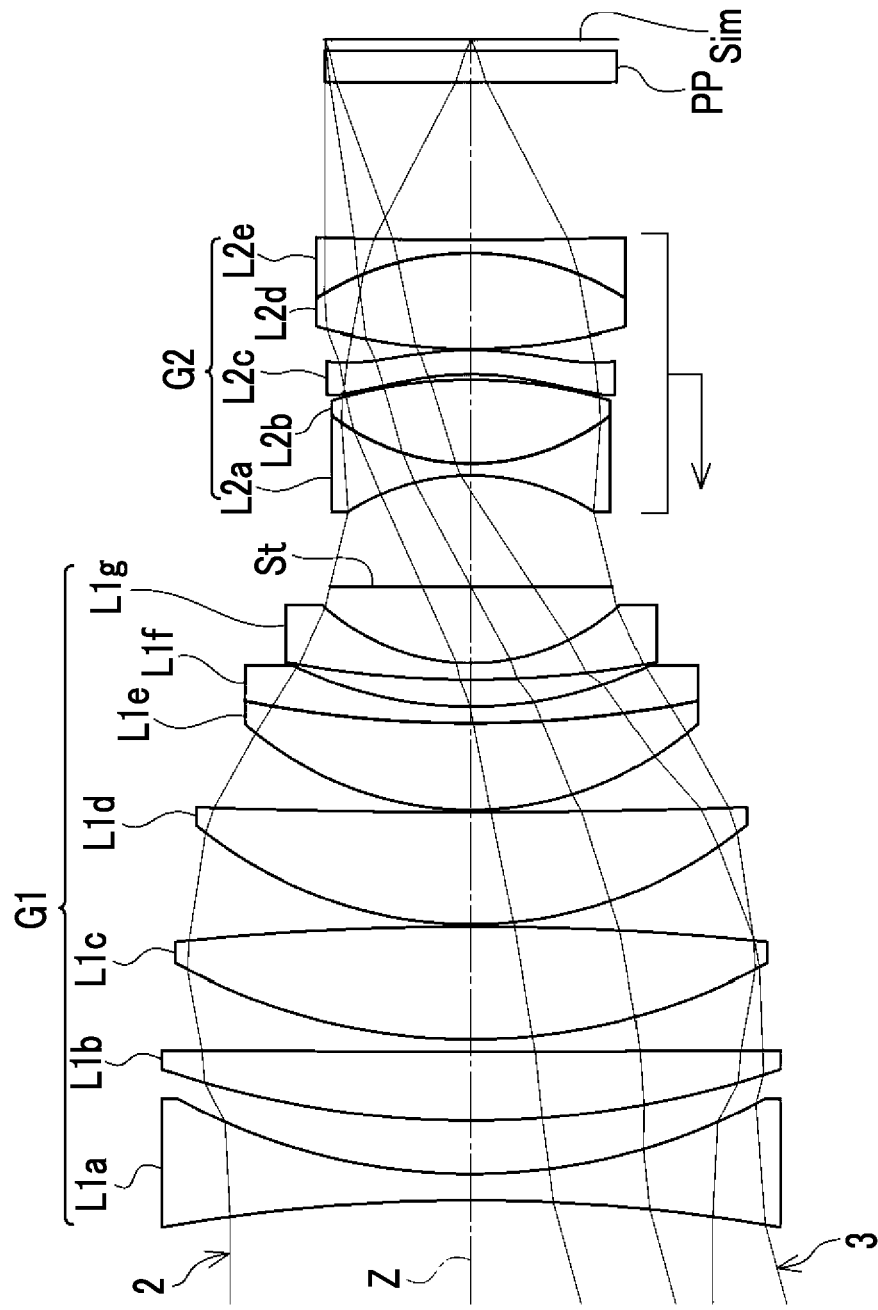
FIG. 37 is a cross-sectional view showing a configuration and rays of an imaging lens according to Example 15 of the present disclosure.

FIG. 37 shows a cross-sectional configuration of the imaging lens of Example 15. The imaging lens of Example 15 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 49:
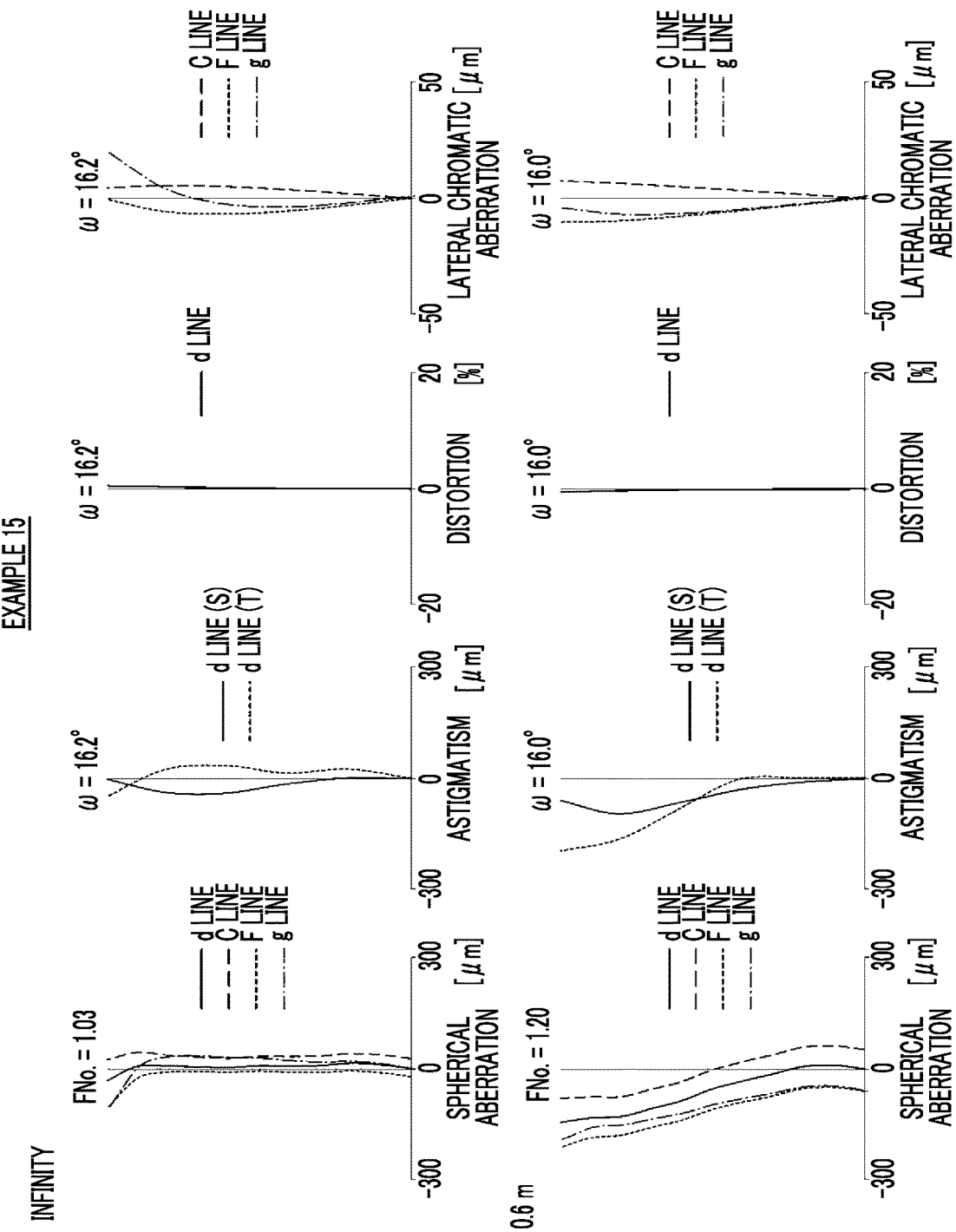
FIG. 49 shows spherical aberration diagrams, astigmatism diagrams, distortion diagrams, lateral chromatic aberration diagrams of the imaging lens of Example 15 of the present disclosure.
Figure 50:
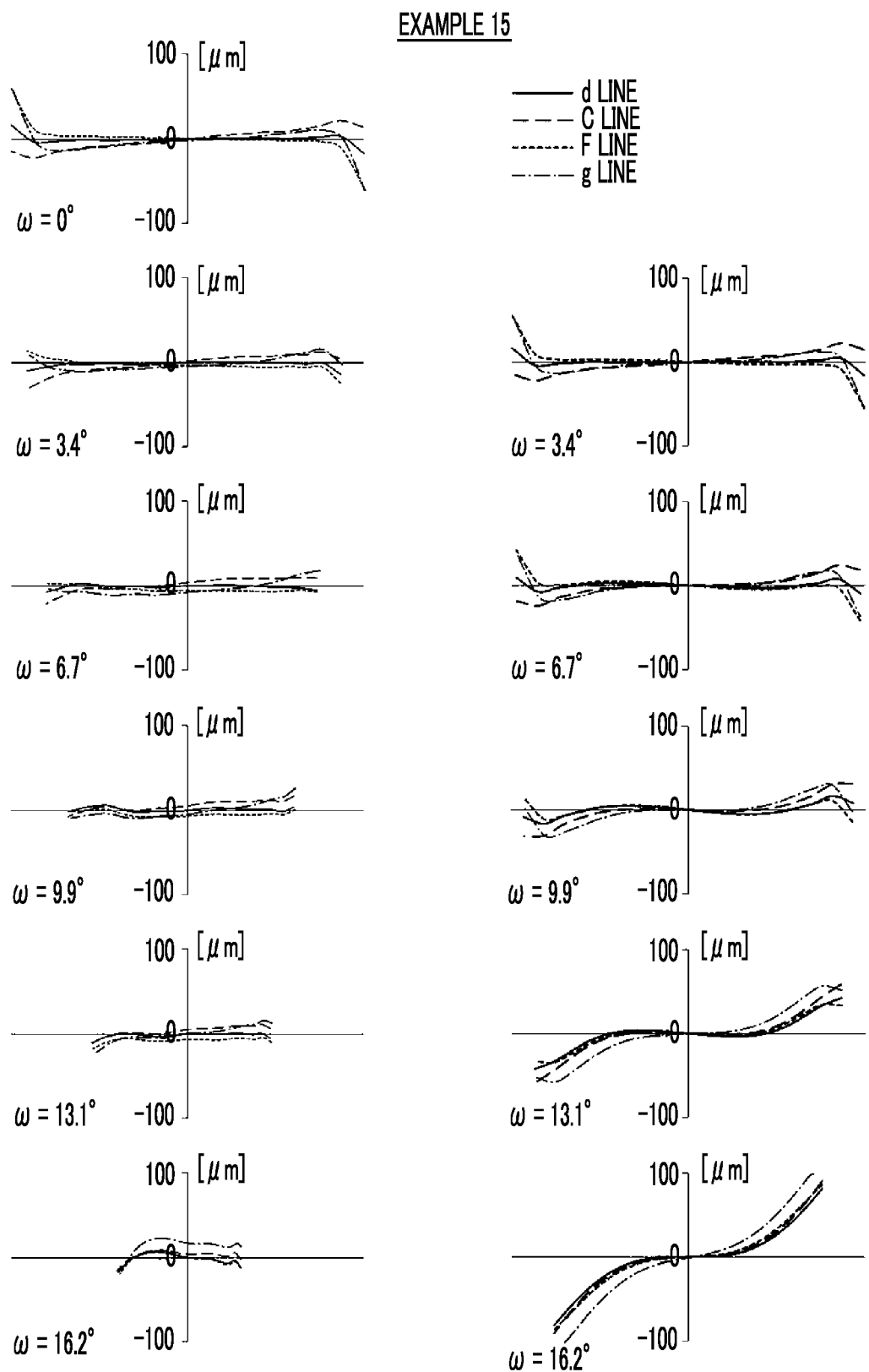
FIG. 50 is a lateral aberration diagram of the imaging lens according to Example 15 of the present disclosure.

Regarding the imaging lens of Example 15, Table 55 shows basic lens data, Table 56 shows specification, Table 57 shows variable surface distances, Table 58 shows aspheric surface coefficients, and FIGS. 49 and 50 show aberration diagrams. In FIG. 49, the upper part shows aberration diagrams in a state where the object at infinity is in focus, and the lower part shows aberration diagrams in a state where the object at the distance of 0.6 m (meter) from the object to the image plane Sim is in focus. FIG. 50 shows lateral aberration diagram in a state where

TABLE 55

| Sn | R | D | Nd | vd | θgF |
|---|---|---|---|---|---|
| 1 | −184.15927 | 2.400 | 1.80000 | 29.84 | 0.60178 |
| 2 | 62.61647 | 4.878 | | | |
| 3 | 98.51388 | 6.313 | 1.98613 | 16.48 | 0.66558 |
| 4 | 4034.13252 | 1.100 | | | |
| 5 (Hm) | 63.34975 | 10.200 | 1.59282 | 68.62 | 0.54414 |
| 6 | −296.07052 | 0.200 | | | |
| 7 | 44.03004 | 10.250 | 1.59282 | 68.62 | 0.54414 |
| 8 | 795.08982 | 0.200 | | | |
| 9 | 34.85519 | 7.910 | 1.87070 | 40.73 | 0.56825 |
| 10 | 121.35104 | 1.500 | 1.89286 | 20.36 | 0.63944 |
| 11 | 41.54155 | 2.500 | | | |
| 12 | 103.47070 | 1.500 | 1.85896 | 22.73 | 0.62844 |
| 13 | 22.43821 | 7.000 | | | |
| 14 (St) | ∞ | DD[14] | | | |
| 15 | −23.29314 | 1.110 | 1.59270 | 35.31 | 0.59336 |
| 16 | 23.13973 | 7.642 | 1.88300 | 39.22 | 0.57295 |
| 17 | −49.13842 | 0.500 | | | |
| *18 | −31.45625 | 2.200 | 1.68948 | 31.02 | 0.59874 |
| *19 | −35.44240 | 0.100 | | | |
| 20 | 57.70265 | 8.669 | 1.88300 | 39.22 | 0.57295 |
| 21 | −29.44571 | 1.210 | 1.59270 | 35.31 | 0.59336 |
| 22 | 455.30805 | DD[22] | | | |
| 23 | ∞ | 2.850 | 1.51680 | 64.20 | 0.53430 |
| 24 | ∞ | 1.000 | | | |

TABLE 56

| f | 48.495 |
|---|---|
| FNo. | 1.03 |
| 2ωmax | 32.4 |

TABLE 57

| | Infinity | 0.6 m |
|---|---|---|
| DD[14] | 10.100 | 5.021 |
| DD[22] | 14.402 | 19.481 |

TABLE 58

| Sn | 18 | 19 |
|---|---|---|
| KA | 1.0000000E+00 | 1.0000000E+00 |
| A3 | 0.0000000E+00 | 0.0000000E+00 |
| A4 | −4.1880254E−05 | −1.8080969E−05 |
| A5 | 2.2277957E−05 | 1.7658879E−05 |
| A6 | −1.0486644E−06 | −1.2728716E−06 |
| A7 | −6.0774700E−07 | −2.8821944E−07 |
| A8 | 6.5534778E−08 | 3.8775713E−08 |
| A9 | 9.8049532E−09 | 3.2995970E−09 |
| A10 | −1.3866580E−09 | −5.0968526E−10 |
| A11 | −9.2054942E−11 | −2.6981943E−11 |

TABLE 58-continued

| Sn | 18 | 19 |
|---|---|---|
| A12 | 1.6184890E−11 | 3.7414083E−12 |
| A13 | 4.5994752E−13 | 1.6196819E−13 |
| A14 | −1.1024413E−13 | −1.4531348E−14 |
| A15 | −7.7379704E−16 | −6.8886559E−16 |
| A16 | 4.2085620E−16 | 1.7953337E−17 |
| A17 | −2.3252064E−18 | 1.8140969E−18 |
| A18 | −7.7399797E−19 | 5.5970230E−20 |
| A19 | 8.4567070E−21 | −2.1514981E−21 |
| A20 | 4.0991440E−22 | −1.5749796E−22 |

Example 16

Figure 38:
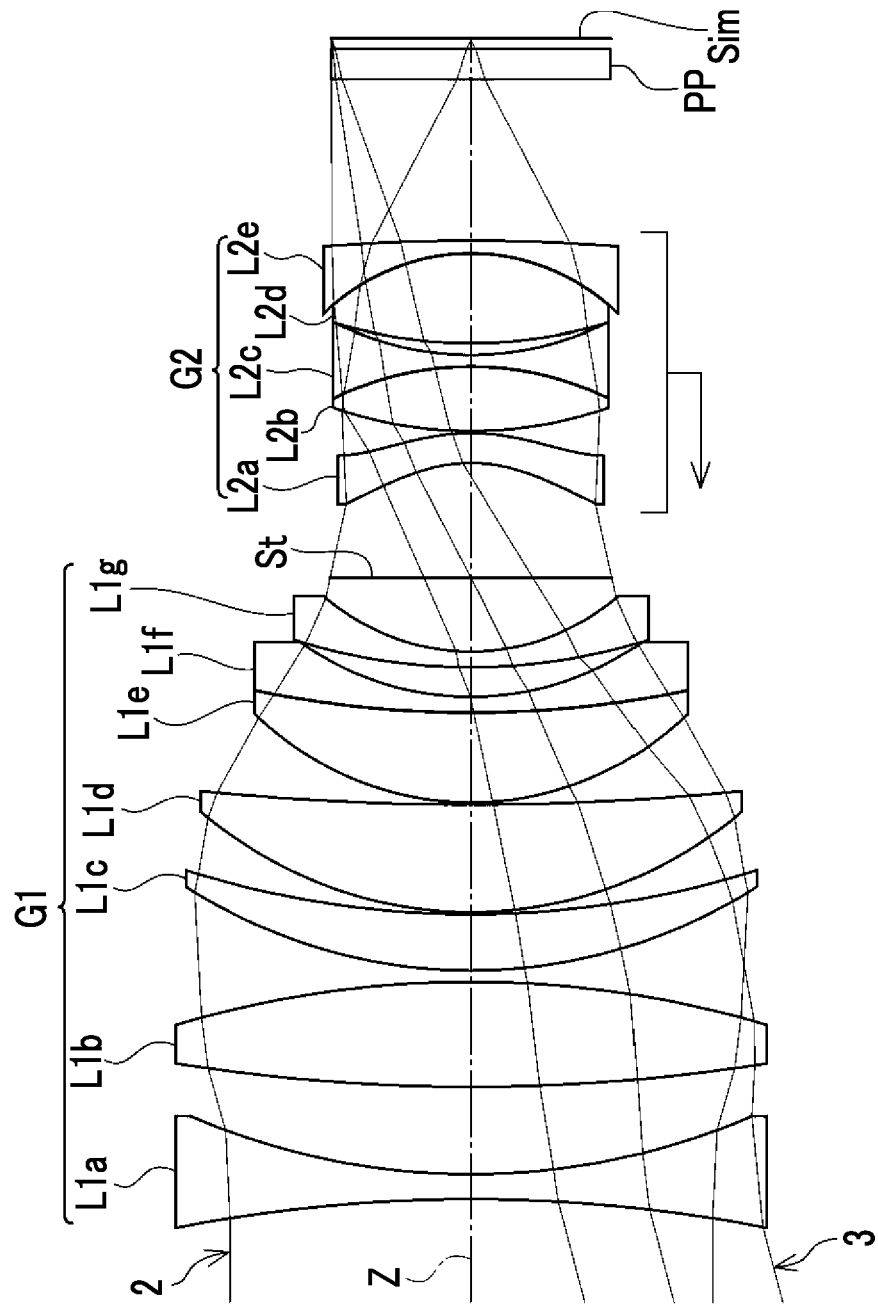
FIG. 38 is a cross-sectional view showing a configuration and rays of an imaging lens according to Example 16 of the present disclosure.

FIG. 38 shows a cross-sectional configuration of the imaging lens of Example 16. The imaging lens of Example 16 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 51:
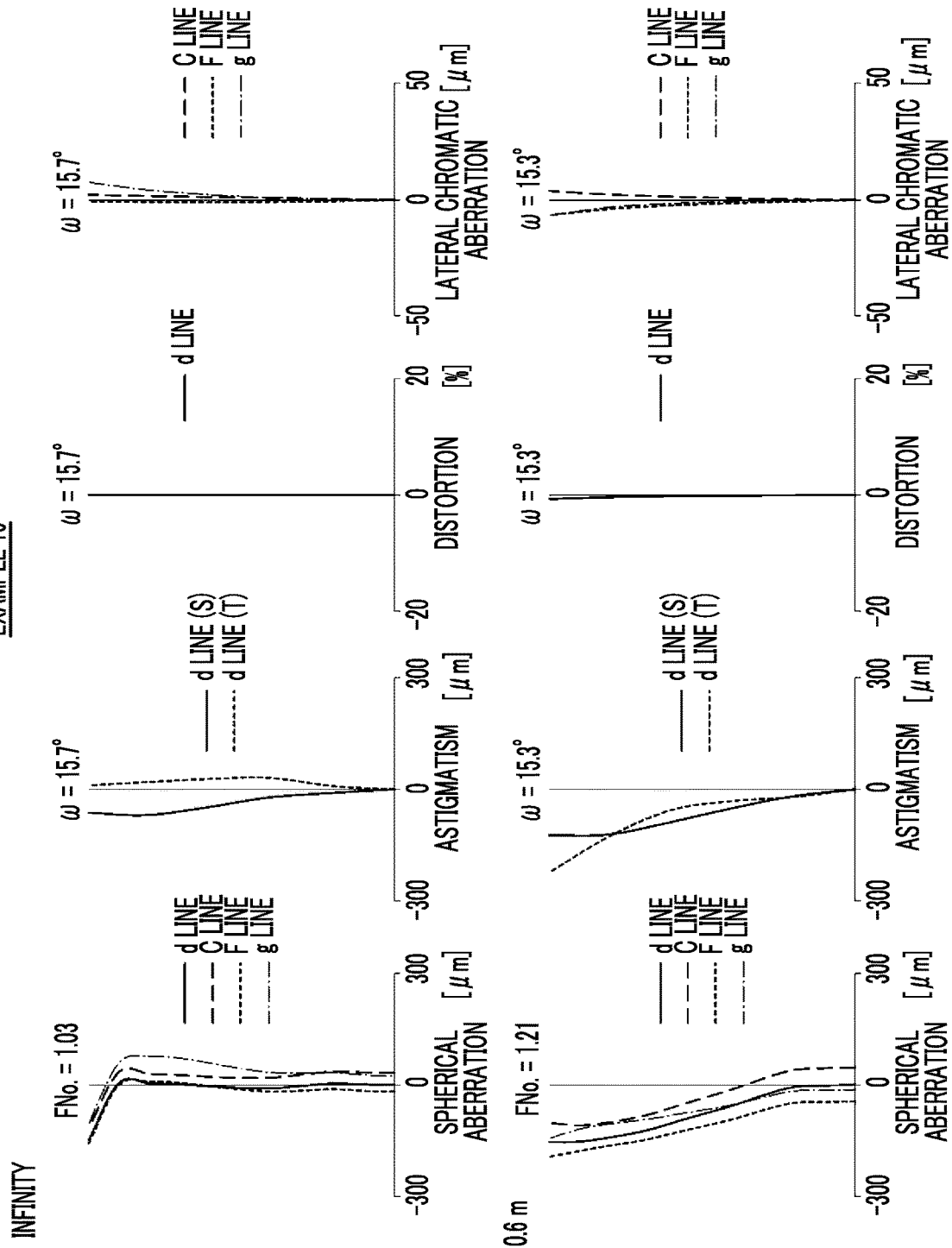
FIG. 51 shows spherical aberration diagrams, astigmatism diagrams, distortion diagrams, lateral chromatic aberration diagrams of the imaging lens of Example 16 of the present disclosure.
Figure 52:
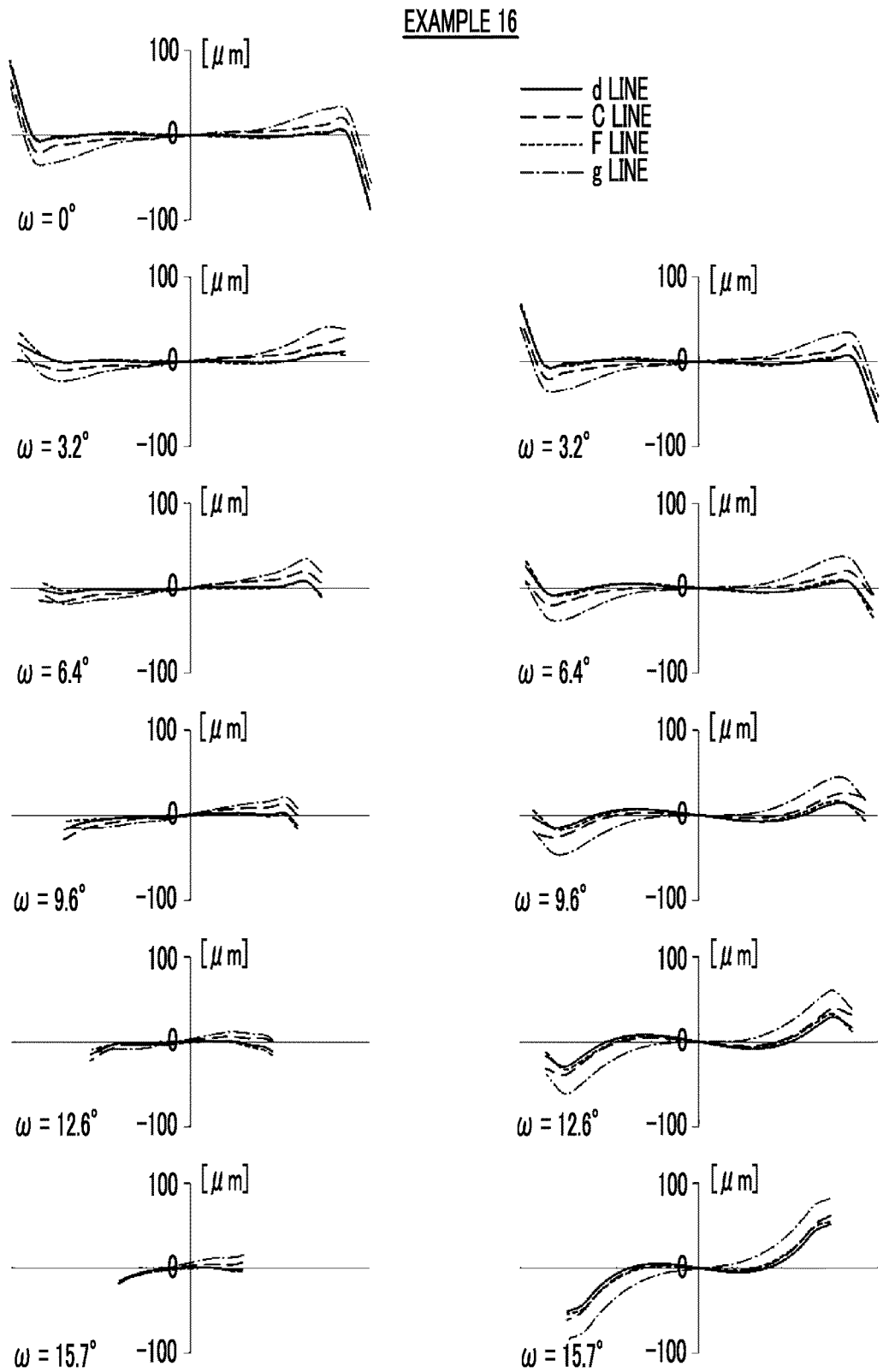
FIG. 52 is a lateral aberration diagram of the imaging lens according to Example 16 of the present disclosure.

Regarding the imaging lens of Example 16, Table 59 shows basic lens data, Table 60 shows specification, Table 61 shows variable surface distances, Table 62 shows aspheric surface coefficients, and FIGS. 51 and 52 show aberration diagrams. In FIG. 51, the upper part shows aberration diagrams in a state where the object at infinity is in focus, and the lower part shows aberration diagrams in a state where the object at the distance of 0.6 m (meter) from the object to the image plane Sim is in focus. FIG. 52 shows lateral aberration diagram in a state where

TABLE 59

| Sn | R | D | Nd | vd | θgF |
|---|---|---|---|---|---|
| 1 | −165.93122 | 2.400 | 1.56037 | 43.68 | 0.57006 |
| 2 | 76.27518 | 8.339 | | | |
| 3 | 203.54358 | 10.000 | 1.59522 | 67.73 | 0.54426 |
| 4 | −111.87010 | 1.010 | | | |
| 5 (Hm) | 56.74170 | 5.365 | 1.89286 | 20.36 | 0.63944 |
| 6 | 102.45084 | 0.200 | | | |
| 7 | 44.31471 | 10.250 | 1.59522 | 67.73 | 0.54426 |
| 8 | 292.61942 | 0.200 | | | |
| 9 | 32.85510 | 8.595 | 1.69253 | 56.87 | 0.54266 |
| 10 | 115.66155 | 1.500 | 1.78472 | 25.68 | 0.61052 |
| 11 | 31.63618 | 2.819 | | | |
| 12 | 63.52660 | 1.500 | 1.89286 | 20.36 | 0.63944 |
| 13 | 23.88347 | 7.000 | | | |
| 14 (St) | ∞ | DD[14] | | | |
| *15 | −16.34570 | 2.837 | 1.68948 | 31.02 | 0.59874 |
| *16 | −22.88973 | 0.200 | | | |
| 17 | 45.14005 | 6.141 | 1.90043 | 37.37 | 0.57720 |
| 18 | −33.79047 | 1.110 | 1.70834 | 29.58 | 0.59931 |
| 19 | 33.20670 | 1.120 | | | |
| 20 | 51.98052 | 8.500 | 1.90043 | 37.37 | 0.57720 |
| 21 | −22.44701 | 1.210 | 1.60763 | 37.24 | 0.58209 |
| 22 | −201.05993 | DD[22] | | | |
| 23 | ∞ | 2.850 | 1.54763 | 54.98 | 0.55247 |
| 24 | ∞ | 1.000 | | | |

TABLE 60

| f | 50.617 |
|---|---|
| FNo. | 1.03 |
| 2ωmax | 31.4 |

TABLE 61

| | Infinity | 0.6 m |
|---|---|---|
| DD[14] | 11.000 | 5.612 |
| DD[22] | 15.436 | 20.824 |

TABLE 62

| Sn | 15 | 16 |
|---|---|---|
| KA | 1.0000000E+00 | 1.0000000E+00 |
| A3 | 0.0000000E+00 | 0.0000000E+00 |
| A4 | 3.1181867E−05 | 2.6530803E−05 |
| A5 | 1.4794096E−05 | 1.5226995E−05 |
| A6 | −2.8122797E−06 | −3.5186055E−06 |
| A7 | 8.9003214E−08 | 2.0389209E−07 |
| A8 | 6.9213577E−08 | 7.3115649E−08 |
| A9 | −8.7233682E−09 | −1.1688257E−08 |
| A10 | −8.1799110E−10 | −5.0238456E−10 |
| A11 | 1.9725575E−10 | 1.9915512E−10 |
| A12 | 3.0890969E−12 | −2.4972651E−12 |
| A13 | −2.3953381E−12 | −1.7930323E−12 |
| A14 | 4.0298515E−14 | 6.6348784E−14 |
| A15 | 1.6625829E−14 | 9.1585232E−15 |
| A16 | −5.7273231E−16 | −4.6481540E−16 |
| A17 | −6.1842548E−17 | −2.5090883E−17 |
| A18 | 2.7969524E−18 | 1.4869080E−18 |
| A19 | 9.5479576E−20 | 2.8685321E−20 |
| A20 | −4.9925629E−21 | −1.8543937E−21 |

Example 17

Figure 39:
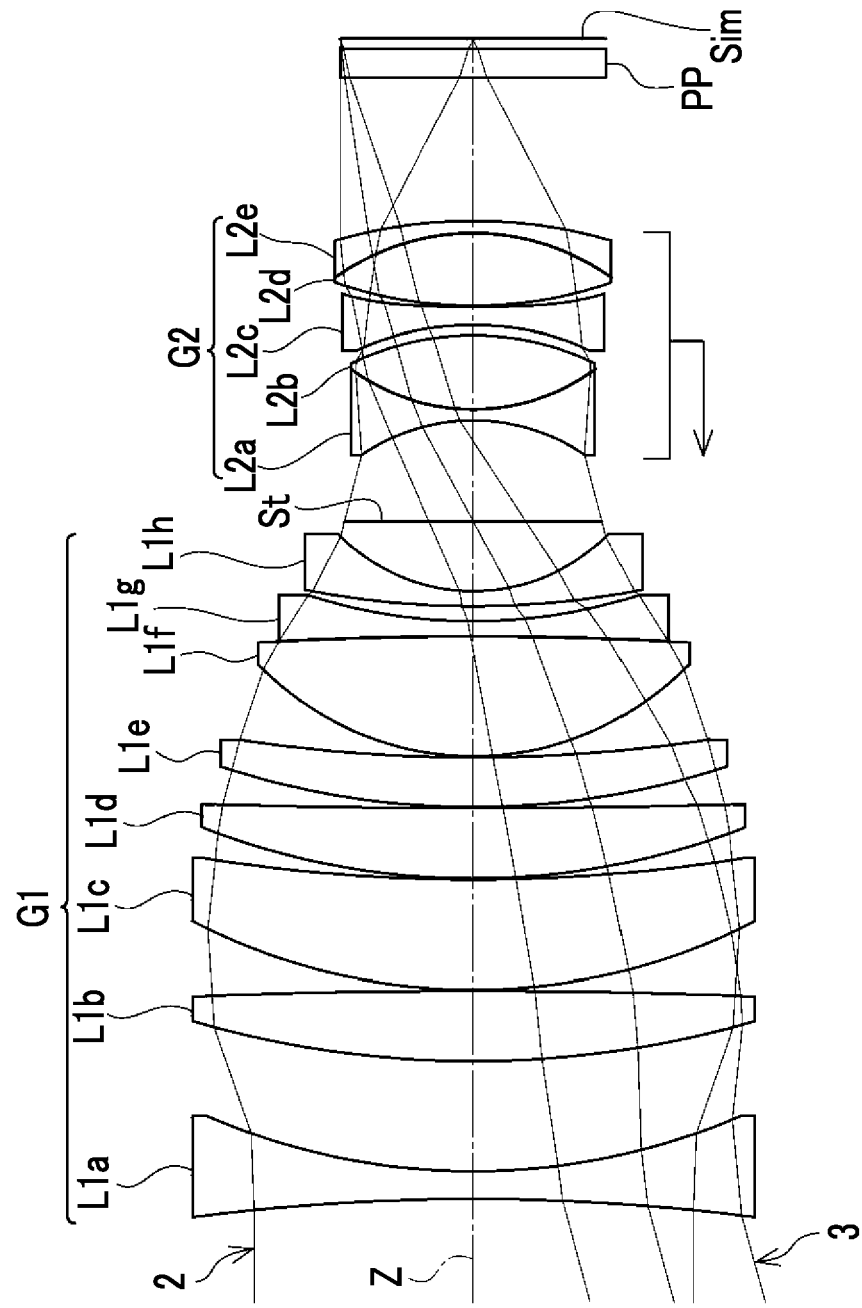
FIG. 39 is a cross-sectional view showing a configuration and rays of an imaging lens according to Example 17 of the present disclosure.

FIG. 39 shows a cross-sectional configuration of the imaging lens of Example 17. The imaging lens of Example 17 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of eight lenses L1a to L1h in order from the object side. The second lens group G2 consists of five lenses L2a to L2e in order from the object side.

Figure 53:
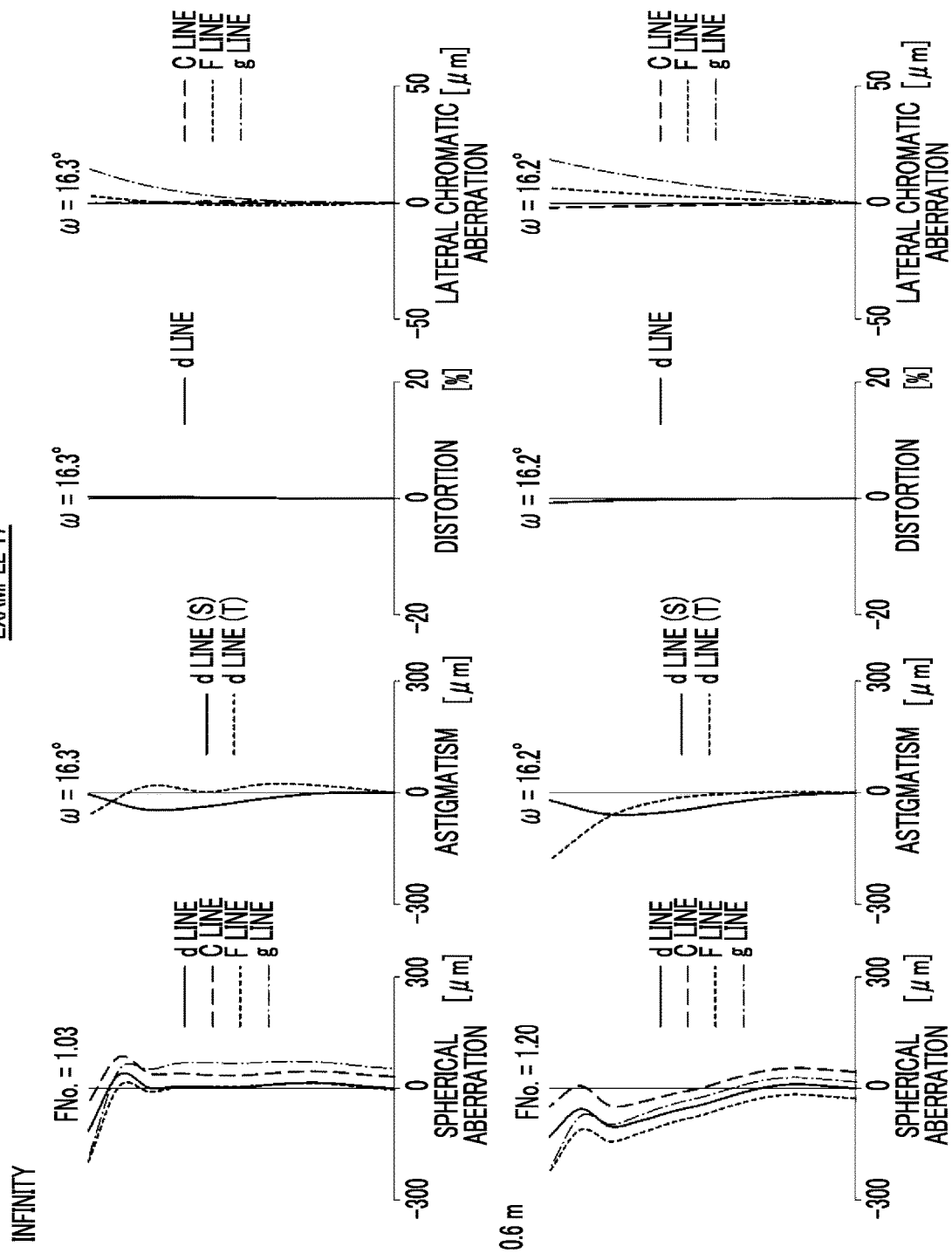
FIG. 53 shows spherical aberration diagrams, astigmatism diagrams, distortion diagrams, lateral chromatic aberration diagrams of the imaging lens of Example 17 of the present disclosure.
Figure 54:
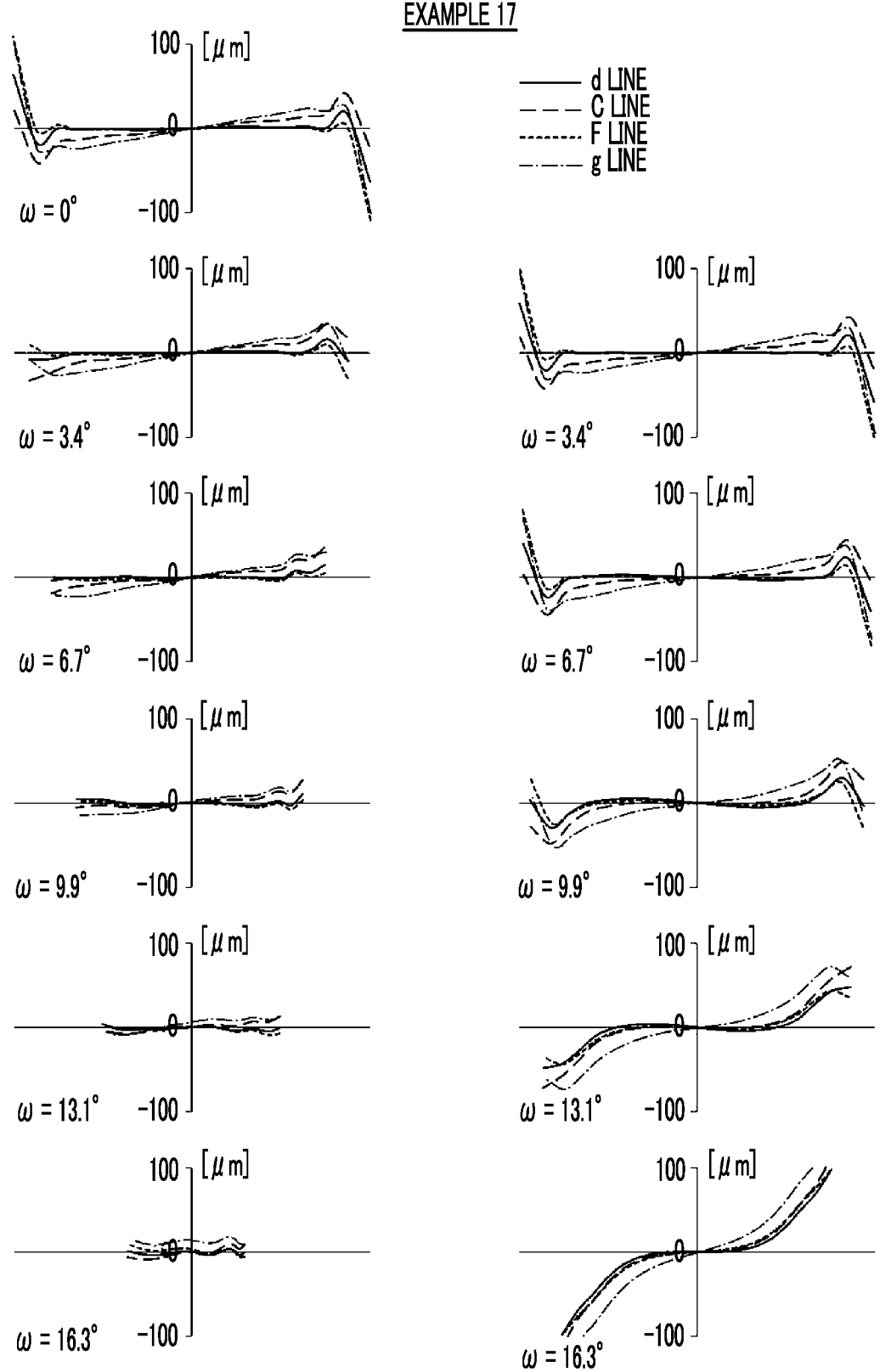
FIG. 54 is a lateral aberration diagram of the imaging lens according to Example 17 of the present disclosure.

Regarding the imaging lens of Example 17, Table 63 shows basic lens data, Table 64 shows specification, Table 65 shows variable surface distances, Table 66 shows aspheric surface coefficients, and FIGS. 53 and 54 show aberration diagrams. In FIG. 53, the upper part shows aberration diagrams in a state where the object at infinity is in focus, and the lower part shows aberration diagrams in a state where the object at the distance of 0.6 m (meter) from the object to the image plane Sim is in focus. FIG. 54 shows lateral aberration diagram in a state where

TABLE 63

| Sn | R | D | Nd | vd | θgF |
|---|---|---|---|---|---|
| 1 | −247.95976 | 2.800 | 1.77791 | 26.10 | 0.61461 |
| 2 | 75.89689 | 11.010 | | | |

TABLE 63-continued

| Sn | R | D | Nd | vd | θgF |
|---|---|---|---|---|---|
| 3 | 114.39503 | 7.000 | 1.92286 | 18.90 | 0.64960 |
| 4 | -837.42367 | 0.100 | | | |
| 5 (Hm) | 69.26549 | 11.000 | 1.58525 | 61.72 | 0.54210 |
| 6 | 196.03197 | 0.100 | | | |
| 7 | 84.81564 | 7.038 | 1.53775 | 74.70 | 0.53936 |
| 8 | 1034.21503 | 0.100 | | | |
| 9 | 91.91092 | 5.000 | 1.53775 | 74.70 | 0.53936 |
| 10 | 177.41757 | 0.100 | | | |
| 11 | 33.30279 | 12.000 | 1.88300 | 39.22 | 0.57295 |
| 12 | -424.49645 | 1.510 | 1.72186 | 28.91 | 0.60113 |
| 13 | 61.07419 | 1.500 | | | |
| 14 | 98.63832 | 1.500 | 1.91717 | 19.14 | 0.63501 |
| 15 | 21.08130 | 7.000 | | | |
| 16 (St) | ∞ | DD[16] | | | |
| 17 | -22.42941 | 1.100 | 1.58780 | 39.22 | 0.57813 |
| 18 | 23.14403 | 7.400 | 1.88300 | 39.22 | 0.57295 |
| 19 | -31.61388 | 1.000 | | | |
| *20 | -33.94641 | 1.800 | 1.61724 | 36.28 | 0.58403 |
| *21 | 173.48601 | 0.100 | | | |
| 22 | 47.71113 | 7.271 | 1.81834 | 46.17 | 0.55821 |
| 23 | -26.72012 | 1.210 | 1.69584 | 30.30 | 0.60324 |
| 24 | -56.34422 | DD[24] | | | |
| 25 | ∞ | 2.850 | 1.51680 | 64.20 | 0.53430 |
| 26 | ∞ | 1.000 | | | |

TABLE 64

| | |
|---|---|
| f | 48.498 |
| FNo. | 1.03 |
| 2ωmax | 32.6 |

TABLE 65

| | Infinity | 0.6 m |
|---|---|---|
| DD[16] | 10.100 | 4.816 |
| DD[24] | 14.400 | 19.684 |

TABLE 66

| Sn | 20 | 21 |
|---|---|---|
| KA | 1.0000000E+00 | 1.0000000E+00 |
| A3 | 0.0000000E+00 | 0.0000000E+00 |
| A4 | -2.3773046E-05 | 3.0929722E-06 |
| A5 | 5.6674484E-06 | 4.8487684E-06 |
| A6 | 5.6970844E-08 | -5.0456910E-07 |
| A7 | -1.9176909E-07 | 1.5258010E-08 |
| A8 | 1.9626233E-08 | 6.7914018E-09 |
| A9 | 2.9049337E-09 | -1.5524880E-09 |
| A10 | -6.6057808E-10 | -1.1339723E-11 |
| A11 | -1.9889473E-11 | 2.4115890E-11 |
| A12 | 1.0577029E-11 | -4.6114184E-13 |
| A13 | 7.5098137E-15 | -1.8660180E-13 |
| A14 | -9.7929627E-14 | 3.8327989E-15 |
| A15 | 7.5328476E-16 | 7.9224149E-16 |
| A16 | 5.3398130E-16 | -7.7601860E-18 |
| A17 | -4.2992770E-18 | -1.7504256E-18 |
| A18 | -1.5949215E-18 | -2.1972718E-20 |
| A19 | 7.7287369E-21 | 1.5807498E-21 |
| A20 | 2.0144963E-21 | 7.7734912E-23 |

Example 18

Figure 40:
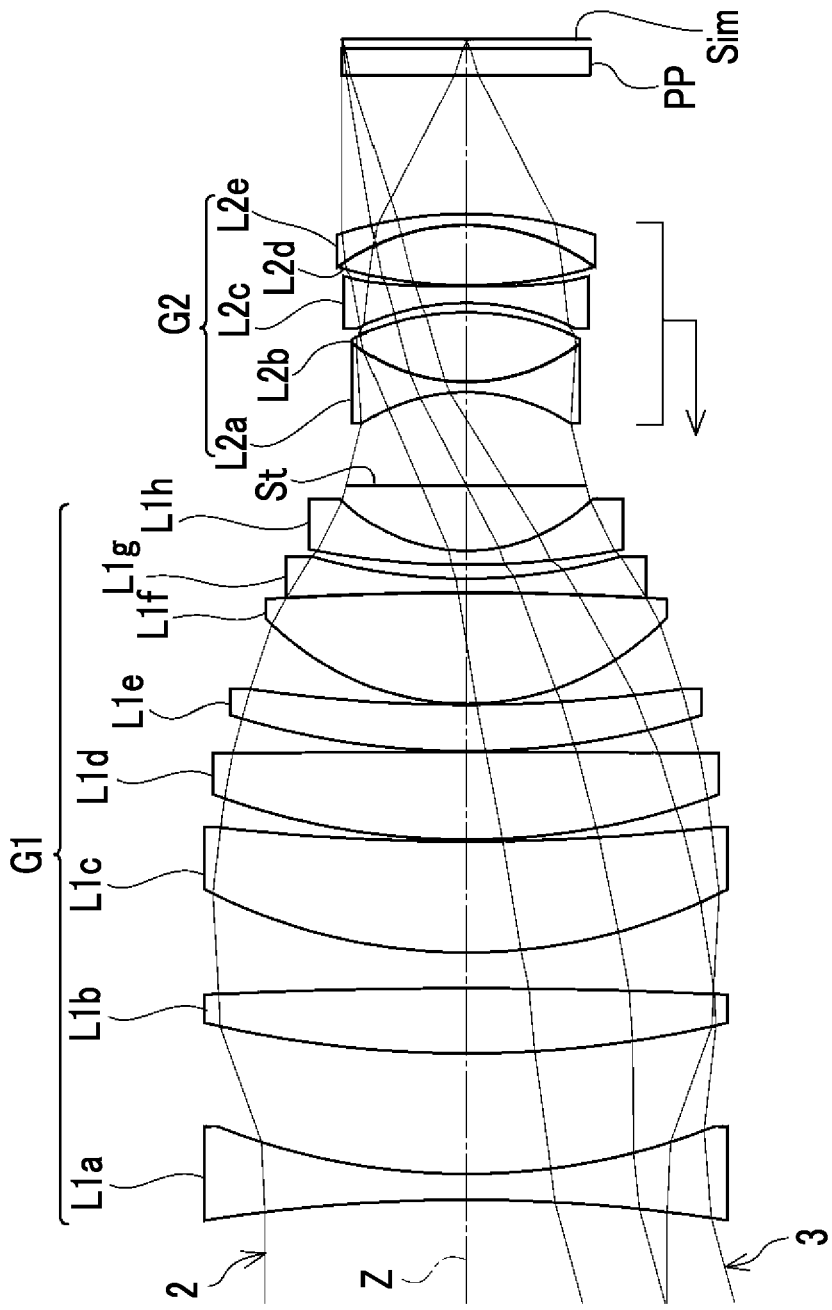
FIG. 40 is a cross-sectional view showing a configuration and rays of an imaging lens according to Example 18 of the present disclosure.

FIG. 40 shows a cross-sectional configuration of the imaging lens of Example 18. The imaging lens of Example 18 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of eight lenses L1a to L1h in order from the object side. The second lens group G2 consists of five lenses L2a to L2e in order from the object side.

Figure 55:
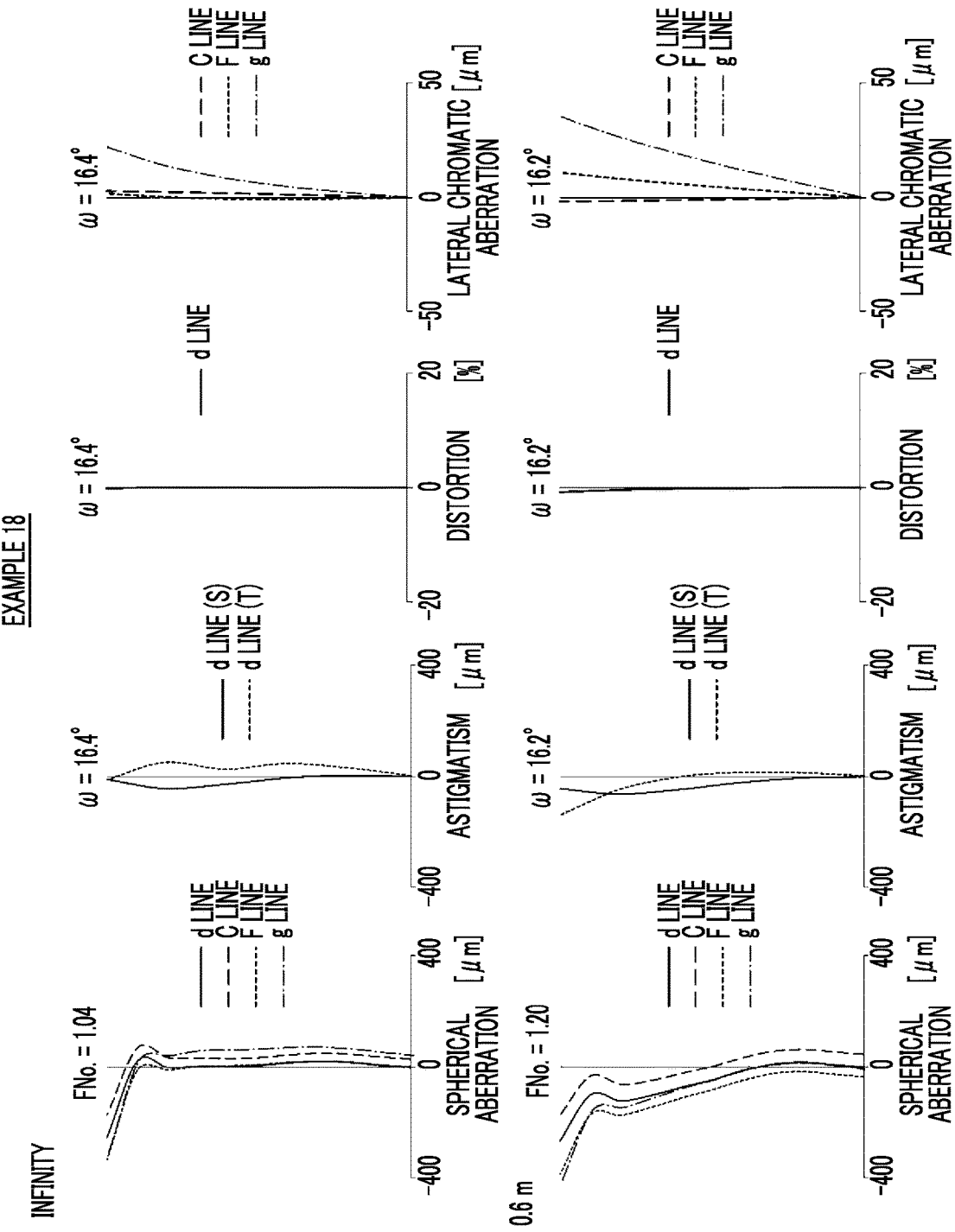
FIG. 55 shows spherical aberration diagrams, astigmatism diagrams, distortion diagrams, lateral chromatic aberration diagrams of the imaging lens of Example 18 of the present disclosure.
Figure 56:
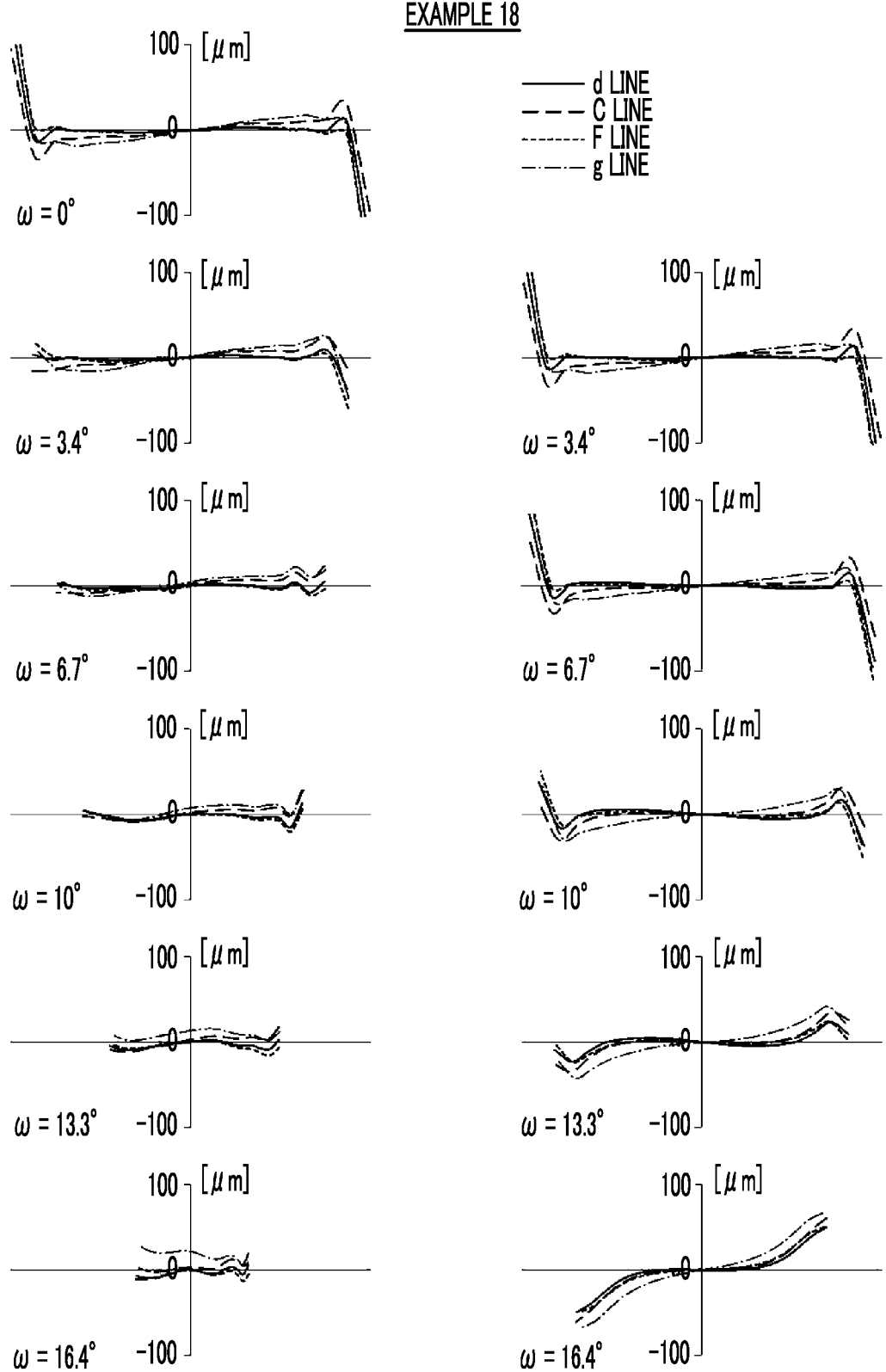
FIG. 56 is a lateral aberration diagram of the imaging lens according to Example 18 of the present disclosure.

Regarding the imaging lens of Example 18, Table 67 shows basic lens data, Table 68 shows specification, Table 69 shows variable surface distances, Table 70 shows aspheric surface coefficients, and FIGS. 55 and 56 show aberration diagrams. In FIG. 55, the upper part shows aberration diagrams in a state where the object at infinity is in focus, and the lower part shows aberration diagrams in a state where the object at the distance of 0.6 m (meter) from the object to the image plane Sim is in focus. FIG. 56 shows lateral aberration diagram in a state where

TABLE 67

| Sn | R | D | Nd | vd | θgF |
|---|---|---|---|---|---|
| 1 | -204.30501 | 2.800 | 1.81294 | 24.35 | 0.61887 |
| 2 | 81.96794 | 13.010 | | | |
| 3 | 137.60012 | 7.000 | 2.10420 | 17.02 | 0.66311 |
| 4 | -656.31103 | 3.750 | | | |
| 5 (Hm) | 69.54614 | 12.000 | 1.57265 | 62.21 | 0.54137 |
| 6 | 267.60481 | 0.193 | | | |
| 7 | 88.85695 | 9.422 | 1.43875 | 94.66 | 0.53402 |
| 8 | -2937.87944 | 0.100 | | | |
| 9 | 96.07701 | 5.000 | 1.43875 | 94.66 | 0.53402 |
| 10 | 181.83582 | 0.100 | | | |
| 11 | 33.17157 | 12.000 | 1.88300 | 39.22 | 0.57295 |
| 12 | -374.98026 | 1.510 | 1.76530 | 26.82 | 0.60713 |
| 13 | 66.58003 | 1.500 | | | |
| 14 | 97.44593 | 1.500 | 1.96720 | 17.42 | 0.64384 |
| 15 | 21.58463 | 7.000 | | | |
| 16 (St) | ∞ | DD[16] | | | |
| 17 | -22.85203 | 1.100 | 1.56026 | 43.70 | 0.57003 |
| 18 | 22.46642 | 7.400 | 1.88300 | 39.22 | 0.57295 |
| 19 | -31.83440 | 1.000 | | | |
| *20 | -30.58326 | 1.800 | 1.66113 | 32.78 | 0.59162 |
| *21 | 340.35421 | 0.100 | | | |
| 22 | 55.88143 | 6.486 | 1.81271 | 42.14 | 0.56732 |
| 23 | -26.29030 | 1.210 | 1.70642 | 29.68 | 0.60465 |
| 24 | -49.33676 | DD[24] | | | |
| 25 | ∞ | 2.850 | 1.51680 | 64.20 | 0.53430 |
| 26 | ∞ | 1.000 | | | |

TABLE 68

| | |
|---|---|
| f | 48.220 |
| FNo. | 1.04 |
| 2ωmax | 32.8 |

TABLE 69

| | Infinity | 0.6 m |
|---|---|---|
| DD[16] | 10.100 | 4.858 |
| DD[24] | 14.973 | 20.215 |

TABLE 70

| Sn | 20 | 21 |
|---|---|---|
| KA | 1.0000000E+00 | 1.0000000E+00 |
| A3 | 0.0000000E+00 | 0.0000000E+00 |
| A4 | −2.1813953E−05 | 5.6632078E−06 |
| A5 | 5.5899615E−06 | 4.4402595E−06 |
| A6 | 8.3363623E−08 | −4.7071845E−07 |
| A7 | −1.9184059E−07 | 1.5982530E−08 |
| A8 | 1.9586298E−08 | 6.7572477E−09 |
| A9 | 2.8981856E−09 | −1.5590421E−09 |
| A10 | −6.6105638E−10 | −1.1726148E−11 |
| A11 | −1.9888631E−11 | 2.4116692E−11 |
| A12 | 1.0581175E−11 | −4.5950671E−13 |
| A13 | 8.0018964E−15 | −1.8648724E−13 |
| A14 | −9.7926487E−14 | 3.8358049E−15 |
| A15 | 7.5055780E−16 | 7.9215688E−16 |
| A16 | 5.3398130E−16 | −7.7662214E−18 |
| A17 | −4.2992770E−18 | −1.7496474E−18 |
| A18 | −1.5949215E−18 | −2.1852378E−20 |
| A19 | 7.7287369E−21 | 1.5557319E−21 |
| A20 | 2.0144963E−21 | 7.8155637E−23 |

Example 19

Figure 41:
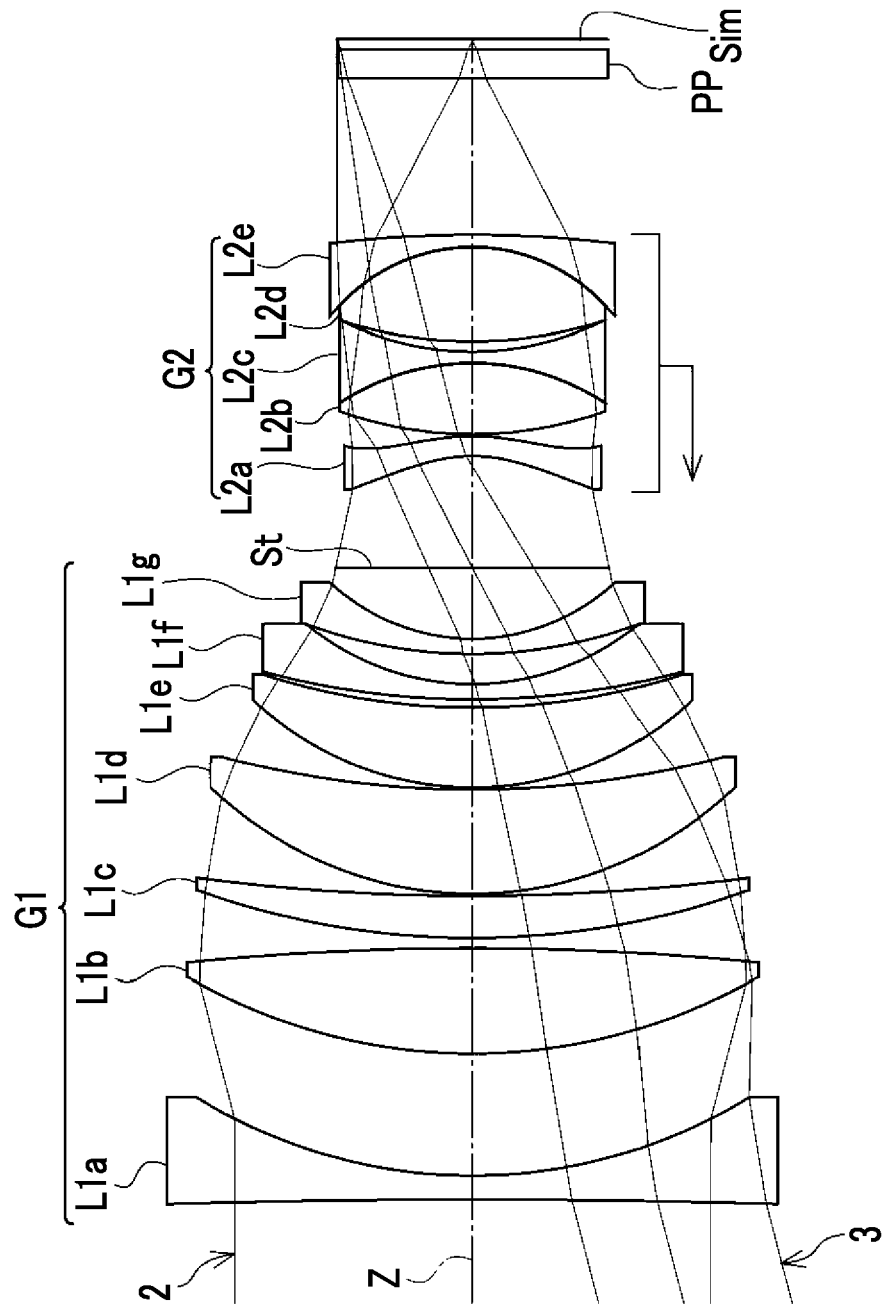
FIG. 41 is a cross-sectional view showing a configuration and rays of an imaging lens according to Example 19 of the present disclosure.

FIG. 41 shows a cross-sectional configuration of the imaging lens of Example 19. The imaging lens of Example 19 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 57:
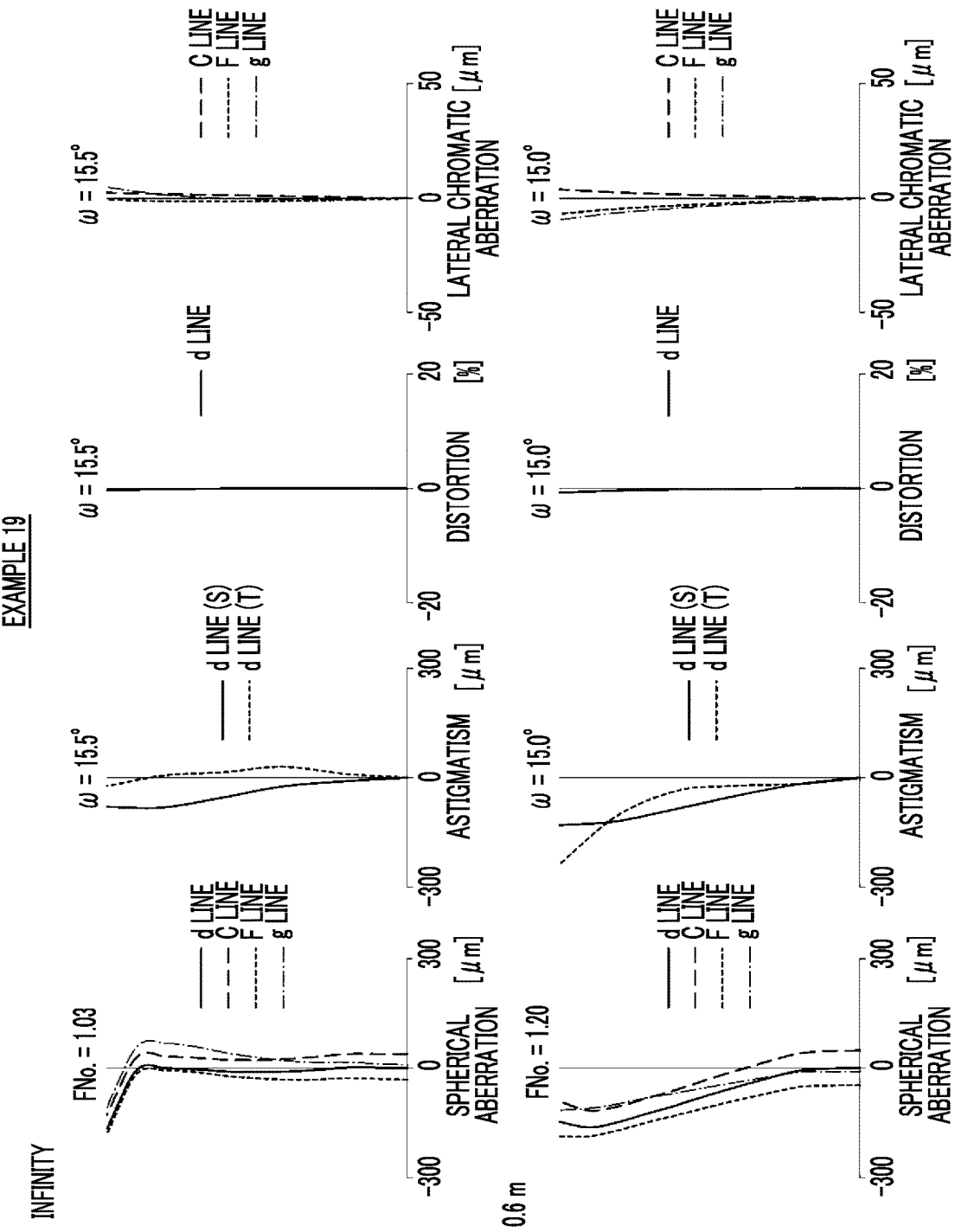
FIG. 57 shows spherical aberration diagrams, astigmatism diagrams, distortion diagrams, lateral chromatic aberration diagrams of the imaging lens of Example 19 of the present disclosure.
Figure 58:
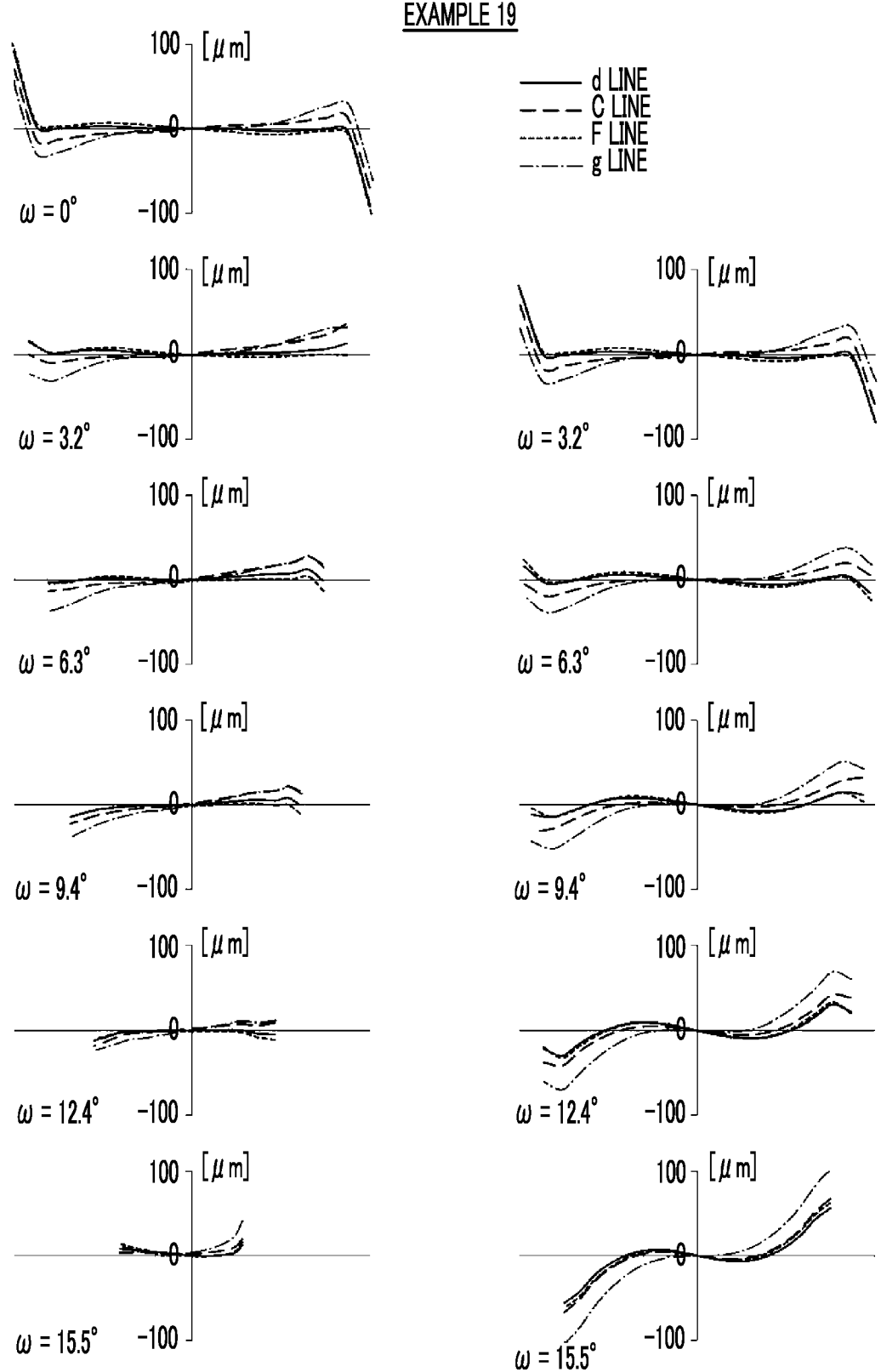
FIG. 58 is a lateral aberration diagram of the imaging lens according to Example 19 of the present disclosure.

Regarding the imaging lens of Example 19, Table 71 shows basic lens data, Table 72 shows specification, Table 73 shows variable surface distances, Table 74 shows aspheric surface coefficients, and FIGS. 57 and 58 show aberration diagrams. In FIG. 57, the upper part shows aberration diagrams in a state where the object at infinity is in focus, and the lower part shows aberration diagrams in a state where the object at the distance of 0.6 m (meter) from the object to the image plane Sim is in focus. FIG. 58 shows lateral aberration diagram in a state where

TABLE 71

| Sn | R | D | Nd | νd | θgF |
|---|---|---|---|---|---|
| 1 | −1250.00000 | 2.400 | 1.50911 | 53.29 | 0.55329 |
| 2 | 58.56667 | 12.004 | | | |
| 3 (Hm) | 63.53662 | 10.300 | 1.55032 | 75.50 | 0.54001 |
| 4 | −324.18577 | 1.010 | | | |
| 5 | 91.24308 | 4.145 | 1.55032 | 75.50 | 0.54001 |
| 6 | 237.79601 | 0.200 | | | |
| 7 | 41.36102 | 10.250 | 1.59282 | 68.62 | 0.54414 |
| 8 | 108.29456 | 0.200 | | | |
| 9 | 35.06677 | 7.900 | 2.00069 | 25.46 | 0.61364 |
| 10 | 76.31696 | 0.806 | | | |
| 11 | 90.22442 | 1.500 | 1.78880 | 28.43 | 0.60092 |
| 12 | 28.87926 | 2.968 | | | |
| 13 | 53.65263 | 1.500 | 1.89286 | 20.36 | 0.63944 |
| 14 | 23.13445 | 7.000 | | | |
| 15 (St) | ∞ | DD[15] | | | |
| *16 | −16.70584 | 1.943 | 1.68948 | 31.02 | 0.59874 |
| *17 | −24.50468 | 0.200 | | | |
| 18 | 44.48608 | 6.995 | 1.88300 | 39.22 | 0.57295 |
| 19 | −26.79392 | 1.110 | 1.71036 | 29.48 | 0.59958 |
| 20 | 33.02652 | 1.005 | | | |
| 21 | 48.60027 | 9.237 | 1.85150 | 40.78 | 0.56958 |
| 22 | −19.88726 | 1.210 | 1.56738 | 42.37 | 0.57237 |
| 23 | −131.23867 | DD[23] | | | |
| 24 | ∞ | 2.850 | 1.51680 | 64.20 | 0.53430 |
| 25 | ∞ | 1.000 | | | |

TABLE 72

| f | 51.521 |
|---|---|
| FNo. | 1.03 |
| 2ωmax | 31.0 |

TABLE 73

| | Infinity | 0.6 m |
|---|---|---|
| DD[15] | 11.000 | 5.534 |
| DD[23] | 15.401 | 20.867 |

TABLE 74

| Sn | 16 | 17 |
|---|---|---|
| KA | 1.0000000E+00 | 1.0000000E+00 |
| A3 | 0.0000000E+00 | 0.0000000E+00 |
| A4 | 7.0570380E−05 | 6.6014243E−05 |
| A5 | 1.9198543E−05 | 1.9606733E−05 |
| A6 | −3.3289534E−06 | −4.2582967E−06 |
| A7 | −9.0333134E−08 | 1.4153915E−07 |
| A8 | 9.0099971E−08 | 9.0936965E−08 |
| A9 | −4.1396511E−09 | −1.1106603E−08 |
| A10 | −1.4390577E−09 | −8.1411034E−10 |
| A11 | 1.2641084E−10 | 1.9638299E−10 |
| A12 | 1.3445189E−11 | 1.0722851E−12 |
| A13 | −1.7282916E−12 | −1.7929595E−12 |
| A14 | −6.2059351E−14 | 3.9257132E−14 |
| A15 | 1.2881202E−14 | 9.2275563E−15 |
| A16 | 2.3758855E−17 | −3.3269509E−16 |
| A17 | −5.0325955E−17 | −2.5409216E−17 |
| A18 | 9.0421501E−19 | 1.1130994E−18 |
| A19 | 8.0548323E−20 | 2.9170042E−20 |
| A20 | −2.4717980E−21 | −1.3898997E−21 |

Example 20

Figure 42:
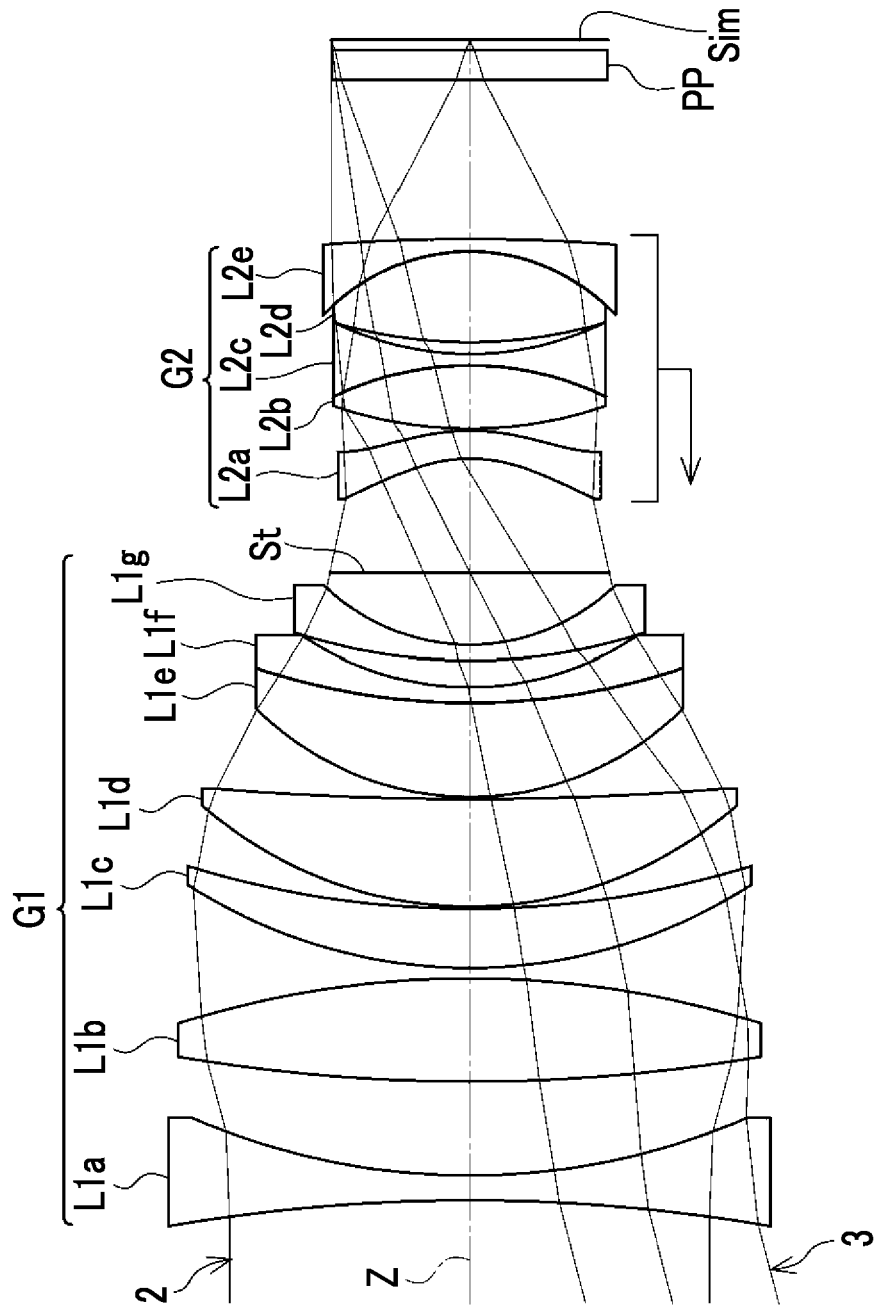
FIG. 42 is a cross-sectional view showing a configuration and rays of an imaging lens according to Example 20 of the present disclosure.

FIG. 42 shows a cross-sectional configuration of the imaging lens of Example 20. The imaging lens of Example 20 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 59:
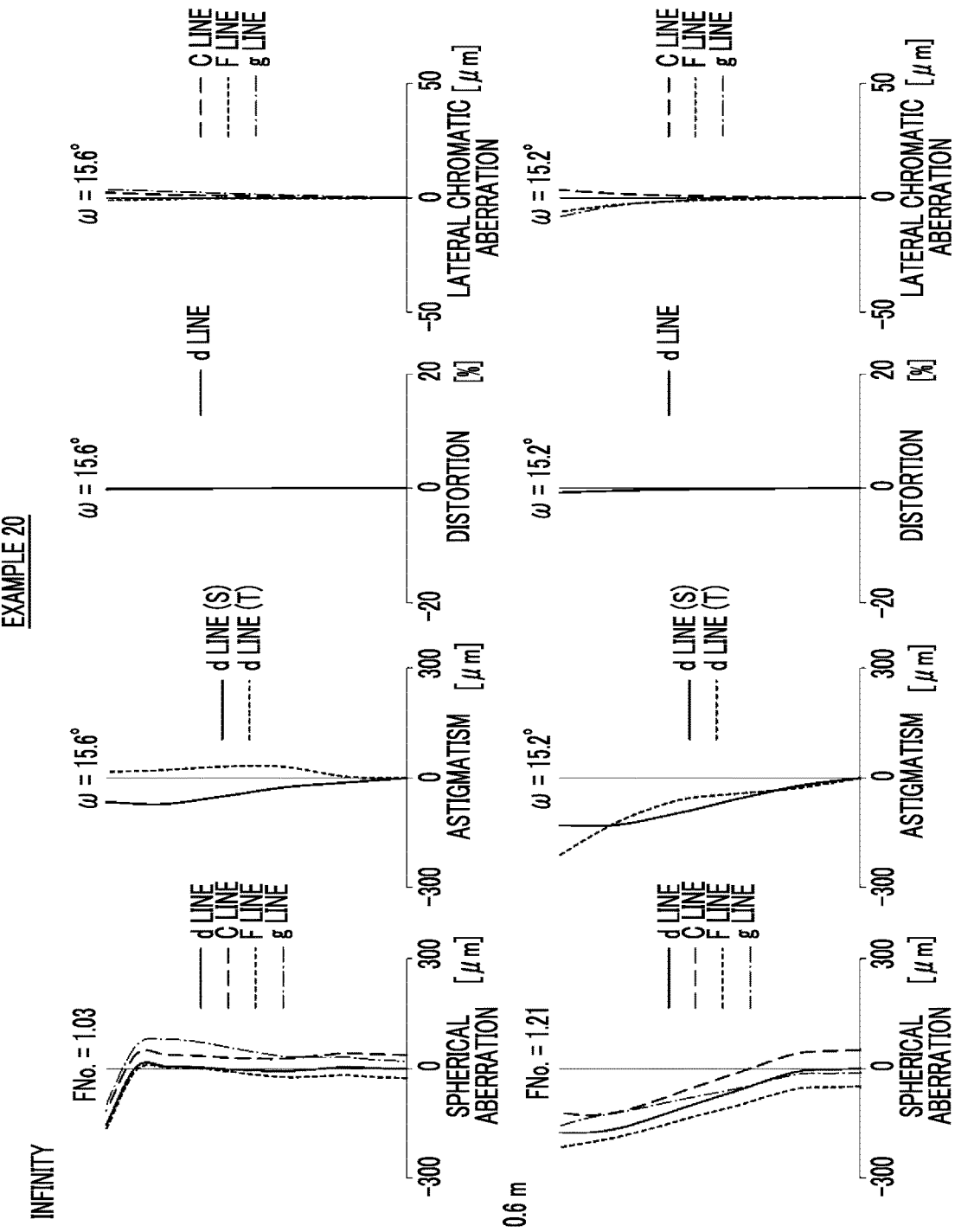
FIG. 59 shows spherical aberration diagrams, astigmatism diagrams, distortion diagrams, lateral chromatic aberration diagrams of the imaging lens of Example 20 of the present disclosure.

Regarding the imaging lens of Example 20, Table 75 shows basic lens data, Table 76 shows specification, Table 77 shows variable surface distances, Table 78 shows aspheric surface coefficients, and FIGS. 59 and 60 show aberration diagrams. In FIG. 59, the upper part shows aberration diagrams in a state where the object at infinity is in focus, and the lower part shows aberration diagrams in a state where the object at the distance of 0.6 m (meter) from the object to the image plane Sim is in focus. FIG. 60 shows lateral aberration diagram in a state where

TABLE 75

| Sn | R | D | Nd | vd | θgF |
|---|---|---|---|---|---|
| 1 | −193.76114 | 2.400 | 1.54760 | 46.08 | 0.56589 |
| 2 | 75.97796 | 9.081 | | | |
| 3 | 189.01581 | 10.000 | 1.49700 | 81.61 | 0.53887 |
| 4 | −105.13621 | 1.010 | | | |
| 5 (Hm) | 56.49917 | 5.721 | 1.92119 | 23.96 | 0.62025 |
| 6 | 104.36406 | 0.200 | | | |
| 7 | 43.70727 | 10.385 | 1.49700 | 81.61 | 0.53887 |
| 8 | 340.80096 | 0.200 | | | |
| 9 | 32.58246 | 9.094 | 1.75819 | 43.78 | 0.56631 |
| 10 | 73.72282 | 1.500 | 1.78472 | 25.68 | 0.61052 |
| 11 | 32.68245 | 2.542 | | | |
| 12 | 61.75401 | 1.500 | 1.89286 | 20.36 | 0.63944 |
| 13 | 22.41400 | 7.000 | | | |
| 14 (St) | ∞ | DD[14] | | | |
| *15 | −16.41866 | 2.693 | 1.68948 | 31.02 | 0.59874 |
| *16 | −22.85517 | 0.200 | | | |
| 17 | 45.64284 | 6.105 | 1.88300 | 39.22 | 0.57295 |
| 18 | −33.87303 | 1.110 | 1.68877 | 30.80 | 0.59625 |
| 19 | 33.14697 | 1.132 | | | |
| 20 | 52.16226 | 8.770 | 1.88300 | 39.22 | 0.57295 |
| 21 | −21.44050 | 1.210 | 1.59203 | 38.80 | 0.57897 |
| 22 | −202.15701 | DD[22] | | | |
| 23 | ∞ | 2.850 | 1.51680 | 64.20 | 0.53430 |
| 24 | ∞ | 1.000 | | | |

TABLE 76

| f | 51.018 |
|---|---|
| FNo. | 1.03 |
| 2ωmax | 31.2 |

TABLE 77

| | Infinity | 0.6 m |
|---|---|---|
| DD[14] | 11.000 | 5.539 |
| DD[22] | 15.401 | 20.862 |

TABLE 78

| Sn | 15 | 16 |
|---|---|---|
| KA | 1.0000000E+00 | 1.0000000E+00 |
| A3 | 0.0000000E+00 | 0.0000000E+00 |
| A4 | 2.5050662E−05 | 2.1927553E−05 |
| A5 | 1.6399123E−05 | 1.6962214E−05 |
| A6 | −2.7037336E−06 | −3.5614573E−06 |
| A7 | 2.2716407E−08 | 1.6637583E−07 |
| A8 | 7.0481328E−08 | 7.6462842E−08 |
| A9 | −7.0934969E−09 | −1.1129036E−08 |
| A10 | −9.1743883E−10 | −5.7804163E−10 |
| A11 | 1.7293397E−10 | 1.9360903E−10 |
| A12 | 5.1834973E−12 | −1.4806257E−12 |
| A13 | −2.1727289E−12 | −1.7572338E−12 |
| A14 | 1.7187231E−14 | 5.7682678E−14 |
| A15 | 1.5404695E−14 | 9.0145899E−15 |
| A16 | −4.2947569E−16 | −4.1936383E−16 |
| A17 | −5.8157492E−17 | −2.4764768E−17 |
| A18 | 2.3258567E−18 | 1.3542989E−18 |
| A19 | 9.0773374E−20 | 2.8368189E−20 |
| A20 | −4.3526649E−21 | −1.6904315E−21 |

Tables 79 to 83 show values corresponding to Conditional Expressions (1) to (32) of the imaging lenses of Examples 1 to 20. In Examples 1 to 20, the d line is set as the reference wavelength. Tables 79 to 83 show the values based on the d line.

TABLE 79

| Expression Number | | Example 1 | Example 2 | Example 3 | Example 4 |
|---|---|---|---|---|---|
| (1) | H1max/H1f | 1.566 | 1.554 | 1.567 | 1.575 |
| (2) | H1max/H2f | 2.367 | 2.359 | 2.419 | 2.338 |
| (3) | (Rso + Rsi)/(Rso − Rsi) | 0.152 | 0.093 | 0.302 | 0.14 |
| (4) | β2 | 0.523 | 0.527 | 0.55 | 0.548 |
| (5) | $(1 - \beta2^2) \times \beta r^2$ | 0.821 | 0.823 | 0.789 | 0.818 |
| (6) | v1p − v1n | 13.61 | 11.433 | 12.783 | 14.652 |
| (7) | θ1n − θ1p | 0.03318 | 0.00010 | 0.02809 | 0.03422 |
| (8) | v2p − v2n | 12.345 | 13.1 | 9.4 | 9.715 |
| (9) | θ2n − θ2p | 0.03600 | 0.03833 | 0.03026 | 0.02792 |
| (10) | f1/f2 | 1.83 | 1.807 | 1.701 | 1.301 |
| (11) | f/f1 | 0.556 | 0.562 | 0.584 | 0.593 |
| (12) | f/f2 | 1.017 | 1.015 | 0.994 | 1.031 |
| (13) | P1/D12 | −0.147 | −0.142 | −0.098 | −0.117 |
| (14) | θ1max | 0.66558 | 0.64514 | 0.66558 | 0.65993 |
| (15) | θ2max | 0.57295 | 0.56835 | 0.57295 | 0.57295 |
| (16) | θ1p − θ1n + 0.00163 × (v1p − v1n) | −0.01134 | 0.00079 | −0.00725 | −0.01033 |
| (17) | θ2p − θ2n + 0.00163 × (v2p − v2n) | −0.01582 | −0.01697 | −0.01494 | −0.01208 |
| (18) | Nce1Ap − Nce1An | −0.05110 | −0.08800 | 0.02407 | 0.26269 |
| (19) | vce1Ap − vce1An | 11.39 | 18.9 | 16.49 | −6.87 |
| (20) | Nce1Bp − Nce1Bn | 0.15255 | 0.10205 | 0.27958 | — |
| (21) | vce1Bp − vce1Bn | 10.65 | 4.84 | 1.19 | — |
| (22) | Nce1Cp − Nce1Cn | −0.01774 | 0.01699 | 0.02771 | −0.04735 |
| (23) | vce1Cp − vce1Cn | 27.15 | 22.26 | 24.98 | 28.42 |
| (24) | Nce1Dp − Nce1Dn | 0.08130 | 0.08775 | 0.01500 | 0.11705 |
| (25) | vce1Dp − vce1Dn | 19.26 | 18.16 | 24.02 | 16.49 |
| (26) | Nce2p − Nce2n | 0.15055 | 0.14440 | 0.17790 | 0.06478 |
| (27) | vce2p − vce2n | 12.79 | 13.545 | 9.845 | 17.24 |
| (28) | f/fr | −0.125 | −0.133 | −0.125 | −0.157 |
| (29) | TL × FNo/f | 4.342 | 4.324 | 4.317 | 4.117 |

TABLE 79-continued

| Expression Number | | Example 1 | Example 2 | Example 3 | Example 4 |
|---|---|---|---|---|---|
| (30) | $1/\{\tan((\omega max) \times FNo\}$ | 2.108 | 2.112 | 2.099 | 2.089 |
| (31) | Tf/TL | 0.671 | 0.677 | 0.678 | 0.647 |
| (32) | f/fm | — | — | — | 0.571 |

TABLE 80

| Expression Number | | Example 5 | Example 6 | Example 7 | Example 8 |
|---|---|---|---|---|---|
| (1) | H1max/H1f | 1.616 | 1.656 | 1.614 | 1.543 |
| (2) | H1max/H2f | 2.052 | 2.103 | 2.371 | 2.273 |
| (3) | (Rso + Rsi)/(Rso − Rsi) | −0.036 | −0.058 | −0.023 | −0.05 |
| (4) | $\beta 2$ | 0.67 | 0.381 | 0.509 | 0.496 |
| (5) | $(1 - \beta 2^2) \times \beta r^2$ | 0.552 | 0.855 | 0.741 | 0.754 |
| (6) | $v1p - v1n$ | 5.737 | 9.497 | 6.517 | 5.684 |
| (7) | $\theta 1n - \theta 1p$ | 0.00254 | 0.00683 | 0.00608 | 0.01134 |
| (8) | $v2p - v2n$ | 10.045 | 6.18 | 8.667 | 9.802 |
| (9) | $\theta 2n - \theta 2p$ | 0.02516 | 0.02229 | 0.02600 | 0.01509 |
| (10) | f1/f2 | 2.542 | 2.534 | 1.802 | 1.852 |
| (11) | f/f1 | 0.401 | 0.381 | 0.509 | 0.496 |
| (12) | f/f2 | 1.021 | 0.965 | 0.917 | 0.918 |
| (13) | P1/D12 | −0.714 | 6.791 | −0.003 | −0.05 |
| (14) | $\theta 1max$ | 0.65993 | 0.65515 | 0.64538 | 0.63657 |
| (15) | $\theta 2max$ | 0.60104 | 0.60123 | 0.60899 | 0.59467 |
| (16) | $\theta 1p - \theta 1n + 0.00163 \times (v1p - v1n)$ | 0.00479 | 0.00865 | 0.00454 | −0.00208 |
| (17) | $\theta 2p - \theta 2n + 0.00163 \times (v2p - v2n)$ | −0.00879 | −0.01222 | −0.01154 | 0.00088 |
| (18) | Nce1Ap − Nce1An | 0.29893 | 0.26768 | — | — |
| (19) | vce1Ap − vce1An | −22.55 | −13.87 | — | — |
| (20) | Nce1Bp − Nce1Bn | — | 0.30269 | — | — |
| (21) | vce1Bp − vce1Bn | — | −17.12 | — | — |
| (22) | Nce1Cp − Nce1Cn | −0.35853 | −0.36443 | −0.37040 | −0.36336 |
| (23) | vce1Cp − vce1Cn | 35.41 | 41.81 | 41.13 | 29.04 |
| (24) | Nce1Dp − Nce1Dn | 0.05058 | −0.06948 | 0.11034 | 0.14285 |
| (25) | vce1Dp − vce1Dn | 19.94 | 12.96 | 14.18 | 5.13 |
| (26) | Nce2p − Nce2n | — | — | — | — |
| (27) | vce2p − vce2n | — | — | — | — |
| (28) | f/fr | — | — | — | — |
| (29) | TL × FNo/f | 4.586 | 4.655 | 4.367 | 4.381 |
| (30) | $1/\{\tan((\omega max) \times FNo\}$ | 2.055 | 2.055 | 2.071 | 2.128 |
| (31) | Tf/TL | 0.663 | 0.666 | 0.663 | 0.670 |
| (32) | f/fm | — | — | — | — |

TABLE 81

| Expression Number | | Example 9 | Example 10 | Example 11 | Example 12 |
|---|---|---|---|---|---|
| (1) | H1max/H1f | 1.589 | 1.581 | 1.554 | 1.158 |
| (2) | H1max/H2f | 2.339 | 2.342 | 2.402 | 2.429 |
| (3) | (Rso + Rsi)/(Rso − Rsi) | −0.059 | −0.13 | 0.288 | 0.175 |
| (4) | $\beta 2$ | 0.52 | 0.583 | 0.557 | 0.424 |
| (5) | $(1 - \beta 2^2) \times \beta r^2$ | 0.729 | 0.645 | 0.779 | 0.692 |
| (6) | $v1p - v1n$ | 10.823 | 14.652 | 10.994 | 35.249 |
| (7) | $\theta 1n - \theta 1p$ | 0.02631 | 0.03422 | 0.02435 | 0.05995 |
| (8) | $v2p - v2n$ | −6.665 | 9.715 | 9.4 | 1.943 |
| (9) | $\theta 2n - \theta 2p$ | −0.00620 | 0.02792 | 0.03026 | 0.00891 |
| (10) | f1/f2 | 1.749 | 1.511 | 1.67 | 3.231 |
| (11) | f/f1 | 0.52 | 0.576 | 0.592 | 0.389 |
| (12) | f/f2 | 0.91 | 0.87 | 0.989 | 1.258 |
| (13) | P1/D12 | −0.146 | 4.258 | −0.077 | −2.848 |
| (14) | $\theta 1max$ | 0.65515 | 0.65993 | 0.66558 | 0.64514 |
| (15) | $\theta 2max$ | 0.5964 | 0.57295 | 0.57295 | 0.59015 |
| (16) | $\theta 1p - \theta 1n + 0.00163 \times (v1p - v1n)$ | −0.00867 | −0.01033 | 0.00345 | −0.00250 |
| (17) | $\theta 2p - \theta 2n + 0.00163 \times (v2p - v2n)$ | −0.00466 | −0.01208 | −0.01494 | −0.00574 |

TABLE 81-continued

| Expression Number | | Example 9 | Example 10 | Example 11 | Example 12 |
|---|---|---|---|---|---|
| (18) | Nce1Ap − Nce1An | 0.05617 | 0.26269 | 0.02404 | — |
| (19) | νce1Ap − νce1An | −2.46 | −6.87 | 16.49 | — |
| (20) | Nce1Bp − Nce1Bn | — | — | 0.27958 | — |
| (21) | νce1Bp − νce1Bn | — | — | 1.19 | — |
| (22) | Nce1Cp − Nce1Cn | −0.20160 | −0.04735 | 0.02771 | — |
| (23) | νce1Cp − νce1Cn | 36.58 | 28.42 | 24.98 | — |
| (24) | Nce1Dp − Nce1Dn | −0.01829 | 0.11705 | −0.00020 | −0.31951 |
| (25) | νce1Dp − νce1Dn | 23.33 | 16.49 | 24.81 | 40.75 |
| (26) | Nce2p − Nce2n | — | 0.06478 | 0.17790 | — |
| (27) | νce2p − νce2n | — | 17.24 | 9.845 | — |
| (28) | f/fr | — | 0.017 | −0.125 | 0.266 |
| (29) | TL × FNo/f | 4.310 | 4.140 | 4.317 | 2.246 |
| (30) | $1/\{\tan((\omega\max) \times FNo\}$ | 2.092 | 2.116 | 2.092 | 3.555 |
| (31) | Tf/TL | 0.669 | 0.649 | 0.678 | 0.544 |
| (32) | f/fm | — | 0.562 | — | 0.859 |

TABLE 82

| Expression Number | | Example 13 | Example 14 | Example 15 | Example 16 |
|---|---|---|---|---|---|
| (1) | H1max/H1f | 1.219 | 1.170 | 1.117 | 1.144 |
| (2) | H1max/H2f | 2.488 | 2.443 | 2.359 | 2.398 |
| (3) | (Rso + Rsi)/(Rso − Rsi) | 0.243 | 0.311 | −0.019 | 0.187 |
| (4) | β2 | 0.422 | 0.433 | 0.458 | 0.423 |
| (5) | $(1 − \beta2^2) \times \beta r^2$ | 0.822 | 0.813 | 0.790 | 0.821 |
| (6) | ν1p − ν1n | 34.989 | 20.441 | 24.303 | 23.266 |
| (7) | θ1n − θ1p | 0.06102 | 0.03674 | 0.04269 | 0.03902 |
| (8) | ν2p − ν2n | 1.347 | 6.687 | 5.340 | 4.757 |
| (9) | θ2n − θ2p | 0.00644 | 0.02333 | 0.02220 | 0.01618 |
| (10) | f1/f2 | 3.288 | 3.281 | 3.122 | 3.457 |
| (11) | f/f1 | 0.422 | 0.433 | 0.458 | 0.423 |
| (12) | f/f2 | 1.386 | 1.419 | 1.430 | 1.461 |
| (13) | P1/D12 | −2.287 | −3.139 | −2.274 | −2.479 |
| (14) | θ1max | 0.63900 | 0.65993 | 0.66558 | 0.63944 |
| (15) | θ2max | 0.59952 | 0.57295 | 0.57295 | 0.57720 |
| (16) | θ1p − θ1n + 0.00163 × (ν1p − ν1n) | −0.00399 | −0.00342 | −0.00308 | −0.00110 |
| (17) | θ2p − θ2n + 0.00163 × (ν2p − ν2n) | −0.00424 | −0.01243 | −0.01350 | −0.00843 |
| (18) | Nce1Ap − Nce1An | — | — | — | — |
| (19) | νce1Ap − νce1An | — | — | — | — |
| (20) | Nce1Bp − Nce1Bn | — | — | — | — |
| (21) | νce1Bp − νce1Bn | — | — | — | — |
| (22) | Nce1Cp − Nce1Cn | — | — | — | — |
| (23) | νce1Cp − νce1Cn | — | — | — | — |
| (24) | Nce1Dp − Nce1Dn | −0.30936 | −0.10486 | −0.02216 | −0.09219 |
| (25) | νce1Dp − νce1Dn | 41.43 | 27.16 | 20.37 | 31.19 |
| (26) | Nce2p − Nce2n | — | — | — | — |
| (27) | νce2p − νce2n | — | — | — | — |
| (28) | f/fr | — | — | — | — |
| (29) | TL × FNo/f | 2.417 | 2.293 | 2.225 | 2.230 |
| (30) | $1/\{\tan((\omega\max) \times FNo\}$ | 3.375 | 3.448 | 3.330 | 3.462 |
| (31) | Tf/TL | 0.576 | 0.547 | 0.534 | 0.540 |
| (32) | f/fm | 0.803 | 0.872 | 0.825 | 0.860 |

TABLE 83

| Expression Number | | Example 17 | Example 18 | Example 19 | Example 20 |
|---|---|---|---|---|---|
| (1) | H1max/H1f | 1.168 | 1.211 | 1.110 | 1.146 |
| (2) | H1max/H2f | 2.499 | 2.532 | 2.334 | 2.409 |
| (3) | (Rso + Rsi)/(Rso − Rsi) | −0.031 | −0.029 | 0.161 | 0.154 |
| (4) | β2 | 0.499 | 0.488 | 0.398 | 0.420 |
| (5) | $(1 − \beta2^2) \times \beta r^2$ | 0.751 | 0.762 | 0.842 | 0.823 |
| (6) | ν1p − ν1n | 29.131 | 38.691 | 27.243 | 27.033 |
| (7) | θ1n − θ1p | 0.04824 | 0.05419 | 0.03843 | 0.03921 |

TABLE 83-continued

| Expression Number | | Example 17 | Example 18 | Example 19 | Example 20 |
|---|---|---|---|---|---|
| (8) | $\nu2p - \nu2n$ | 7.428 | 5.293 | 5.710 | 5.680 |
| (9) | $\theta2n - \theta2p$ | 0.02289 | 0.01863 | 0.01897 | 0.01837 |
| (10) | f1/f2 | 2.800 | 2.808 | 3.800 | 3.503 |
| (11) | f/f1 | 0.499 | 0.488 | 0.398 | 0.420 |
| (12) | f/f2 | 1.398 | 1.369 | 1.512 | 1.472 |
| (13) | P1/D12 | −2.036 | −2.029 | −2.772 | −2.538 |
| (14) | θ1max | 0.64960 | 0.66311 | 0.61364 | 0.62025 |
| (15) | θ2max | 0.57295 | 0.57295 | 0.57295 | 0.57295 |
| (16) | θ1p − θ1n + 0.00163 × (ν1p − ν1n) | −0.00076 | 0.00888 | 0.00597 | 0.00486 |
| (17) | θ2p − θ2n + 0.00163 × (ν2p − ν2n) | −0.01078 | −0.01000 | −0.00966 | −0.00911 |
| (18) | Nce1Ap − Nce1An | — | — | — | — |
| (19) | νce1Ap − νce1An | — | — | — | — |
| (20) | Nce1Bp − Nce1Bn | — | — | — | — |
| (21) | νce1Bp − νce1Bn | — | — | — | — |
| (22) | Nce1Cp − Nce1Cn | — | — | — | — |
| (23) | νce1Cp − νce1Cn | — | — | — | — |
| (24) | Nce1Dp − Nce1Dn | 0.16114 | 0.11770 | — | −0.02653 |
| (25) | νce1Dp − νce1Dn | 10.31 | 12.40 | — | 18.10 |
| (26) | Nce2p − Nce2n | — | — | — | — |
| (27) | νce2p − νce2n | — | — | — | — |
| (28) | f/fr | — | — | — | — |
| (29) | TL × FNo/f | 2.443 | 2.660 | 2.262 | 2.244 |
| (30) | 1/{tan((ωmax) × FNo} | 3.329 | 3.279 | 3.512 | 3.482 |
| (31) | Tf/TL | 0.589 | 0.620 | 0.550 | 0.546 |
| (32) | f/fm | 0.822 | 0.796 | 0.933 | 0.856 |

The F numbers of the imaging lenses of Examples 1 to 20 are less than 1.2, and more specifically, less than 1.05. The imaging lens of Examples 1 to 20 have such a small F number, reduction in weight of focus group is achieved, and various aberrations are satisfactorily corrected, whereby high optical performance is achieved.

Figure 63:
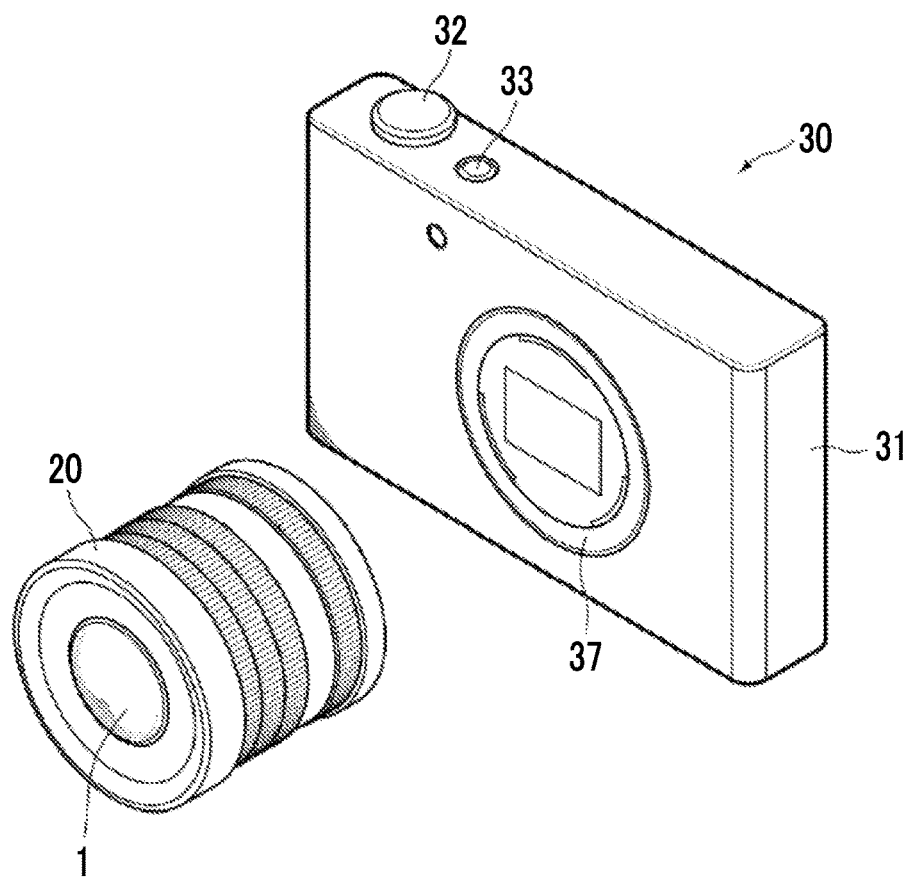
FIG. 63 is a perspective view of the front side of an imaging apparatus according to an embodiment of the present disclosure.
Figure 64:
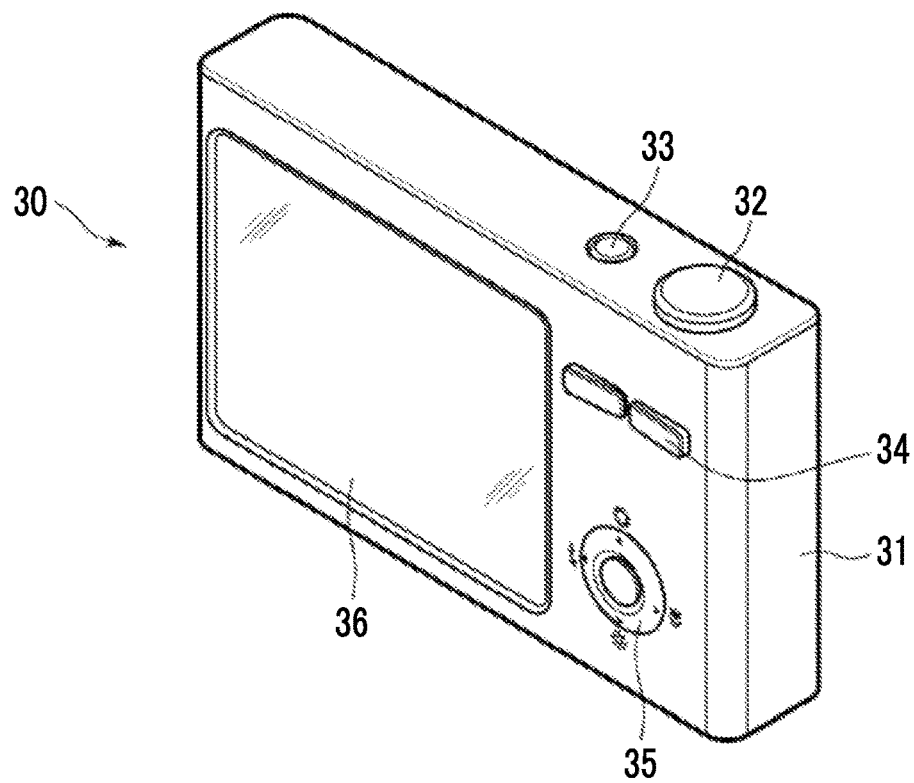
FIG. 64 is a perspective view of the rear side of an imaging apparatus according to an embodiment of the present disclosure.

Next, an imaging apparatus according to an embodiment of the present disclosure will be described. FIGS. 63 and 64 are external views of a camera 30 which is the imaging apparatus according to the embodiment of the present disclosure. FIG. 63 is a perspective view of the camera 30 viewed from the front surface side, and FIG. 64 is a perspective view of the camera 30 viewed from the rear surface side. The camera 30 is a so-called mirrorless type digital camera, and the interchangeable lens 20 can be detachably attached thereto. The interchangeable lens 20 includes the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

Further, the imaging apparatus according to the embodiment of the present disclosure is not limited to the above example, and may be modified into various forms such as a camera other than the mirrorless type, a film camera, and a video camera.

The entire disclosure of Japanese Patent Application No. 2019-016233A filed on Jan. 31, 2019 and Japanese Patent Application No. 2020-012798A filed on Jan. 29, 2020 is incorporated into the present specification by reference. All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An imaging lens comprising, successively in order from a position closest to an object side to an image side: a first lens group that remains stationary with respect to an image plane during focusing and has a positive refractive power; a stop; and a second lens group that moves during focusing and has a positive refractive power, wherein the second lens group consists of all lenses, which integrally move during focusing, among lenses which are disposed closer to the image side than the stop, and assuming that a maximum value of heights of a paraxial ray from an optical axis in the first lens group is H1max, in a case in which paraxial ray tracing is performed by causing the paraxial ray, of which a height from the optical axis on a lens surface closest to the object side in the first lens group is H1f, and which is parallel to the optical axis, to be incident from the object side, Conditional Expression (1) is satisfied, which is represented by $$1.05 < H1max/H1f < 2 \quad (1),$$

wherein the first lens group includes at least one positive lens and at least one negative lens, and assuming that an average of Abbe numbers of all positive lenses in the first lens group based on a d line is ν1p, and an average of Abbe numbers of all negative lenses in the first lens group based on the d line is ν1n, Conditional Expression (6) is satisfied, which is represented by $$5 < \nu 1p - \nu 1n < 45 \quad (6),$$

wherein assuming that a height of the paraxial ray from the optical axis on a lens surface closest to the object side in the second lens group is H2f, Conditional Expression (2-2) is satisfied, which is represented by $$1.7 < H1max/H2f < 3.5 \quad (2\text{-}2), \text{ and}$$

wherein the first lens group includes at least three cemented lenses, each of which is formed by cementing one positive lens and one negative lens.

2. The imaging lens according to claim 1, wherein the first lens group includes at least five positive lenses and at least four negative lenses.

3. The imaging lens according to claim 1, wherein the first lens group includes, successively in order from a position closest to the image side to the object side, one or two negative lenses and three positive lenses convex toward the object side.

4. The imaging lens according to claim 1, wherein the first lens group includes at least three biconvex lenses and at least one biconcave lens.

5. The imaging lens according to claim 1, wherein the second lens group includes at least two positive lenses and at least two negative lenses.

6. The imaging lens according to claim 1, wherein an image side surface of a negative lens closest to the image side in the first lens group is a concave surface.

7. The imaging lens according to claim 1, wherein the second lens group includes at least one negative lens, and an object side surface of a negative lens closest to the object side in the second lens group is a concave surface.

8. The imaging lens according to claim 1, wherein the first lens group and the second lens group each include at least one negative lens, an image side surface of a negative lens closest to the image side in the first lens group is a concave surface, an object side surface of a negative lens closest to the object side in the second lens group is a concave surface, and assuming that a radius of curvature of the image side surface of the negative lens closest to the image side in the first lens group is Rso, and a radius of curvature of the object side surface of the negative lens closest to the object side in the second lens group is Rsi, Conditional Expression (3) is satisfied, which is represented by $$-0.4 < (Rso + Rsi)/(Rso - Rsi) < 0.5 \quad (3).$$

9. The imaging lens according to claim 1, wherein assuming that a lateral magnification of the second lens group in a state where an object at infinity is in focus is β2, Conditional Expression (4) is satisfied, which is represented by $$0.2 < \beta 2 < 0.8 \quad (4).$$

10. The imaging lens according to claim 1, wherein assuming that a lateral magnification of the second lens group in a state where an object at infinity is in focus is β2, and a combined lateral magnification of all lenses closer to the image side than the second lens group in the state where the object at infinity is in focus is βr in a case where a lens is disposed closer to the image side than the second lens group, and βr is set to 1 in a case where no lens is disposed closer to the image side than the second lens group, Conditional Expression (5) is satisfied, which is represented by $$0.4 < (1 - \beta 2^2) \times \beta r^2 < 1.2 \quad (5).$$

11. The imaging lens according to claim 1,
wherein assuming that an average of partial dispersion ratios of all the positive lenses in the first lens group between a g line and an F line is θ1p, and an average of partial dispersion ratios of all the negative lenses in the first lens group between the g line and the F line is θ1n, Conditional Expression (7) is satisfied, which is represented by $$0 < \theta 1n - \theta 1p < 0.07 \quad (7).$$

12. The imaging lens according to claim 1,
wherein the second lens group includes at least one positive lens and at least one negative lens, and
assuming that an average of Abbe numbers of all positive lenses in the second lens group based on a d line is ν2p, an average of Abbe numbers of all negative lenses in the second lens group based on the d line is ν2n, an average of partial dispersion ratios of all the positive lenses in the second lens group between a g line and an F line is θ2p, and an average of partial dispersion ratios of all the negative lenses in the second lens group between the g line and the F line is θ2n, Conditional Expressions (8) and (9) are satisfied, which are represented by $$-10 < \nu 2p - \nu 2n < 35 \quad (8), \text{ and}$$

$$-0.03 < \theta 2n - \theta 2p < 0.07 \quad (9).$$

13. The imaging lens according to claim 1, wherein assuming that a focal length of the first lens group is f1, and a focal length of the second lens group is f2, Conditional Expression (10) is satisfied, which is represented by $$1 < f1/f2 < 4.5 \quad (10).$$

14. The imaging lens according to claim 1, further comprising a subsequent group that is disposed to be subsequent to the second lens group on the image side of the second lens group and remains stationary with respect to the image plane during focusing.

15. The imaging lens according to claim 14, wherein assuming that
    a focal length of the imaging lens in a state where an object at infinity is in focus is f, and
    a focal length of the subsequent group is fr,
    Conditional Expression (28) is satisfied, which is represented by $$-0.3 < f/fr < 0.4 \quad (28).$$

16. The imaging lens according to claim 1, consisting of the first lens group, the stop, and the second lens group.

17. The imaging lens according to claim 1, wherein Conditional Expression (1-1) is satisfied, which is represented by $$1.1 < H1\max/H1f < 2 \quad (1-1).$$

18. The imaging lens according to claim 1, wherein Conditional Expression (2-1) is satisfied, which is represented by $$1.7 < H1\max/H2f < 2.5 \quad (2-1).$$

19. The imaging lens according to claim 1, wherein assuming that
    a focal length of the imaging lens in a state where an object at infinity is in focus is f, and
    a focal length of the first lens group is f1,
    Conditional Expression (11) is satisfied, which is represented by $$0.2 < f/f1 < 1 \quad (11).$$

20. The imaging lens according to claim 1, wherein assuming that
    a focal length of the imaging lens in a state where an object at infinity is in focus is f, and
    a focal length of the second lens group is f2,
    Conditional Expression (12) is satisfied, which is represented by $$0.5 < f/f2 < 2 \quad (12).$$

21. The imaging lens according to claim 1, wherein assuming that
    a distance on the optical axis from a lens surface closest to the image side in the first lens group to an image side principal point position of the first lens group is P1,
    a sign of P1 is negative in a case where the image side principal point position of the first lens group is closer to the object side than the lens surface closest to the image side in the first lens group, and a sign of P1 is positive in a case where the image side principal point position of the first lens group is closer to the image side than the lens surface closest to the image side in the first lens group, and
    a distance on the optical axis between the first lens group and the second lens group in a state where an object at infinity is in focus is D12,
    Conditional Expression (13) is satisfied, which is represented by $$-5 < P1/D12 < 20 \quad (13).$$

22. The imaging lens according to claim 1, wherein assuming that a maximum value of partial dispersion ratios of positive lenses in the first lens group between a g line and an F line is θ1max, Conditional Expression (14) is satisfied, which is represented by $$0.56 < \theta1\max < 0.7 \quad (14).$$

23. The imaging lens according to claim 1, wherein assuming that a maximum value of partial dispersion ratios of positive lenses in the second lens group between a g line and an F line is θ2max, Conditional Expression (15) is satisfied, which is represented by $$0.54 < \theta2\max < 0.7 \quad (15).$$

24. The imaging lens according to claim 1,
    wherein assuming that
        an average of partial dispersion ratios of all positive lenses in the first lens group between a g line and an F line is θ1p, and
        an average of partial dispersion ratios of all negative lenses in the first lens group between the g line and the F line is θ1n,
        Conditional Expression (16) is satisfied, which is represented by $$-0.04 < \theta1p - \theta1n + 0.00163 \times (v1p - v1n) < 0.03 \quad (16).$$

25. The imaging lens according to claim 1,
    wherein the second lens group includes at least one positive lens and at least one negative lens, and
    assuming that
        an average of partial dispersion ratios of all positive lenses in the second lens group between a g line and an F line is θ2p,
        an average of partial dispersion ratios of all negative lenses in the second lens group between the g line and the F line is θ2n,
        an average of Abbe numbers of all the positive lenses in the second lens group based on a d line is v2p, and
        an average of Abbe numbers of all the negative lenses in the second lens group based on the d line is v2n,
        Conditional Expression (17) is satisfied, which is represented by $$-0.02 < \theta2p - \theta2n + 0.00163 \times (v2p - v2n) < 0.02 \quad (17).$$

26. The imaging lens according to claim 1,
    wherein assuming that
        an average of refractive indices of all positive lenses in the cemented lens closest to the object side in the first lens group at a d line is Nce1Ap, and
        an average of refractive indices of all negative lenses in the cemented lens closest to the object side in the first lens group at the d line is Nce1An,
        Conditional Expression (18) is satisfied, which is represented by $$-0.2 < Nce1Ap - Nce1An < 0.35 \quad (18).$$

27. The imaging lens according to claim 1,
    wherein the first lens group includes at least four cemented lenses, each of which is formed by cementing one positive lens and one negative lens, and
    assuming that
        an average of refractive indices of all positive lenses in the cemented lens which is second from the object side in the first lens group at a d line is Nce1Bp, and
        an average of refractive indices of all negative lenses in the cemented lens which is second from the object side in the first lens group at the d line is Nce1Bn, Conditional Expression (20) is satisfied, which is represented by $$0 < Nce1Bp - Nce1Bn < 0.35 \qquad (20).$$

28. The imaging lens according to claim 1,
wherein the first lens group includes at least four cemented lenses, each of which is formed by cementing one positive lens and one negative lens, and
assuming that
an average of Abbe numbers of all positive lenses in the cemented lens which is second from the object side in the first lens group based on a d line is vce1Bp, and
an average of Abbe numbers of all negative lenses in the cemented lens which is second from the object side in the first lens group based on the d line is vce1Bn,
Conditional Expression (21) is satisfied, which is represented by $$-20 < vce1Bp - vce1Bn < 20 \qquad (21).$$

29. The imaging lens according to claim 1,
wherein the second lens group includes a three-piece cemented lens which is formed by cementing a positive lens, a negative lens, and a positive lens in order from the object side, and
assuming that
an average of refractive indices of all the positive lenses in the three-piece cemented lens in the second lens group at a d line is Nce2p, and
a refractive index of the negative lens in the three-piece cemented lens in the second lens group at the d line is Nce2n,
Conditional Expression (26) is satisfied, which is represented by $$0 < Nce2p - Nce2n < 0.25 \qquad (26).$$

30. The imaging lens according to claim 1,
wherein the second lens group includes a three-piece cemented lens which is formed by cementing a positive lens, a negative lens, and a positive lens in order from the object side, and
assuming that
an average of Abbe numbers of all the positive lenses in the three-piece cemented lens in the second lens group based on a d line is vce2p, and
an Abbe number of the negative lens in the three-piece cemented lens in the second lens group based on the d line is vce2n,
Conditional Expression (27) is satisfied, which is represented by $$0 < vce2p - vce2n < 25 \qquad (27).$$

31. The imaging lens according to claim 1, wherein assuming that
a sum of a distance on the optical axis from a lens surface closest to the object side in the imaging lens to a lens surface closest to the image side in the imaging lens and a back focal length at an air conversion distance in a state where an object at infinity is in focus is TL,
an F number of the imaging lens in the state where the object at infinity is in focus is FNo, and
a focal length of the imaging lens in the state where the object at infinity is in focus is f,
Conditional Expression (29) is satisfied, which is represented by $$1.5 < TL \times FNo/f < 5 \qquad (29).$$

32. The imaging lens according to claim 1, wherein the second lens group includes at least two positive lenses and at least three negative lenses.

33. The imaging lens according to claim 1, comprising, successively in order from the position closest to the object side: a single lens that has a negative refractive power, a single lens that has a positive refractive power, and a single lens that has a positive refractive power.

34. The imaging lens according to claim 1, wherein the number of lenses disposed closer to the object side than the stop is 8 or less.

35. The imaging lens according to claim 1, wherein the number of lenses disposed closer to the object side than the stop is 7 or less.

36. The imaging lens according to claim 1, wherein the number of lenses included in the imaging lens is 13 or less.

37. The imaging lens according to claim 1, wherein the number of lenses included in the imaging lens is 12 or less.

38. The imaging lens according to claim 1, wherein assuming that
a maximum half angle of view of the imaging lens in a state where an object at infinity is in focus is $\omega$max, and
an F number of the imaging lens in the state where the object at infinity is in focus is FNo,
Conditional Expression (30) is satisfied, which is represented by $$1.8 < 1/\{\tan(\omega max) \times FNo\} < 4.5 \qquad (30).$$

39. The imaging lens according to claim 1, wherein assuming that
a distance on the optical axis from a lens surface closest to the object side in the imaging lens to the stop in a state where an object at infinity is in focus is Tf, and
a sum of a distance on the optical axis from the lens surface closest to the object side in the imaging lens to a lens surface closest to the image side in the imaging lens and a back focal length at an air conversion distance in the state where the object at infinity is in focus is TL,
Conditional Expression (31) is satisfied, which is represented by $$0.2 < Tf/TL < 0.65 \qquad (31).$$

40. An imaging apparatus comprising the imaging lens according to claim 1.

* * * * *